(12) United States Patent
Farsad et al.

(10) Patent No.: US 8,137,444 B2
(45) Date of Patent: Mar. 20, 2012

(54) SYSTEMS AND METHODS FOR PROCESSING $CO_2$

(75) Inventors: Kasra Farsad, San Jose, CA (US); Robert W. Elliott, Salinas, CA (US); Richard P. O'Connor, Los Gatos, CA (US); William Randall Seeker, San Clemente, CA (US); Kyle Self, San Jose, CA (US); Justin Wall, Santa Cruz, CA (US)

(73) Assignee: Calera Corporation, Los Gatos, CA (US)

(*) Notice: Subject to any disclaimer, the term of this patent is extended or adjusted under 35 U.S.C. 154(b) by 0 days.

(21) Appl. No.: 12/721,545

(22) Filed: Mar. 10, 2010

(65) Prior Publication Data

US 2010/0230830 A1    Sep. 16, 2010

Related U.S. Application Data

(60) Provisional application No. 61/158,992, filed on Mar. 10, 2009, provisional application No. 61/168,166, filed on Apr. 9, 2009, provisional application No. 61/178,475, filed on May 14, 2009, provisional application No. 61/228,210, filed on Jul. 24, 2009, provisional application No. 61/230,042, filed on Jul. 30, 2009, provisional application No. 61/239,429, filed on Sep. 2, 2009, provisional application No. 61/178,360, filed on May 14, 2009, provisional application No. 61/221,457, filed on Jun. 29, 2009, provisional application No. 61/221,631, filed on Jun. 30, 2009, provisional application No. 61/223,657, filed on Jul. 7, 2009, provisional application No. 61/289,657, filed on Dec. 23, 2009, provisional application No. 61/306,412, filed on Feb. 19, 2010, provisional application No. 61/311,275, filed on Mar. 5, 2010.

(51) Int. Cl.
*B01D 53/14* (2006.01)
(52) U.S. Cl. .......... 96/235; 95/152; 95/236; 96/234
(58) Field of Classification Search .......... 95/236, 95/235, 152; 96/234, 235, 236
See application file for complete search history.

(56) References Cited

U.S. PATENT DOCUMENTS

| | | | |
|---|---|---|---|
| 1,655,171 | A | 1/1928 | Wagner |
| 1,678,345 | A | 7/1928 | Mattison |
| 1,759,361 | A | 5/1930 | Miller |
| 1,865,833 | A | 7/1932 | Chesny |
| 1,897,725 | A | 2/1933 | Gaus et al. |
| 1,924,503 | A | 8/1933 | Lambert |
| 2,082,101 | A | 6/1937 | Dougherty |

(Continued)

FOREIGN PATENT DOCUMENTS

AU         2007100157         4/2007

(Continued)

OTHER PUBLICATIONS

Aker, "Aker Clean Carbon, Carbon Capture Solutions Provider" Aker Clean Carbon Presentation for UN's IPCC; (Jan. 24, 2008); 8pp.

(Continued)

*Primary Examiner* — Duane Smith

(57) ABSTRACT

Systems and methods for lowering levels of carbon dioxide and other atmospheric pollutants are provided. Economically viable systems and processes capable of removing vast quantities of carbon dioxide and other atmospheric pollutants from gaseous waste streams and sequestering them in storage-stable forms are also discussed.

10 Claims, 49 Drawing Sheets

U.S. PATENT DOCUMENTS

| | | |
|---|---|---|
| 2,242,294 A | 5/1941 | Fox et al. |
| 2,304,391 A | 12/1942 | Zimmerman |
| 2,329,940 A | 9/1943 | Ponzer |
| 2,383,674 A | 8/1945 | Osborne |
| 2,458,039 A | 1/1949 | Wait |
| 2,606,839 A | 8/1952 | Evans |
| 2,934,419 A | 4/1960 | Cook |
| 2,967,807 A | 1/1961 | Osborne et al. |
| 3,046,152 A | 7/1962 | Tsuneyoshi |
| 3,120,426 A | 2/1964 | Crawford, Jr. |
| 3,165,460 A | 1/1965 | Zang et al. |
| 3,179,579 A | 4/1965 | Gustave et al. |
| 3,196,092 A | 7/1965 | Beer |
| 3,202,522 A | 8/1965 | Yang et al. |
| 3,262,865 A | 7/1966 | Waters, Jr. |
| 3,264,125 A | 8/1966 | Bourlin et al. |
| 3,322,574 A | 5/1967 | Justi et al. |
| 3,340,003 A | 9/1967 | Judd |
| 3,350,292 A | 10/1967 | Weinberger et al. |
| 3,374,164 A | 3/1968 | Balej et al. |
| 3,420,775 A | 1/1969 | Cadwallader |
| 3,463,814 A | 8/1969 | Blanco et al. |
| 3,466,169 A | 9/1969 | Nowak et al. |
| 3,511,595 A | 5/1970 | Fuchs |
| 3,511,712 A | 5/1970 | Giner |
| 3,525,675 A | 8/1970 | Gaudin |
| 3,558,769 A | 1/1971 | Globus |
| 3,574,530 A | 4/1971 | Suriani et al. |
| 3,627,479 A | 12/1971 | Yee |
| 3,627,480 A | 12/1971 | Birchall |
| 3,630,762 A | 12/1971 | Olton et al. |
| 3,663,379 A | 5/1972 | Kendall |
| 3,686,372 A | 8/1972 | Hiatt et al. |
| 3,721,621 A | 3/1973 | Hough |
| 3,725,267 A | 4/1973 | Gelblum |
| 3,733,788 A | 5/1973 | Crowley |
| 3,816,592 A | 6/1974 | Rinaldi et al. |
| 3,847,632 A | 11/1974 | Blengsli |
| 3,861,928 A | 1/1975 | Slater et al. |
| 3,864,236 A | 2/1975 | Lindstrom |
| 3,904,496 A | 9/1975 | Harke et al. |
| 3,917,795 A | 11/1975 | Pelczarski et al. |
| 3,925,534 A | 12/1975 | Singleton et al. |
| 3,953,568 A | 4/1976 | Seko et al. |
| 3,963,592 A | 6/1976 | Lindstrom |
| 3,970,528 A | 7/1976 | Zirngiebl et al. |
| 3,975,503 A | 8/1976 | Hauschild et al. |
| 4,000,991 A | 1/1977 | Melin, Jr. et al. |
| 4,002,721 A | 1/1977 | Guffy et al. |
| 4,026,716 A | 5/1977 | Urschel, III et al. |
| 4,036,749 A | 7/1977 | Anderson |
| 4,069,063 A | 1/1978 | Ball |
| 4,080,270 A | 3/1978 | O+Leary et al. |
| 4,106,296 A | 8/1978 | Leonard, Jr. et al. |
| 4,107,022 A | 8/1978 | Strempel et al. |
| 4,117,060 A | 9/1978 | Murray |
| 4,128,462 A | 12/1978 | Ghiringhelli et al. |
| 4,140,510 A | 2/1979 | Scholze et al. |
| 4,147,599 A | 4/1979 | O'Leary et al. |
| 4,157,250 A | 6/1979 | Regehr et al. |
| 4,164,537 A | 8/1979 | Drostholm et al. |
| 4,188,291 A | 2/1980 | Anderson |
| 4,217,186 A | 8/1980 | McRae |
| 4,219,396 A | 8/1980 | Gancy et al. |
| 4,242,185 A | 12/1980 | McRae |
| 4,246,075 A | 1/1981 | Hilbertz |
| 4,253,922 A | 3/1981 | Welch |
| 4,264,367 A | 4/1981 | Schutz |
| 4,303,549 A | 12/1981 | Boylan |
| 4,307,066 A | 12/1981 | Davidson |
| 4,308,298 A | 12/1981 | Chen |
| 4,335,788 A | 6/1982 | Murphey et al. |
| 4,337,230 A * | 6/1982 | Ellestad et al. ........... 423/243.03 |
| 4,340,572 A | 7/1982 | Ben-Shmuel et al. |
| 4,361,475 A | 11/1982 | Moeglich |
| 4,363,667 A | 12/1982 | Birchall |
| 4,370,307 A | 1/1983 | Judd |
| 4,376,101 A | 3/1983 | Sartori et al. |
| 4,377,554 A | 3/1983 | Johnson |
| 4,410,606 A | 10/1983 | Loutfy et al. |
| 4,450,009 A | 5/1984 | Childs et al. |
| 4,477,573 A | 10/1984 | Taufen |
| 4,561,945 A | 12/1985 | Coker et al. |
| 4,588,443 A | 5/1986 | Bache |
| 4,620,969 A | 11/1986 | Wilkinson |
| 4,634,533 A | 1/1987 | Somerville et al. |
| 4,670,234 A | 6/1987 | Holter et al. |
| 4,716,027 A | 12/1987 | Morrison |
| 4,804,449 A | 2/1989 | Sweeney |
| 4,818,367 A | 4/1989 | Winkler |
| 4,838,941 A | 6/1989 | Hill |
| 4,852,344 A | 8/1989 | Warner |
| 4,899,544 A | 2/1990 | Boyd |
| 4,915,877 A | 4/1990 | Shepherd |
| 4,915,914 A | 4/1990 | Morrison |
| 4,931,264 A | 6/1990 | Rochelle et al. |
| 5,037,286 A | 8/1991 | Roberts |
| 5,100,633 A | 3/1992 | Morrison |
| 5,141,620 A | 8/1992 | Molter |
| 5,230,734 A | 7/1993 | Kumasaka et al. |
| 5,244,304 A | 9/1993 | Weill et al. |
| 5,246,551 A | 9/1993 | Pletcher et al. |
| 5,275,794 A | 1/1994 | Luna |
| 5,282,935 A | 2/1994 | Cawlfield et al. |
| 5,362,688 A | 11/1994 | Porta et al. |
| 5,364,611 A | 11/1994 | Iijima et al. |
| 5,366,513 A | 11/1994 | Goldmann et al. |
| 5,376,343 A | 12/1994 | Fouche |
| 5,378,279 A | 1/1995 | Conroy |
| 5,388,456 A | 2/1995 | Kettel |
| 5,470,671 A | 11/1995 | Fletcher et al. |
| 5,520,898 A | 5/1996 | Pinnavaia et al. |
| 5,531,821 A | 7/1996 | Wu |
| 5,531,865 A | 7/1996 | Cole |
| 5,536,310 A | 7/1996 | Brook et al. |
| 5,547,027 A | 8/1996 | Chan et al. |
| 5,569,558 A | 10/1996 | Takeuchi et al. |
| 5,584,923 A | 12/1996 | Wu |
| 5,584,926 A | 12/1996 | Borgholm et al. |
| 5,595,641 A | 1/1997 | Traini et al. |
| 5,614,078 A | 3/1997 | Lubin et al. |
| 5,624,493 A | 4/1997 | Wagh et al. |
| 5,690,729 A | 11/1997 | Jones, Jr. |
| 5,702,585 A | 12/1997 | Hillrichs et al. |
| 5,749,930 A | 5/1998 | Wolf et al. |
| 5,766,338 A | 6/1998 | Weber |
| 5,766,339 A | 6/1998 | Babu et al. |
| 5,776,328 A | 7/1998 | Traini et al. |
| 5,785,868 A | 7/1998 | Li et al. |
| 5,792,440 A | 8/1998 | Huege |
| 5,803,894 A | 9/1998 | Kao et al. |
| 5,846,669 A | 12/1998 | Smotkin et al. |
| 5,849,075 A | 12/1998 | Hopkins et al. |
| 5,853,686 A | 12/1998 | Doxsee |
| 5,855,666 A | 1/1999 | Kao et al. |
| 5,855,759 A | 1/1999 | Keating et al. |
| 5,885,478 A | 3/1999 | Montgomery et al. |
| 5,897,704 A | 4/1999 | Baglin |
| 5,925,255 A | 7/1999 | Mukhopadhyay |
| 5,958,353 A | 9/1999 | Eyal |
| 5,965,201 A | 10/1999 | Jones, Jr. |
| 6,024,848 A | 2/2000 | Dufner et al. |
| 6,059,974 A | 5/2000 | Scheurman, III |
| 6,071,336 A | 6/2000 | Fairchild et al. |
| 6,080,297 A | 6/2000 | Ayers |
| 6,090,197 A | 7/2000 | Vivian et al. |
| 6,129,832 A | 10/2000 | Fuhr et al. |
| 6,139,605 A * | 10/2000 | Carnell et al. ................... 95/164 |
| 6,174,507 B1 | 1/2001 | Wallace et al. |
| 6,180,012 B1 | 1/2001 | Rongved |
| 6,186,426 B1 | 2/2001 | Killer |
| 6,190,428 B1 | 2/2001 | Rolison et al. |
| 6,200,381 B1 | 3/2001 | Rechichi |
| 6,200,543 B1 | 3/2001 | Allebach et al. |
| 6,217,728 B1 | 4/2001 | Lehmann et al. |
| 6,221,225 B1 | 4/2001 | Mani |
| 6,235,186 B1 | 5/2001 | Tanaka et al. |

| Patent No. | Date | Inventor |
|---|---|---|
| 6,248,166 B1 | 6/2001 | Solsvik |
| 6,251,356 B1 | 6/2001 | Mathur |
| 6,264,736 B1 | 7/2001 | Knopf et al. |
| 6,264,740 B1 | 7/2001 | McNulty, Jr. |
| 6,280,505 B1 | 8/2001 | Torkildsen et al. |
| 6,293,731 B1 | 9/2001 | Studer |
| 6,309,570 B1 | 10/2001 | Fellabaum |
| 6,331,207 B1 | 12/2001 | Gebhardt |
| 6,352,576 B1 | 3/2002 | Spencer et al. |
| 6,375,825 B1 | 4/2002 | Mauldin et al. |
| 6,387,174 B2 | 5/2002 | Knopf et al. |
| 6,387,212 B1 | 5/2002 | Christian |
| 6,402,831 B1 | 6/2002 | Sawara et al. |
| 6,416,574 B1 | 7/2002 | Steelhammer et al. |
| 6,428,767 B1 | 8/2002 | Burch et al. |
| 6,444,107 B2 | 9/2002 | Hartel et al. |
| 6,447,437 B1 | 9/2002 | Lee et al. |
| 6,475,460 B1 | 11/2002 | Max |
| 6,495,013 B2 | 12/2002 | Mazur et al. |
| 6,517,631 B1 | 2/2003 | Bland |
| 6,518,217 B2 | 2/2003 | Xing et al. |
| 6,537,456 B2 | 3/2003 | Mukhopadhyay |
| 6,602,630 B1 | 8/2003 | Gopal |
| 6,613,141 B2 | 9/2003 | Key, Jr. |
| 6,620,856 B1 | 9/2003 | Mortimer et al. |
| 6,623,555 B1 | 9/2003 | Haverinen et al. |
| 6,638,413 B1 | 10/2003 | Weinberg et al. |
| 6,648,949 B1 | 11/2003 | Der et al. |
| 6,712,946 B2 | 3/2004 | Genders et al. |
| 6,755,905 B2 | 6/2004 | Oates et al. |
| 6,776,972 B2 | 8/2004 | Vohra et al. |
| 6,786,963 B2 | 9/2004 | Matherly et al. |
| 6,841,512 B1 | 1/2005 | Fetcenko et al. |
| 6,881,256 B2 | 4/2005 | Orange et al. |
| 6,890,419 B2 | 5/2005 | Reichman et al. |
| 6,890,497 B2 * | 5/2005 | Rau et al. .................. 423/220 |
| 6,908,507 B2 | 6/2005 | Lalande et al. |
| 6,936,573 B2 | 8/2005 | Wertz et al. |
| 6,938,425 B2 | 9/2005 | Simpson et al. |
| 7,037,434 B2 | 5/2006 | Myers et al. |
| 7,040,400 B2 | 5/2006 | de Rouffignac et al. |
| 7,132,090 B2 | 11/2006 | Dziedzic et al. |
| 7,135,604 B2 | 11/2006 | Ding et al. |
| 7,182,851 B2 | 2/2007 | Gomez |
| 7,198,722 B2 | 4/2007 | Hussain |
| 7,255,842 B1 | 8/2007 | Yeh et al. |
| 7,261,912 B2 | 8/2007 | Zeigler |
| 7,282,189 B2 | 10/2007 | Zauderer |
| 7,285,166 B2 | 10/2007 | Luke et al. |
| 7,314,847 B1 | 1/2008 | Siriwardane |
| 7,347,896 B2 | 3/2008 | Harrison |
| 7,390,444 B2 | 6/2008 | Ramme et al. |
| 7,427,449 B2 | 9/2008 | Delaney et al. |
| 7,440,871 B2 | 10/2008 | McConnell et al. |
| 7,452,449 B2 | 11/2008 | Weinberg et al. |
| 7,455,854 B2 | 11/2008 | Gower et al. |
| 7,459,134 B2 | 12/2008 | Cadours et al. |
| 7,541,011 B2 | 6/2009 | Hu |
| 7,595,001 B2 | 9/2009 | Arakel et al. |
| 7,628,847 B2 * | 12/2009 | Pope et al. .................. 96/242 |
| 7,674,443 B1 | 3/2010 | Davis |
| 7,704,369 B2 | 4/2010 | Olah et al. |
| 7,727,374 B2 | 6/2010 | Jones |
| 7,735,274 B2 | 6/2010 | Constantz et al. |
| 7,744,761 B2 | 6/2010 | Constantz et al. |
| 7,749,476 B2 | 7/2010 | Constantz et al. |
| 7,753,618 B2 | 7/2010 | Constantz et al. |
| 7,754,169 B2 | 7/2010 | Constantz et al. |
| 7,771,684 B2 | 8/2010 | Constantz et al. |
| 7,790,012 B2 | 9/2010 | Kirk et al. |
| 7,815,880 B2 | 10/2010 | Constantz et al. |
| 7,829,053 B2 | 11/2010 | Constantz et al. |
| 7,875,163 B2 | 1/2011 | Gilliam et al. |
| 7,887,694 B2 | 2/2011 | Constantz et al. |
| 7,906,028 B2 | 3/2011 | Constantz et al. |
| 7,914,685 B2 | 3/2011 | Constantz et al. |
| 2001/0022952 A1 | 9/2001 | Rau et al. |
| 2001/0023655 A1 | 9/2001 | Knopf et al. |
| 2001/0054253 A1 | 12/2001 | Takahashi et al. |
| 2002/0009410 A1 | 1/2002 | Mathur |
| 2002/0127474 A1 | 9/2002 | Fleischer et al. |
| 2002/0151017 A1 | 10/2002 | Stemmer et al. |
| 2002/0155103 A1 | 10/2002 | Crippen et al. |
| 2003/0017088 A1 | 1/2003 | Downs et al. |
| 2003/0027023 A1 | 2/2003 | Dutil et al. |
| 2003/0123930 A1 | 7/2003 | Jacobs et al. |
| 2003/0126899 A1 | 7/2003 | Wolken |
| 2003/0188668 A1 | 10/2003 | Bland |
| 2003/0213937 A1 | 11/2003 | Yaniv |
| 2003/0229572 A1 | 12/2003 | Raines et al. |
| 2004/0014845 A1 | 1/2004 | Takamura et al. |
| 2004/0028963 A1 | 2/2004 | Kormann et al. |
| 2004/0040671 A1 | 3/2004 | Duesel, Jr. et al. |
| 2004/0040715 A1 | 3/2004 | Wellington et al. |
| 2004/0052865 A1 | 3/2004 | Gower et al. |
| 2004/0109927 A1 | 6/2004 | Ang et al. |
| 2004/0111968 A1 | 6/2004 | Day et al. |
| 2004/0126293 A1 | 7/2004 | Geerlings et al. |
| 2004/0139891 A1 | 7/2004 | Merkley et al. |
| 2004/0151957 A1 | 8/2004 | Brooks et al. |
| 2004/0213705 A1 | 10/2004 | Blencoe et al. |
| 2004/0219090 A1 | 11/2004 | Dziedzic et al. |
| 2004/0224214 A1 | 11/2004 | Vamos et al. |
| 2004/0228788 A1 | 11/2004 | Nagai et al. |
| 2004/0231568 A1 | 11/2004 | Morioka et al. |
| 2004/0234443 A1 | 11/2004 | Chen et al. |
| 2004/0259231 A1 | 12/2004 | Bhattacharya |
| 2004/0267077 A1 | 12/2004 | Ding et al. |
| 2005/0002847 A1 | 1/2005 | Maroto-Valer et al. |
| 2005/0011770 A1 | 1/2005 | Katsuyoshi et al. |
| 2005/0031515 A1 | 2/2005 | Charette |
| 2005/0031522 A1 | 2/2005 | Delaney et al. |
| 2005/0036932 A1 | 2/2005 | Takahashi et al. |
| 2005/0087496 A1 | 4/2005 | Borseth |
| 2005/0098499 A1 | 5/2005 | Hussain |
| 2005/0118081 A1 | 6/2005 | Harris et al. |
| 2005/0129606 A1 | 6/2005 | Mitsuhashi et al. |
| 2005/0136310 A1 | 6/2005 | Luo et al. |
| 2005/0154669 A1 | 7/2005 | Streetman |
| 2005/0180910 A1 | 8/2005 | Park et al. |
| 2005/0232855 A1 | 10/2005 | Stevens et al. |
| 2005/0232856 A1 | 10/2005 | Stevens et al. |
| 2005/0238563 A1 | 10/2005 | Eighmy et al. |
| 2005/0252215 A1 | 11/2005 | Beaumont |
| 2005/0255174 A1 | 11/2005 | Shelley et al. |
| 2006/0039853 A1 | 2/2006 | Fan et al. |
| 2006/0048517 A1 | 3/2006 | Fradette et al. |
| 2006/0051274 A1 | 3/2006 | Wright et al. |
| 2006/0057036 A1 | 3/2006 | Ayala Hermosillo |
| 2006/0060532 A1 | 3/2006 | Davis |
| 2006/0093540 A1 | 5/2006 | Fan et al. |
| 2006/0105082 A1 | 5/2006 | Zeigler |
| 2006/0165583 A1 | 7/2006 | Makino et al. |
| 2006/0169177 A1 | 8/2006 | Jardine et al. |
| 2006/0169593 A1 | 8/2006 | Xu et al. |
| 2006/0173169 A1 | 8/2006 | Cheryan |
| 2006/0184445 A1 | 8/2006 | Sandor et al. |
| 2006/0185516 A1 | 8/2006 | Moriyama et al. |
| 2006/0185560 A1 | 8/2006 | Ramme et al. |
| 2006/0185985 A1 | 8/2006 | Jones |
| 2006/0186562 A1 | 8/2006 | Wright et al. |
| 2006/0189837 A1 | 8/2006 | Forrester |
| 2006/0195002 A1 | 8/2006 | Grandjean et al. |
| 2006/0196836 A1 | 9/2006 | Arakel et al. |
| 2006/0286011 A1 | 12/2006 | Anttila et al. |
| 2006/0288912 A1 | 12/2006 | Sun et al. |
| 2007/0045125 A1 | 3/2007 | Hartvigsen et al. |
| 2007/0056487 A1 | 3/2007 | Anthony et al. |
| 2007/0092427 A1 | 4/2007 | Anthony et al. |
| 2007/0099038 A1 | 5/2007 | Galloway |
| 2007/0113500 A1 | 5/2007 | Zhao |
| 2007/0148509 A1 | 6/2007 | Colbow et al. |
| 2007/0163443 A1 | 7/2007 | Moriyama et al. |
| 2007/0184394 A1 | 8/2007 | Comrie |
| 2007/0186820 A1 | 8/2007 | O'Hearn |
| 2007/0187247 A1 | 8/2007 | Lackner et al. |
| 2007/0202032 A1 | 8/2007 | Geerlings et al. |
| 2007/0212584 A1 | 9/2007 | Chuang |

| | | |
|---|---|---|
| 2007/0217981 A1 | 9/2007 | Van Essendelft |
| 2007/0233616 A1 | 10/2007 | Richards et al. |
| 2007/0240570 A1 | 10/2007 | Jadhav et al. |
| 2007/0251393 A1 | 11/2007 | Pope et al. |
| 2007/0261947 A1 | 11/2007 | Geerlings et al. |
| 2007/0266632 A1 | 11/2007 | Tsangaris et al. |
| 2008/0031801 A1 | 2/2008 | Lackner et al. |
| 2008/0035036 A1 | 2/2008 | Bassani et al. |
| 2008/0059206 A1 | 3/2008 | Jenkins |
| 2008/0099122 A1 | 5/2008 | Andersen et al. |
| 2008/0104858 A1 | 5/2008 | Carin et al. |
| 2008/0112868 A1 | 5/2008 | Blencoe et al. |
| 2008/0134891 A1 | 6/2008 | Jarvenpaa |
| 2008/0138265 A1 | 6/2008 | Lackner et al. |
| 2008/0171158 A1 | 7/2008 | Maddan |
| 2008/0178739 A1 | 7/2008 | Lewnard et al. |
| 2008/0213146 A1 | 9/2008 | Zauderer |
| 2008/0223727 A1 | 9/2008 | Oloman et al. |
| 2008/0233029 A1 | 9/2008 | Fan et al. |
| 2008/0236143 A1 | 10/2008 | Lo |
| 2008/0245274 A1 | 10/2008 | Ramme |
| 2008/0245660 A1 | 10/2008 | Little et al. |
| 2008/0245672 A1 | 10/2008 | Little et al. |
| 2008/0248350 A1 | 10/2008 | Little et al. |
| 2008/0270272 A1 | 10/2008 | Branscomb |
| 2008/0275149 A1 | 11/2008 | Ladely et al. |
| 2008/0276553 A1 | 11/2008 | Ingjaldsdottir et al. |
| 2008/0277319 A1 | 11/2008 | Wyrsta |
| 2008/0289495 A1 | 11/2008 | Eisenberger et al. |
| 2009/0001020 A1 | 1/2009 | Constantz et al. |
| 2009/0010827 A1 | 1/2009 | Geerlings et al. |
| 2009/0020044 A1 | 1/2009 | Constantz et al. |
| 2009/0043687 A1 | 2/2009 | van Soestbergen et al. |
| 2009/0078162 A1 | 3/2009 | Clausi et al. |
| 2009/0081093 A1 | 3/2009 | Comrie |
| 2009/0081096 A1 | 3/2009 | Pellegrin |
| 2009/0081112 A1 | 3/2009 | Virtanen |
| 2009/0090277 A1 | 4/2009 | Joshi et al. |
| 2009/0101008 A1 | 4/2009 | Lackner et al. |
| 2009/0107038 A1 | 4/2009 | Wan |
| 2009/0120288 A1 | 5/2009 | Lackner |
| 2009/0120644 A1 | 5/2009 | Roddy et al. |
| 2009/0143211 A1 | 6/2009 | Riman et al. |
| 2009/0148238 A1 | 6/2009 | Smith |
| 2009/0169452 A1 | 7/2009 | Constantz et al. |
| 2009/0186244 A1 | 7/2009 | Mayer |
| 2009/0202410 A1 | 8/2009 | Kawatra et al. |
| 2009/0214408 A1 | 8/2009 | Blake et al. |
| 2009/0232861 A1 | 9/2009 | Wright et al. |
| 2009/0263301 A1 | 10/2009 | Reddy et al. |
| 2009/0294366 A1 | 12/2009 | Wright et al. |
| 2009/0301352 A1 | 12/2009 | Constantz et al. |
| 2010/0000444 A1 | 1/2010 | Constantz et al. |
| 2010/0024686 A1 | 2/2010 | Constantz et al. |
| 2010/0037653 A1 | 2/2010 | Enis et al. |
| 2010/0051859 A1 | 3/2010 | House et al. |
| 2010/0063902 A1 | 3/2010 | Constantz et al. |
| 2010/0068109 A1 | 3/2010 | Comrie |
| 2010/0077691 A1 | 4/2010 | Constantz et al. |
| 2010/0077922 A1 | 4/2010 | Constantz et al. |
| 2010/0083880 A1 | 4/2010 | Constantz et al. |
| 2010/0084280 A1 | 4/2010 | Gilliam et al. |
| 2010/0089142 A1 | 4/2010 | Sukhija et al. |
| 2010/0111810 A1 | 5/2010 | Constantz et al. |
| 2010/0116683 A1 | 5/2010 | Gilliam |
| 2010/0132556 A1 | 6/2010 | Constantz et al. |
| 2010/0132591 A1 | 6/2010 | Constantz et al. |
| 2010/0135865 A1 | 6/2010 | Constantz et al. |
| 2010/0135882 A1 | 6/2010 | Constantz et al. |
| 2010/0140103 A1 | 6/2010 | Gilliam et al. |
| 2010/0144521 A1 | 6/2010 | Constantz et al. |
| 2010/0150802 A1 | 6/2010 | Gilliam et al. |
| 2010/0154679 A1 | 6/2010 | Constantz et al. |
| 2010/0155258 A1 | 6/2010 | Kirk et al. |
| 2010/0158786 A1 | 6/2010 | Constantz et al. |
| 2010/0196104 A1 | 8/2010 | Constantz et al. |
| 2010/0200419 A1 | 8/2010 | Gilliam et al. |
| 2010/0219373 A1 | 9/2010 | Seeker et al. |
| 2010/0224503 A1 | 9/2010 | Kirk et al. |
| 2010/0229725 A1 | 9/2010 | Farsad et al. |
| 2010/0230293 A1 | 9/2010 | Gilliam et al. |
| 2010/0236242 A1 | 9/2010 | Farsad et al. |
| 2010/0239467 A1 | 9/2010 | Constantz et al. |
| 2010/0239487 A1 | 9/2010 | Constantz et al. |
| 2010/0247410 A1 | 9/2010 | Constantz et al. |
| 2010/0258035 A1 | 10/2010 | Constantz et al. |
| 2010/0276299 A1 | 11/2010 | Kelly et al. |
| 2010/0290967 A1 | 11/2010 | Detournay et al. |
| 2010/0313793 A1 | 12/2010 | Constantz et al. |
| 2010/0313794 A1 | 12/2010 | Constantz et al. |
| 2010/0319586 A1 | 12/2010 | Blount et al. |
| 2010/0326328 A1 | 12/2010 | Constantz et al. |
| 2011/0030586 A1 | 2/2011 | Constantz et al. |
| 2011/0030957 A1 | 2/2011 | Constantz et al. |
| 2011/0033239 A1 | 2/2011 | Constantz et al. |
| 2011/0035154 A1 | 2/2011 | Kendall et al. |
| 2011/0036728 A1 | 2/2011 | Farsad et al. |
| 2011/0042230 A1 | 2/2011 | Gilliam et al. |
| 2011/0054084 A1 | 3/2011 | Constantz et al. |
| 2011/0059000 A1 | 3/2011 | Constantz et al. |
| 2011/0067600 A1 | 3/2011 | Constantz et al. |
| 2011/0067603 A1 | 3/2011 | Constantz et al. |
| 2011/0067605 A1 | 3/2011 | Constantz et al. |
| 2011/0071309 A1 | 3/2011 | Constantz et al. |

FOREIGN PATENT DOCUMENTS

| | | |
|---|---|---|
| AU | 2008256636 B2 | 12/2008 |
| CA | 1303822 C | 6/1988 |
| CA | 1335974 A1 | 6/1995 |
| CA | 2308224 C | 4/1999 |
| CA | 2255287 A1 | 6/2000 |
| CA | 2353830 A1 | 6/2000 |
| CA | 2646462 | 9/2007 |
| CA | 2617325 A1 | 11/2007 |
| CA | 2659447 A1 | 12/2008 |
| DE | 2653649 A1 | 6/1978 |
| DE | 3146326 A1 | 6/1983 |
| DE | 3638317 A1 | 6/1987 |
| DE | 19523324 A1 | 9/1994 |
| DE | 19512163 A1 | 10/1995 |
| DE | 19631794 A1 | 8/1997 |
| EP | 0522382 A1 | 1/1993 |
| EP | 0487102 B1 | 8/1995 |
| EP | 0591350 B1 | 11/1996 |
| EP | 0628339 B1 | 9/1999 |
| EP | 0844905 B1 | 3/2000 |
| EP | 1379469 B1 | 3/2006 |
| EP | 1650162 A1 | 4/2006 |
| EP | 1716911 A1 | 11/2006 |
| EP | 1554031 B1 | 12/2006 |
| EP | 1571105 B1 | 12/2007 |
| EP | 2253600 A1 | 11/2010 |
| GB | 911386 A | 11/1962 |
| GB | 1392907 | 5/1975 |
| GB | 2032441 | 5/1980 |
| GB | 2050325 A | 1/1981 |
| GB | 2208163 A | 3/1989 |
| GB | 2210035 A | 6/1989 |
| GB | 2371810 | 8/2002 |
| JP | 51102357 A1 | 9/1976 |
| JP | 59100280 | 6/1984 |
| JP | 63-312988 | 12/1988 |
| JP | 03-020491 | 1/1991 |
| JP | 03-170363 A | 7/1991 |
| JP | 7061842 A | 3/1995 |
| JP | 10287461 | 10/1998 |
| JP | 10305212 A | 11/1998 |
| JP | 2000226402 A | 8/2000 |
| JP | 2002-273163 A | 9/2002 |
| JP | 2003041388 | 2/2003 |
| JP | 2004-174370 | 6/2004 |
| JP | 2005-052762 | 3/2005 |
| JP | 2006-076825 | 3/2006 |
| NL | 7607470 A | 1/1978 |
| WO | WO 93/16216 A1 | 8/1993 |
| WO | WO 94/18119 | 8/1994 |
| WO | WO 96/34997 A1 | 11/1996 |
| WO | WO 99/13967 A1 | 3/1999 |

| | | |
|---|---|---|
| WO | WO 2006/009600 A2 | 1/2000 |
| WO | WO 01/07365 A1 | 2/2001 |
| WO | WO 01/96243 A1 | 12/2001 |
| WO | WO 02/00551 A2 | 1/2002 |
| WO | WO 03/008071 A1 | 1/2003 |
| WO | WO 03/054508 A2 | 7/2003 |
| WO | WO 03/068685 A1 | 8/2003 |
| WO | WO 2004/041731 A1 | 5/2004 |
| WO | WO 2004/094043 A2 | 11/2004 |
| WO | WO 2004/098740 A2 | 11/2004 |
| WO | WO 2005/028379 A1 | 3/2005 |
| WO | WO 2005/078836 A2 | 8/2005 |
| WO | WO 2005/086843 A2 | 9/2005 |
| WO | WO 2005/108297 A2 | 11/2005 |
| WO | WO 2006/034339 A1 | 3/2006 |
| WO | WO 2006/036396 A2 | 4/2006 |
| WO | WO 2006/099599 A2 | 9/2006 |
| WO | WO 2006/113997 A1 | 11/2006 |
| WO | WO 2006/134080 A1 | 12/2006 |
| WO | WO 2007/003013 A1 | 1/2007 |
| WO | WO 2007/016271 A2 | 2/2007 |
| WO | WO 2007/022595 A1 | 3/2007 |
| WO | WO 2007/060149 A1 | 5/2007 |
| WO | WO 2007/069902 A1 | 6/2007 |
| WO | WO 2007/071633 A1 | 6/2007 |
| WO | WO 2007/082505 A2 | 7/2007 |
| WO | WO 2007/094691 A1 | 8/2007 |
| WO | WO 2007/096671 A1 | 8/2007 |
| WO | WO 2007/106372 A2 | 9/2007 |
| WO | WO 2007/106883 A1 | 9/2007 |
| WO | WO 2007/123917 A2 | 11/2007 |
| WO | WO 2007/139392 A1 | 12/2007 |
| WO | WO 2007/140544 A1 | 12/2007 |
| WO | WO 2007/142945 A2 | 12/2007 |
| WO | WO 2008/018928 A2 | 2/2008 |
| WO | WO 2008/026201 A2 | 3/2008 |
| WO | WO 2008/031834 A1 | 3/2008 |
| WO | WO 2008/061305 A1 | 5/2008 |
| WO | WO 2008/068322 A1 | 6/2008 |
| WO | WO 2008/089523 A1 | 7/2008 |
| WO | WO 2008/095057 A2 | 8/2008 |
| WO | WO 2008/101293 A1 | 8/2008 |
| WO | WO 2008/108657 A1 | 9/2008 |
| WO | WO 2008/115662 A2 | 9/2008 |
| WO | WO 2008/124538 A1 | 10/2008 |
| WO | WO 2008/140821 A2 | 11/2008 |
| WO | WO 2008/142017 A2 | 11/2008 |
| WO | WO 2008/142025 A2 | 11/2008 |
| WO | WO 2008/148055 A1 | 12/2008 |
| WO | WO 2008/151060 A1 | 12/2008 |
| WO | WO 2009/006295 A2 | 1/2009 |
| WO | WO 2009/024826 A1 | 2/2009 |
| WO | WO 2009/032331 A1 | 3/2009 |
| WO | WO 2009/036087 A1 | 3/2009 |
| WO | WO 2009/039655 A1 | 4/2009 |
| WO | WO 2009/049085 A2 | 4/2009 |
| WO | WO 2009/065031 A1 | 5/2009 |
| WO | WO 2009/070273 A1 | 6/2009 |
| WO | WO 2009/086460 A1 | 7/2009 |
| WO | WO 2009/102816 A2 | 8/2009 |
| WO | WO 2009/102817 A2 | 8/2009 |
| WO | WO 2009/146436 A1 | 12/2009 |
| WO | WO 2009/155378 A1 | 12/2009 |
| WO | WO 2010/006242 A1 | 1/2010 |
| WO | WO 2010/008896 A1 | 1/2010 |
| WO | WO 2010/009273 A1 | 1/2010 |
| WO | WO 2010/030826 A1 | 3/2010 |
| WO | WO 2010/039903 A1 | 4/2010 |
| WO | WO 2010/039909 A1 | 4/2010 |
| WO | WO 2010/048457 A1 | 4/2010 |
| WO | WO 2010/051458 A1 | 5/2010 |
| WO | WO 2010/068924 A1 | 6/2010 |
| WO | WO 2010/074686 A1 | 7/2010 |
| WO | WO 2010/074687 A1 | 7/2010 |
| WO | WO 2010/087823 A1 | 8/2010 |
| WO | WO 2010/091029 A1 | 8/2010 |
| WO | WO 2010/093713 A1 | 8/2010 |
| WO | WO 2010/093716 A1 | 8/2010 |
| WO | WO 2010/101953 A1 | 9/2010 |
| WO | WO 2010/104989 A1 | 9/2010 |
| WO | WO 2010/132863 A1 | 9/2010 |
| WO | WO 2010/136744 A1 | 12/2010 |
| WO | WO 2011/008223 A1 | 1/2011 |
| WO | WO 2011/017609 A1 | 2/2011 |
| WO | WO 2011/038076 A1 | 3/2011 |

OTHER PUBLICATIONS

Alexander, G. et al., "Evaluation of reaction variables in the dissolution of serpentine for mineral carbonation"; Elsevier; ScienceDirect Fuel 86 (2007) 273-281.

Allen, L.M. 1992. Boron and Sulfur Isotopic Fractionation in the Coal Combustion System. A Thesis Submitted to the Faculty of the Department of Hydrology and Water Resources. The University of Arizona.

Back, M. et al.,"Reactivity of Alkaline Lignite Fly Ashes Towards CO in Water." Environmental Science & Technology. vol. 42, No. 12 (2008) pp. 4520-4526.

Baer, D.S., et al. 2002. Sensitive absorption measurements in the near-infrared region using off-axis integrated-cavity-output spectroscopy. Appl. Phys. B. 5 pages.

Berg et al., "A 3-Hydroxyproprionate/ 4-Hydroxybutyrate Autotrophic Carbon Dioxide Assimilation Pathway in Archea"; Science 14, Dec. 2007; vol. 318, No. 5857 DOI 10.1126/science 1149976; pp. 1782-1786.

Biello, D. Cement from CO2: A Concrete Cure for Global Warming? Scientific American 07 Aug. 2008., pp. 1-3 [online] [retrieved on Dec. 29, 2009] <URL: http://www.scientificamerican.com/article.cfm>.

Biennier, L., et al. 2004. Multiplex integrated cavity output spectroscopy of cold PAH cations. Chemical Physics Letters. 387: 287-294.

"Biomass Burning: A Hot Issue in Global Change." National Aeronautics and Space Administration. Langley Research Center, Hampton, Virginia. Fact Sheet FS-2001-02-56-LaRC. Feb. 2001. 4 pages.

Bond, G.M., et al. 2001. CO2 Capture from Coal-Fired Utility Generation Plant Exhausts, and Sequestration by a Biomimetic Route Based on Enzymatic Catalysis—Current Status (paper presented at the First National Conference on Carbon Sequestration, May 14-17, in Washington D.C., USA; Paper Sa.5.

Bond, G.M., et al. 2002. Brines as possible cation sources for biomimetic carbon dioxide sequestration. American Geophysical Union Abstract #U22A-07.

Bottomley, D.J. et al. 1999. The origin and evolution of Canadian Shield brines: evaporation or freezing of seawater? New lithium isotope and geochemical evidence from the Slave craton. Chemical Geology. 155: 295-320.

Cannell, M.G.R. 2003. "Carbon sequestration and biomass energy offset: theoretical, potential and achievable capacities globally, in Europe and the UK." Biomass and Bioenergy. 24: 97-116.

Carbon Sequestration. National Energy Technology Laboratory, Jul. 1, 2008 (online) [retrieved on Dec. 21, 2009] <URL: http://web.archive.org/web/20080701213124/http://www.netl.doe.gov/technologies/carbon_seq /index.html>.

Cerling, T.E. 1984. The stable isotopic composition of modern soil carbonate and its relationship to climate. Earth and Planetary Science Letters. 71: 229-240.

Christensen, L.E., et al. Measurement of Sulfur Isotope Compositions by Tunable Laser Spectroscopy of SO2. Analytical Chemistry, Nov. 17, 2007, vol. 79, No. 24, pp. 9261-9268 (abstract) [online] [retrieved on Dec. 30, 2009] <URL: http://pubs.acs.org/doi/abs/10.1021/ac071040p>.

Ciccs "Aims and Research"; www.nottingham.ac.uk/carbonmanagement/ccs_aims.php 2pp (Aug. 3, 2007).

Criss, R.E. 1995. Stable Isotope Distribution: Variations from Temperature, Organic and Water-Rock Interactions. Washington University, St. Louis, Department of Eearch and Planetary Sciences. American Geophysical Union. pp. 292-307.

Druckenmiller et al., "Carbon sequestration using brine of adjusted pH to form mineral carbonates"; Elsevier; www.elsevier.com/locate/fuproc; Fuel Processing Technology 86 (2005) 1599-1614.

Ehleringer, J.R., et al. 2002. Stable Isotopes. vol. 2, The Earth System: biological and ecological dimensions of global environmental change. pp. 554-550. Edited by Professor Harold A. Mooney and Dr.

Josep G. Canadell in Encyclopedia of Global Environmental Change. John Wiley & Sons, Ltd. Chichester.

"Electrochemical cell", Wikipedia (2009), http:en.wikipedia.org/wiki/Electrochemical_Cell, Nov. 24, 2009, 5 pp.

Elswick, E.R., et al. 2007. Sulfur and carbon isotope geochemistry of coal and derived coal-combustion by-products: An example from an Eastern Kentucky mine and power plant. *Applied Geochemistry.* 22: 2065-2077.

Fallick, A.E., et al. 1991. A Stable Isotope Study of the Magnesite Deposits Associated with the Alpine-Type Ultramafic Rocks of Yugoslavia. *Economic Geology.* 86: 847-861.

Faverjon, F. et al. 2005. Electrochemical study of a hydrogen diffusion anode-membrane assembly for membrane electrolysis. *Electrochimica Acta* 51 (3): 386-394.

Faverjon, F. et al. 2006. Regeneration of hydrochloric acid and sodium hydroxide from purified sodium chloride by membrane electrolysis using a hydrogen diffusion anode-membrane assembly. Journal of Membrane Science 284 (1-2): 323-330.

Filley, T.R. et al. 1997. Application of Isotope-Ratio-Monitoring Gas Chromatography/Mass Spectrometry to Study Carbonization Reactions of FCCU Slurry Oils. Department of Geosciences, Department of Materials Science and Engineering, The Pennsylvania State University, University Park, PA. Abstracts of Papers of the American Chemical Society. 214:65-FUEL Part 1. pp. 938-941.

Fouke, B.W., et al. 2000. Depositional Facies and Aqueous-Solid Geochemistry of Travertine-Depositing Hot Springs (Angel Terrace, Mammoth Hot Springs, Yellowstone National Park, U.S.A.). *Journal of Sedimentary Research.* 70(3): 565-585.

Gain, E. et al. 2002. Ammonium nitrate wastewater treatment by coupled membrane electrolysis and electrodialysis. *Journal of Applied Electrochemistry* 32: 969-975.

Genders, D. 1995. Electrochemical Salt Splitting. http://www.electrosynthesis.com/news/mwatts.html (accessed Feb. 5, 2009).

Goldberg et al. Jun. 2009. "CO2 Mineral Sequestration Studies in US"; National Energy Technology Laboratory; goldberg@netl.doe.gov; 10pp.

Graff "Just Catch—CO2 Capture Technology" Aker Kvaerner; Pareto Clean Energy Tech Seminar (Oct. 11, 2007) 25pp.

Green Car Congress "PKU Researchers Carry Out Aqueous Fischer-Tropsch Reaction for First Time"; www.greeencarcongress.com/2007/12/pku-researchers.html; Dec. 12, 2007; 2pp.

Green Car Congress "Researcher Proposes System for Capture of Mobile Source CO2 Emissions Directly from Atmosphere"; www.greeencarcongress.com/2007/10/researcher-prop.html#more; Oct. 8, 2007; 4pp.

Green Car Congress "Researchers Develop New Method for Ocean Sequestration of Carbon Dioxide Through Accelerated Weathering f Volcanic Rocks"; www.greeencarcongress.com/2007/11/researchers-dev.html#more; Nov. 7, 2007; 3pp.

Haywood et al., "Carbon dioxide sequestration as stable carbonate minerals—environmental barriers"; Environmental Geology (2001) 41:11-16; Springer-Verlag 2001.

Hill et al. Mar. 18, 2006. "Preliminary Investigation of Carbon Sequestration Potential in Brine from Pennsylvania's Oriskany Sandstone Formation in Indiana County, PA"; The Energy Institute and the Department of Energy & Geo-Environmental Engineering. College of Engineering Research Symposium, Session 3C, 16pp.

Holdgate, G.R., et al. 2009. Eocene-Miocene carbon-isotope and floral record from brown coal seams in the Gippsland Basin of southeast Australia. *Global and Planetary Change.* 65: 89-103.

Holze, S. et al. 1994. Hydrogen Consuming Anodes for Energy Saving in Sodium Sulphate Electrolysis. *Chem. Eng. Technol.* 17: 382-389.

Horkel, K., et al. 2009. Stable isotopic composition of cryptocrystalline magnesite from deposits in Turkey and Austria. *Geophysical Research Abstracts.* 11. (abstract only).

Horner, G. et al. 2004. Isotope selective analysis of CO2 with tunable diode laser (TDL) spectroscopy in the NIR. *The Analyst.* 129: 772-778.

Huijgen, W.J.J., et al. 2003. Carbon dioxide sequestration by mineral carbonation. ECN-C-03-016; Energy Research Centre of the Netherlands: Petten; pp. 1-42.

Huijgen, W.J.J., et al. 2005. Carbon dioxide sequestration by mineral carbonation: Literature review update 2003-2004, ECN-C-05-022; Energy Research Centre of the Netherlands: Petten; pp. 1-37.

Huijgen, W.J.J., et al. 2005. Mineral CO2 Sequestration by Steel Slag Carbonation. *Environ. Sci. Technol.* 39: 9676-9682.

Huijgen, W.J.J., et al. 2006. Energy Consumption and Net CO2 Sequestration of Aqueous Mineral Carbonation. *Ind. Eng. Chem. Res.* 45: 9184-9194.

Huntzinger, D.N. et al. 2009. A life-cycle assessment of Portland cement manufacturing: comparing the traditional process with alternative technologies. *Journal of Cleaner Production.* 17: 668-675.

Huntzinger, D.N. Carbon Dioxide Sequestration in Cement Kiln Dust Through Mineral Carbonation. Michigan Technological University, 2006 [online], [retrieved on Dec. 29, 2009]. <URL: http://www.geo.mtu.edu/~dnhuntzi/DNHuntzingerETD.pdf>.

Huntzinger, D.N. et al.,"Carbon Dioxide Sequestration in Cement Kiln Dust through Mineral Carbonation"; Environmental Science & Technology, vol. 43, No. 6 (2009) pp. 1986-1992.

International Search Report dated Sep. 17, 2008 of PCT/US2008/068564.

International Search Report dated Feb. 19, 2009 of PCT/US08/88242.

International Search Report dated Mar. 3, 2010 of EP08867440.3.

International Search Report dated Mar. 11, 2009 of PCT/US2008/088318.

International Search Report dated Mar. 11, 2009 of PCT/2008/088246.

International Search Report dated Aug. 5, 2009 of PCT/2009/048511.

International Search Report dated Sep. 8, 2009 of PCT/US2009/045722.

International Search Report dated Sep. 17, 2009 of PCT/US2009/050756.

International Search Report dated Sep. 22, 2009 of PCT/US2009/047711.

International Search Report dated Oct. 19, 2009 of PCT/US2009/050223.

International Search Report dated Oct. 30, 2009 of PCT/US09/056573.

International Search Report dated Dec. 14, 2009 of PCT/US09/061748.

International Search Report dated Jan. 4, 2010 of PCT/US09/062795.

International Search Report dated Jan. 13, 2010 of PCT/US09/059135.

International Search Report dated Feb. 2, 2010 of PCT/US09/059141.

International Search Report dated Feb. 24, 2010 of PCT/US09/067764.

International Search Report dated Mar. 10, 2010 of PCT/US10/022935.

Justnes, H. et al. "Pozzolanic, Amorphous Silica Produced from the Mineral Olivine." Proceedings of the Seventh CANMET/ACI International Conference on Fly Ash, Silica Fume, Slag And Natural Pozzolans in Concrete, 2001. SP-199-44. pp. 769-781.

Kohlmann et al., "Carbon Dioxide Emission Control by Mineral Carbonation: The Option for Finland"; INFUB 6th European Conference on Industrial Furnaces and Boilers Estoril Lisbon Portugal, Apr. 2-5 (2002) 10pp.

Lackner, K. "Carbonate Chemistry for Sequestering Fossil Carbon"; Annual Review Energy Environ. 2002 27:193-232.

Lackner, K.S. et al. "Carbon Dioxide Disposal in Carbonate Minerals." Energy. 1995. 20(11): 1153-1170.

Levy, D. "Burnt biomass causes short-term global cooling, long-term warming." http://news-service.stanford.edu/news/2004/august4/biomass-84.html. 3 pages.

Lin, C. et al. Use of Cement Kiln Dust, Fly Ash, and Recycling Technique in Low-Volume Road Rehabilitation. Transportation Research Record, 1992, No. 1345, pp. 19-27 (abstract) [online], [retrieved on Dec. 31, 2009] <URL: http://pubsindex.trb.org/view.aspx?id=370714>.

Mazrou, S., et al. 1997. Sodium hydroxide and hydrochloric acid generation from sodium chloride and rock salt by electro-electrodialysis. *Journal of Applied Electrochemistry* 27: 558-567.

McCrea, J.M. 1950. On the Isotopic Chemistry of Carbonates and a Paleotemperature Scale. *The Journal of Chemical Physics.* 18(6): 849-857.

Melezhik, V.A., et al. 2001. Palaeproterozoic magnesite: lithological and isotopic evidence for playa/sabkha environments. *Sedimentology.* 48: 379-397.

Mihalcea, R.M., et al. 1998. Diode-laser absorption measurements of CO2 near 2.0 μm at elevated temperatures. *Applied Optics.* 37(36): 8341-8347.

Miljevic, N., et al. 2007. Potential Use of Environmental Isotopes in Pollutant Migration Studies. *Environmental Isotopes in Pollutant Studies.* 58: 251-262.

Montes-Hernandez, G. et al.,"Mineral sequestration of CO2 by aqueous carbonation of coal combustion fly-ash." Journal of Hazardous Materials vol. 161 (2009). pp. 1347-1354.

Mook, W.G., et al. 1968. Isotopic Equilibrium between Shells and Their Environment. *Science.* 159(3817): 874-875.

Mook, W.G., et al. 1974. Carbon Isotope Fractionation Between Dissolved Bicarbonate and Gaseous Carbon Dioxide. 22:169-176.

Nayak, V.S. "Nonelectrolytic Production of Caustic Soda and Hydrochloric Acid from Sodium Chloride"; Ind. Eng. Chem. Res. 1996. 35: 3808-3811.

O'Connor et al., "Carbon Dioxide Sequestration by Direct Mineral Carbonation: Results From Recent Studies And Current Status"; Albany Research Center, Albany Oregon; Office of Fossil Energy, US Dept. of Energy; 1st Annual DOE Carbon Sequestration Conference, Washington DC, May (2001) 12pp.

O'Connor, W.K. et al. "Carbon dioxide sequestration: Aqueous mineral carbonation studies using olivine and serpentine." 2001. Albany Research Center, National Energy Technology Laboratory: Mineral Carbonation Workshop, Pittsburgh, PA.

O'Neil, J.R., et al. 1971. C13 and O18 compositions in some freshwater carbonates associated with ultramafic rocks and serpentines: western United States*. *Geochimica et Cosmochimica Acta.* 35: 687-697.

Park, A., et al. 2004. CO2 mineral sequestration: physically activated dissolution of serpentine and pH swing process. *Chemical Engineering Science* 59 (22-23): 5241-5247.

Philp, R.P. 2007. The emergence of stable isotopes in environmental and forensic geochemistry studies: a review. *Environ Chem Lett.* 5:57-66.

Power, I.M., et al. 2007. Biologically induced mineralization of dypingite by cyanobacteria from an alkaline wetland near Atlin, British Columbia, Canada. *Geochemical Transactions.* 8: 16 pages.

Rahardianto et al., "High recovery membrane desalting of low-salinity brackish water: Integration of accelerated precipitation softening with membrane RO"; Science Direct; Journal of Membrane Science 289 (2007) 123-137.

Rakib, M. et al. 1999. Behaviour of Nafion® 350 membrane in sodium sulfate electrochemical splitting: continuous process modelling and pilot scale tests. Journal of Applied Electrochemistry. 29: 1439-1448.

Rau, G. 2004. Possible use of Fe/CO2 fuel cells for CO2 mitigation plus H2 and electricity production. *Energy Conversion and Management.* 45: 2143-2152.

Raz et al., "Formation of High-Magnesium Calcites via an Amorphous Precursor Phase: Possible Biological Implications"; Advanced Materials; Adv. Mater. (2000) vol. 12, No. 1; 5pp.

Rosenthal, E., "Cement Industry is at Center of Climate Change Debate" New York Times; www.nytimes.com/2007/10/26/business/worldbusiness/26cement.html"ref=todayspaper; 4pp.

Saad, N. et al. 2009. Measurement of Isotopic CO2 in Dissolved Inorganic Carbons of Water Samples from Various Origins Using Wavelength-Scanned Cavity Ring-Down Spectrophotometer. *Geophysical Research Abstracts.* 11. (abstract only).

Sadhwani et al., "Case Studies on environmental impact of seawater desalination" Science Direct; http://www.sciencedirect.com/science?_ob=ArticleURL&_udi=B6TFX-4HMX97J-3&_u... 3pp.

Sasakawa, M., et al. Carbonic Isotopic Characterization for the Origin of Excess Methane in Subsurface Seawater. Journal of Geophysical Research, vol. 113 (abstract) [online], Mar. 11, 2008 [retrieved on Jan. 1, 2010] <URL: http://www.agu.org/pubs/crossref/2008/2007JC004217.shtml>.

Schouten, S., et al. 2004. Stable Carbon Isotopic Fractionations Associated with Inorganic Carbon Fixation by Anaerobic Ammonium-Oxidizing Bacteria. *Applied and Environmental Microbiology.* 70(6): 3785-3788.

Schroll, E. 2002. Genesis of magnesite deposits in the view of isotope geochemistry. *Boletim Paranaense de Geociencias.* 50: 59-68.

Sheppard, S.M.F., et al. 1970. Fractionation of Carbon and Oxygen Isotopes and Magnesium between Coexisting Metamorphic Calcite and Dolomite. *Contr. Mineral. And Petrol.* 26. 161-198.

Serizawa et al., "Cell-compatible properties of calcium carbonates and hydroxyapatite deposited on ultrathin poly (vinyl alcohol)-coated polyethylene films"; J. Biomater. Sci. Polymer Edn., vol. 14, No. 7 (2003) pp. 653-663.

Sethi, S. et al. 2006. Existing & Emerging Concentrate Minimization & Disposal Practices for Membrane Systems. *Florida Water Resources Journal.* pp. 38, 40, 42, 44, 46, 48.

Shell Global Solutions, "ADIP-X and Sulfinol-X—new regenerable acid-gas removal processes"; Shell Global Solutions International; OG 130210370903-En(A); www.shellglobalsoultions.com 2 pp.

Sial, A.N., et al. 2000. Carbon isotope fluctuations in Precambrian carbonate sequences of several localities in Brazil. *An. Acad. Bras. Ci.* 72(4): 539-558.

Stanley, S.M., et al. 2002. Low-magnesium calcite produced by coralline algae in seawater of Late Cretaceous composition. *PNAS.* 99(24): 15323-15326.

Tececo Pty Ltd, "Eco-Cement"; www.tececo.com/simple.eco-cement.php; Dec. 29, 2008; 6pp.

Turner, J.A. 1999. "A Realizable Renewable Energy Future." *Science.* 285 (5428): 687-689.

Uibu, M. et al. "CO2 mineral sequestration in oil-shale wastes from Estonian power production." Journal of Environmental Management vol. 90 (2009). pp. 1253-1260.

Uibu, M. et al.,"Mineral trapping of CO2 via oil shale ash aqueous carbonation: controlling mechanism of process rate and development of continuous-flow reactor system." Oil Shale. vol. 26, No. 1 (2009) pp. 40-58.

Uliasz-Bochenczyk, A. et al. "Utilization of Carbon Dioxide in Fly Ash and Water Mixtures." Chemical Engineering Research and Design. 2006. 84(A9): 843-846.

U.S. Appl. No. 12/126,776, filed May 23, 2008, Constantz, Brent R., et al, Non-Final Office Action dated Feb. 25, 2010; 21 pp.

U.S. Appl. No. 12/163,205, filed Jun. 27, 2008, Constantz, Brent R., et al, Non-Final Office Action dated Jan. 27, 2010.

U.S. Appl. No. 12/163,205, filed Jun. 27, 2008, Constantz, Brent R., et al, Non-Final Office Action dated Mar. 1, 2010.

U.S. Appl. No. 12/163,205, filed Jun. 27, 2008, Constantz, Brent R., et al, Non-Final Office Action dated Mar. 25, 2010.

U.S. Appl. No. 12/344,019, filed Dec. 24, 2008, Constantz, Brent R., et al, Non-Final Office Action dated Nov. 16, 2009.

U.S. Appl. No. 12/344,019, filed Dec. 24, 2008, Constantz, Brent R., et al, Non-Final Office Action dated Mar. 11, 2010.

U.S. Appl. No. 12/375,632, filed Mar. 5, 2009, Kirk, Donald W. et al, Non-Final Office Action dated Mar. 19, 2010.

U.S. Appl. No. 12/375,632, filed Mar. 5, 2009, Kirk, Donald W. et al, Non-Final Office Action dated Sep. 8, 2009.

U.S. Appl. No. 12/475,378, filed May 29, 2009, Constantz Brent. et al, Non-Final Office Action dated Mar. 17, 2010.

U.S. Appl. No. 12/475,378, filed May 29, 2009, Constantz Brent. et al, Non-Final Office Action dated Mar. 2, 2010.

U.S. Appl. No. 12/486,692, filed Jun. 17, 2009, Constantz Brent. et al, Non-Final Office Action dated Mar. 23, 2010.

U.S. Appl. No. 12/486,692, filed Jun. 17, 2009, Constantz Brent. et al, Non-Final Office Action dated Mar. 1, 2010.

U.S. Appl. No. 12/501,217, filed Jul. 10, 2009, Constantz Brent. et al, Non-Final Office Action dated Mar. 12, 2010.

U.S. Appl. No. 12/604,383, filed Oct. 22, 2009, Constantz Brent R. et al, Non-Final Office Action dated Apr. 5, 2010.

U.S. Appl. No. 12/609,491, filed Oct. 30, 2009, Constantz Brent. et al, Non-Final Office Action dated Mar. 31, 2010.

Vagin, S.P., et al. 1979. Measurement of the Temperature of Gas Media Containing Carbon Dioxide by the Laser-Probing Method. *Plenum.*

Wang, W., et al. 2005. Effects of biodegradation on the carbon isotopic composition of natural gas—A case study in the bamianhe oil field of the Jiyang Depression, Eastern China. *Geochemical Journal*. 39(4): 301-309. (abstract) [online] [retrieved Dec. 29, 2009] <URL: http://www.jstage.jst.go.jp/article/geochemj/39/4/39_301/_article>ab.

Webber, M.E., et al. 2001. In situ combustion measurements of CO2 by use of a distributed-feedback diode-laser sensor near 2.0 μm. *Applied Optics*. 40(6): 821-828.

Wen-Zhi et al., "Using Electrolytic Method to Promote CO2 Sequestration in Serpentine by Mineral Carbonation", Journal of China University of Mining and Technology; vo. 36, No. 6; November (2007).

Wilson, S.A., et al. 2009. Carbon Dioxide Fixation within Mine Wastes of Ultramafic-Hosted Ore Deposits: Examples from the Clinton Creek and Cassiar Chrysotile Deposits, Canada. *Society of Economic Geologists, Inc.* 104: 95-112.

Winschel, R.A., et al. Stable Carbon Isotope Analysis of Coal/Petroleum Coprocessing Products. Preprints of Papers, American Chemical Society, Division of Fuel Chemistry, Jan. 1, 1988, vol. 33, No. 1, pp. 114-121 [online], [retrieved on Dec. 29, 2009] <URL: http://www.anl.gov/PCS/acsfuel/preprint%20archive/Files/33_1_TORONTO_06-88_0114.PDF>.

Wright, L.L., et al. 1993. "U.S. Carbon Offset Potential Using Biomass Energy Systems." Water, Air and Soil Pollution. 70: 483-497.

Zedef, V., et al. 2000. Genesis of Vein Stockwork and Sedimentary Magnesite and Hydromagnesite Deposits in the Ultramafic Terranes of Southwestern Turkey: A Stable Isotope Study. 95: 429-446.

U.S. Appl. No. 60/921,598, Apr. 3, 2007, Little et al.

Avery, G.B. et al. 2006. Carbon isotopic characterization of dissolved organic carbon in rainwater: Terrestrial and marine influences. *Science Direct*. 40(39): 7539-7545. Retrieved from the internet on May 20, 2010.

Bagotsky, V.S. 2006. Conductive Polymers: Polymers with Ionic Functions. *Fundamentals of Electrochemistry*. Second Edition. New Jersey: John Wiley & Sons. pp. 454-455.

Bauer, C.F., et al. 1981. Identification and Quantitation of Carbonate Compounds in Coal Fly Ash. *American Chemical Society*. 15(7): 783-788.

Bommaraju, T.V. et al. 2001. Brine Electrolysis. <http://electrochem.cwru.edu/encycl/art-b01-brine.htm>. Retrieved on Oct. 6, 2010. pp. 1-25.

Bradfield, D.L. 1984. Conventional Uranium Processing: The Yeelirrie Uranium Project. *Practical Hydromet '83—7th Annual Symposium on Uranium and Precious Metals*. pp. 39-47. Lakewood, CO.

Dickens, A. et al. 2004. Reburial of fossil organic carbon in marine sediments. *Nature*. 427: 336-339. Retrieved from the internet on May 20, 2010.

Eurodia. Bipolar Membrane Electrodialysis. Available online as of 2001.; visited Oct. 6, 2010 at http://www.eurodia.com/html/eb.html.

Faure, et al. 1963. The Isotopic Composition of Strontium in Oceanic and Continental Basalts: Application to the Origin of Igneous Rocks. *Journal of Petrology*. 4(1): 31-50. (abstract only). Http://petrology.oxfordjournals.org/cgi/content/abstract/4/1/31 (retrieved on Jun. 1, 2010).

Gillery et al. Bipolar membrane electrodialysis: the time has finally come! Presented 16th Intl. Forum on Appl. Electrochem; Cleaner Tech.-Challenges and Solutions. Nov. 10-14, 2002. Amelia Island Plantation, FL. 4 pages. Retrieved form the Internet on Aug. 14, 2009. http://www.ameridia.com/html.ebc.html.

Golden, D.C., et al. 2001. A Simple Inorganic Process for Formation of Carbonates, Magnetite, and Sulfides in Martian Meteorite ALH84001. *American Mineralogist*. 86: 370-375.

Gregerson, J. 1999. Conquering Corrosion (in concrete). *Building Design & Construction*. 40(8): 50.

Hassan, A.M. et al. 1989. Corrosion Resistant Materials For Seawater RO Plants. *Desalination*. 74: 157-170.

Hein, J.R. et al. 2006. Methanogen c calc te, $^{13}$C-depleted b valve shells, and gas hydrate from a mud volcano offshore southern Cal forn a. *Geological Society of America*. 34(2): 109-112.

Horii, Y. et al. 2007. Novel evidence for natural formation of dioxins in ball clay. *Chemosphere*. 70: 1280-1289.

International Search Report dated Jan. 20, 2009 of PCT/US2007/010032.
International Search Report dated Mar. 21, 2011 of EP10739828.1.
International Search Report dated Mar. 25, 2011 of EP10739829.9.
International Search Report dated Mar. 25, 2011 of EP10737735.0.
International Search Report dated Mar. 4, 2011 of EP10737736.8.
International Search Report dated May 6, 2010 of EP09716193.9.
International Search Report dated Jun. 22, 2010 of EP08772151.0.
International Search Report dated Dec. 14, 2010 of EP09812408.4.
International Search Report dated Jul. 29, 2010 of EP08873036.1.
International Search Report dated Jan. 4, 2011 of EP09818485.6.
International Search Report dated Jul. 7, 2010 of PCT/US10/026880.
International Search Report dated Jul. 9, 2010 of PCT/US10/025970.
International Search Report dated May 21, 2010 of PCT/US09/064117.
International Search Report dated Sep. 13, 2010 of PCT/US10/035041.

"Isotopic Signature", Wikipedia (2010), http://en.wikipedia.org/wiki/Isotopic_signature, Apr. 14, 2009, 3 pp.

Jensen, P. et al. 1992. 'Bubbling reefs' in the Kattegat: submarine landscapes of carbonate-cemented rocks support a diverse ecosystem at methane seeps. *Marine Ecology Progress Series*. 83: 103-112.

Li, et al., "Using Electrolytic Method to Promote CO2 Sequestration in Serpentine by Mineral Carbonation," Journal of China University of Mining and Technology, 36(6), pp. 817-821 (2007) (in Chinese, with English translation).

Lopez-Capel, E. et al. 2005. Application of simultaneous thermal analysis mass spectrometry and stable carbon isotope analysis in a carbon sequestration study. *Rapid Communications in Mass Spectrometry*. 19: 3192-3198.

Merritt, R.C. 1971. Carbonate Leaching. The Extractive Metallurgy of Uranium: pp. 82-97. Colorado School of Mines Research Institute. Prepared Under Contract with the United States Atomic Energy Commission.

Mottana, A. et al. 1979. Der grosse Mineralienfuhrer, BLV Verlagsgesel Ischaft mbH, Munchen, XP002577921, p. 194.

Noda, H., et al. 1990. Electrochemical Reduction of Carbon Dioxide at Various Metal Electrodes in Aqueous Potassium Hydrogen Carbonate Solution. *The Chemical Society of Japan*. 63: 2459-2462.

Perkins, S. 2004. Sea Change: Carbon Dioxide Imperils Marine Ecosystems. *Science News*. 166(3): 35.

Portier et al. 2005. Modeling CO2 solubility in pure water and NaCl-type waters from 0 to 300° C. and from 1 to 300 bar Application to the Utsira Formation at Sleipner. *Chemical Geology*. 217: 187-199.

Quay, P.D., et al. 1992. Oceanic Uptake of Fossil Fuel CO$_2$$: Carbon- 13 Evidence. *Science*. 256 (5053): 74-79.

Sample, J.C. et al. 1995. Isotope Geochemistry of Syntectonic Carbonate Cements and Veins from the Oregon Margin: Implications for the Hydrogelogic Evolution of the Accretionary Wedge. *Proceedings of the Ocean Drilling Program, Scientific Results*. 146: 137-148.

Sakata, M. 1987. Movement and Neutralization of Alkaline Leachate at Coal Ash Disposal Sites. *Environ. Sci. Technol*. 21(8): 771-777.

Schwab, E. 2004. Calciumhydroxid, XP-002577920. Retrieved from the Internet: <URL:http://www.roempp.com/prod/index1.html>.

Shaffer, R. 2008. A Devlish Green Angel. *Fast Company*. N127: 92-97.

Skrzypek, G. et al. 2006. $\delta^{13}$C analyses of calcium carbonate: comparison between the GasBench and elemental analyzer techniques. *Rapid Communications in Mass Spectrometry*. 20: 2915-2920.

Socolow, R. 1997. Fuels Decarbonization and Carbon Sequestration: Report of a Workshop. Center for Energy and Environmental Studies School of Engineering and Applied Science. Princeton University, Princeton, NJ.

Soong, Y. et al. 2004. Experimental and simulation studies on mineral trapping of CO2 with brine. *Energy Conversion and Management*. 45: 1845-1859.

Technology for Commercialization of Slag. 1995. *New Technology Japan*. ISSN: 0385-6542. p35.

U.S. Appl. No. 12/163,205, filed Jun. 27, 2008, Constantz, Brent R., et al, Notice of Allowance dated May 18, 2010.

U.S. Appl. No. 12/700,129, filed Feb. 4, 2010, Constantz, Brent R., et al, Non-Final Office Action dated Oct. 20, 2010.

U.S. Appl. No. 12/700,129 filed Feb. 4, 2010, Constantz, Brent R., et al, Notice of Allowance dated Feb. 25, 2011.
U.S. Appl. No. 12/700,193, filed Feb. 4, 2010, Constantz, Brent R., et al, Non-Final Office Action dated Oct. 20, 2010.
U.S. Appl. No. 12/700,193, filed Feb. 4, 2010, Constantz, Brent R., et al, Final Office Action dated Feb. 23, 2011.
U.S. Appl. No. 12/344,019, filed Dec. 24, 2008, Constantz, Brent R., et al, Non-Final Office Action dated Jul. 14, 2010.
U.S. Appl. No. 12/344,019, filed Dec. 24, 2008, Constantz, Brent R., et al, Notice of Allowance dated Dec. 1, 2010.
U.S. Appl. No. 12/698,741, filed Feb. 2, 2010, Constantz, Brent R., et al, Non-Final Office Action dated Sep. 28, 2010.
U.S. Appl. No. 12/698,741, filed Feb. 2, 2010, Constantz, Brent R., et al, Final Office Action dated Mar. 9, 2011.
U.S. Appl. No. 12/698,802, filed Feb. 2, 2010, Constantz, Brent R., et al, Non-Final Office Action dated Sep. 29, 2010.
U.S. Appl. No. 12/698,802, filed Feb. 2, 2010, Constantz, Brent R., et al, Final Office Action dated Mar. 10, 2011.
U.S. Appl. No. 12/942,558, filed Nov. 9, 2010, Constantz, Brent R., et al, Non-Final Office Action dated Feb. 4, 2011.
U.S. Appl. No. 12/698,483, filed Feb. 2, 2010, Constantz, Brent R., et al, Non-Final Office Action dated Sep. 28, 2010.
U.S. Appl. No. 12/698,483, filed Feb. 2, 2010, Constantz, Brent R., et al, Non-Final Office Action dated Dec. 15, 2010.
U.S. Appl. No. 12/698,483, filed Feb. 2, 2010, Constantz, Brent R., et al, Final Office Action dated Feb. 25, 2011.
U.S. Appl. No. 12/375,632, filed Mar. 5, 2009, Kirk, Donald W. et al, Notice of Allowance dated Jun. 28, 2010.
U.S. Appl. No. 12/475,378, filed May 29, 2009, Constantz Brent. et al, Final Office Action dated May 5, 2010.
U.S. Appl. No. 12/475,378, filed May 29, 2009, Constantz Brent. et al, Notice of Allowance dated Jun. 3, 2010.
U.S. Appl. No. 12/794,198, filed Jun. 4, 2010, Constantz Brent. et al, Non-Final Office Action dated Nov. 4, 2010.
U.S. Appl. No. 12/794,198, filed Jun. 4, 2010, Constantz Brent. et al, Notice of Allowance dated Jan. 10, 2011.
U.S. Appl. No. 12/486,692, filed Jun. 17, 2009, Constantz Brent. et al, Final Office Action dated May 3, 2010.
U.S. Appl. No. 12/486,692, filed Jun. 17, 2009, Constantz Brent. et al, Notice of Allowance dated May 24, 2010.
U.S. Appl. No. 12/501,217, filed Jul. 10, 2009, Constantz Brent. et al, Notice of Allowance dated May 25, 2010.
U.S. Appl. No. 12/788,255, filed May 26, 2010, Constantz Brent. et al, Non-Final Office Action dated Dec. 10, 2010.
U.S. Appl. No. 12/557,492, filed Sep. 10, 2009, Constantz, Brent R., et al. Final Office Action dated Sep. 16, 2010.
U.S. Appl. No. 12/557,492, filed Sep. 10, 2009, Constantz, Brent R., et al. Non-Final Office Action dated May 6, 2010.
U.S. Appl. No. 12/557,492, filed Sep. 10, 2009, Constantz, Brent R., et al. Notice of Allowance dated Feb. 22, 2011.
U.S. Appl. No. 12/604,383, filed Oct. 22 2009, Constantz Brent R. et al, Final Office Action dated Jun. 11, 2010.
U.S. Appl. No. 12/604,383, filed Oct. 22 2009, Constantz Brent R. et al, Notice of Allowance dated Sep. 20, 2010.
U.S. Appl. No. 12/571,398, filed Sep. 30, 2009, Constantz Brent R. et al, Non-Final Office Action dated May 3, 2010.
U.S. Appl. No. 12/571,398, filed Sep. 30, 2009, Constantz Brent R. et al, Notice of Allowance dated Jun. 18, 2010.
U.S. Appl. No. 12/826,209, filed Jun. 29, 2010, Constantz Brent R. et al, Non-Final Office Action dated Nov. 5, 2010.
U.S. Appl. No. 12/826,209, filed Jun. 29, 2010, Constantz Brent R. et al, Non-Final Office Action dated Mar. 16, 2011.
U.S. Appl. No. 12/609,491, filed Oct. 30, 2009, Constantz Brent. et al, Final Office Action dated Jul. 16, 2010.
U.S. Appl. No. 12/609,491, filed Oct. 30, 2009, Constantz Brent. et al, Notice of Allowance dated Sep. 29, 2010.
U.S. Appl. No. 12/790,317, filed May 28, 2010, Constantz Brent. et al, Non-Final Office Action dated Aug. 17, 2010.
U.S. Appl. No. 12/790,317, filed May 28, 2010, Constantz Brent. et al, Final Office Action dated Feb. 16, 2011.
U.S. Appl. No. 12/721,549, filed Mar. 10, 2010, Farsad Kasra et al, Non-Final Office Action dated Feb. 17, 2011.
U.S. Appl. No. 12/716,235, filed Mar. 2, 2010, Seeker, William Randall et al, Non-Final Office Action dated Mar. 4, 2011.
U.S. Appl. No. 12/571,400, filed Sep. 30, 2009, Constantz, Brent. et al, Office Action dated Jul. 26, 2010.
U.S. Appl. No. 12/571,400, filed Sep. 30, 2009, Constantz, Brent. et al, Final Office Action dated Nov. 2, 2010.
U.S. Appl. No. 12/571,400, filed Sep. 30, 2009, Constantz, Brent. et al, Notice of Allowance dated Mar. 28, 2011.
U.S. Appl. No. 12/521,256, filed Mar. 5, 2010, Gilliam, Ryan et al, Office Action dated Jul. 28, 2010.
U.S. Appl. No. 12/521,256, filed Mar. 5, 2010, Gilliam, Ryan et al, Notice of Allowance dated Nov. 30, 2010.
U.S. Appl. No. 12/503,557, filed Jul. 15, 2009, Gilliam, Ryan J. et al, Non-Final Office Action dated Nov. 24, 2010.
U.S. Appl. No. 12/541,055, filed Aug. 13, 2009, Gilliam, Ryan J. et al, Office Action dated Jul. 22, 2010.
U.S. Appl. No. 12/541,055, filed Aug. 13, 2009, Gilliam, Ryan J. et al, Non-Final Office Action dated Nov. 12, 2010.
U.S. Appl. No. 12/617,005, filed Nov. 12, 2009, Gilliam, Ryan J. et al, Office Action dated Oct. 5, 2010.
U.S. Appl. No. 12/617,005, filed Nov. 12, 2009, Gilliam, Ryan J. et al, Notice of Allowance dated Mar. 18, 2011.
Zhang, C.L. et al. 2001. Temperature-dependent oxygen and carbon isotope fractionations of biogenic siderite. *Geochimica et Cosmochimica Acta*. 65(14): 2257-2271.
Constantz, B. 2009. The Risk of Implementing New Regulations on Game-Changing Technology: Sequestering CO2 in the Built Environment. AGU, 90(22), Jt. Assem, Suppl., Abstract.

* cited by examiner

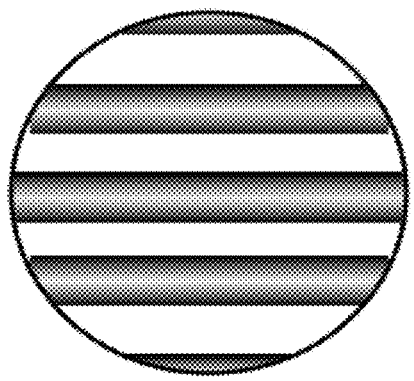
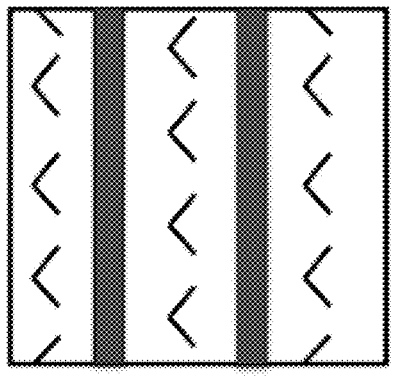
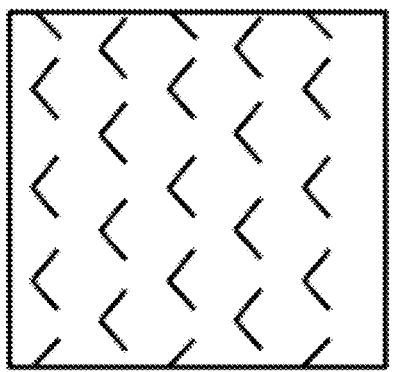
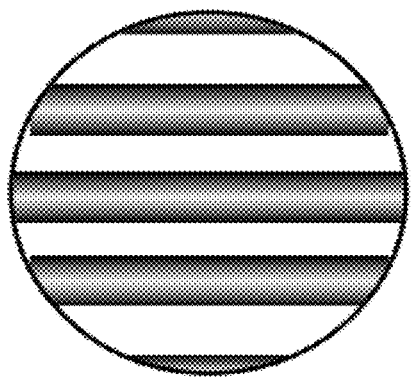
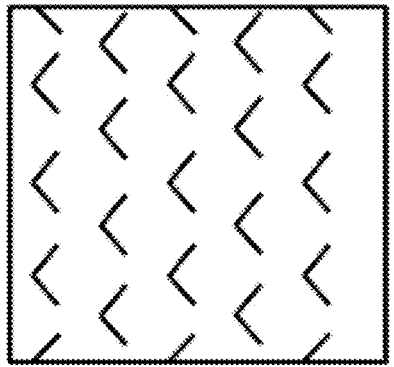
Fig. 20

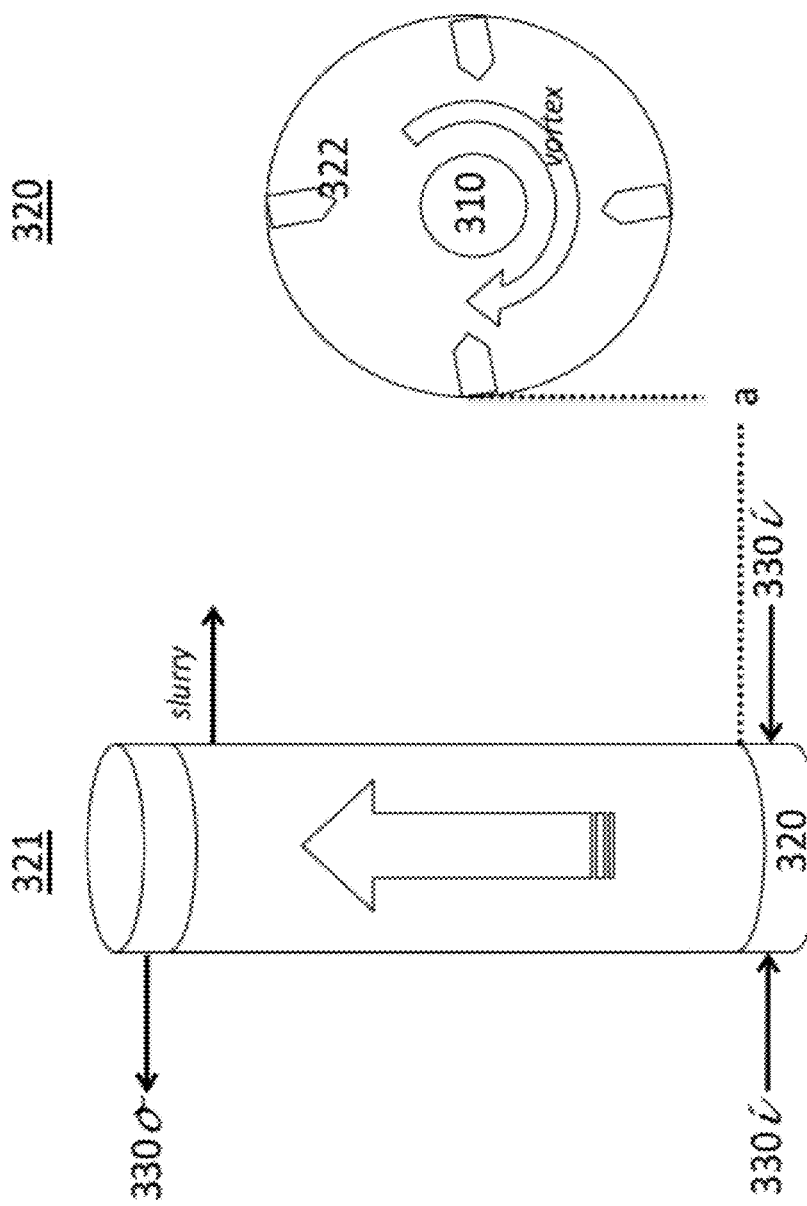

SYSTEMS AND METHODS FOR PROCESSING $CO_2$

CROSS-REFERENCE

This application claims the benefit of the following applications, each of which is incorporated herein by reference in its entirety:

U.S. Provisional Patent Application No. 61/158,992, filed 10 Mar. 2009, titled "Liquid Absorption of Gaseous Pollutants Using a Flat Jet Reactor";

U.S. Provisional Patent Application No. 61/168,166, filed 9 Apr. 2009, titled "Apparatus, Systems, and Methods for Treating Industrial Waste Gases";

U.S. Provisional Patent Application No. 61/178,475, filed 14 May 2009, titled "Apparatus, Systems, and Methods for Treating Industrial Waste Gases";

U.S. Provisional Patent Application No. 61/228,210, filed 24 Jul. 2009, titled "Apparatus, Systems, and Methods for Treating Industrial Waste Gases";

U.S. Provisional Patent Application No. 61/230,042, filed 30 Jul. 2009, titled "Apparatus, Systems, and Methods for Treating Industrial Waste Gases";

U.S. Provisional Patent Application No. 61/239,429, filed 2 Sep. 2009, titled, "Apparatus, Systems, and Methods for Treating Industrial Waste Gases";

U.S. Provisional Patent Application No. 61/178,360, filed 14 May 2009, titled, "Methods and Apparatus for Contacting Gas and Liquid";

U.S. Provisional Patent Application No. 61/221,457, filed 29 Jun. 2009, titled, "Gas-Liquid-Solid Contactor and Precipitator: Apparatus and Methods";

U.S. Provisional Patent Application No. 61/221,631, filed 30 Jun. 2009, titled "Gas, Liquid, Solid Contacting: Methods and Apparatus";

U.S. Provisional Patent Application No. 61/223,657, filed 7 Jul. 2009, title "Gas, Liquid, Solid Contacting: Methods and Apparatus";

U.S. Provisional Patent Application No. 61/289,657, filed 23 Dec. 2009, titled "Gas, Liquid, Solid Contacting Methods and Apparatus";

U.S. Provisional Patent Application No. 61/306,412, filed 19 Feb. 2010, titled "Apparatus, Systems, And Methods For Treating Industrial Waste Gases"; and U.S. Provisional Patent Application No. 61/311,275, filed 5 Mar. 2010, titled "Apparatus, Systems, And Methods For Treating Industrial Waste Gases."

BACKGROUND

The most concentrated point sources of carbon dioxide and many other atmospheric pollutants (e.g., NOx, SOx, volatile organic compounds ("VOCs"), and particulates) are energy-producing power plants, particularly power plants that produce their power by combusting carbon-based fuels (e.g., coal-fired power plants). Considering that world energy demand is expected to increase, and despite continuing growth in non-carbon-based sources of energy, atmospheric levels of carbon dioxide and other combustion products of carbon-based fuels are expected to increase as well. As such, power plants utilizing carbon-based fuels are particularly attractive sites for technologies aimed at lowering emissions of carbon dioxide and other atmospheric pollutants.

Attempts at lowering emissions of carbon dioxide and other atmospheric pollutants from power plant waste streams have produced many varied technologies, most of which require very large energy inputs to overcome the energy associated with isolating and concentrating diffuse gaseous species. In addition, current technologies and related equipment are inefficient and cost prohibitive. As such, it is important to develop an economically viable technology capable of removing vast quantities of carbon dioxide and other atmospheric pollutants from gaseous waste streams by sequestering carbon dioxide and other atmospheric pollutants in a stable form or by converting it to valuable commodity products.

In consideration of the foregoing, a significant need exists for systems and methods that efficiently and economically sequester carbon dioxide and other atmospheric pollutants.

SUMMARY

In some embodiments, the invention provides an apparatus for transferring a component of a gas into a liquid which includes a gas inlet; a chamber configured to contact the liquid and gas; a first liquid introduction unit at a first location within the chamber and a second liquid introduction unit at a second location within the chamber, in which the liquid introduction units are configured to introduce the liquid into the chamber for contact with the gas; a reservoir configured to contain the liquid after it has contacted the gas; an outlet for the liquid after it has contacted the gas, wherein the inlet, the chamber, the liquid introduction units, the reservoir, and the outlet are operably connected; and at least one of the following features: i) at least one array of shed rows within the chamber, wherein the shed rows are configured to redistribute the flow of the gas as it enters the chamber such that the gas flows axially along the chamber over a greater area of the cross section of the chamber than the gas flow upon entering the chamber, prior to interacting with the shed rows; ii) an anti-foaming device configured to reduce foaming in the reservoir; iii) at least one pump per liquid introduction unit for pumping the liquid through the introduction unit; iv) configuration of the liquid introduction units such that the direction of the flow of the liquid out of the first unit is different than the direction of flow of the liquid out of the second unit; v) one or more restriction orifice mechanism (release valve) configured to direct liquid flow to at least one of the liquid introduction units, into the gas inlet, or a combination thereof; and vi) varying the area covered by the liquid introduction units, wherein the liquid introduction units comprise atomizing units that create sprays, wherein at least one atomizing unit is configured to create a spray of angle different from that of the other atomizing units. In some embodiments, the apparatus comprises at least two of the features. In some embodiments, the apparatus comprises at least three of the features. In some embodiments, the apparatus comprises at least four of the features. In some embodiments, the apparatus comprises at least five of the features. In some embodiments, the apparatus comprises all of the features. In some embodiments, the gas inlet is configured to accept industrial waste gas, compressed ambient air, compressed carbon dioxide, super critical carbon dioxide or any combination thereof. In some embodiments, the gas comprises an industrial waste gas, carbon dioxide that has been previously separated from an industrial waste gas, or any combination thereof. In some embodiments, the gas comprises one or more of carbon dioxide, nitrogen oxide, and sulfur oxide. In some embodiments, the first liquid introduction unit is located on the lowest level above the inlet of the gas and is oriented to direct the flow of liquid into the chamber in a direction substantially co-current to the direction of gas flow. In some embodiments, the second liquid introduction unit is oriented to direct the flow of liquid into the chamber in a direction substantially countercurrent to the direction of gas flow. In some embodiments, the first liquid introduction unit, the second liquid introduction unit, or both comprise nozzles. In some embodiments, the nozzles comprise dual-fluid nozzles. In some embodiments, the nozzles comprise eductor-jet nozzles. In some embodiments, at least one of the pumps is controlled with a variable frequency drive. In some embodiments, the anti-foaming device comprises a cone situated over the reservoir. In some embodiments, the anti-foaming device further comprises liquid sprays oriented towards the cone. In some embodiments, the apparatus further comprises a liquid recirculation circuit configured to direct the liquid from the reservoir to the one or more of the liquid introduction units. In some embodiments, the apparatus further comprises a demisting level before the gas exits the contacting chamber. In some embodiments, the demisting level comprises a chevron demister, flat-jet sprays, a wet electrostatic precipitator, a packed bed, or any combination thereof. In some embodiments, the liquid provided to the demisting level comprises a different solution from the liquid provided to the liquid introduction units. In some embodiments, the liquid provided to each of the liquid introduction units comprises a different solution. In some embodiments, the liquid provided to the demisting level is a clear liquid. In some embodiments, the liquid provided to the liquid introduction units comprises a slurry. In some embodiments, the apparatus further comprises a comminution station configured to accept slurry from the reservoir and provide processed slurry to the liquid introduction units. In some embodiments, the recirculation circuit comprises the comminution station. In some embodiments, the reservoir is located below the nozzles at the bottom of the contacting chamber. In some embodiments, the apparatus further comprises a precipitation tank operably connected to the contacting chamber. In some embodiments, the precipitation tank comprises temperature controllers, inlets for addition of pH adjusting agents, agitators, inlets for crystal growth agents, inlets for crystal seeding agents, inlets for settling agents, inlets for flocculants, or any combination thereof. In some embodiments, the apparatus further comprises a precipitate outlet operably connected to the precipitation tank. In some embodiments, the precipitate outlet collects a solid precipitate and a supernatant solution. In some embodiments, the precipitate outlet separates solid precipitate from the supernatant solution. In some embodiments, the apparatus further comprises a conduit to provide the solid precipitate to a building materials fabrication station. In some embodiments, the gas inlet is configured to accept a waste gas from an industrial plant. In some embodiments, the gas inlet is configured to accept a flue gas from a plant that combusts fossil fuel. In some embodiments, the gas inlet is configured to accept a flue gas from a plant that combusts fossil fuel, further wherein the flue gas has passed through an emission control system prior to being provided to the gas inlet of said apparatus. In some embodiments, the emission control system comprises one or more of i) an electrostatic precipitator to collect particulates; ii) SOx control technology; iii) NOx control technology; iv) physical filtering technology to collect particulates; or v) mercury control technology. In some embodiments, the sprays of the atomizing units comprise sprays of 60° near the walls of the contacting chamber and sprays of 90° in the inner cross section of the contacting chamber. In some embodiments, the flow of the gas across the shed rows is perpendicular. In some embodiments, the apparatus further comprises packing material, trays, a packed bed, or any combination thereof within said chamber. In some embodiments, the apparatus further comprises a at least one membrane or one microporous membrane within said chamber.

In some embodiments, the invention provides an apparatus that includes an absorber that includes a bubble column; an inlet for an industrial gas, wherein the industrial gas includes $CO_2$, SOx, NOx, heavy metal, non-$CO_2$ acid gas, and/or fly ash in an amount equal to a time-averaged original composition, operably connected to the absorber; an inlet for an absorbing solution, wherein the absorbing solution includes an alkaline solution that includes a salt water, particulate material, or both in an absorbing slurry; an outlet for an effluent gas, said gas characterized by being depleted in $CO_2$ and at least one of SOx, NOx, heavy metal, non-$CO_2$ acid gas, and/or fly ash relative to said original composition of said industrial gas, in which the outlet is operably connected to said absorber; an outlet for absorbing solution that has contacted the industrial gas operably connected to the absorber; and a processing station operably connected to the output, wherein the processing station is configured to obtain at least one of the following saleable products: a building material comprising a $CO_2$ sequestering component, a desalinated water, a potable water, a slurry comprising a $CO_2$ sequestering component, or a solution comprising a $CO_2$ sequestering component, in which the bubble column is configured to produce bubbles of the industrial gas within the absorbing solution such that at least 10% by weight of the carbon dioxide in the industrial gas is transferred to the absorbing solution. In some embodiments, the invention provides an apparatus that includes an absorber comprising a sparging vessel; an inlet for an industrial gas, wherein the industrial gas comprises $CO_2$, SOx, NOx, heavy metal, non-$CO_2$ acid gas, and/or fly ash in an amount equal to a time-averaged original composition, operably connected to the absorber; an inlet for an absorbing solution, wherein the absorbing solution comprises an alkaline solution comprising a salt water, particulate material, or both in an absorbing slurry; an outlet for an effluent gas, said gas characterized by being depleted in $CO_2$ and at least one of SOx, NOx, heavy metal, non-$CO_2$ acid gas, and/or fly ash relative to said original composition of said industrial gas, wherein the outlet is operably connected to said absorber; an outlet for absorbing solution that has contacted the industrial gas operably connected to the absorber; and a processing station operably connected to the output, wherein the processing station is configured to obtain at least one of the following saleable products: a building material comprising a $CO_2$ sequestering component, a desalinated water, a potable water, a slurry comprising a $CO_2$ sequestering component, or a solution comprising a $CO_2$ sequestering component, wherein the sparging vessel is configured to produce bubbles of the industrial gas within the absorbing solution such that at least 10% by weight of the carbon dioxide in the industrial gas is transferred to the absorbing solution. In some embodiments, the invention provides an apparatus that includes an absorber that includes a spray tower; an inlet for an industrial gas, wherein the industrial gas comprises $CO_2$, SOx, NOx, heavy metal, non-$CO_2$ acid gas, and/or fly ash in an amount equal to a time-averaged original composition, operably connected to the absorber; an inlet for an absorbing solution, wherein the absorbing solution includes an alkaline solution, particulate material, or both in an absorbing slurry; an outlet for an effluent gas, said gas characterized by being depleted in $CO_2$ and at least one of SOx, NOx, heavy metal, non-$CO_2$ acid gas, and/or fly ash relative to said original composition of said industrial gas, wherein the outlet is operably connected to said absorber; an outlet for absorbing solution that has contacted the industrial gas operably connected to the absorber; and a processing station operably connected to the output, wherein the processing station is configured to obtain at least one of the following saleable products: a building material comprising a $CO_2$ sequestering component, a desalinated water, a potable water, a slurry comprising a $CO_2$ sequestering component, or a solution comprising a $CO_2$ sequestering component, wherein the spray tower is configured to produce streams, droplets, or a combination thereof of the absorbing solution in the industrial gas such that at least 10% by weight of the carbon dioxide in the industrial gas is transferred to the absorbing solution, further wherein the spray tower is configured to operate at a liquid flow rate to gas flow rate ratio (L/G ratio) of between 50 and 5,000 gallons per minute/1000 actual cubic feet. In some embodiments, the invention provides an apparatus that includes an absorber comprising a at least one of a spray tower, packing material, a packed bed, trays, shed rows, or a microporous membrane; an inlet for an industrial gas, wherein the industrial gas comprises $CO_2$, SOx, NOx, heavy metal, non-$CO_2$ acid gas, and/or fly ash in an amount equal to a time-averaged original composition, operably connected to the absorber; an inlet for an absorbing solution, wherein the absorbing solution comprises an alkaline solution, particulate material, or both in an absorbing slurry; an outlet for an effluent gas, said gas characterized by being depleted in $CO_2$ and at least one of SOx, NOx, heavy metal, non-$CO_2$ acid gas, and/or fly ash relative to said original composition of said industrial gas, wherein the outlet is operably connected to said absorber; an outlet for absorbing solution that has contacted the industrial gas operably connected to the absorber; and a processing station operably connected to the output, wherein the processing station is configured to obtain at least one of the following saleable products: a building material comprising a $CO_2$ sequestering component, a desalinated water, a potable water, a slurry comprising a $CO_2$ sequestering component, or a solution comprising a $CO_2$ sequestering component, in which the absorber is configured to produce streams, droplets, or a combination thereof of the absorbing solution in the industrial gas such that at least 10% by weight of the carbon dioxide in the industrial gas is transferred to the absorbing solution, and further wherein the absorber is configured to operate at a liquid flow rate to gas flow rate ratio (L/G ratio) of between 50 and 5,000 gallons per minute/1000 actual cubic feet. In some embodiments, the invention provides an apparatus that includes an absorber that includes a at least one of a spray tower, packing material, a packed bed, trays, shed rows, or a microporous membrane; an inlet for an industrial gas, wherein the industrial gas comprises $CO_2$, SOx, NOx, heavy metal, non-$CO_2$ acid gas, and/or fly ash in an amount equal to a time-averaged original composition, operably connected to the absorber; an inlet for an absorbing solution, wherein the absorbing solution includes an alkaline solution, particulate material, or both in an absorbing slurry, wherein said alkaline solution comprises a salt water, a clear solution, or any combination thereof; an outlet for an effluent gas, said gas characterized by being depleted in $CO_2$ and at least one of SOx, NOx, heavy metal, non-$CO_2$ acid gas, and/or fly ash relative to said original composition of said industrial gas, wherein the outlet is operably connected to said absorber; an outlet for absorbing solution that has contacted the industrial gas operably connected to the absorber; and a processing station operably connected to the output, wherein the processing station is configured to obtain at least one of the following saleable products: a building material comprising a $CO_2$ sequestering component, a desalinated water, a potable water, a slurry comprising a $CO_2$ sequestering component, or a solution comprising a $CO_2$ sequestering component, in which the absorber is configured to produce streams, droplets, or a combination thereof of the absorbing solution in the industrial gas such that at least 10% by weight of the carbon dioxide in the industrial gas is transferred to the absorbing solution. In some embodiments, the invention provides apparatus that includes an absorber that includes a at least one of a spray tower, packing material, a packed bed, trays, shed rows, or a microporous membrane; an inlet for an industrial gas, wherein the industrial gas comprises $CO_2$, SOx, NOx, heavy metal, non-$CO_2$ acid gas, and/or fly ash in an amount equal to a time-averaged original composition, operably connected to the absorber; an inlet for an absorbing solution, wherein the absorbing solution comprises an alkaline solution, particulate material, or both in an absorbing slurry, wherein said alkaline solution comprises a salt water; an outlet for an effluent gas, said gas characterized by being depleted in $CO_2$ and at least one of SOx, NOx, heavy metal, non-$CO_2$ acid gas, and/or fly ash relative to said original composition of said industrial gas, wherein the outlet is operably connected to said absorber; an outlet for absorbing solution that has contacted the industrial gas operably connected to the absorber; and a processing station operably connected to the output, in which the processing station is configured to obtain a saleable product, in which the absorber is configured to produce streams, droplets, or a combination thereof of the absorbing solution in the industrial gas such that at least 10% by weight of the carbon dioxide in the industrial gas is transferred to the absorbing solution. In some embodiments, the inlet for an industrial gas is configured to accept industrial waste gas, combustion flue gas, cement kiln flue gas, compressed carbon dioxide, super critical carbon dioxide, or any combination thereof. In some embodiments, the absorbing solution is contacted with the industrial gas such that the absorbing solution is present as droplets, rivulets, columns of liquid, jet sprays, liquid sheets, neutrally buoyant clouds of solution, or any combination thereof. In some embodiments, the apparatus further comprises atomizing components, comprising: pressure atomizers (nozzles), rotary atomizers, air-assisted atomizers, air-blast atomizers, ultrasonic atomizers, ink jet atomizers, MEMS atomizers, electrostatic spray atomizers, dual fluid atomizers, eduction nozzles, or any combination thereof within the contacting chamber. In some embodiments, the salt water in absorbing solution comprises sea water, an alkaline brine, a cation rich brine, a synthetic brine, an industrial waste water, an industrial waste brine, or any combination thereof. In some embodiments, the apparatus further comprises a recirculation system. In some embodiments, the recirculation system comprises conduits and pumps to move absorbing solution that has contacted the industrial gas from the outlet for absorbing solution that has contacted the industrial gas, the processing station or both to the inlet for absorbing solution, the atomizing components, or any combination thereof. In some embodiments, the recirculation system comprises conduits and pumps to move gas reduced in CO2 from the outlet for effluent gas to the inlet for industrial gas, the bubble columns, sparging vessel, or any combination thereof.

In some embodiments, the invention provides an emissions control system operably connected to a power plant in which the power plant produces energy and an industrial waste gas that includes carbon dioxide, in which the emissions control system is configured to absorb at least 50% of the carbon dioxide from the waste gas and is configured to use less than 30% of the energy generated by the power plant. In some embodiments, the invention provides an emissions control system operably connected to a power plant in which the power plant produces energy and an industrial waste gas that includes oxides of sulfur, in which the emissions control system is configured to absorb at least 90% of the oxides of sulfur from the waste gas and is configured to use less than 30% of the energy generated by the power plant. In some embodiments, the invention provides an emissions control system operably connected to a power plant in which the power plant produces energy and an industrial waste gas that includes carbon dioxide and sulfur oxide, in which the emissions control system is configured to absorb at least 50% of the carbon dioxide and at least 80% of the sulfur oxide from the waste gas, and in which said emissions control system is further configured to use less than 30% of the energy generated by the power plant. In some embodiments, the emissions control system is configured to accept at least 10% of the industrial waste gas from the power plant. In some embodiments, the emissions control system is configured to accept an alkaline solution from an electrochemical system configured to produce a caustic solution. In some embodiments, the electrochemical system comprises an anode, a cathode, and at least one ion-selective membrane between the anode and cathode. In some embodiments, the electrochemical system is configured to operate at a voltage of 2.8V or less applied across the anode and the cathode. In some embodiments, the emissions control system is configured to accept a pH adjusting agent, wherein the pH adjusting agent comprises an industrial waste, a naturally occurring pH adjusting agent, a produced pH adjusting agent, or any combination thereof. In some embodiments, the emissions control system is configured to operate at a liquid flow rate to gas flow rate ratio (L/G) ranging from 5 to 5,000 gallons per minute/1000 actual cubic feet per minute. In some embodiments, the system is configured to operate at a liquid flow rate to gas flow rate ratio (L/G) ranging from 100 to 500 gallons per minute/1000 actual cubic feet per minute.

Provided herein are systems comprising a precipitation reactor for producing an effluent comprising a precipitation product comprising carbonate, bicarbonate, or a combination thereof, operably connected to a liquid-solid separation apparatus for concentrating the precipitation product from the precipitation reactor effluent.

In one version of the liquid-solid separation apparatus, the liquid-solid separation apparatus comprises a baffle situated such that in operation the baffle deflects the precipitation reactor effluent such that precipitation product descends to a lower region of the liquid-solid separation apparatus and supernatant ascends and exits the liquid-solid separation apparatus. In another version of the liquid-solid apparatus, the liquid-solid separation apparatus comprises a spiral channel configured to direct effluent from the precipitation reactor to flow in the spiral channel resulting in concentration of the precipitation product based on size and mass and production of a supernatant. Liquid-solid separation apparatus of the systems described herein comprise a precipitation product collector capable of collecting 50% to 100%, 75% to 100%, or 95% to 100% of the precipitation product from the precipitation station. Additionally, liquid-solid separation apparatus are capable of processing 100 L/min to 20,000 L/min, 5000 L/min to 20,000 L/min, or 10,000 L/min to 20,000 L/min of effluent from the precipitation station.

Precipitation reactors of the systems described herein may comprise a charging reactor and precipitation station. The charging reactor is capable of removing $CO_2$ from an industrial waste gas stream. Furthermore, the charging reactor may be capable of removing one or more of SOx, NOx, heavy metals, particulates, VOCs, or a combination thereof, from the industrial waste gas steam. The charging reactor comprises a flat jet nozzle coupled to a source of water, wherein the flat jet nozzle is adapted to form a flat jet stream for contacting a gaseous waste stream comprising $CO_2$ with water from the source of water. The gaseous waste stream comprising $CO_2$ is a waste stream from an industrial plant that burns carbon-based fuels, calcined materials, or a combination thereof. The water provided by the source of water may contain alkaline earth metal ions; in such cases the source of water may be selected from the group selected from fresh water brackish water, seawater, and brine. The precipitation station is operably connected to a source of a pH-raising agent. The pH-raising agent may comprises ash, oxides, hydroxides, or carbonates. The precipitation station is adapted to produce precipitation product comprising carbonate, bicarbonate, or a combination thereof.

The systems described herein may further comprise an electrochemical cell. The electrochemical cell may be configured to remove protons from the charging station, the precipitation station, or both the charging and the precipitation station.

Also provided are integrated systems comprising a power plant that combusts carbon-based fuel to produce a waste gas stream comprising carbon dioxide, operably connected to a waste gas-processing system. The waste gas-processing system comprises a precipitation reactor for producing an effluent comprising a precipitation product comprising carbonate, bicarbonate, or a combination thereof, operably connected to a liquid-solid separation apparatus for concentrating the precipitation product from the precipitation reactor effluent. In one version of the liquid-solid separation apparatus, the liquid-solid separation apparatus comprises a baffle situated such that in operation the baffle deflects the precipitation reactor effluent such that precipitation product descends to a lower region of the liquid-solid separation apparatus and supernatant ascends and exits the liquid-solid separation apparatus. In another version of the liquid-solid separation apparatus, the liquid-solid separation apparatus comprises a spiral channel configured to direct effluent from the precipitation reactor to flow in the spiral channel resulting in concentration of the precipitation product based on size and mass and production of a supernatant. The waste gas stream further comprises SOx, NOx, heavy metals, VOCs, particulates, or a combination thereof.

Also provided are methods comprising transferring part or all of a gaseous waste stream from an industrial plant comprising carbon dioxide to a precipitation reactor for producing an effluent comprising a precipitation product comprising carbonate, bicarbonate, or a combination thereof; and concentrating the precipitation product from precipitation reactor effluent in a liquid-solid separation apparatus. In one version of the liquid-solid separation apparatus, the effluent is deflected against a baffle within the liquid-solid separation apparatus such that precipitation product descends to a lower region of the liquid-solid separation apparatus and supernatant ascends and exits the liquid-solid separation apparatus. In another version of the liquid-solid separation apparatus, the effluent is made to flow in a spiral channel resulting in concentration of the precipitation product based on size and mass, and production of a supernatant.

Methods for sequestering carbon dioxide may be done with any system according to any one of the preceding claims.

DRAWINGS

The novel features of the invention are set forth with particularity in the appended claims. A better understanding of the features and advantages of the invention will be obtained by reference to the following detailed description that sets forth illustrative embodiments, in which the principles of the invention are utilized, and the accompanying drawings of which:

FIG. 1 provides a system of the invention comprising a processor, wherein the processor is configured to process a variety of gases comprising carbon dioxide.

FIG. 2 provides a system of the invention comprising a processor and a treatment system, wherein the treatment system is configured to treat compositions from the processor.

FIG. 3 provides a system of the invention comprising a processor and an optional treatment system, wherein the processor comprises a contactor and a reactor.

FIG. 4 provides a system of the invention comprising a processor and a treatment system, wherein supernatant from the treatment system may optionally be recirculated to the processor.

FIG. 5 provides a system of the invention comprising a processor, a treatment system, and an electrochemical system, wherein supernatant from the treatment system may optionally be recirculated to the processor, the electrochemical system, or a combination thereof.

FIG. 6A provides a schematic diagram of a $CO_2$ sequestration method according to one embodiment of the invention.

FIG. 6B provides a schematic diagram of a $CO_2$ sequestration system according to one embodiment of the invention.

FIG. 6C provides is a schematic of an embodiment of the system.

FIG. 7 provides a schematic diagram of a $CO_2$ sequestration system according to another embodiment of the invention.

FIG. 8 provides a diagram of one embodiment of a low-voltage apparatus for producing hydroxide electrochemically.

FIG. 9 provides a diagram of another embodiment of a low-voltage apparatus for producing hydroxide electrochemically.

FIG. 10 provides a diagram of another embodiment of a low-voltage apparatus for producing hydroxide electrochemically.

FIG. 20 is a schematic of shed row configurations that may be used in some embodiments of the apparatus and system.

FIG. 23 provides a schematic diagram of a gas-liquid or gas-liquid-solid contactor.

Figure 24:
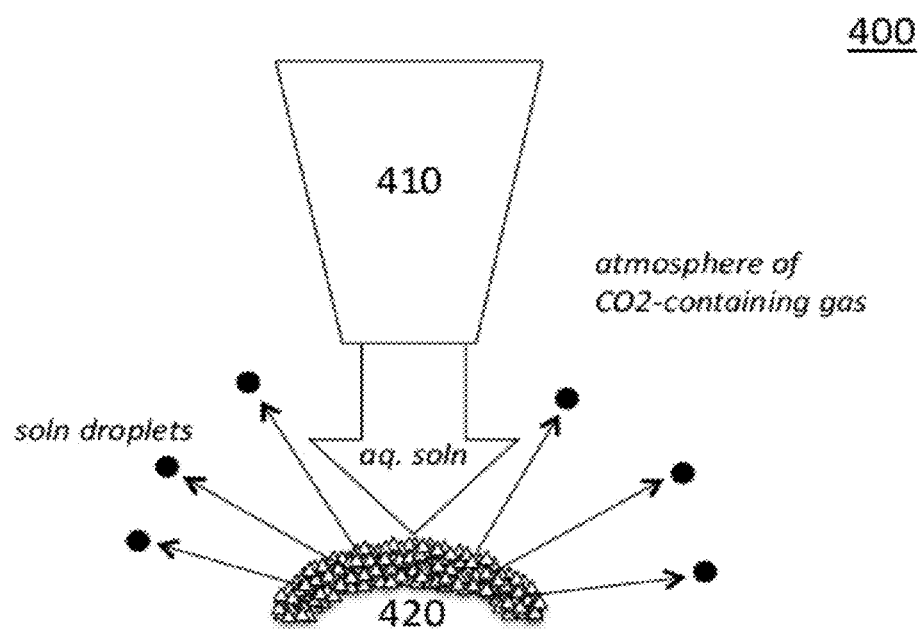

FIG. 24 provides a schematic diagram of another view of the gas-liquid or gas-liquid-solid contactor of FIG. 23.

Figure 25:
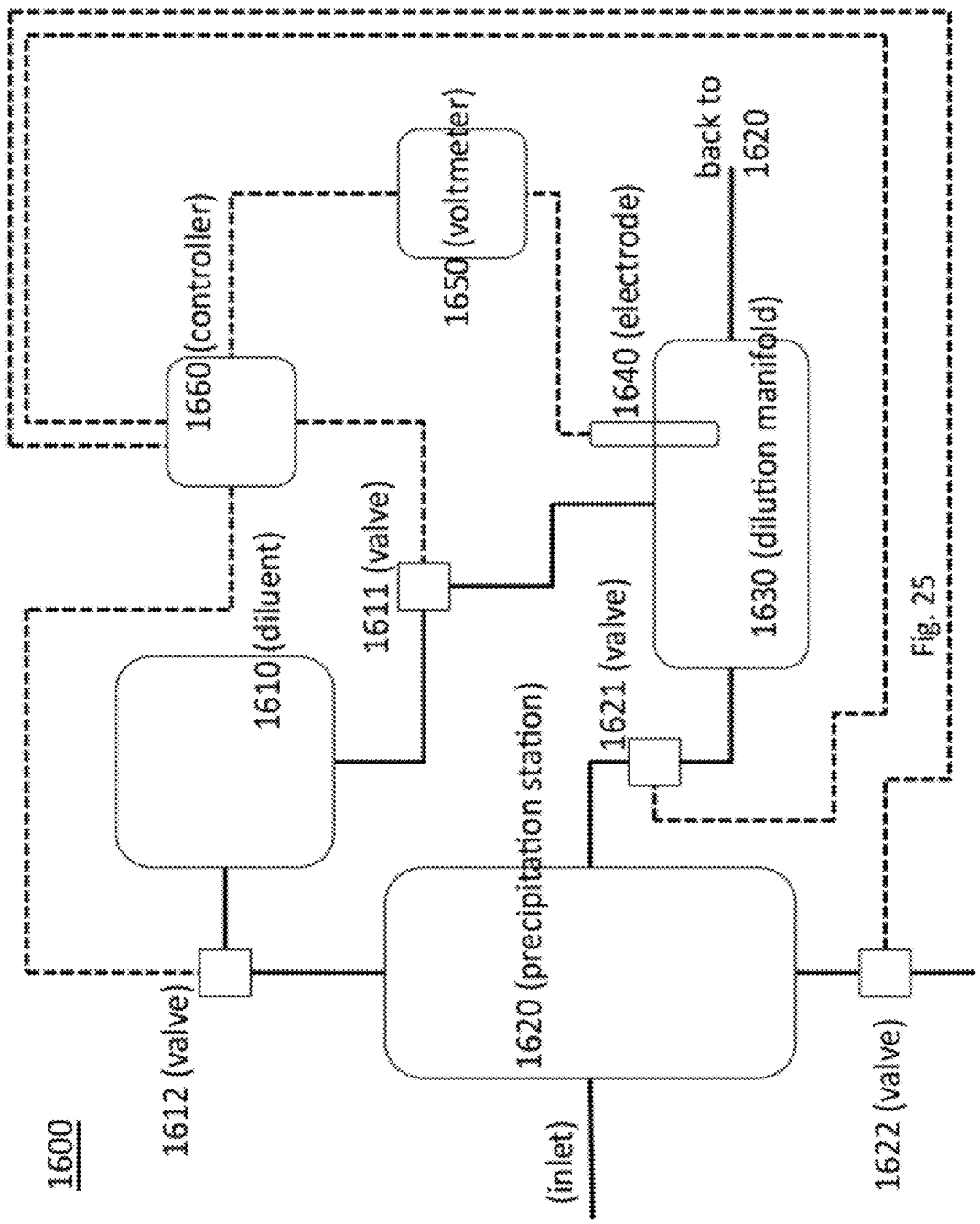

FIG. 25 provides a diagram of an inline monitor.

Figure 26:
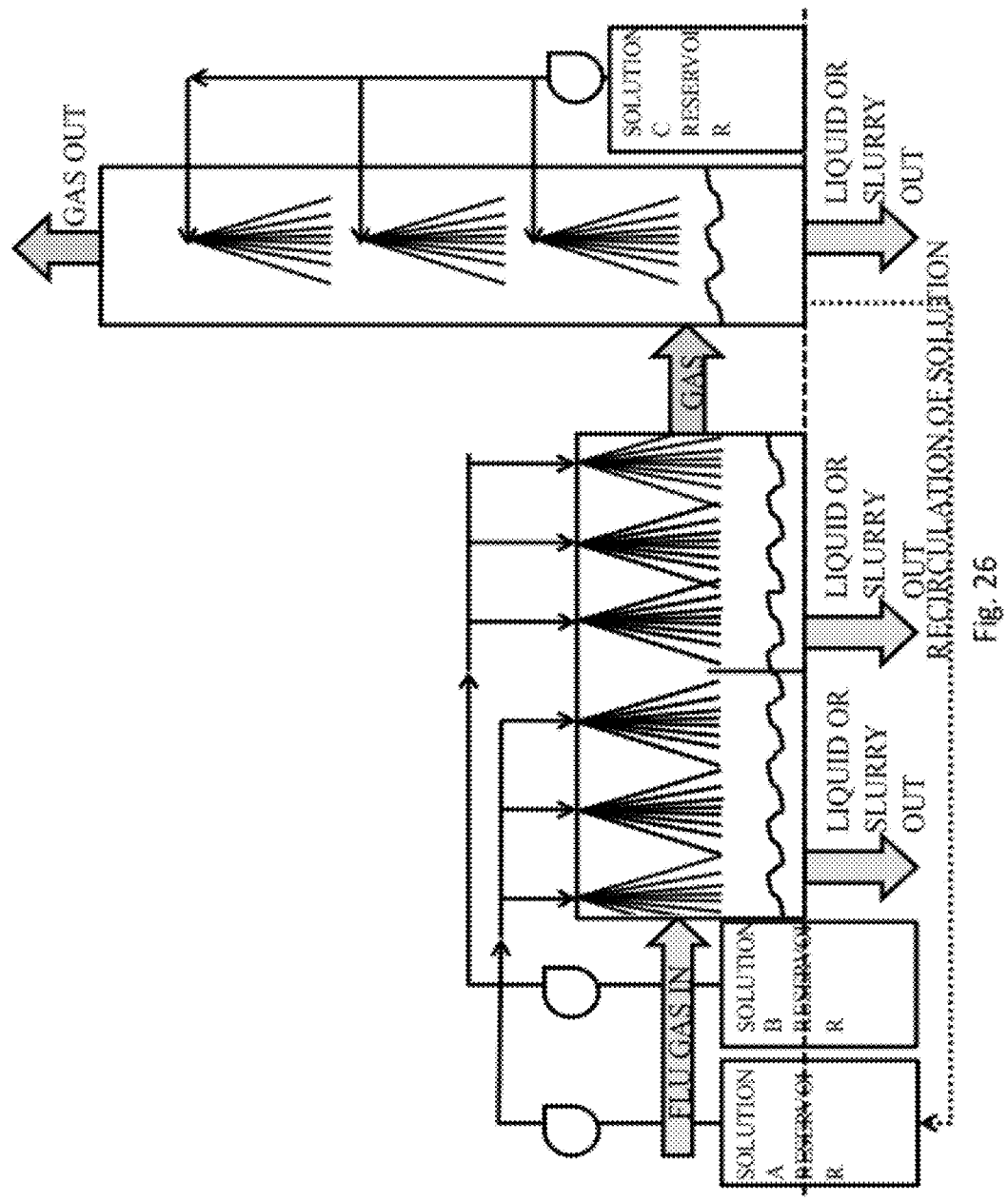

FIG. 26 is a schematic of an embodiment of the apparatus showing both vertically and horizontally oriented sections.

Figure 27:
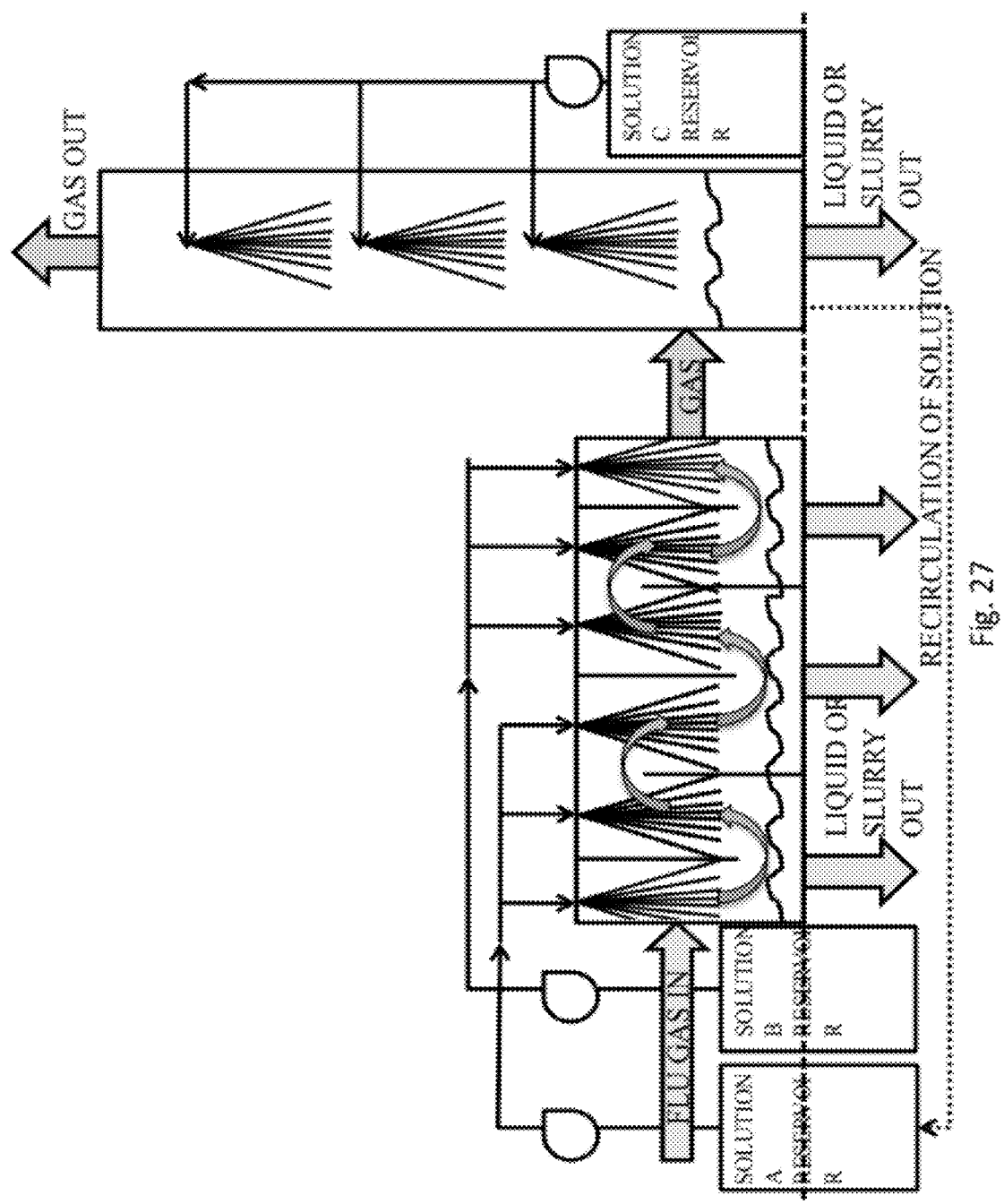

FIG. 27 is a schematic of an embodiment of the apparatus showing both vertically and horizontally oriented sections.

Figure 28:
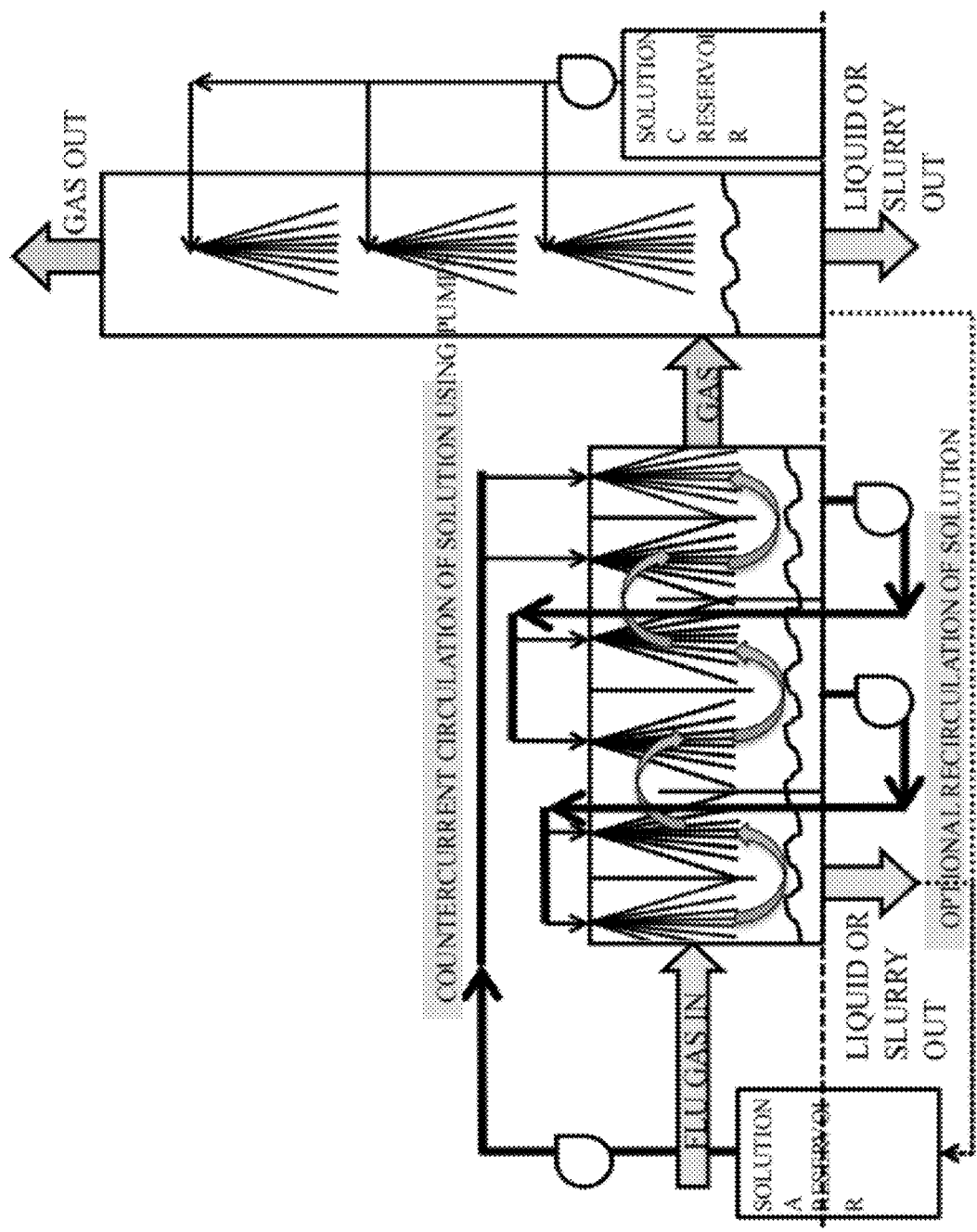

FIG. 28 is a schematic of an embodiment of the apparatus showing both vertically and horizontally oriented sections with countercurrent solution circulation, with respect to gas flow, in the horizontally oriented section suing pumps.

Figure 29:
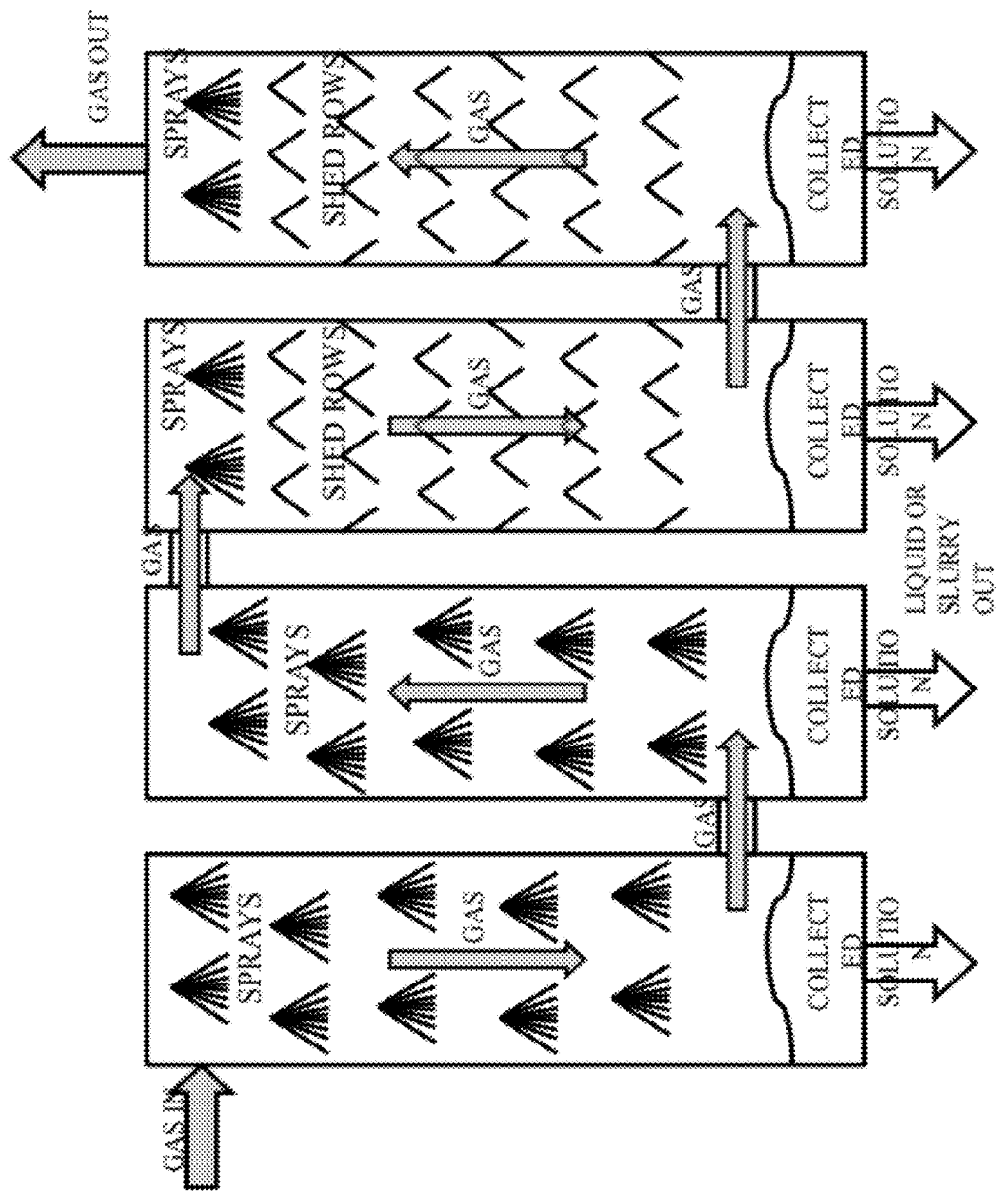

FIG. 29 is a schematic of an embodiment of the apparatus and system, wherein the system is a series of apparatus.

Figure 30:
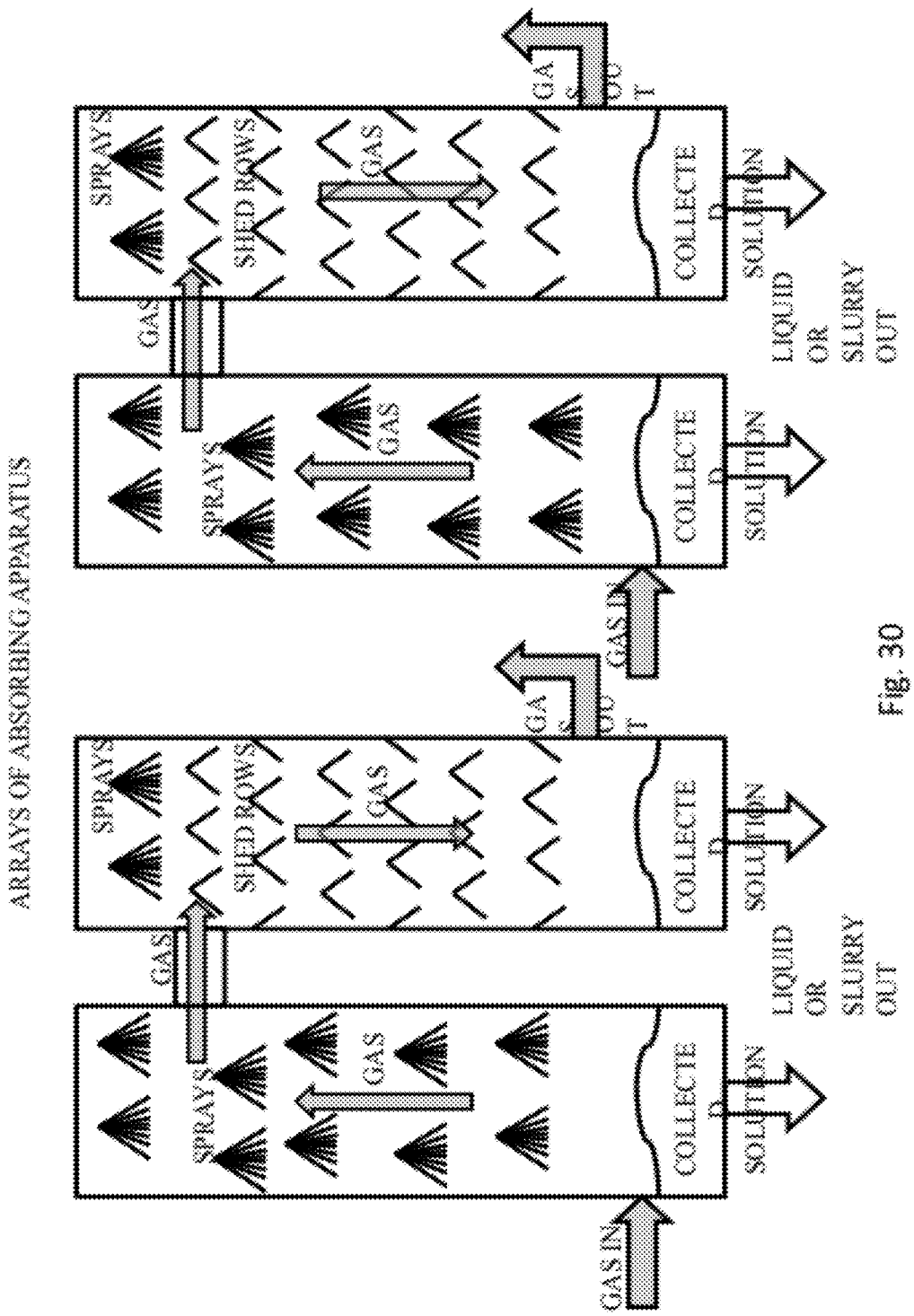
Figure 31:
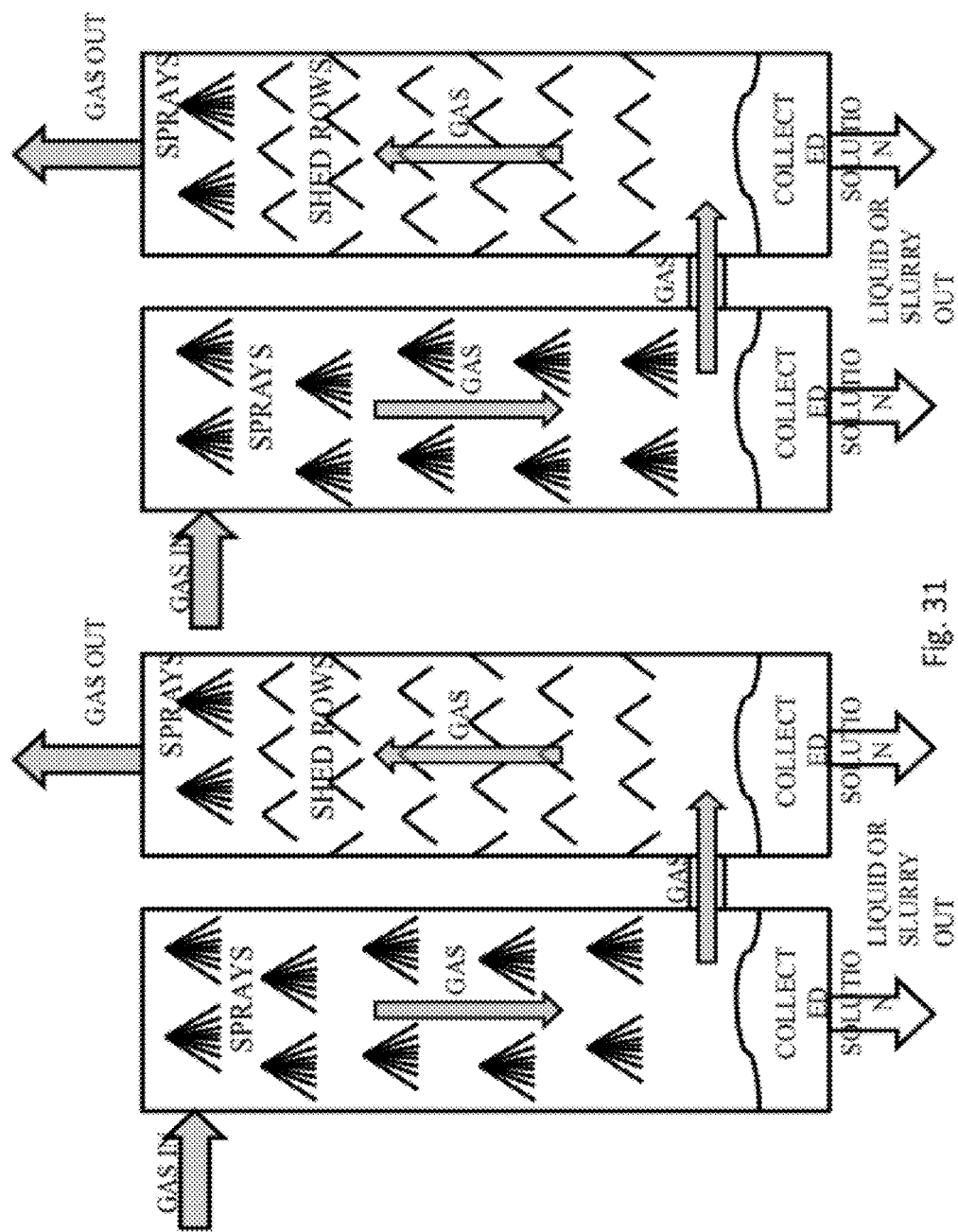

FIG. 30 is a schematic of an embodiment showing system that is an array of apparatus FIG. 31 is a schematic of an embodiment showing system that is an array of apparatus.

Figure 32:
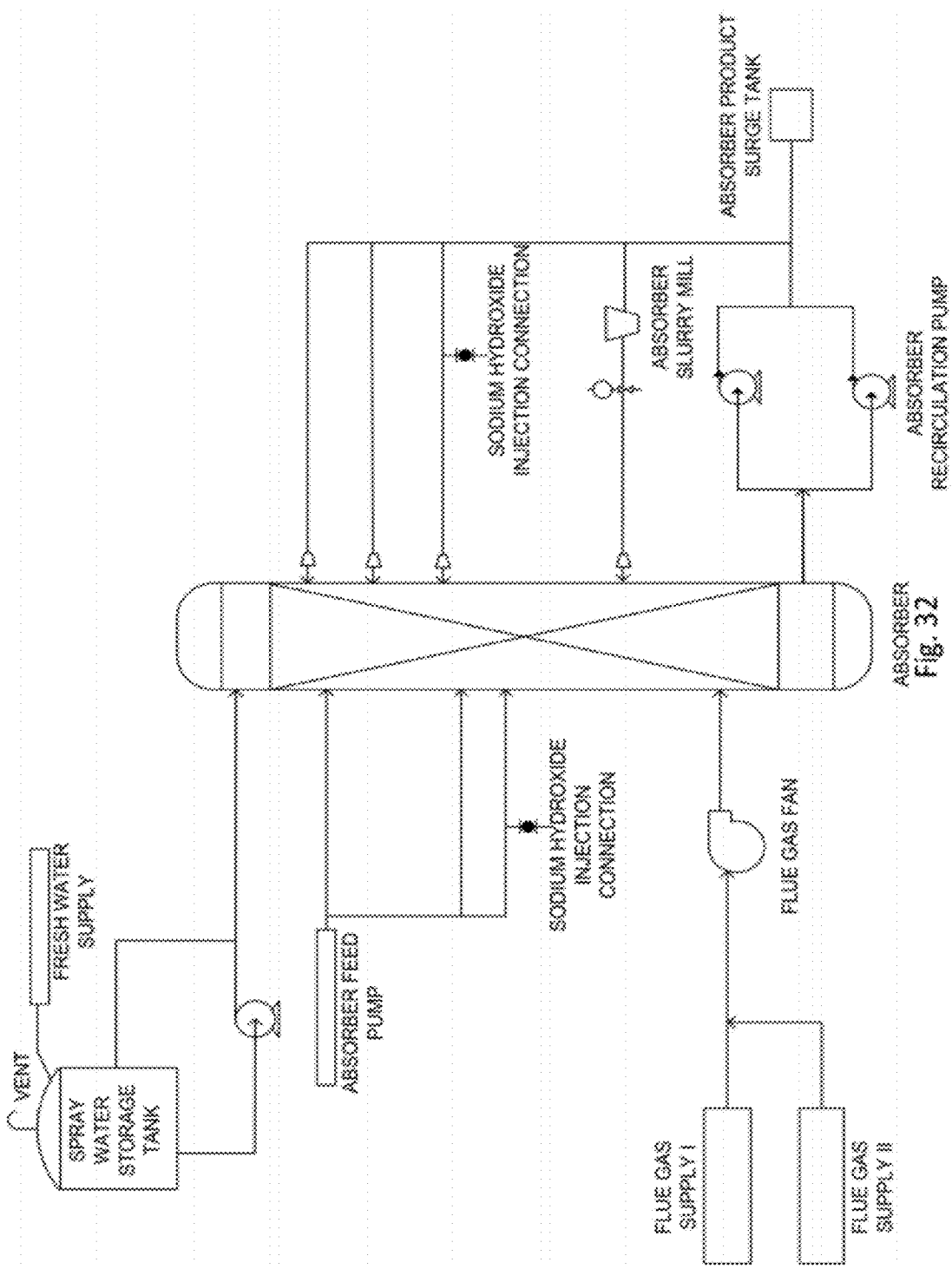

FIG. 32 is a schematic of an embodiment of the system.

Figure 33:
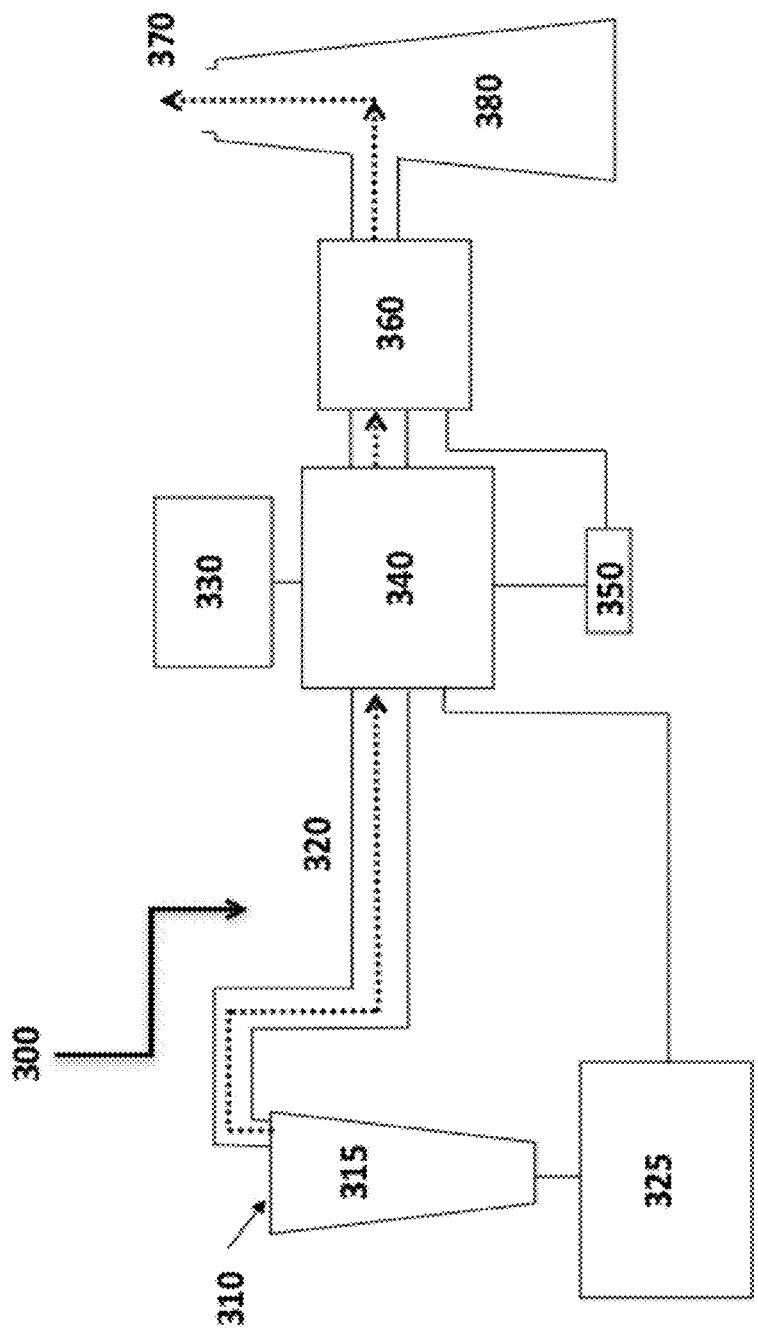

FIG. 33 provides a schematic diagram of power plant that is integrated with a $CO_2$ sequestration system according to an embodiment of the invention.

Figure 34:
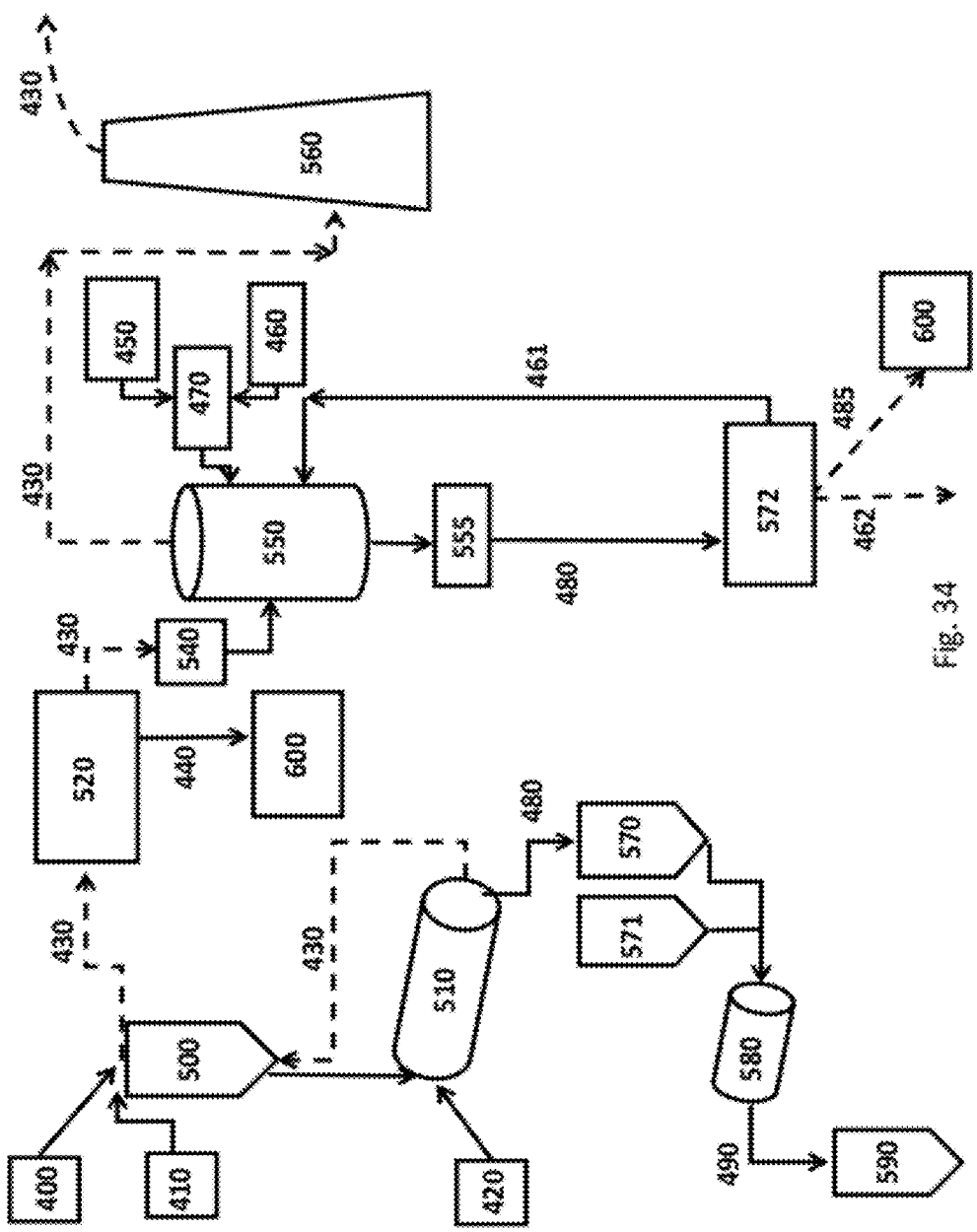

FIG. 34 provides a schematic diagram of a Portland cement plant.

Figure 35:
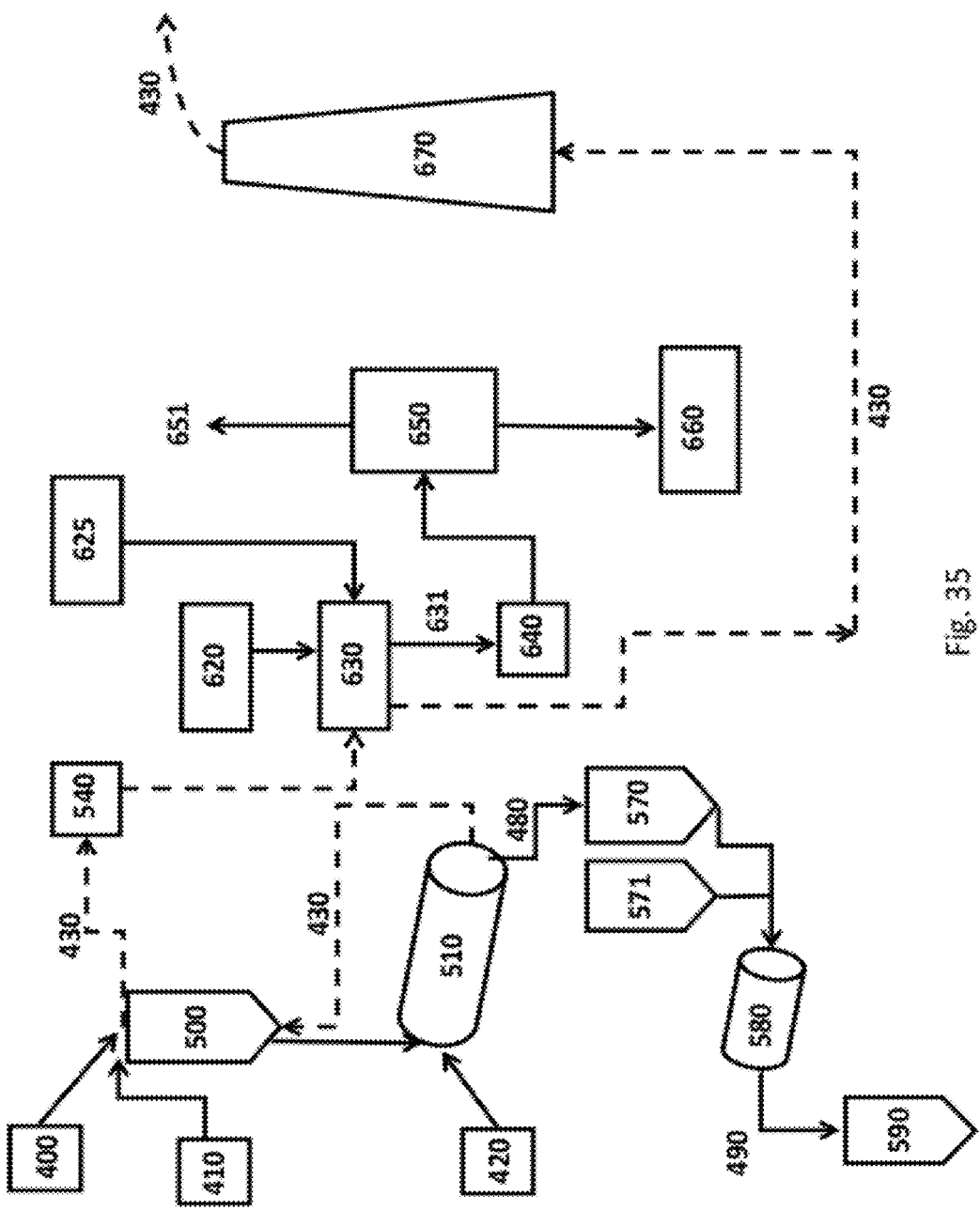

FIG. 35 provides a schematic diagram of a cement plant co-located with a precipitation plant according to one embodiment of the invention.

Figure 36:
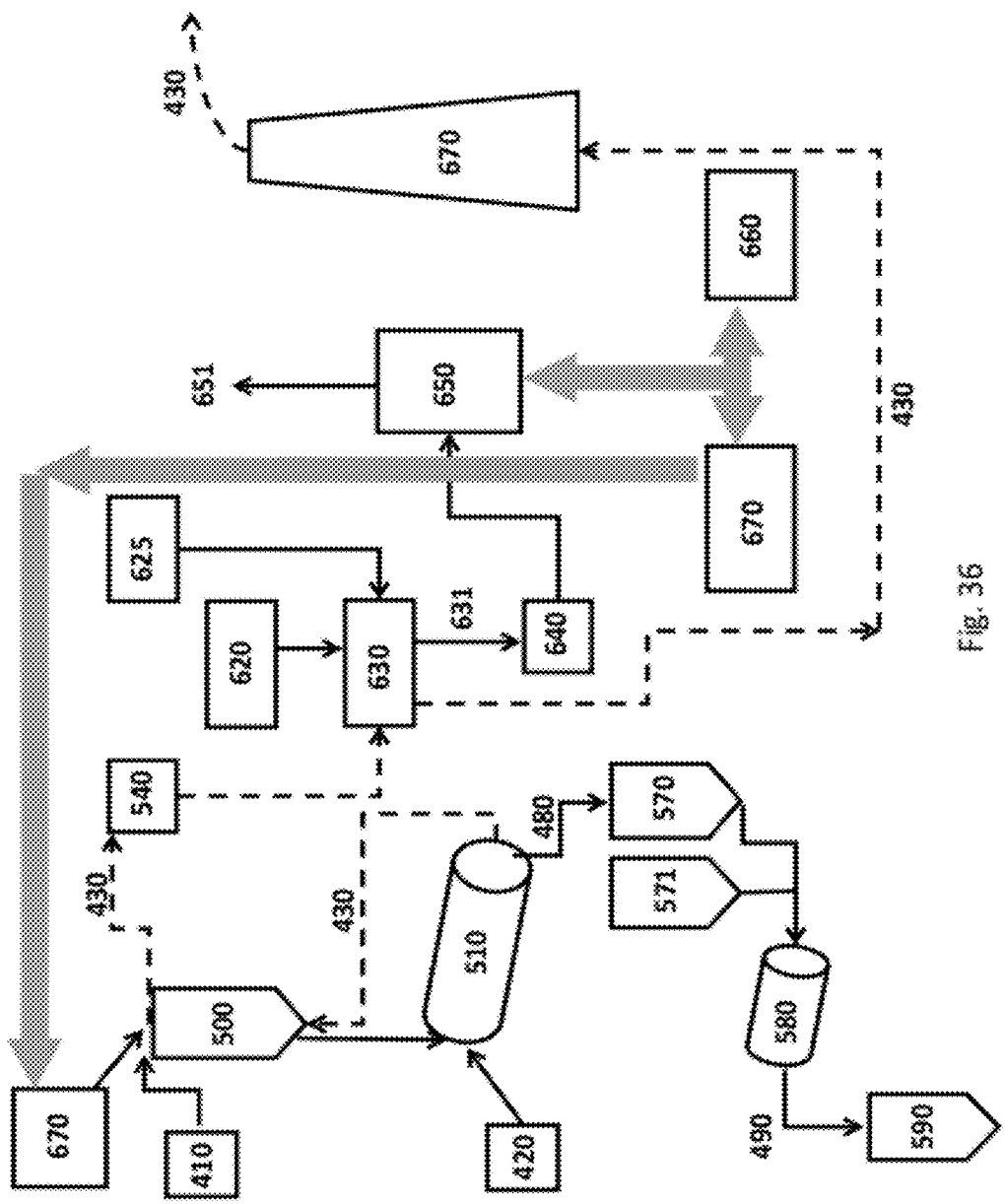

FIG. 36 provides a schematic of a cement plant that does not require a mined limestone feedstock according to one embodiment of the invention.

Figure 37:
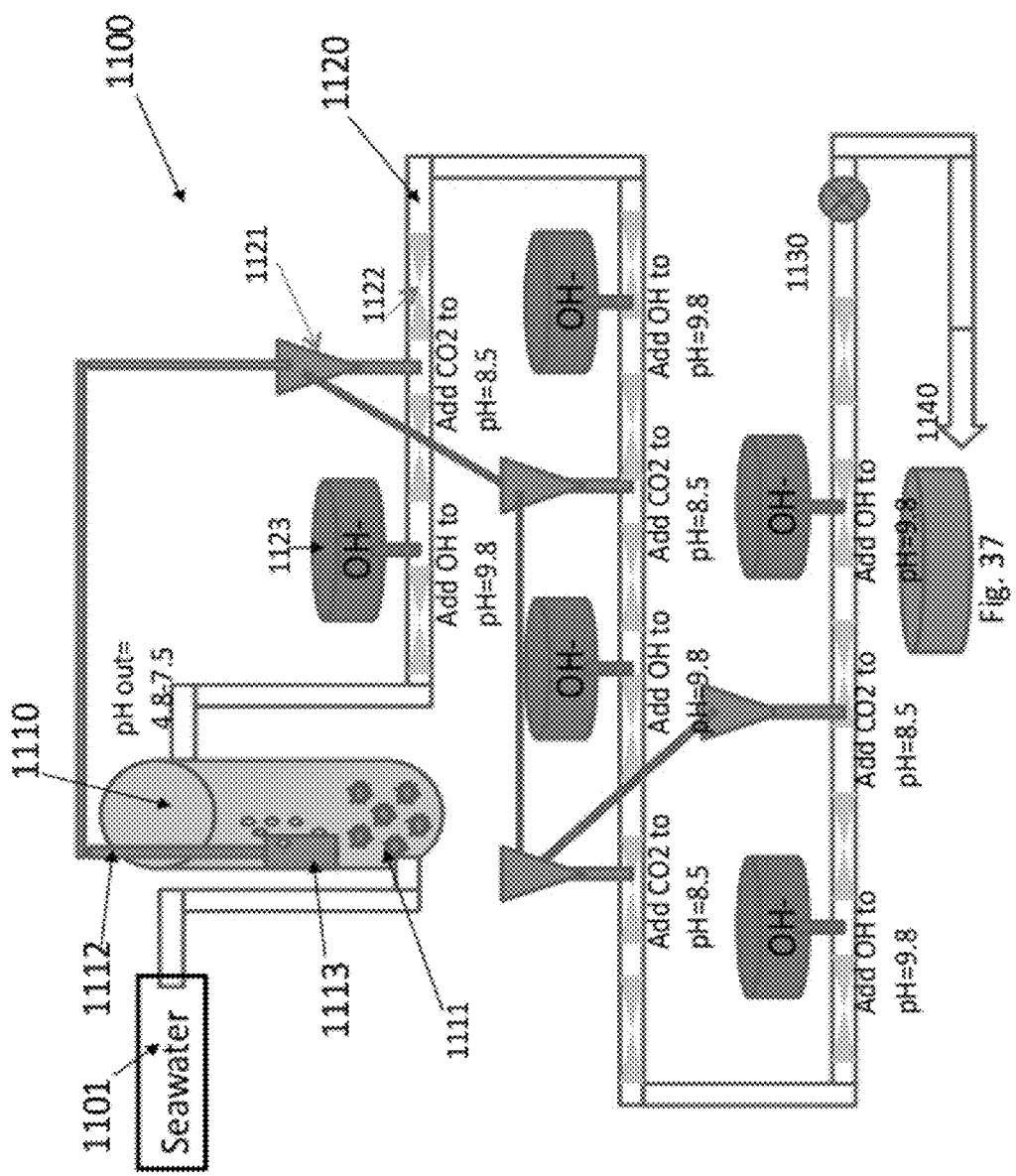

FIG. 37 provides a schematic of a system according to one embodiment of the invention.

Figure 38:
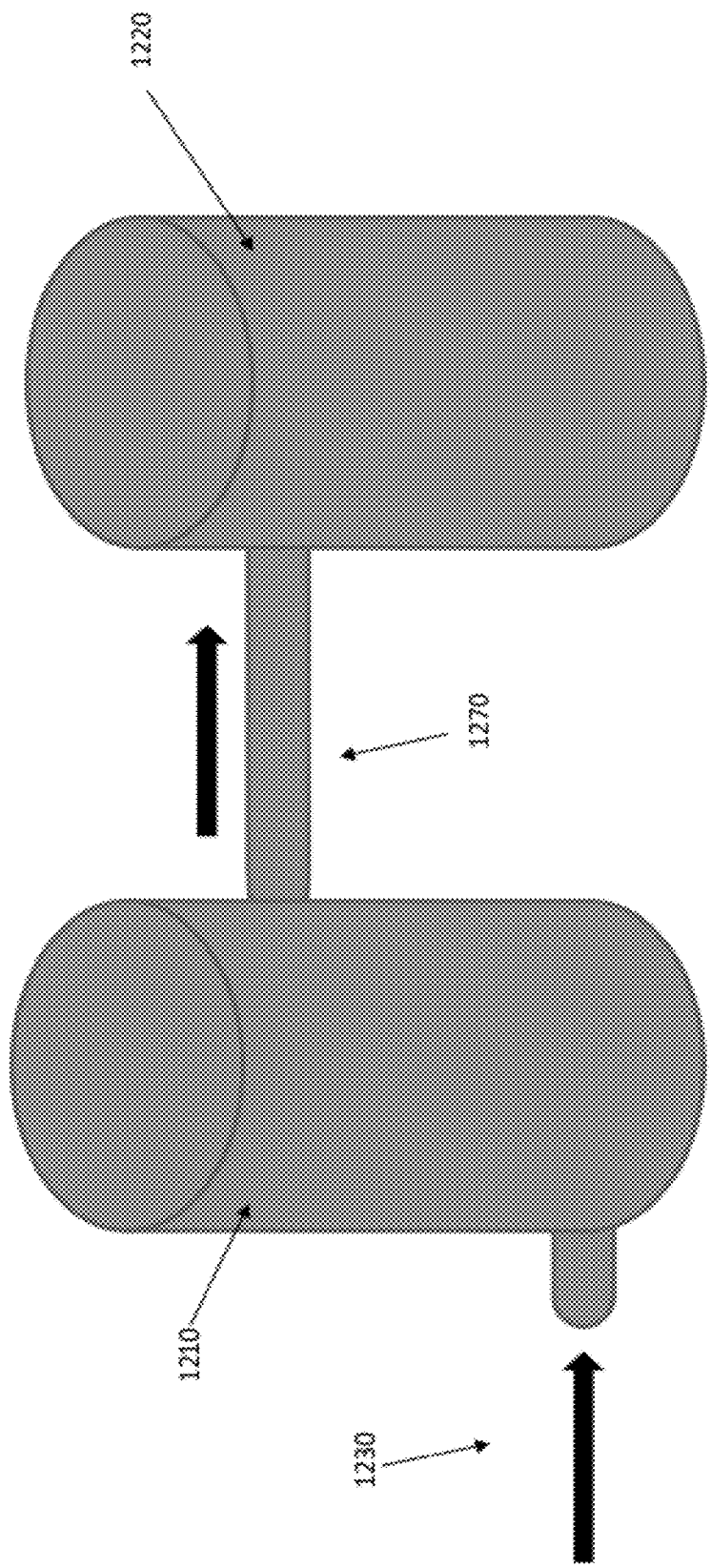
Figure 39:
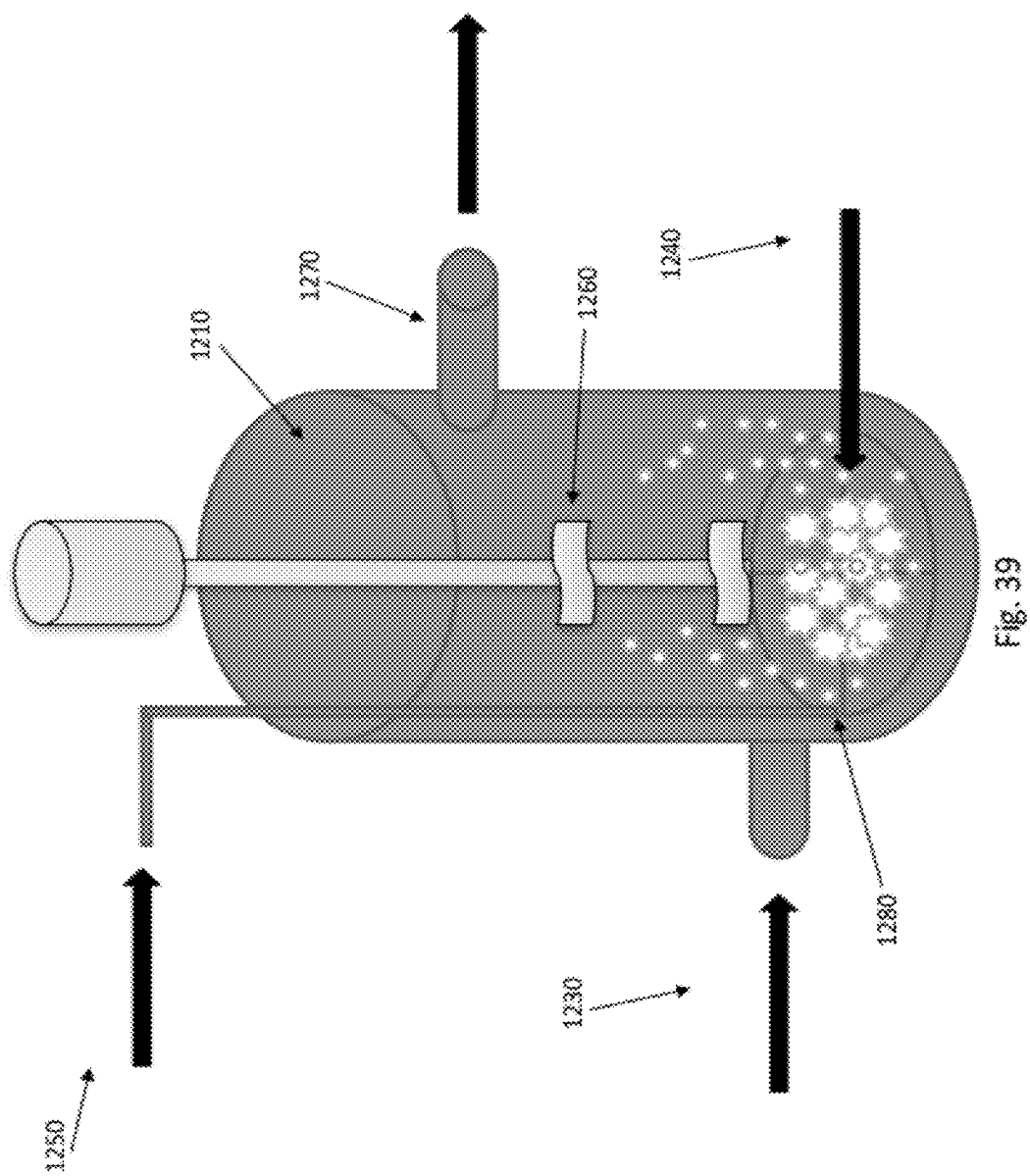
Figure 40:
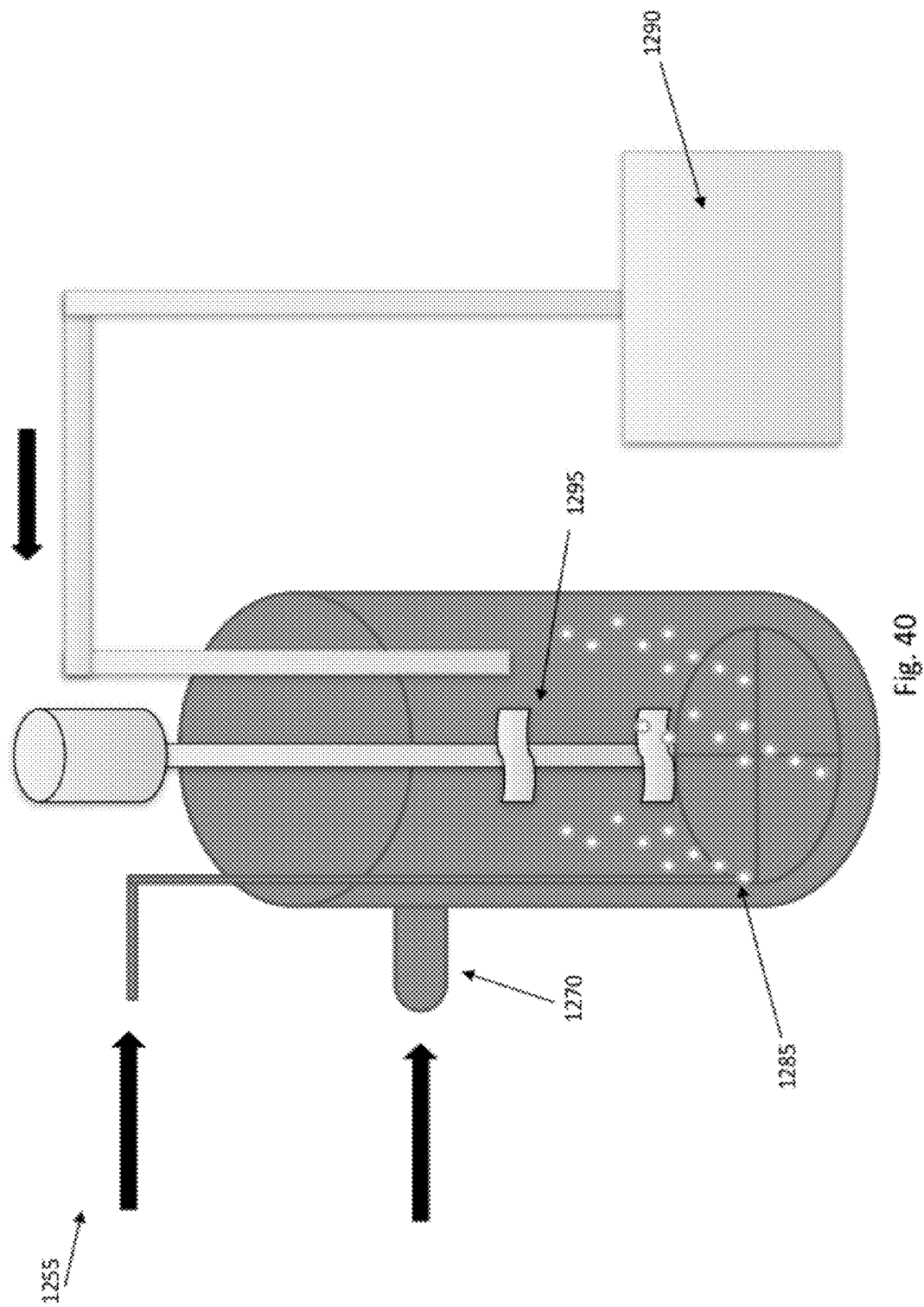

FIGS. 38, 39, and 40 provide schematics of a system according to one embodiment of the invention.

Figure 41:
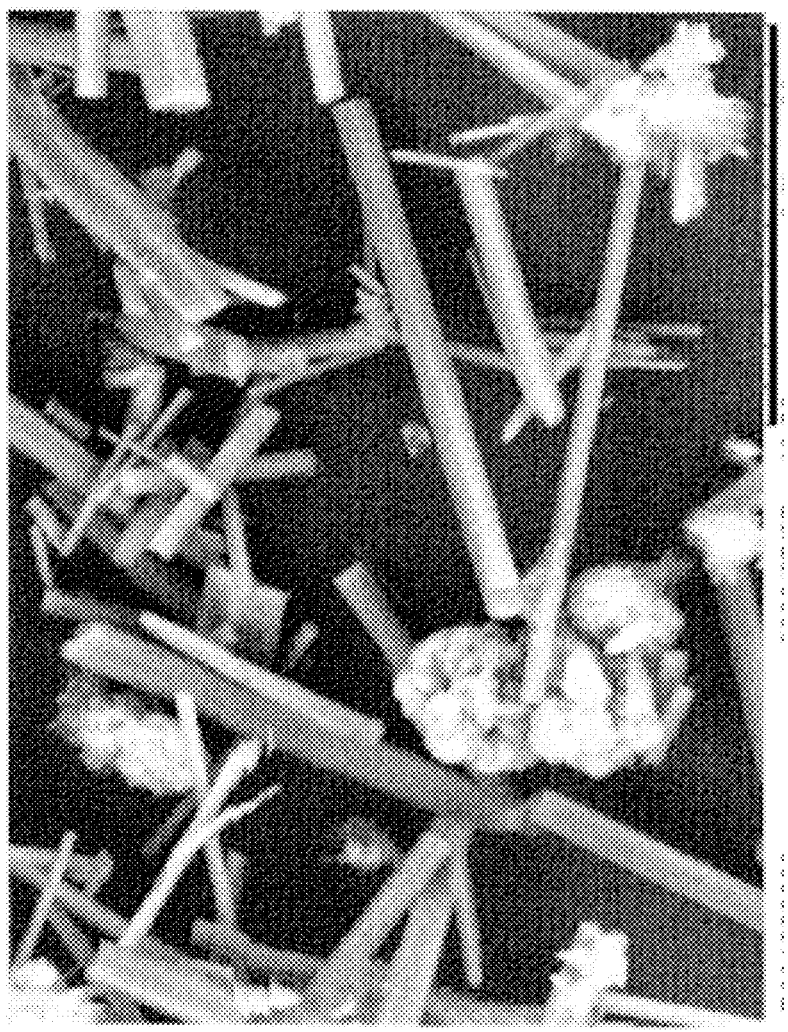
Figure 42:
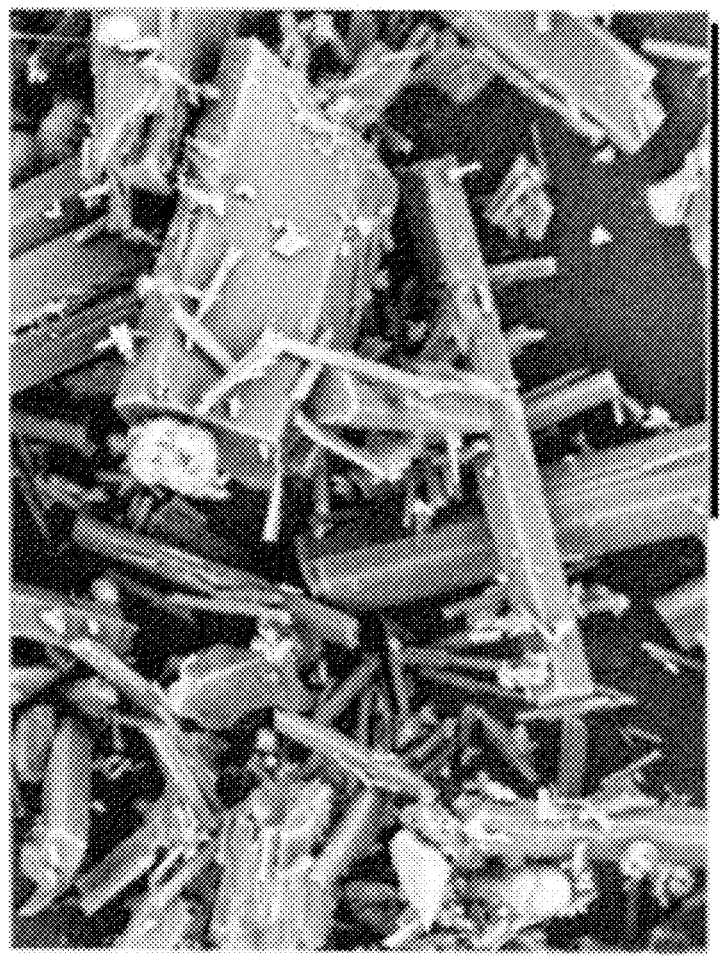

FIGS. 41 and 42 provide pictures of precipitate of the invention.

Figure 43:

FIG. 43 provides a picture of amorphous precipitate of the invention.

Figure 44:
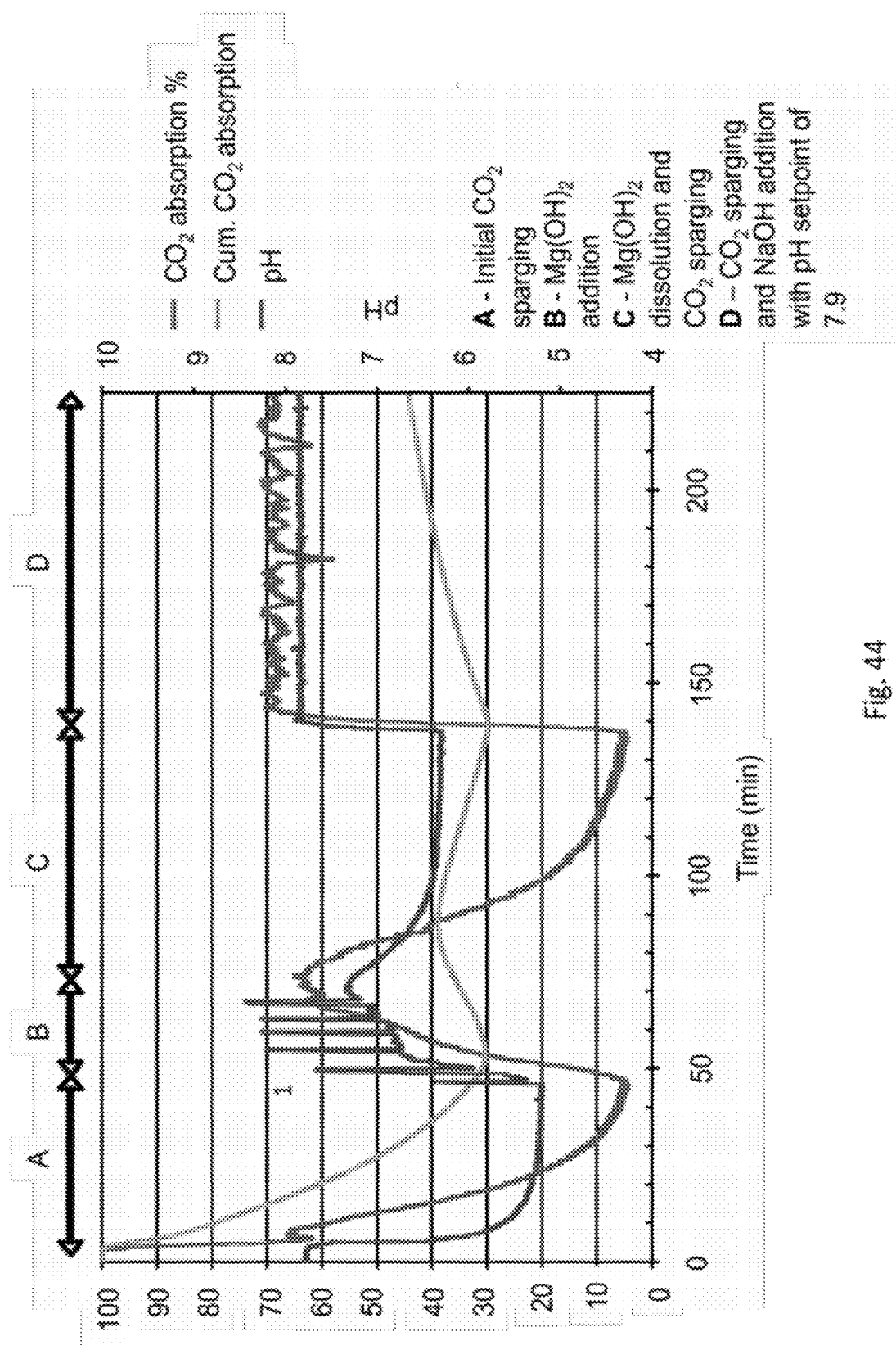

FIG. 44 provides graphical results of a $CO_2$ absorption experiment reported in the Examples section below.

Figure 45:
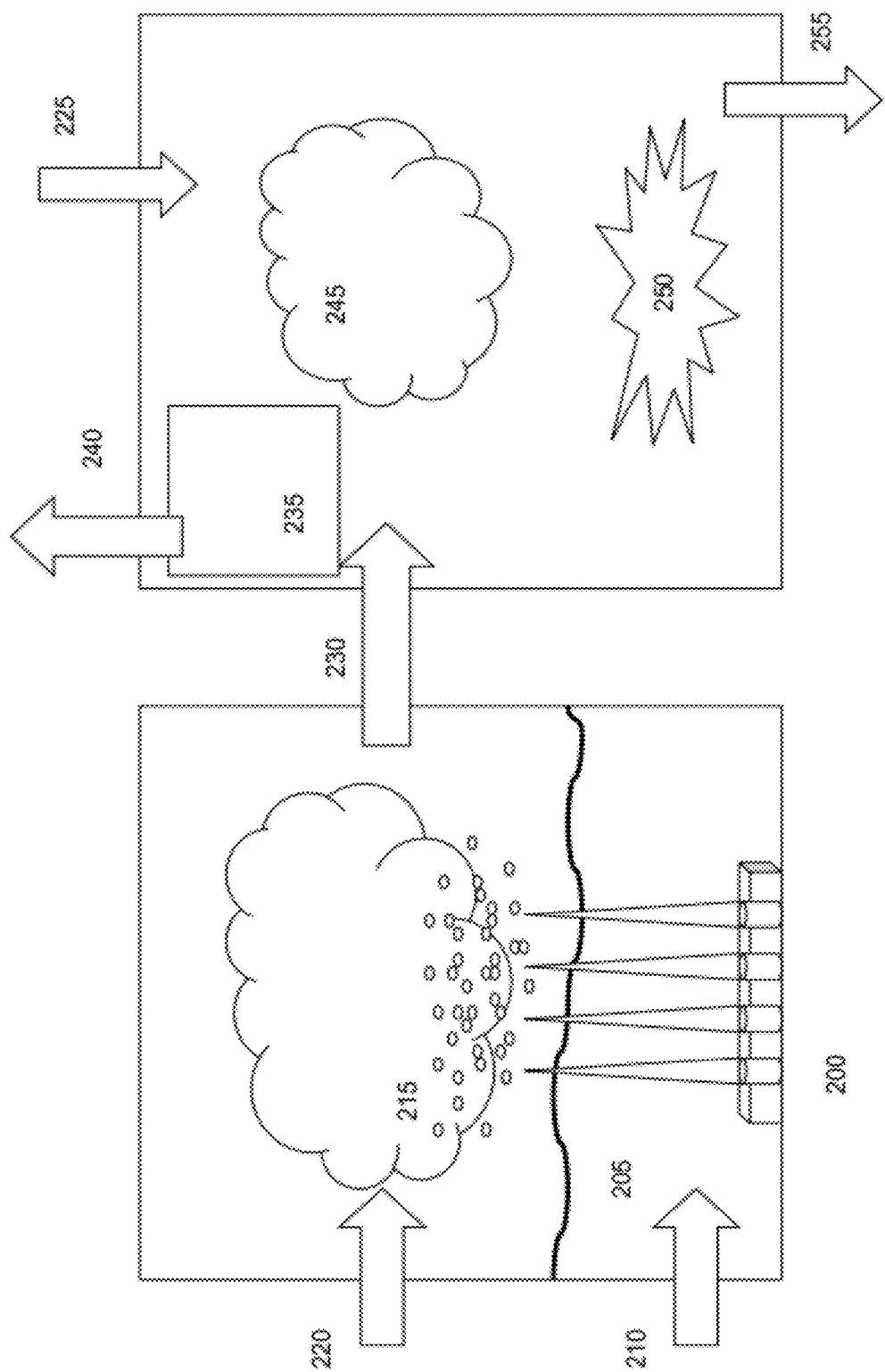

FIG. 45 shows an embodiment of the invention where creation of the liquid droplets and contacting the liquid droplets with the gas of interest occur in different chambers.

Figure 46:
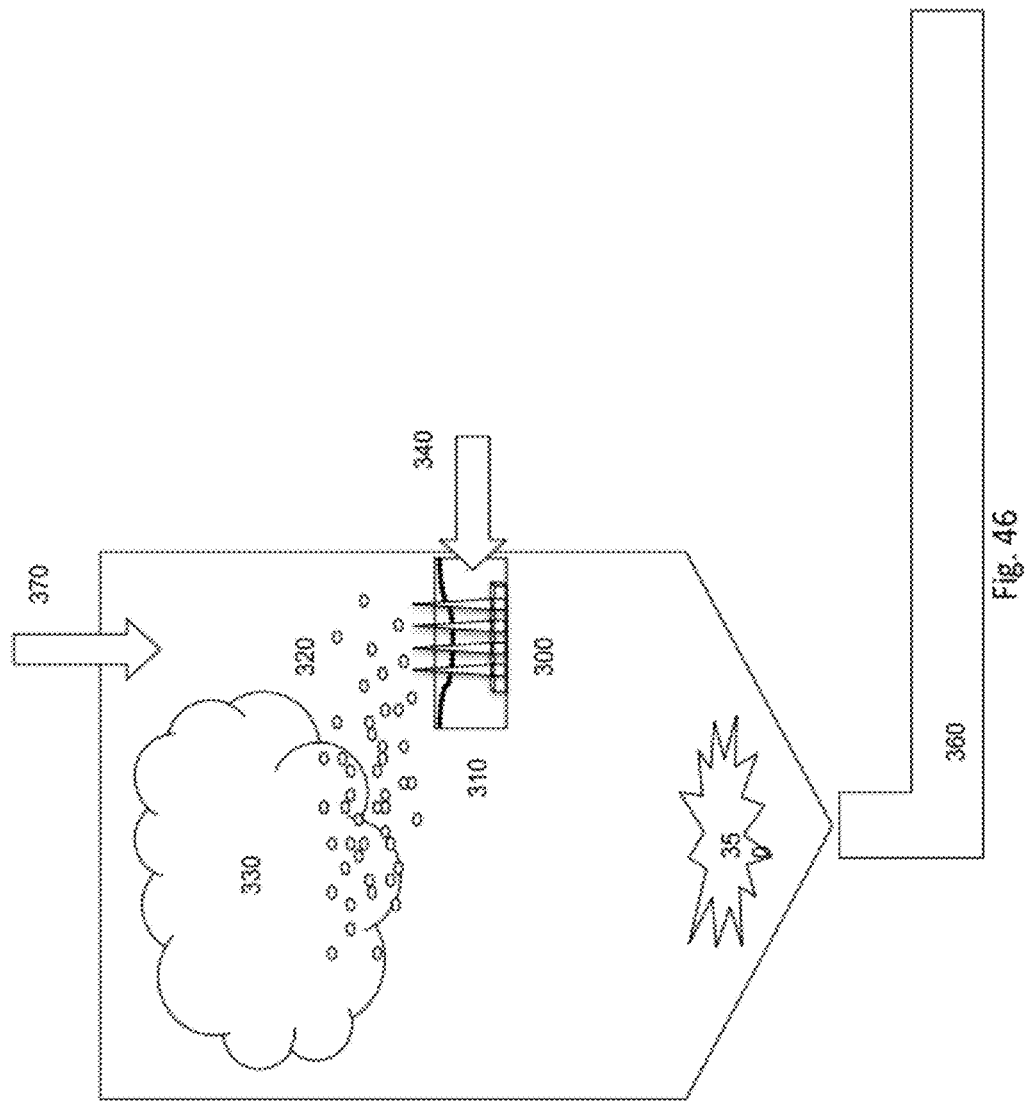

FIG. 46 shows an embodiment where droplet creation and gas contacting occur in one chamber that is designed to keep coalesced droplets separate from the liquid from which droplets are formed.

Figure 47:
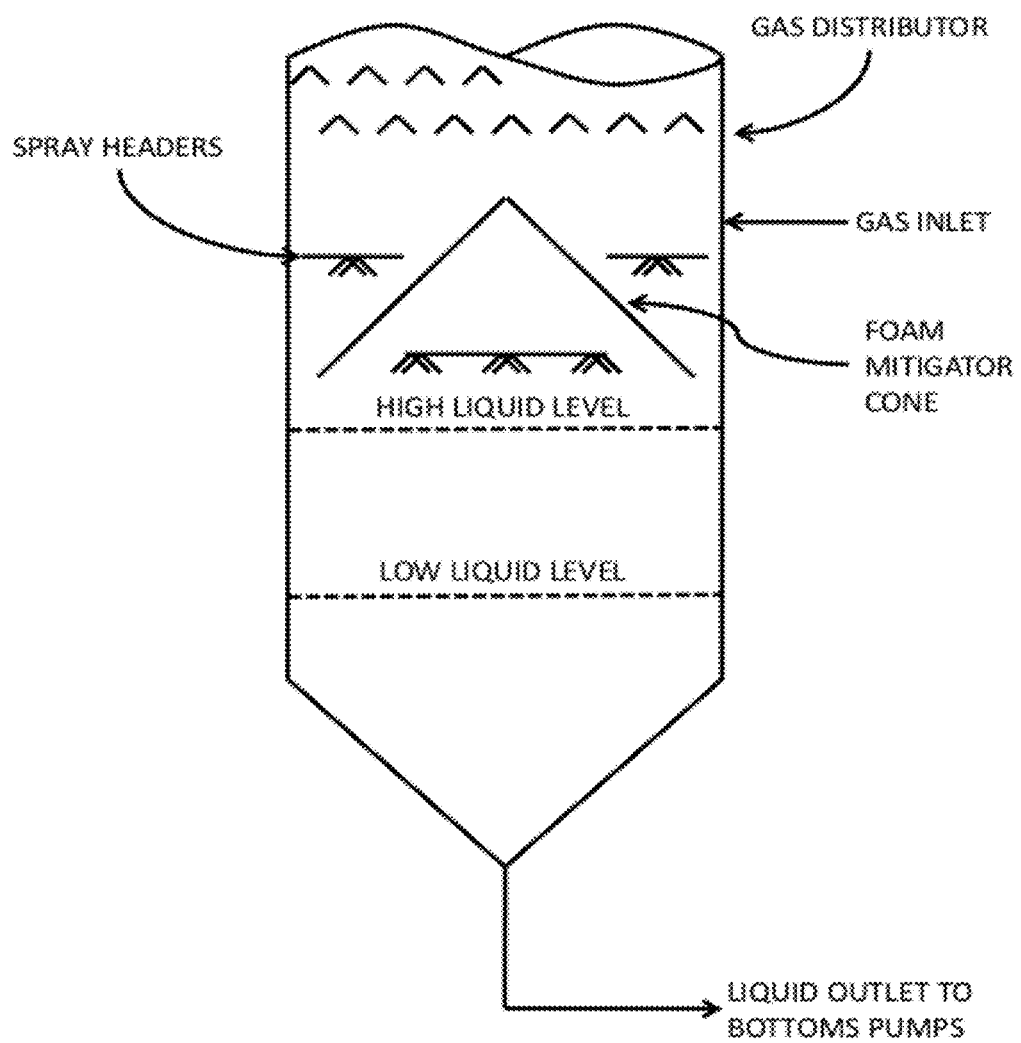

FIG. 47 is a schematic of an embodiment showing an apparatus that utilizes a de-foaming cone and sprays.

DESCRIPTION

Presented herein are systems, apparatus and methods related to efficiently contacting solid material, liquid and gas. The embodiments presented herein represent methods and apparatus for incorporating a gas into a liquid or a slurry or both. In some embodiments where a slurry is presented, the slurry is comprised of a liquid and a solid material component, such that solid material is present throughout contact of the liquid with the gas. By incorporating, what is meant is dissolution and/or absorption of the gas into the liquid or adsorption and/or chemisorption of the gas on the surface of the liquid. Incorporation of a gas into a liquid is achieved by optimizing contacting conditions. The conditions varied and optimized in the embodiments herein include: the solution chemistry of the liquid; the surface area to volume ratio of the liquid; the ratio of the flow rate of the liquid or slurry and gas (L/G); and the contact time between the liquid and the gas. Incorporation of a gas into a liquid is desirable for a many reasons, some of which are considered in embodiments herein, including but not limited to the removal of a component of a gas stream (e.g. scrubbing a flue gas) and efficient precipitation of a material from a reaction between a gas and a liquid (e.g. creation of fine solid particulates).

The methods, apparatus, and systems of the invention may utilize combinations of gas-liquid or gas-liquid-solid technology as described further herein. Contacting methods where liquid or slurry (i.e. absorbing solution) is introduced into a gas may be utilized in which the liquid and/or slurry is introduced as droplets, streams or a combination thereof. Contacting methods where a gas in introduced into a liquid or slurry (i.e. absorbing solution) may be utilized in which the gas creates bubbles or a foam within the liquid or slurry. In either situation, the parameters may be optimized to incorporate carbon dioxide and at least one of SOx, NOx, a heavy metal, a non-$CO_2$ acid gas or fly ash into the liquid or slurry that make up the absorbing solution. To facilitate this incorporation, structural features such as packing material, packed beds, trays, shed rows, or membranes, including microporous membranes, may be utilized in the methods, apparatus, and systems of the invention. Once the desired components of a gas have been incorporated into an absorbing solution through contact between the solution and gas, the contacted solution may be disposed of by an convenient means that do not make the components removed from the gas available for release into the Earth's atmosphere. Alternatively, the contacted solution may be subjected to precipitation conditions such that a solid precipitate is formed, and such precipitate and the effluent liquid may be further processed to recover saleable products (e.g. potable water, building materials comprising a $CO_2$-sequestering component).

The methods, apparatus, and systems of the invention may be applicable to contacting a gas and an absorbing solution in an emission control system that is operably connected to an power plant, such that the flue gas (i.e. industrial waste gas) from the power plant contains carbon dioxide, SOx, NOx, heavy metals, non-carbon dioxide acid gases, and in some cases fly ash. It is desirable to remove the carbon dioxide and at least one of SOx, NOx, heavy metals, non-carbon dioxide acid gases, and in some cases fly ash while using as little of the energy produced by the power plant, such as 30% of the energy produced by the power plant, to power the emissions control system. The emissions control system encompasses activities and components such as, but not limited to, pumping and recirculating absorbing solution, regenerating or recharging absorbing solution, circulating flue gas, removing particulates including fly ash and precipitates, and disposal of any liquid, solid, or slurry that contains the carbon dioxide and at least one of SOx, NOx, heavy metals, non-carbon dioxide acid gases, and in some cases fly ash that was removed from the flue gas. The methods, apparatus, and systems of the invention may supplant other emissions control systems or may be used in conjunction with existing systems that a power plant may have in place, however, in some embodiments, it may not be necessary to have separate $CO_2$ and SOx emissions control systems.

Some embodiments utilize simultaneous comminution, particle size reduction, and mixing of the solid component of the slurry with the liquid component of the slurry. Some embodiments include contacting with gas while simultaneously mixing and reducing the size of the solid particulates. Comminution, or particle size reduction, may serve to improve the reactivity of the solid component of the slurry by increasing the surface area of the solid which can participate in reactions as well as by exposing new solid material with each pass of the slurry through the comminution step. Comminution can be accomplished using any suitable apparatus that reduces the size of the solid particulates, including but not limited to, a jet mill, a screw conveyor, a high shear mixer, wet mill, attrition mill, colloid mill, or any combination thereof. In some embodiments, comminution takes place before the initial contact of the slurry with the gas. In some embodiments, comminution takes place after the initial contact of the slurry with the gas during recirculation. In some embodiments, comminution takes place in a conduit with a screw conveyor while the slurry is also contacted with gas, prior to reaching the contacting chamber.

Some embodiments utilize high-efficiency gas-liquid contacting methods or apparatus. High-efficiency gas-liquid contacting methods or apparatus have the added advantages of optimized contacting parameters such as: a higher surface area across which incorporation of the gas into the liquid can take place; the solution chemistry favors the kinetics of incorporating the gas into the liquid; or sufficient residence time is provided either by slowing fluid flow or increasing the path length that the liquid and gas travel while the gas incorporates into the liquid.

One of the uses of efficient gas-liquid contacting methods and apparatus is to optimize precipitation reactions. Variations in the solution chemistry of the liquid in a gas-liquid contactor affects the ability of the liquid to incorporate the gas. In some embodiments, the chemistry of the liquid (e.g. absorbing solution, contacting mixture) is affected to incorporate gas more efficiently. In some embodiments, the pH of the liquid (e.g. absorbing solution, contacting mixture) allows for simultaneous removal of $CO_2$ and $SO_2$ and/or SOx from the gas. In some embodiments, the chemistry of the liquid (e.g. absorbing solution, contacting mixture) does not require a separate (i.e. distinct from the method or steps to remove $CO_2$) $SO_2$ and/or SOx removal step. In some embodiments, the pH of the liquid ranges from pH 4 to pH 13.5. In some embodiments, the pH of the liquid ranges from pH 4 to pH 11. In some embodiments, the pH of the liquid ranges from pH 5 to pH 10. In some embodiments, the pH of the liquid ranges from pH 5.5 to pH 9.5. In some embodiments, the pH of the liquid is affected by agents added to the solution from which the droplets are made. Agents which alter the pH of the liquid include, but are not limited to: naturally occurring pH raising agents, microorganisms and fungi, synthetic chemical pH raising agents, recovered man-made waste streams, and alkaline solutions produced by electrochemical means.

Before the invention is described in greater detail, it is to be understood that the invention is not limited to particular embodiments described herein as such embodiments may vary. It is also to be understood that the terminology used herein is for the purpose of describing particular embodiments only, and is not intended to be limiting, since the scope of the invention will be limited only by the appended claims. Unless defined otherwise, all technical and scientific terms used herein have the same meaning as commonly understood by one of ordinary skill in the art to which this invention belongs.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

Certain ranges are presented herein with numerical values being preceded by the term "about." The term "about" is used herein to provide literal support for the exact number that it precedes, as well as a number that is near to or approximately the number that the term precedes. In determining whether a number is near to or approximately a specifically recited number, the near or approximating unrecited number may be a number, which, in the context in which it is presented, provides the substantial equivalent of the specifically recited number.

All publications, patents, and patent applications cited in this specification are incorporated herein by reference to the same extent as if each individual publication, patent, or patent application were specifically and individually indicated to be incorporated by reference. Furthermore, each cited publication, patent, or patent application is incorporated herein by reference to disclose and describe the subject matter in connection with which the publications are cited. The citation of any publication is for its disclosure prior to the filing date and should not be construed as an admission that the invention described herein is not entitled to antedate such publication by virtue of prior invention. Further, the dates of publication provided may be different from the actual publication dates, which may need to be independently confirmed.

It is noted that, as used herein and in the appended claims, the singular forms "a", "an", and "the" include plural references unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the invention. Any recited method can be carried out in the order of events recited or in any other order, which is logically possible. Although any methods and materials similar or equivalent to those described herein may also be used in the practice or testing of the invention, representative illustrative methods and materials are now described.

The methods and systems of the invention often may utilize processes summarized by the following chemical reactions:

(1) Combustion of a carbon-containing fuel source in liquid, gas, or solid phase forms gaseous carbon dioxide:

$$C+O_2(g) \rightarrow CO_2(g)$$

(2) Contacting the source of carbon dioxide with a water source solvates the carbon dioxide to give an aqueous solution of carbon dioxide:

$$CO_2(g) \leftrightarrows CO_2(aq)$$

(3) Carbon dioxide dissolved in water establishes equilibrium with aqueous carbonic acid:

$$CO_2(aq)+H_2O \leftrightarrows H_2CO_3(aq)$$

(4) Carbonic acid is a weak acid which dissociates in two steps, where the equilibrium balance is determined in part by the pH of the solution, with, generally, pHs below 8-9 favoring bicarbonate formation and pHs above 9-10 favoring carbonate formation. In the second step, a hydroxide source may be added to increase alkalinity:

$$H_2CO_3+2H_2O \leftrightarrows H_3O^+(aq)+HCO_3^-(aq)$$

$$HCO_3^-(aq)+OH^-(aq) \leftrightarrows H_2O+CO_3^{2-}(aq)$$

Reaction of elemental metal cations from Group IIA with the carbonate anion forms a metal carbonate precipitate:

$$mX(aq)+nCO_3^{2-} \leftrightarrows X_m(CO_3)_n(s)$$

wherein X is any element or combination of elements that can chemically bond with a carbonate group or its multiple and m and n are stoichiometric positive integers.

In further describing the subject invention, the methods of $CO_2$ sequestration according to embodiments of the invention are described first in greater detail. Systems that find use in practicing various embodiments of the methods of the invention are then described, followed by compositions that may be produced using methods and systems of the invention.

Methods of $CO_2$ Sequestration

In some embodiments, the invention provides a method of $CO_2$ sequestration. In such embodiments, an amount of $CO_2$ may be removed or segregated from an environment, such as the Earth's atmosphere or a gaseous waste stream produced by an industrial plant, so that some or all of the $CO_2$ is no longer present in the environment from which the $CO_2$ was removed. For example, $CO_2$ sequestration removes $CO_2$ or prevents the release of $CO_2$ into the atmosphere from the combustion of fuel. In some embodiments, the $CO_2$ sequestered is in the form of a composition comprising carbonates, bicarbonates, or carbonates and bicarbonates. Such compositions may comprise a solution, a slurry comprising precipitation material, or precipitation material alone or in combination with one or more additional materials for use in or as a building material. For example, a composition of the invention may comprise precipitation material comprising a carbonate compound (e.g., amorphous calcium carbonate, calcite, aragonite, vaterite, etc.). Therefore, in some embodiments, $CO_2$ sequestration according to aspects of the invention produces compositions (e.g., precipitation material comprising a carbonate compound), wherein at least part of the carbon in the compositions is derived from a fuel used by humans (e.g., a fossil fuel). $CO_2$-sequestering methods of the invention produce storage-stable products from an amount of $CO_2$, such that the $CO_2$ from which the product is produced is then sequestered in that product. A storage-stable $CO_2$-sequestering product is a storage-stable composition that incorporates an amount of $CO_2$ into a storage-stable form, such as an above-ground, underwater, or underground storage-stable form, so that the $CO_2$ is no longer present as, or available to be, a gas in the atmosphere. As such, sequestering of $CO_2$ according to methods of the invention results in prevention of $CO_2$ gas from entering the atmosphere and allows for long-term storage of $CO_2$ in a manner such that $CO_2$ does not become part of the atmosphere.

Embodiments of methods of the invention comprise small-, neutral- or negative-carbon footprint methods. Carbon neutral methods of the invention comprise methods having a negligible carbon footprint or no carbon footprint. In negative-carbon footprint methods, the amount by weight of $CO_2$ that is sequestered (e.g., through conversion of $CO_2$ to carbonate) by practice of the methods is greater that the amount of $CO_2$ that is generated (e.g., through power production, base production, etc) to practice the methods. In some instances, the amount by weight of $CO_2$ that is sequestered by practicing the methods exceeds the amount by weight of $CO_2$ that is generated in practicing the methods by 1 to 100%, such as 5 to 100%, including 10 to 95%, 10 to 90%, 10 to 80%, 10 to 70%, 10 to 60%, 10 to 50%, 10 to 40%, 10 to 30%, 10 to 20%, 20 to 95%, 20 to 90%, 20 to 80%, 20 to 70%, 20 to 60%, 20 to 50%, 20 to 40%, 20 to 30%, 30 to 95%, 30 to 90%, 30 to 80%, 30 to 70%, 30 to 60%, 30 to 50%, 30 to 40%, 40 to 95%, 40 to 90%, 40 to 80%, 40 to 70%, 40 to 60%, 40 to 50%, 50 to 95%, 50 to 90%, 50 to 80%, 50 to 70%, 50 to 60%, 60 to 95%, 60 to 90%, 60 to 80%, 60 to 70%, 70 to 95%, 70 to 90%, 70 to 80%, 80 to 95%, 80 to 90%, and 90 to 95%. In some instances, the amount by weight of $CO_2$ that is sequestered by practicing the methods exceeds the amount by weight of $CO_2$ that is generated in practicing the methods by 5% or more, by 10% or more, by 15% or more, by 20% or more, by 30% or more, by 40% or more, by 50% or more, by 60% or more, by 70% or more, by 80% or more, by 90% or more, or by 95% or more.

Figure 1:
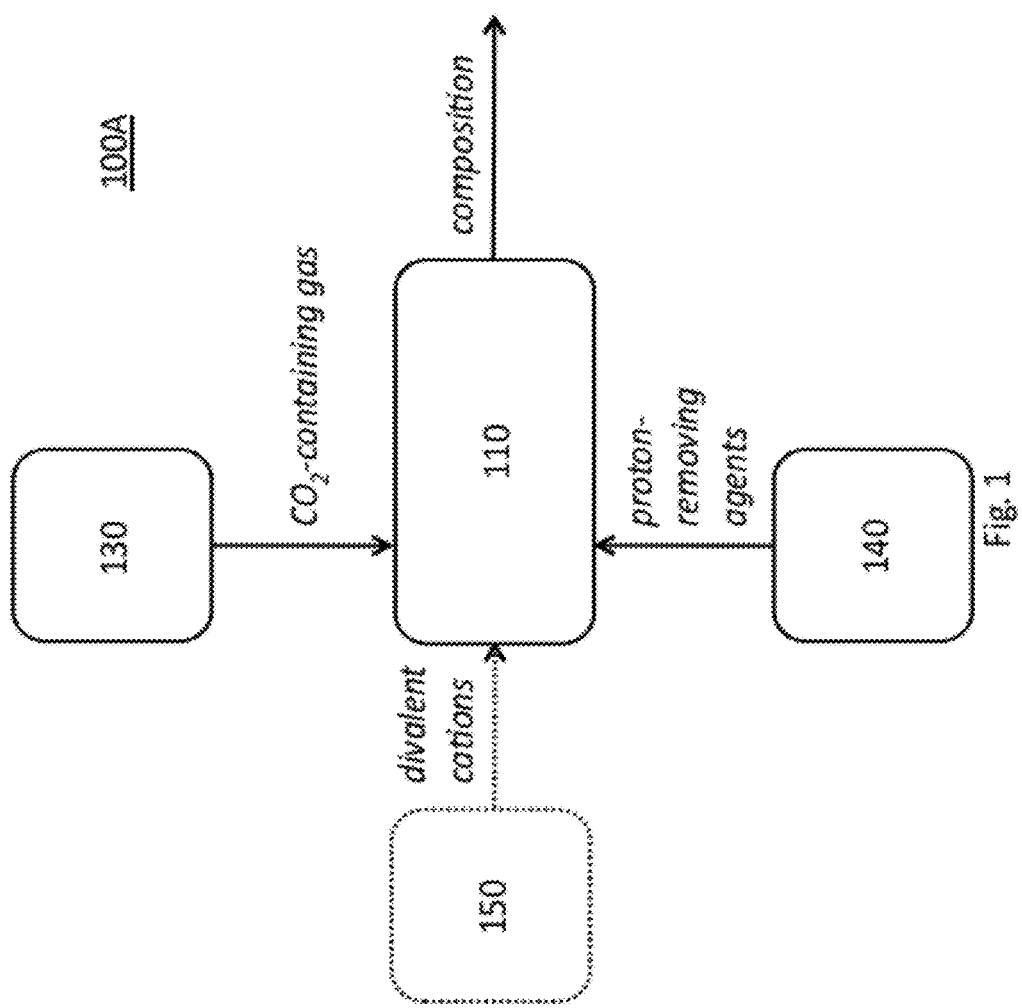

In reference to the system of FIG. 1, the invention provides an aqueous-based method for processing a source of carbon dioxide (130) and producing a composition comprising carbonates, bicarbonates, or carbonates and bicarbonates, wherein the source of carbon dioxide comprises one or more additional components in addition to carbon dioxide. In such embodiments, the industrial source of carbon dioxide may be sourced, a source of proton-removing agents (140) may be sourced, and each may be provided to processor 110 to be processed (i.e., subjected to suitable conditions for production of the composition comprising carbonates, bicarbonates, or carbonates and bicarbonates). In some embodiments, processing the industrial source of carbon dioxide comprises contacting the source of proton-removing agents in a contactor such as, but not limited to, a gas-liquid contactor or a gas-liquid-solid contactor to produce a carbon dioxide-charged composition, which composition may be a solution or slurry, from an initial aqueous solution or slurry. In some embodiments, the composition comprising carbonates, bicarbonates, or carbonates and bicarbonates may be produced from the carbon dioxide-charged solution or slurry in the contactor. In some embodiments, the carbon dioxide-charged solution or slurry may be provided to a reactor, within which the composition comprising carbonates, bicarbonates, or carbonates and bicarbonates may be produced. In some embodiments, the composition is produced in both the contactor and the reactor. For example, in some embodiments, the contactor may produce an initial composition comprising bicarbonates and the reactor may produce the composition comprising carbonates, bicarbonates, or carbonates and bicarbonates from the initial composition. In some embodiments, methods of the invention may further comprise sourcing a source of divalent cations such as those of alkaline earth metals (e.g., $Ca^{2+}$, $Mg^{2+}$). In such embodiments, the source of divalent cations may be provided to the source of proton-removing agents or provided directly to the processor. Provided sufficient divalent cations are provided by the source of proton-removing agents, by the source of divalent cations, or by a combination of the foregoing sources, the composition comprising carbonates, bicarbonates, or carbonates and bicarbonates may comprise an isolable precipitation material (e.g., $CaCO_3$, $MgCO_3$, or a composition thereof). Whether the composition from the processor comprises an isolable precipitation material or not, the composition may be used directly from the processor (optionally with minimal post-processing) in the manufacture of building materials. In some embodiments, compositions comprising carbonates, bicarbonates, or carbonates and bicarbonates directly from the processor (optionally with minimal post-processing) may be injected into a subterranean site as described in U.S. Provisional Patent Application No. 61/232,401, filed 7 Aug. 2009, which application is incorporated herein by reference in its entirety.

In reference to the systems of FIGS. 2-5, the invention provides an aqueous-based method for processing a source of carbon dioxide (130) and producing a composition comprising carbonates, bicarbonates, or carbonates and bicarbonates, wherein the source of carbon dioxide comprises one or more additional components in addition to carbon dioxide. In addition to producing compositions as described in reference to FIG. 1, the invention further provides methods for treating compositions comprising carbonates, bicarbonates, or carbonates and bicarbonates. As such, in some embodiments, the invention provides an aqueous-based method for processing a source of carbon dioxide (130) to produce a composition comprising carbonates, bicarbonates, or carbonates and bicarbonates and treating the composition produced. Whether a processor-produced composition of the invention comprises an isolable precipitation material or not, the composition may be directly provided to a treatment system of the invention for treatment (e.g., concentration, filtration, etc.). In some embodiments, the composition may be provided directly to the treatment system from a contactor, a reactor, or a settling tank of the processor. For example, a processor-produced composition that does not contain an isolable precipitation material may be provided directly to a treatment system for concentration of the composition and production of a supernatant. In another non-limiting example, a processor-produced composition comprising an isolable precipitation material may be provided directly to a treatment system for liquid-solid separation. The processor-produced composition may be provided to any of a number of treatment system sub-systems, which sub-systems include, but are not limited to, dewatering systems, filtration systems, or dewatering systems in combination with filtration systems, wherein treatment systems, or a sub-systems thereof, separate supernatant from the composition to produce a concentrated composition (e.g., the concentrated composition is more concentrated with to respect to carbonates, bicarbonates, or carbonates and carbonates).

Figure 3:
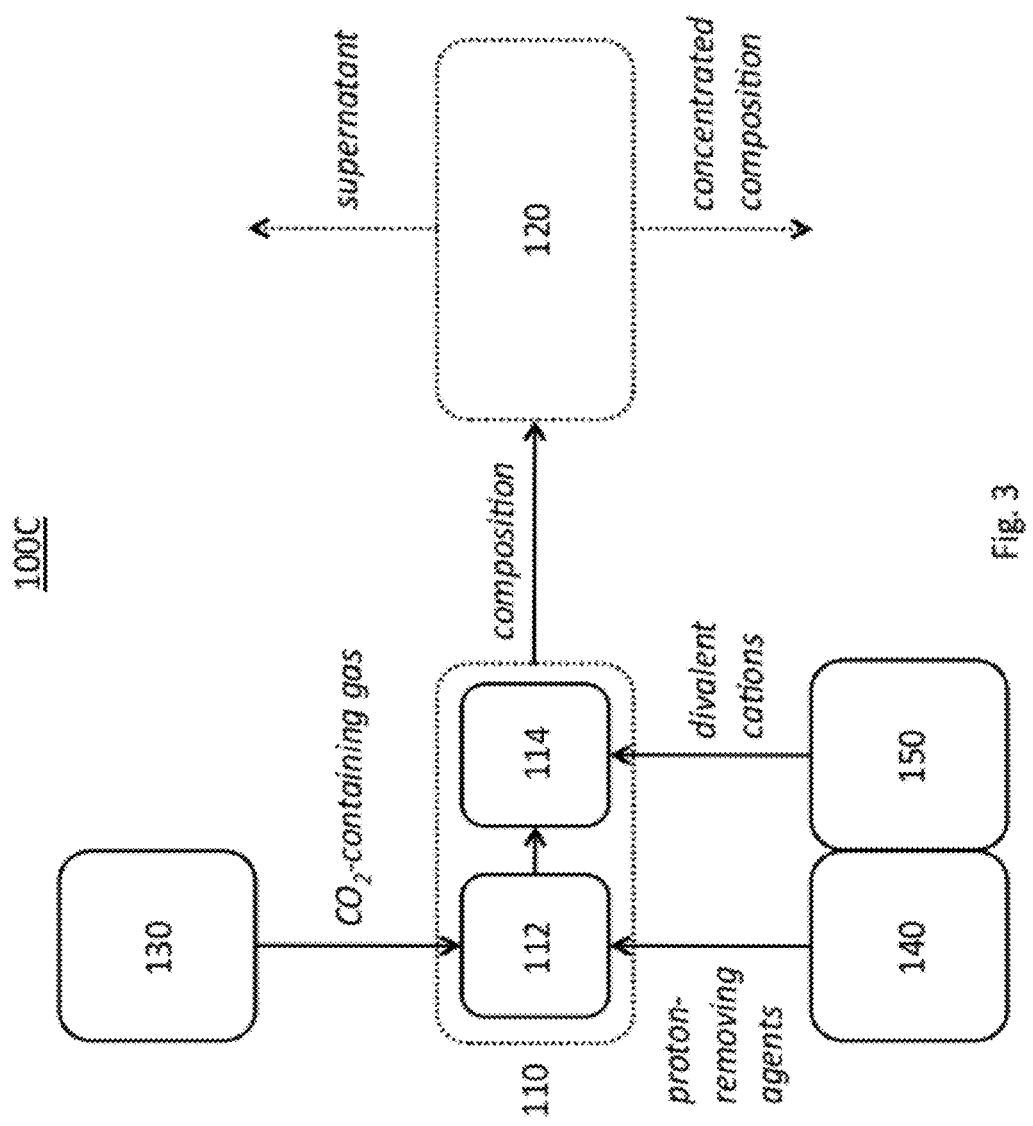

With reference to the system of FIG. 3, in some embodiments, the invention provides a method for charging a solution with $CO_2$ from an industrial waste gas stream to produce a composition comprising carbonates, bicarbonates, or carbonates and bicarbonates. In such embodiments, the solution may have a pH ranging from pH 6.5 to pH 14.0 prior to charging the solution with $CO_2$. In some embodiments, the solution may have a pH of at least pH 6.5, pH 7.0, pH 7.5, pH 8.0, pH 8.5, pH 9.0, pH 9.5, pH 10.0, pH 10.5, pH 11.0, pH 11.5, pH 12.0, pH 12.5, pH 13.0, pH 13.5, or pH 14.0 prior to charging the solution with $CO_2$. The pH of the solution may be increased using any convenient approach including, but not limited to, use of proton-removing agents and electrochemical methods for effecting proton removal. In some embodiments, proton-removing agents may be used to increase the pH of the solution prior to charging the solution with $CO_2$. Such proton-removing agents include, but are not limited to, hydroxides (e.g., NaOH, KOH) and carbonates (e.g., $Na_2CO_3$, $K_2CO_3$). In some embodiments, sodium hydroxide is used to increase the pH of the solution. As such, in some embodiments, the invention provides a method for charging an alkaline solution (e.g., pH>pH 7.0) with $CO_2$ from an industrial waste gas stream to produce a composition comprising carbonates, bicarbonates, or carbonates and bicarbonates.

In some embodiments, the composition resulting from charging the alkaline solution with $CO_2$ from an industrial waste source (i.e., the solution comprising carbonates, bicarbonates, or carbonates and bicarbonates) may be a slurry or a substantially clear solution (i.e., substantially free of precipitation material, such as at least 95% or more free) depending upon the cations available in the solution at the time the solution is charged with $CO_2$. As described herein, the solution may, in some embodiments, comprise divalent cations such as $Ca^{2+}$, $Mg^{2+}$, or a combination thereof at the time the solution is charged with $CO_2$. In such embodiments, the resultant composition may comprise carbonates, bicarbonates, or carbonates and bicarbonates of divalent cations (e.g. precipitation material) resulting in a slurry. Such slurries, for example, may comprise $CaCO_3$, $MgCO_3$, or a combination thereof. The solution may, in some embodiments, comprise insufficient divalent cations to form a slurry comprising carbonates, bicarbonates, or carbonates and bicarbonates of divalent cations at the time the solution is charged with $CO_2$. In such embodiments, the resultant composition may comprise carbonates, bicarbonates, or carbonates and bicarbonates in a substantially clear solution (i.e., substantially free of precipitation material, such as at least 95% or more free) at the time the solution is charged with $CO_2$. In some embodiments, for example, monovalent cations such as $Na^+$, $K^+$, or a combination thereof (optionally by addition of NaOH and/or KOH) may be present in the substantially clear solution at the time the solution is charged with $CO_2$. The composition resulting from charging such a solution with $CO_2$ may comprise, for example, carbonates, bicarbonates, or carbonates and bicarbonates of monovalent cations.

As such, in some embodiments, the invention provides a method for charging an alkaline solution (e.g., pH>pH 7.0) with $CO_2$ from an industrial waste gas stream to produce a composition comprising carbonates, bicarbonates, or carbonates and bicarbonates, wherein the composition is substantially clear (i.e., substantially free of precipitation material, such as at least 95% or more free). The substantially clear composition may subsequently be contacted with a source of divalent cations (e.g., $Ca^{2+}$, $Mg^{2+}$, or a combination thereof) to produce a composition comprising carbonates, bicarbonates, or carbonates and bicarbonates of divalent cations resulting in a slurry. As above, such slurries may comprise $CaCO_3$, $MgCO_3$, or a combination thereof that may be treated as described herein. In a non-limiting example, an alkaline solution comprising NaOH (e.g., NaOH dissolved in freshwater lacking significant divalent cations) may be contacted in a gas-liquid contactor with $CO_2$ from an industrial waste gas stream to produce a composition comprising carbonates, bicarbonates, or carbonates and bicarbonates, wherein the composition is substantially clear due to a lack of precipitation material, which, in turn, is due to the lack of significant divalent cations. Depending upon the amount of $CO_2$ added (and makeup NaOH, if any), the substantially clear composition may comprise NaOH, $NaHCO_3$, and/or $Na_2CO_3$. The substantially clear composition may subsequently be contacted in a reactor outside the gas-liquid contactor with a source of divalent cations (e.g., $Ca^{2+}$, $Mg^{2+}$, $Sr^{2+}$, and the like) to produce a composition comprising carbonates, bicarbonates, or carbonates and bicarbonates of divalent cations (e.g., precipitation material) resulting in a slurry. As such, compositions may comprise $CaCO_3$ and/or $MgCO_3$, and the compositions may be treated as described herein. For example, the composition may be subjected to liquid-solid separation and the solids manufactured into cement, supplementary cementitious material, fine aggregate, mortar, coarse aggregate, concrete, pozzolan, or a combination thereof.

Figure 4:
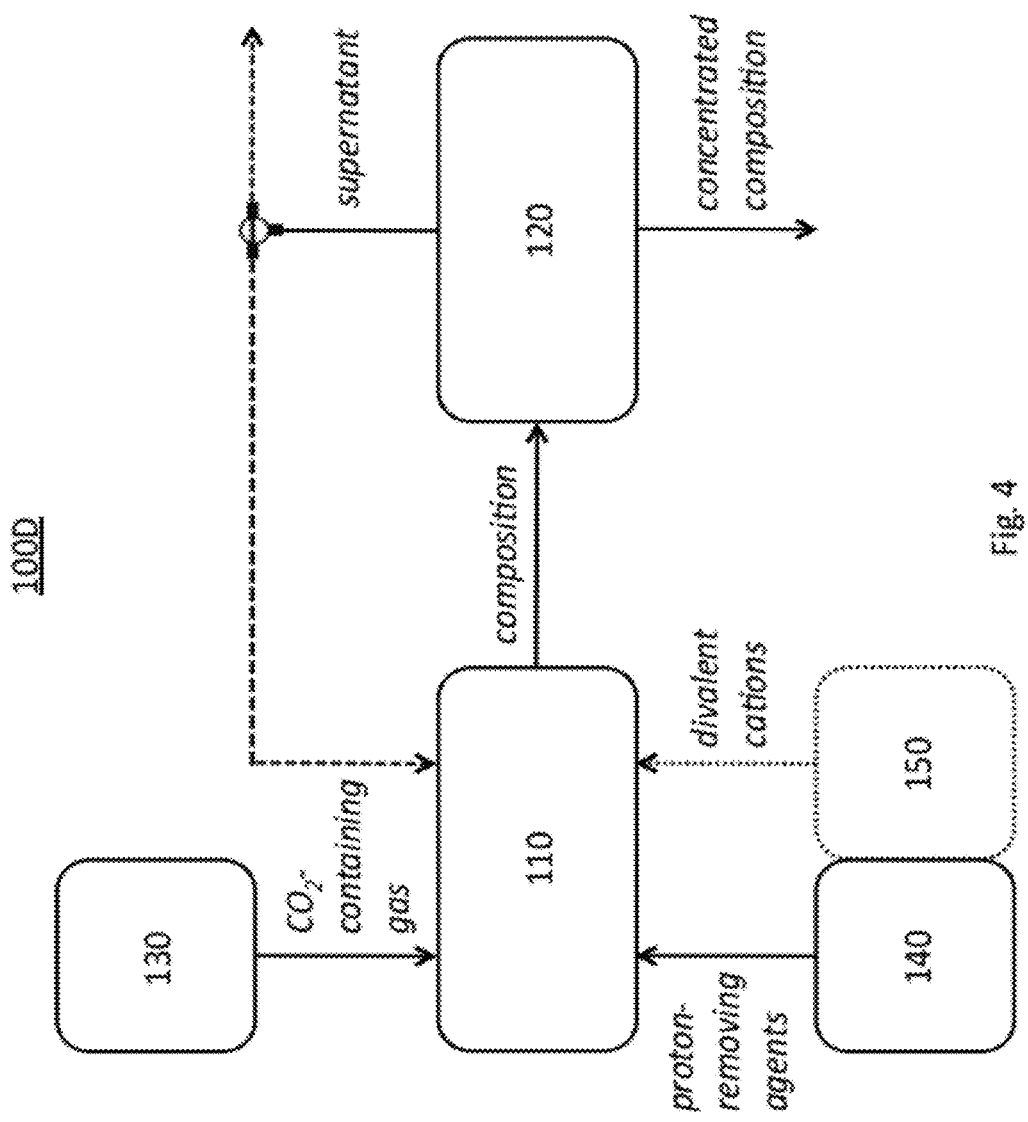
Figure 5:
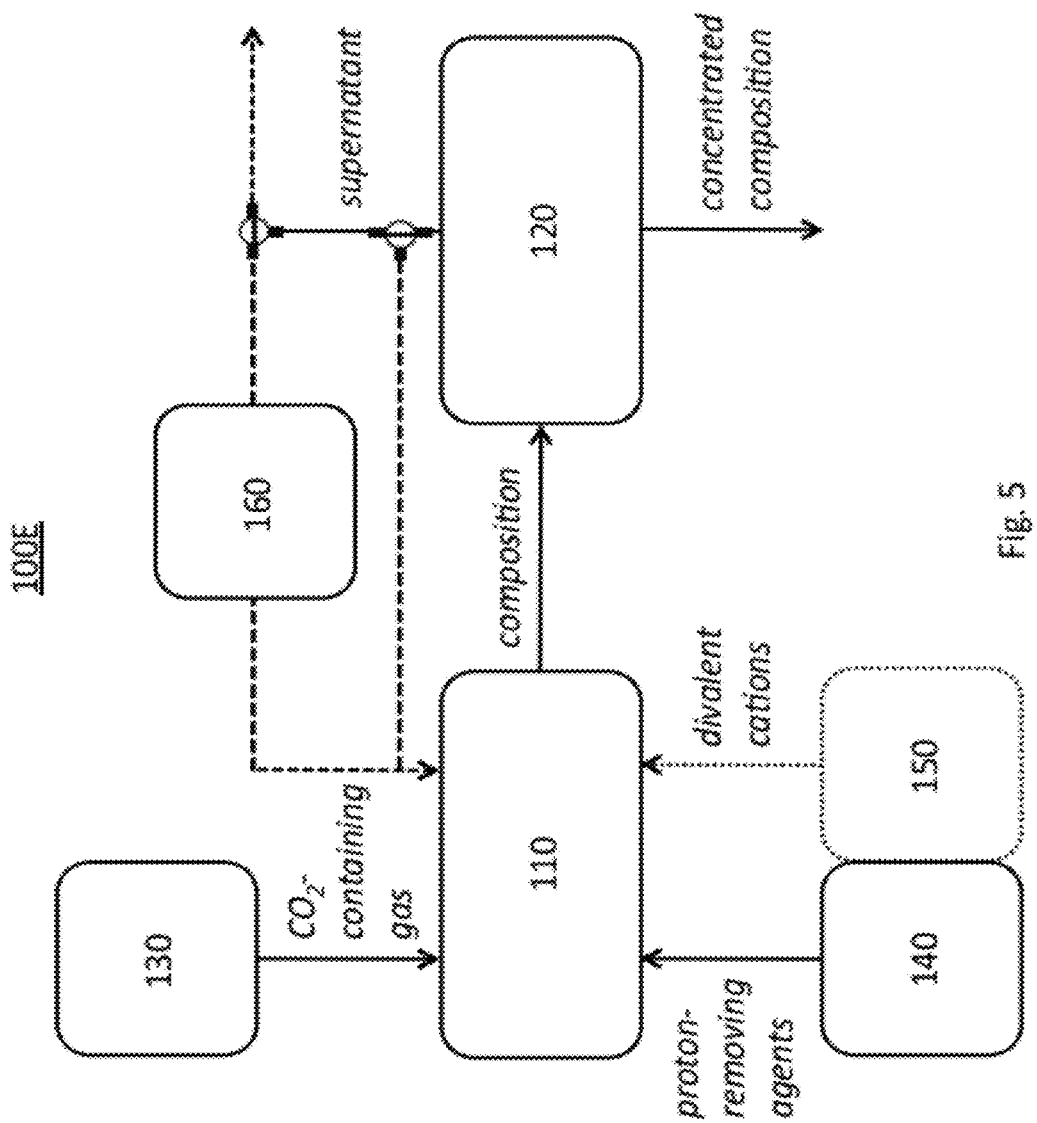

With reference to the systems of FIGS. 4 and 5, the invention also provides aqueous-based methods of processing a source of carbon dioxide (130) and producing a composition comprising carbonates, bicarbonates, or carbonates and bicarbonates, wherein the source of carbon dioxide comprises one or more additional components in addition to carbon dioxide, and wherein at least a portion of treatment system supernatant is recirculated. For example, in some embodiments, the invention provides a method of treating a waste gas stream comprising $CO_2$ and, optionally, SOx, NOx, and/or Hg in a processer to produce a processed waste gas stream (e.g., a clean gas stream suitable for release into the environment), a composition comprising carbonates, bicarbonates, or carbonates and bicarbonates, and an effluent, wherein at least a portion of the effluent is recirculated to the processor. As shown in FIGS. 4 and 5, supernatant from the treatment system, which may comprise a dewatering system and a filtration system, may be recirculated in a variety of ways. As such, in some embodiments, at least a portion of the supernatant from the dewatering system, the filtration system, or a combination of the dewatering system and the filtration system may be used to process carbon dioxide. The supernatant may be provided to a carbon dioxide-processing system processor. In such embodiments, the supernatant may be provided to a contactor (e.g., gas-liquid contactor, gas-liquid-solid contactor), to a reactor, to a combination of the contactor and the reactor, or to any other unit or combination of units for processing carbon dioxide. In addition, in some embodiments, at least a portion of the supernatant from the treatment system may be provided to a washing system. In such embodiments, the supernatant may be used to wash compositions (e.g., precipitation material comprising $CaCO_3$, $MgCO_3$, or a combination thereof) of the invention. For example, the supernatant may be used to wash chloride from carbonate-based precipitation material. With reference to FIG. 5, at least a portion of the treatment system supernatant may be provided to an electrochemical system. As such, treatment system supernatant may be used to produce proton-removing agents or effect proton removal for processing carbon dioxide. In some embodiments, at least a portion of the supernatant from the treatment system may be provided to a different system or process. For example, at least a portion of the treatment system supernatant may be provided to a desalination plant or desalination process such that the treatment system supernatant, which is generally softer (i.e., lower concentration of $Ca^{2+}$ and/or $Mg^{2+}$) than other available feeds (e.g., seawater, brine, etc.) after being used to process carbon dioxide, may be desalinated for potable water.

Recirculation of treatment system supernatant is advantageous as recirculation provides efficient use of available resources; minimal disturbance of surrounding environments; and reduced energy requirements, which reduced energy requirements provide for lower carbon footprints for systems and methods of the invention. When a carbon dioxide-processing system of the invention is operably connected to an industrial plant (e.g., fossil fuel-fired power plant such as coal-fired power plant) and utilizes power generated at the industrial plant, reduced energy requirements provided by recirculation of treatment system supernatant provide for a reduced energy demand. When expressed as a percentage, the energy demand of a given process, apparatus or system is the energy consumed by that process, apparatus or system with respect to the total output for the power plant with which that process, apparatus or system is connected or servicing. A carbon dioxide-processing system not configured for recirculation (i.e., a carbon-dioxide processing system configured for a once-through process) such as that shown in FIG. 2, may have an energy demand on the industrial plant of at least 10% attributable to continuously pumping a fresh source of alkalinity (e.g., seawater, brine) into the system. In such an example, a 100 MW power plant (e.g., a coal-fired power plant) would need to devote 10 MW of power to the carbon dioxide-processing system for continuously pumping a fresh source of alkalinity into the system. In contrast, a system configured for recirculation such as that shown in FIG. 4 or FIG. 5 may have an energy demand on the industrial plant of less than 10%, such as less than 8%, including less than 6%, for example, less than 4% or less than 2%, which energy demand may be attributable to pumping make-up water and recirculating supernatant. Carbon dioxide-processing systems configured for recirculation, may, when compared to systems designed for a once-through process, exhibit a reduction in energy demand of at least 2%, such as at least 5%, including at least 10%, for example, at least 25% or at least 50%. For example, if a carbon dioxide-processing system configured for recirculation consumes 9 MW of power for pumping make-up water and recirculating supernatant and a carbon dioxide-processing system designed for a once-through process consumes 10 MW attributable to pumping, then the carbon dioxide-processing system configured for recirculation exhibits a 10% reduction in energy demand. For systems such as those shown in FIGS. 4 and 5 (i.e., carbon dioxide-processing systems configured for recirculation), the reduction in the energy demand attributable to pumping and recirculating may also provide a reduction in total energy demand, especially when compared to carbon dioxide-processing systems configured for once-through process. In some embodiments, recirculation provides a reduction in total energy demand of a carbon dioxide-processing system, wherein the reduction is at least 2%, such as at least 4%, including at least 6%, for example at least 8% or at least 10% when compared to total energy demand of a carbon dioxide-processing system configured for once-through process. For example, if a carbon dioxide-processing system configured for recirculation has a 15% energy demand and a carbon dioxide-processing system designed for a once-through process has a 20% energy demand, then the carbon dioxide-processing system configured for recirculation exhibits a 5% reduction in total energy demand. For example, a carbon dioxide-processing system configured for recirculation, wherein recirculation comprises filtration through a filtration unit such as a nanofiltration unit (e.g., to concentrate divalent cations in the retentate and reduce divalent cations in the permeate), may have a reduction in total energy demand of at least 2%, such as at least 4%, including at least 6%, for example at least 8% or at least 10% when compared to a carbon dioxide-processing system configured for once-through process.

The energy demand of carbon dioxide-processing methods, apparatus, and systems of the invention may be further reduced by efficient use of other resources. In some embodiments, the energy demand of carbon dioxide-processing systems of the invention may be further reduced by efficient use of heat from an industrial source. In some embodiments, for example, heat from the industrial source of carbon dioxide (e.g., flue gas heat from a coal-fired power plant) may be utilized for drying a composition comprising precipitation material comprising carbonates, bicarbonates, or carbonates and bicarbonates. In such embodiments, a spray dryer may be used for spray drying the composition. For example, low-grade (e.g., 150-200° C.) waste heat may be utilized by means of a heat exchanger to evaporatively spray dry the composition comprising the precipitation material. In addition, utilizing heat from the industrial source of carbon dioxide for drying compositions of the invention allows for simultaneous cooling of the industrial source of carbon dioxide (e.g., flue gas from a coal-fired power plant), which enhances dissolution of carbon dioxide, a process which is inversely related to temperature. In some embodiments, the energy demand of carbon dioxide-processing systems of the invention may be further reduced by efficient use of pressure. For example, in some embodiments, carbon dioxide-processing systems of the invention are configured with an energy recovery system. Such energy recovery systems are known, for example, in the art of desalination and operate by means of pressure exchange. In some embodiments, the overall energy demand of the carbon dioxide-processing system may be less than 99.9%, 90%, 80%, 70%, 60%, 50%, 40%, 30%, 20%, 15%, 10%, 5%, or 3% when capturing and processing 70-90% of the carbon dioxide emitted from an industrial plant (e.g., coal-fired power plant). For example, in some embodiments, the overall energy demand of the carbon dioxide-processing system may be less than 30%, such as less than 20%, including less than 15%, for example, less than 10%, less than 5%, or less than 3% when capturing and processing 70-90% of the carbon dioxide emitted from an industrial plant (e.g., coal-fired power plant). As such, carbon dioxide-processing systems of the invention configured for recirculation, heat exchange, and/or pressure exchange may reduce the parasitic load on power-providing industrial plants while maintaining carbon dioxide processing capacity.

Inevitably, recirculation and other methods described herein consume water as water may become part of a composition of the invention (e.g., precipitation material comprising, for example, amorphous calcium carbonate $CaCO_3 \cdot H_2O$; nesquehonite $MgCO_3 \cdot 2H_2O$; etc.), may be vaporized by drying (e.g., spray drying) compositions of the invention, or lost in some other part of the process. As such, make-up water may be provided to account for water lost to processing carbon dioxide to produce compositions of the invention (e.g., spray-dried precipitation material). For example, make-up water amounting to less than 700,000 gallons per day may replace water lost to producing, for example, spray-dried precipitation material from flue gas from a 35 MWe coal-fired power plant. Processes requiring only make-up water may be considered zero process water discharge processes (i.e. zero liquid waste processes). In processes in which additional water other than make-up water is used, that water may be sourced from any of the water sources (e.g., seawater, brine, etc.) described herein. In some embodiments, for example, water may be sourced from the power plant cooling stream and returned to that stream in a closed loop system. Processes requiring make-up water and additional process water are considered low process water discharge processes because systems and methods of the invention are designed to efficiently use resources.

In some embodiments, the invention provides for contacting a volume of an aqueous solution with a source of carbon dioxide to produce a composition comprising carbonates, bicarbonates, or carbonates and bicarbonates, wherein the composition is a solution or slurry. To produce precipitation material comprising carbonates, bicarbonates, or carbonates and bicarbonates, methods of the invention include contacting a volume of a divalent cation-containing aqueous solution with a source of $CO_2$ and subjecting the resultant solution to conditions that facilitate precipitation. Divalent cations may come from any of a number of different sources of divalent cations depending upon availability at a particular location. Such sources include industrial wastes, seawater, brines, hard waters, rocks and minerals (e.g., lime, periclase, material comprising metal silicates such as serpentine and olivine), and any other suitable source.

In some locations, waste streams from various industrial processes (i.e., industrial waste streams) provide for convenient sources of divalent cations (as well as proton-removing agents such as metal hydroxides). Such waste streams include, but are not limited to, mining wastes; ash (e.g., coal ash such as fly ash, bottom ash, boiler slag); slag (e.g. iron slag, phosphorous slag); cement kiln waste (e.g., cement kiln dust); oil refinery/petrochemical refinery waste (e.g. oil field and methane seam brines); coal seam wastes (e.g. gas production brines and coal seam brine); paper processing waste; water softening waste brine (e.g., ion exchange effluent); silicon processing wastes; agricultural waste; metal finishing waste; high pH textile waste; and caustic sludge. Ash, cement kiln dust, and slag, collectively waste sources of metal oxides, further described in U.S. patent application Ser. No. 12/486,692, filed 17 Jun. 2009, which is incorporated herein by reference in its entirety, may be used in any combination with material comprising metal silicates, further described in U.S. patent application Ser. No. 12/501,217, filed 10 Jul. 2009, which is also incorporated herein by reference in its entirety. Any of the divalent cations sources described herein may be mixed and matched for the purpose of practicing the invention. For example, material comprising metal silicates (e.g., magnesium silicate minerals such as olivine, serpentine, etc.) may be combined with any of the sources of divalent cations described herein for the purpose of practicing the invention.

In some locations, a convenient source of divalent cations for preparation of compositions of the invention (e.g., precipitation material comprising carbonates, bicarbonates, or carbonates and bicarbonates) is water (e.g., an aqueous solution comprising divalent cations such as seawater or brine), which may vary depending upon the particular location at which the invention is practiced. Suitable aqueous solutions of divalent cations that may be used include solutions comprising one or more divalent cations (e.g., alkaline earth metal cations such as $Ca^{2+}$ and $Mg^{2+}$). In some embodiments, the aqueous source of divalent cations comprises alkaline earth metal cations. In some embodiments, the alkaline earth metal cations include calcium, magnesium, or a mixture thereof. In some embodiments, the aqueous solution of divalent cations comprises calcium in amounts ranging from 50 to 50,000 ppm, 50 to 40,000 ppm, 50 to 20,000 ppm, 100 to 10,000 ppm, 200 to 5000 ppm, or 400 to 1000 ppm. In some embodiments, the aqueous solution of divalent cations comprises magnesium in amounts ranging from 50 to 40,000 ppm, 50 to 20,000 ppm, 100 to 10,000 ppm, 200 to 10,000 ppm, 500 to 5000 ppm, or 500 to 2500 ppm. In some embodiments, where $Ca^{2+}$ and $Mg^{2+}$ are both present, the ratio of $Ca^{2+}$ to $Mg^{2+}$ (i.e., $Ca^{2+}:Mg^{2+}$) in the aqueous solution of divalent cations is between 1:1 and 1:2.5; 1:2.5 and 1:5; 1:5 and 1:10; 1:10 and 1:25; 1:25 and 1:50; 1:50 and 1:100; 1:100 and 1:150; 1:150 and 1:200; 1:200 and 1:250; 1:250 and 1:500; 1:500 and 1:1000, or a range thereof. For example, in some embodiments, the ratio of $Ca^{2+}$ to $Mg^{2+}$ in the aqueous solution of divalent cations is between 1:1 and 1:10; 1:5 and 1:25; 1:10 and 1:50; 1:25 and 1:100; 1:50 and 1:500; or 1:100 and 1:1000. In some embodiments, the ratio of $Mg^{2+}$ to $Ca^{2+}$ (i.e., $Mg^{2+}:Ca^{2+}$) in the aqueous solution of divalent cations is between 1:1 and 1:2.5; 1:2.5 and 1:5; 1:5 and 1:10; 1:10 and 1:25; 1:25 and 1:50; 1:50 and 1:100; 1:100 and 1:150; 1:150 and 1:200; 1:200 and 1:250; 1:250 and 1:500; 1:500 and 1:1000, or a range thereof. For example, in some embodiments, the ratio of $Mg^{2+}$ to $Ca^{2+}$ in the aqueous solution of divalent cations is between 1:1 and 1:10; 1:5 and 1:25; 1:10 and 1:50; 1:25 and 1:100; 1:50 and 1:500; or 1:100 and 1:1000.

One or more components that are present in the source of divalent cations from which compositions of the invention (e.g., precipitation material) are prepared may be used to identify the source of divalent cations used. These identifying components and the amounts thereof may be referred to "source identifiers" or "markers." For example, if the source of divalent cations is sea water, the source identifiers or markers that may be present in compositions of the invention (e.g., precipitation material) include, but are not limited to, chlorine, sodium, sulfur, potassium, bromine, silicon, strontium, and the like. Such elements may be present in the compositions in any known valency. Any such source identifiers or markers may be present in small amounts ranging from, for example, 20,000 ppm or less, 2000 ppm or less, 200 ppm or less, or 20 ppm or less. In some embodiments, for example, the marker is strontium. In a precipitation material of the invention, strontium may be incorporated into an aragonite lattice, and make up 10,000 ppm or less of the aragonite lattice, ranging in certain embodiments from 3 to 10,000 ppm, such as from 5 to 5000 ppm, including 5 to 1000 ppm, for example, 5 to 500 ppm or 5 to 100 ppm. Source identifiers may vary depending upon the particular source of divalent cations (e.g., saltwater) employed to produce compositions of the invention. In some embodiments, owing at least in part to the source of divalent cations, the calcium carbonate content compositions of the invention (e.g., precipitation material) may be 25% w/w or higher, such as 40% w/w or higher, including 50% w/w or higher, for example, 60% w/w or higher. Such compositions have, in some embodiments, a calcium:magnesium ratio that is influenced by, and therefore reflects, the source of divalent cations from which the composition was produced. In some embodiments, the calcium: magnesium molar ratio ranges from 10:1 to 1:5 Ca:Mg, such as 5:1 to 1:3 Ca:Mg. In some embodiments, the composition is characterized by having a source identifying carbonate: hydroxide compound ratio, wherein this ratio ranges from, for example, 100 to 1, 10 to 1, or 1 to 1.

The aqueous solution of divalent cations may comprise divalent cations derived from freshwater, brackish water, seawater, or brine (e.g., naturally occurring brines or anthropogenic brines such as geothermal plant wastewaters, desalination plant waste waters, synthetic brines including synthetic brines that include dissolved minerals), as well as other aqueous solutions having a salinity that is greater than that of freshwater, any of which may be naturally occurring or anthropogenic. For convenience in describing the invention, freshwater may be considered to have a salinity of less than 0.5 ppt (parts per thousand). Brackish water may comprise more salt than freshwater, but not as much as salt as seawater. Brackish water may be considered to have a salinity ranging from about 0.5 to about 35 ppt. Seawater may be water from a sea, an ocean, or any other body of water that has a salinity ranging from about 35 to about 50 ppt. Brine may have a salinity that is about 50 ppt or greater. As such, brine may be water saturated or nearly saturated with salt. In some embodiments, the water source from which divalent cations are derived is a mineral rich (e.g., calcium-rich and/or magnesium-rich) freshwater source. In some embodiments, the water source from which divalent cations are derived is a naturally occurring saltwater source selected from a sea, an ocean, a lake, a swamp, an estuary, a lagoon, a surface brine, a deep brine, an alkaline lake, an inland sea, or the like. In some embodiments, the water source from which divalent cations are derived is a surface brine. In some embodiments, the water source from which divalent cations are derived is a subsurface brine. In some embodiments, the water source from which divalent cations are derived is a deep brine. In some embodiments, the water source from which divalent cations are derived is a Ca—Mg—Na—(K)—Cl; Na—(Ca)—SO$_4$—Cl; Mg—Na—(Ca)—SO$_4$—Cl; Na—CO$_3$—Cl; or Na—CO$_3$—SO$_4$—Cl brine. In some embodiments, the water source from which divalent cation are derived is an anthropogenic brine selected from a geothermal plant wastewater or a desalination wastewater. In some embodiments, the water source may also contain boron present as borates including, but not limited to $BO_3^{3-}$, $B_2O_5^{4-}$, $B_3O_7^{5-}$, and $B_4O_9^{6-}$ among others.

Freshwater is often a convenient source of divalent cations (e.g., cations of alkaline earth metals such as $Ca^{2+}$ and $Mg^{2+}$). Any of a number of suitable freshwater sources may be used, including freshwater sources ranging from sources relatively free of minerals to sources relatively rich in minerals. Mineral-rich freshwater sources may be naturally occurring, including any of a number of hard water sources, lakes, or inland seas. Some mineral-rich freshwater sources such as alkaline lakes or inland seas (e.g., Lake Van in Turkey) also provide a source of pH-modifying agents. Mineral-rich freshwater sources may also be anthropogenic. For example, a mineral-poor (soft) water may be contacted with a source of divalent cations such as alkaline earth metal cations (e.g., $Ca^{2+}$, $Mg^{2+}$, etc.) to produce a mineral-rich water that is suitable for methods and systems described herein. Divalent cations or precursors thereof (e.g. salts, minerals) may be added to freshwater (or any other type of water described herein) using any convenient protocol (e.g., addition of solids, suspensions, or solutions). In some embodiments, divalent cations selected from $Ca^{2+}$ and $Mg^{2+}$ are added to freshwater. In some embodiments, monovalent cations selected from $Na^+$ and $K^+$ are added to freshwater. In some embodiments, freshwater comprising $Ca^{2+}$ is combined with material comprising metal silicates, ash (e.g., fly ash, bottom ash, boiler slag), or products or processed forms thereof, including combinations of the foregoing, yielding a solution comprising calcium and magnesium cations.

As such, some methods include preparing a source of divalent cations by adding one or more divalent cations (e.g., $Ca^{2+}$, $Mg^{2+}$, combinations thereof, etc.) to a source of water. Sources of magnesium cations include, but are not limited, magnesium hydroxides, magnesium oxides, etc. Sources of calcium cations include, but are not limited to, calcium hydroxides, calcium oxides, etc. Both naturally occurring and anthropogenic sources of such cations may be employed. Naturally occurring sources of such cations include, but are not limited to mafic minerals (e.g., olivine, serpentine, peridodotite, talc, etc.) and the like. Addition of supplementary magnesium cations to the source water (e.g., seawater) prior to producing compositions of the invention increases yields (e.g., yield of precipitation material) as well as affects the composition of such compositions (e.g., precipitation material), providing a means for increasing $CO_2$ sequestration by utilizing minerals such as, but not limited to, olivine, serpentine, and $Mg(OH)_2$ (brucite). The particular cation (e.g., $Ca^{2+}$, $Mg^{2+}$, combinations thereof, etc.) source may be naturally occurring or anthropogenic, and may be pure with respect to the mineral or impure (e.g., a composition made up of the mineral of interest and other minerals and components).

Methods of the invention include adding a magnesium cation source to an initial water in a manner sufficient to produce a magnesium to calcium ratio in the water of 3 or higher, e.g., 4 or higher, such as 5 or higher, for example 6 or higher, including 7 or higher. In certain embodiments, the desired magnesium to calcium cation ratio of the water ranges from 3 to 10, such as 4 to 8. Any convenient magnesium cation source may be added to the water to provide the desired magnesium to calcium cation ratio, where specific magnesium cation sources of interest include, but are not limited to, $Mg(OH)_2$, serpentine, olivine, mafic minerals, and ultramafic minerals. The amount of magnesium cation source that is added to the water may vary, e.g., depending upon the specific magnesium cation source and the initial water from which the $CO_2$-charged water is produced. In certain embodiments, the amount of magnesium cation that is added to the water ranges from 0.01 to 100.0 grams/liter, such as from 1 to 100 grams/liter of water, including from 5 to 100 grams/liter of water, for example from 5 to 80 grams/liter of water, including from 5 to 50 grams/liter of water. In certain embodiments, the amount of magnesium cation added to the water is sufficient to produce water with a hardness reading of 0.06 grams/liter or more, such as 0.08 grams/liter or more, including 0.1 grams/liter or more as determined a Metrohm Titrator (Metrohm AG, Switzerland) according to manufacturer's instructions. The magnesium cation source may be combined with the water using any convenient protocol, e.g. with agitation, mixing, etc.

In embodiments where a source of magnesium, calcium, or a combination of magnesium and calcium is added to the water, the source may be in solid form e.g., in the form of large, hard, and often-crystalline particles or agglomerations of particles that are difficult to get into solution. For example, $Mg(OH)_2$ as brucite can be in such a form, as are many minerals useful in embodiments of the invention, such as serpentine, olivine, and other magnesium silicate minerals, as well as cement waste and the like. Any suitable method may be used to introduce divalent cations such as magnesium cations from such sources into aqueous solution in a form suitable for reaction with carbonate to form carbonates of divalent cations. Increasing surface area by reducing particle size is one such method, which can be done by means well known in the art such as ball grinding and jet milling. Jet milling has the further advantage of destroying much of the crystal structure of the substance, enhancing solubility. Also of interest is sonochemistry, where intense sonication may be employed to increase reaction rates by a desired amount, e.g., 106 times or more. The particles, with or without size reduction, may be exposed to conditions which promote aqueous solution, such as exposure to an acid such as HCl, $H_2SO_4$, or the like; a weak acid or a base may also be used in some embodiments. See, e.g., U.S. Patent Application Publication Nos. 2005/0022847; 2004/0213705; 2005/0018910; 2008/0031801; and 2007/0217981; European Patent Application Nos. EP1379469 and EP1554031; and International Patent Application Publication Nos. WO 07/016,271 and WO 08/061,305, each of which is incorporated herein by reference in its entirety.

In some embodiments the methods and systems of the invention utilize serpentine as a mineral source. Serpentine is an abundant mineral that occurs naturally and may be generally described by the formula of $X_{2-3}Si_2O_5(OH)_4$, wherein X is selected from the following: Mg, Ca, $Fe^{2+}$, $Fe^{3+}$, Ni, Al, Zn, and Mn, the serpentine material being a heterogeneous mixture consisting primarily of magnesium hydroxide and silica. In some embodiments of the invention, serpentine is used not only as a source of magnesium, but also as a source of hydroxide. Thus in some embodiments of the invention, hydroxide is provided for removal of protons from water and/or adjustment of pH by dissolving serpentine; in these embodiments an acid dissolution is not ideal to accelerate dissolution, and other means are used, such as jet milling and/or sonication. It will be appreciated that in a batch or continuous process, the length of time to dissolve the serpentine or other mineral is not critical, as once the process is started at the desired scale, and sufficient time has passed for appropriate levels of dissolution, a continuous stream of dissolved material may be maintained indefinitely. Thus, even if dissolution to the desired level takes days, weeks, months, or even years, once the process has reached the first time point at which desired dissolution has occurred, it may be maintained indefinitely. Prior to the time point at which desired dissolution has occurred, other processes may be used to provide some or all of the magnesium and/or hydroxide to the process. Serpentine is also a source of iron, which is a useful component of precipitates that are used for, e.g., cements, where iron components are often desired.

Other examples of silicate-based minerals useful in the invention include, but are not limited to olivine, a natural magnesium-iron silicate $((Mg,Fe)_2SiO_4)$, which can also be generally described by the formula $X_2(SiO_4)_n$, wherein X is selected from Mg, Ca, $Fe^{2+}$, $Fe^{3+}$, Ni, Al, Zn, and Mn, and n=2 or 3; and a calcium silicate, such as wollastonite. The minerals may be used individually or in combination with each other as described in U.S. Patent Application Publication No. 2009/0301352, published 10 Dec. 2009, which is incorporated herein by reference in its entirety. Additionally, the materials may be found in nature or may be manufactured. Examples of industrial by-products include but are not limited to waste cement, calcium-rich fly ash, and cement kiln dust (CKD) as described in U.S. Patent Application Publication No. 2010/0000444, published 7 Jan. 2010, which is incorporated herein by reference in its entirety.

In some embodiments, an aqueous solution of divalent cations may be obtained from an industrial plant that is also providing a waste gas stream (e.g., combustion gas stream). For example, in water-cooled industrial plants, such as seawater-cooled industrial plants, water that has been used by an industrial plant for cooling may then be used as water for producing precipitation material. If desired, the water may be cooled prior to entering a precipitation system of the invention. Such approaches may be employed, for example, with once-through cooling systems. For example, a city or agricultural water supply may be employed as a once-through cooling system for an industrial plant. Water from the industrial plant may then be employed for producing precipitation material, wherein output water has a reduced hardness and greater purity.

The aqueous solution of divalent cations may further provide proton-removing agents, which may be expressed as alkalinity or the ability of the divalent cation-containing solution to neutralize acids to the equivalence point of carbonate or bicarbonate. Alkalinity ($A_T$) may be expressed by the following equation $A_T=[HCO_3^-]_T+2[CO_3^{2-}]_T+[B(OH)_4^-]_T+[OH^-]_T+2[PO_4^{3-}]_T+[HPO_4^{2-}]_T+[SiO(OH)_3^-]_T-[H^+]_{sws}-[HSO_4^-]$, wherein "T" indicates the total concentration of the species in the solution as measured. Other species, depending on the source, may contribute to alkalinity as well. The total concentration of the species in solution is in opposition to the free concentration, which takes into account the significant amount of ion pair interactions that occur, for example, in seawater. In accordance with the equation, the aqueous source of divalent cations may have various concentrations of bicarbonate, carbonate, borate, hydroxide, phosphate, biphosphate, and/or silicate, which may contribute to the alkalinity of the aqueous source of divalent cations. Any type of alkalinity is suitable for the invention. For example, in some embodiments, a source of divalent cations high in borate alkalinity is suitable for the invention. In such embodiments, the source of divalent cations may contain boron present as borates including, but not limited to, $BO_3^{3-}$, $B_2O_5^{4-}$, $B_3O_7^{5-}$, and $B_4O_9^{6-}$ among others. In such embodiments, the concentration borate may exceed the concentration of any other species in solution including, for example, carbonate and/or bicarbonate. In some embodiments, the source of divalent cations has at least 10, 100, 500, 1000, 1500, 3000, 5000, or more than 5000 mEq of alkalinity. For example, in some embodiments, the source of divalent cations has between 500 to 1000 mEq of alkalinity.

In some methods of the invention, the water (such as salt water or mineral rich water) is not contacted with a source of $CO_2$ prior to subjecting the water to precipitation conditions. In these methods, the water will have an amount of $CO_2$ associated with it, e.g., in the form of bicarbonate ion, which has been obtained from the environment to which the water has been exposed prior to practice of the method. Subjecting the water to precipitate conditions of the invention results in conversion of this $CO_2$ into a storage-stable precipitate, and therefore sequestration of the $CO_2$. When the water subject to processes of the invention is again exposed to its natural environment, such as the atmosphere, more $CO_2$ from the atmosphere will be taken up by the water resulting in a net removal of $CO_2$ from the atmosphere and incorporation of a corresponding amount of $CO_2$ into a storage-stable product, where the mineral rich freshwater source may be contacted with a source of $CO_2$, e.g., as described in greater detail below. Embodiments of these methods may be viewed as methods of sequestering $CO_2$ gas directly from the Earth's atmosphere. Embodiments of the methods are efficient for the removal of $CO_2$ from the Earth's atmosphere. For example, embodiments of the methods are configured to remove $CO_2$ from saltwater at a rate of 0.025 M or more, such as 0.05 M or more, including 0.1 M or more per gallon of saltwater.

In some embodiments, the invention provides for contacting a volume of an absorbing solution (e.g. aqueous solution) with a source of carbon dioxide to produce a composition comprising carbonates, bicarbonates, or carbonates and bicarbonates, wherein the composition is a solution or slurry. In some embodiments, the solution is a slurry comprising a precipitation material comprising carbonates, bicarbonates, or carbonates and bicarbonates. In some embodiments, the precipitation material is produced by subjecting the volume of the aqueous solution to precipitation conditions before, during, or after contact with the source of carbon dioxide. There may be sufficient carbon dioxide in the aqueous solution to produce significant amounts of carbonates, bicarbonates, or carbonates and bicarbonates (e.g., from brine or seawater); however, additional carbon dioxide is generally used. The source of $CO_2$ may be any convenient $CO_2$ source. The source of $CO_2$ may be a gas, a liquid, a solid (e.g., dry ice), a supercritical fluid, or $CO_2$ dissolved in a liquid. In some embodiments, the $CO_2$ source is a gaseous $CO_2$ source such as a waste gas stream. The gaseous $CO_2$ source may be substantially pure $CO_2$ or, as described in more detail below, comprise one or more components in addition to $CO_2$, wherein the one or more components comprise one or more additional gases such as SOx (e.g., SO, $SO_2$, $SO_3$), NOx (e.g., NO, $NO_2$), etc., non-gaseous components, or a combination thereof. The waste streams may further comprise VOC (volatile organic compounds), metals (e.g., mercury, arsenic, cadmium, selenium), and particulate matter comprising particles of solid (e.g., fly ash) or liquid suspended in the gas. In some embodiments, the gaseous $CO_2$ source may be a waste gas stream (e.g., exhaust) produced by an active process of an industrial plant. The nature of the industrial plant may vary, the industrial plants including, but not limited to, power plants, chemical processing plants, mechanical processing plants, refineries, cement plants, steel plants, and other industrial plants that produce $CO_2$ as a by-product of fuel combustion or another processing step (e.g., calcination by a cement plant). In some embodiments, for example, the gaseous $CO_2$ source may be flue gas from coal-fired power plant.

Waste gas streams comprising $CO_2$ include both reducing condition streams (e.g., syngas, shifted syngas, natural gas, hydrogen, and the like) and oxidizing condition streams (e.g., flue gas resulting from combustion). Particular waste gas streams that may be convenient for the invention include oxygen-containing flue gas resulting from combustion (e.g., from coal or another carbon-based fuel with little or no pre-treatment of the flue gas), turbo charged boiler product gas, coal gasification product gas, pre-combustion synthesis gas (e.g., such as that formed during coal gasification in power generating plants), shifted coal gasification product gas, anaerobic digester product gas, wellhead natural gas stream, reformed natural gas or methane hydrates, and the like. Combustion gas from any convenient source may be used in methods and systems of the invention. In some embodiments, a combustion gas from a post-combustion effluent stack of an industrial plant such as a power plant, cement plant, and coal processing plant is used.

Thus, waste gas streams may be produced from a variety of different types of industrial plants. Suitable waste gas streams for the invention include waste gas streams produced by industrial plants that combust fossil fuels (e.g., coal, oil, natural gas, propane, diesel), biomass, and/or anthropogenic fuel products of naturally occurring organic fuel deposits (e.g., tar sands, heavy oil, oil shale, etc.). In some embodiments, a waste gas stream suitable for systems and methods of the invention is sourced from a coal-fired power plant, such as a pulverized coal power plant, a supercritical coal power plant, a mass burn coal power plant, a fluidized bed coal power plant. In some embodiments, the waste gas stream is sourced from gas or oil-fired boiler and steam turbine power plants, gas or oil-fired boiler simple cycle gas turbine power plants, or gas or oil-fired boiler combined cycle gas turbine power plants. In some embodiments, waste gas streams produced by power plants that combust syngas (i.e., gas that is produced by the gasification of organic matter, for example, coal, biomass, etc.) are used. In some embodiments, waste gas streams from integrated gasification combined cycle (IGCC) plants are used. In some embodiments, waste gas streams produced by heat recovery steam generator (HRSG) plants are used in accordance with systems and methods of the invention.

Waste gas streams comprising $CO_2$ may also result from other industrial processing. Waste gas streams produced by cement plants are also suitable for systems and methods of the invention. Cement plant waste gas streams include waste gas streams from both wet process and dry process plants, which plants may employ shaft kilns or rotary kilns, and may include pre-calciners. These industrial plants may each burn a single fuel, or may burn two or more fuels sequentially or simultaneously. Other industrial plants such as smelters and refineries are also useful sources of waste gas streams that include carbon dioxide.

The gaseous waste stream may be provided by the industrial plant to the $CO_2$-processing system of the invention in any convenient manner that conveys the gaseous waste stream. In some embodiments, the waste gas stream is provided with a gas conveyor (e.g., a duct, pipe, etc.) that runs from a flue or analogous structure of the industrial plant (e.g., a flue or smokestack of the industrial plant) to one or more locations of the $CO_2$-processing system. In such embodiments, a line (e.g., a duct, pipe, etc.) may be connected to the flue of the industrial plant such that gas leaving through the flue is conveyed to the appropriate location(s) of the $CO_2$-processing system (e.g., processor or a component thereof, such as a gas-liquid contactor or gas-liquid-solid contactor). Depending upon the particular configuration of the $CO_2$-processing system, the location of the gas conveyor on the industrial plant may vary, for example, to provide a waste gas stream of a desired temperature. As such, in some embodiments, where a gaseous waste stream having a temperature ranging for 0° C. to 2000° C., such as 0° C. to 1800° C., including 60° C. to 700° C., for example, 100° C. to 400° C. is desired, the flue gas may be obtained at the exit point of the boiler, gas turbine, kiln, or at any point of the power plant that provides the desired temperature. The gas conveyor may be configured to maintain flue gas at a temperature above the dew point (e.g., 125° C.) in order to avoid condensation and related complications. Other steps may be taken to reduce the adverse impact of condensation and other deleterious effects, such as employing ducting that is stainless steel or fluorocarbon (such as poly(tetrafluoroethylene)) lined such the duct does not rapidly deteriorate.

Carbon dioxide may be the primary non-air derived component in waste gas streams. In some embodiments, waste gas streams may comprise carbon dioxide in amounts ranging from 200 ppm to 1,000,000 ppm, such as 1000 ppm to 200,000 ppm, including 2000 ppm to 200,000 ppm, for example, 2000 ppm to 180,000 ppm or 2000 ppm to 130,000 ppm. In some embodiments, waste gas streams may comprise carbon dioxide in amounts ranging from 350 ppm to 400,000 ppm. Such amounts of carbon dioxide may be considered time-averaged amounts. For example, in some embodiments, waste gas streams may comprise carbon dioxide in an amount ranging from 40,000 ppm (4%) to 100,000 ppm (10%) depending on the waste gas stream (e.g., $CO_2$ from natural gas-fired power plants, furnaces, small boilers, etc.). For example, in some embodiments, waste gas streams may comprise carbon dioxide in an amount ranging from 100,000 ppm (10%) to 150,000 ppm (15%) depending on the waste gas stream (e.g., $CO_2$ from coal-fired power plants, oil generators, diesel generators, etc.). For example, in some embodiments, waste gas streams may comprise carbon dioxide in an amount ranging from 200,000 ppm (20%) to 400,000 ppm (40%) depending on the waste gas stream (e.g., $CO_2$ from cement plant calcination, chemical plants, etc.). For example, in some embodiments, waste gas streams may comprise carbon dioxide in an amount ranging from 900,000 ppm (90%) to 1,000,000 ppm (100%) depending on the waste gas stream (e.g., $CO_2$ from ethanol fermenters, $CO_2$ from steam reforming at refineries, ammonia plants, substitute natural gas (SNG) plants, $CO_2$ separated from sour gases, etc.). The concentration of $CO_2$ in a waste gas stream may be decreased by 10% or more, 20% or more, 30% or more, 40% or more, 50% or more, 60% or more, 70% or more, 80% or more, 90% or more, 95% or more, 99% or more, 99.9% or more, or 99.99%. In other words, at least 10%, 20%, 30%, 40%, 50%, 60%, 70%, 80%, 90%, 95%, 99%, 99.9%, or 99.99% of the carbon dioxide may be removed from the waste gas stream.

A portion of the waste gas stream (i.e., not the entire gaseous waste stream) from an industrial plant may be used to produce compositions comprising carbonates, bicarbonates, or carbonates and bicarbonates. In these embodiments, the portion of the waste gas stream that is employed in producing compositions may be 75% or less, such as 60% or less, and including 50% and less of the waste gas stream. In yet other embodiments, most (e.g., 80% or more) of the entire waste gas stream produced by the industrial plant is employed in producing compositions. In these embodiments, 80% or more, such as 90% or more, including 95% or more, up to 100% of the waste gas stream (e.g., flue gas) generated by the source may be employed for producing compositions of the invention.

In some embodiments of the invention substantially 100% of the $CO_2$ contained in a flue gas, or a portion of the flue gas, from a power plant may be sequestered as a composition of the invention (e.g., precipitation material comprising one or more stable or metastable minerals). Such sequestration may be done in a single step or in multiple steps, and may further involve other processes for sequestering $CO_2$ (e.g., as the concentration of $CO_2$ is decreased in the flue gas, more energy-intensive processes that be prohibitive in energy consumption for removing all of the original $CO_2$ in the gas may become practical in removing the final $CO_2$ in the gas). Thus, in some embodiments, the gas entering the power plant (ordinary atmospheric air) may contain a concentration of $CO_2$ that is greater than the concentration of $CO_2$ in the flue gas exiting the plant, which flue gas has been treated by the processes and systems of the invention. Hence, in some embodiments, the methods and systems of the invention encompass a method comprising supplying a gas (e.g., atmospheric air) to a power plant, wherein the gas comprises $CO_2$; treating the gas in the power plant (e.g., by combustion of fossil fuel to consume $O_2$) to produce $CO_2$, then treating exhaust gas to remove $CO_2$; and releasing the gas from the power plant, wherein the gas released from the power plant has a lower $CO_2$ content than the gas supplied to the power plant. In some embodiments, the gas released from the power plant contains at least 10% less $CO_2$, or at least 20% less $CO_2$, or at least 30% less $CO_2$, or at least 40% less $CO_2$, or at least 50% less $CO_2$, or at least 60% less $CO_2$, or at least 70% less $CO_2$, or at least 80% less $CO_2$, or at least 90% less $CO_2$, or at least 95% less $CO_2$, or at least 99% less $CO_2$, or at least 99.5% less $CO_2$, or at least 99.9% less $CO_2$, than the gas entering the power plant. In some embodiments, the gas entering the power plant is atmospheric air and the gas exiting the power plant is treated flue gas.

Although a waste gas stream from an industrial plant offers a relatively concentrated source of $CO_2$ and/or additional components resulting from combustion of fossil fuels, methods and systems of the invention are also applicable to removing combustion gas components from less concentrated sources (e.g., atmospheric air), which contains a much lower concentration of pollutants than, for example, flue gas. Thus, in some embodiments, methods and systems encompass decreasing the concentration of $CO_2$ and/or additional components in atmospheric air by producing compositions of the invention. As with waste gas streams, the concentration of $CO_2$ in a portion of atmospheric air may be decreased by 10% or more, 20% or more, 30% or more, 40% or more, 50% or more, 60% or more, 70% or more, 80% or more, 90% or more, 95% or more, 99% or more, 99.9% or more, or 99.99%. Such decreases in $CO_2$ may be accomplished with yields as described herein, or with higher or lower yields, and may be accomplished in one processing step or in a series of processing steps.

In certain embodiments, oxidizing conditions include subjecting the gaseous stream to hydrogen peroxide ($H_2O_2$) or a $H_2O_2/CH_3OH$ mixture. An exemplary description of systems and methods for oxidizing a $CO_2$-containing gaseous stream using hydrogen peroxide can be found in U.S. Pat. No. 5,670,122, incorporated by reference herein in its entirety. As described in the '122 patent, a gaseous stream can be treated with hydrogen peroxide for a sufficient time to oxidize components therein, e.g., to convert one or more of nitric oxide (NO), sulfur trioxide ($SO_3$), light hydrocarbons ($C_1$-$C_4$), carbon monoxide (CO) and mercury to $NO_2$, $SO_2$, $CO_2$ and HgO. The gaseous stream may be treated with a hydrogen peroxide or a $H_2O_2/CH_3OH$ mixture prior to contacting the gaseous stream with water (e.g., alkaline earth metal ion-containing water in the form of a flat jet stream, spray or droplets, mist, or a combination thereof). In some embodiments, a recovered gaseous stream, recovered after contacting a gaseous stream with water (e.g., alkaline earth metal-containing water), is treated with the $H_2O_2/CH_3OH$ mixture and reprocessed (i.e., contacted a second time to the water).

The reaction time of the hydrogen peroxide or $H_2O_2/CH_3OH$ mixture may be in the range from 0.01 to 5 seconds, e.g., from 0.1 to 2 seconds. The $NO_2$, $SO_2$, $CO_2$, and HgO (and other components of the gaseous stream) can then be removed by absorption into the water, e.g., alkaline earth metal ion-containing water. In certain embodiments, the gas-charged water is then subjected to the precipitation conditions to form a precipitate comprising one or more of the chemical components from the gaseous stream (e.g., $NO_2$, $SO_2$, $CO_2$, HgO, etc.). As such, the invention provides a quick and efficient method of removing a wide variety of chemical components of a gaseous source (e.g., $CO_2$, criteria pollutants, and/or other toxic or environmentally harmful constituents) such that these components are not emitted into the atmosphere in dangerously high concentrations. For example, the invention can be used to remove these compounds in flue gases emanating from boilers, furnaces, incinerators, stationary engines, and other systems connected with combustion of various types of fuels.

The total amount of hydrogen peroxide and methanol used in combination with the gas streams will generally be in the mole ratio from 0.5 to 2.0, but in most applications from 0.9 to 1.5 of the total number of constituents. Hydrogen peroxide can be injected (e.g., in the form of an aqueous solution) at a concentration of 1% to 50%, e.g., from 10 to 30%. Hydrogen peroxide can be also injected as a mixture of $H_2O_2$ solution and methanol. The use of $H_2O_2$ and methanol mixtures are desirable because methanol is very low in cost. The methanol to $H_2O_2$ ratio should be as high as possible to reduce the cost of the additive, but to satisfy emission requirements.

The use of hydrogen peroxide in the invention has many advantages. If properly stored, hydrogen peroxide solutions in water are very stable. The use of hydrogen peroxide does not pose any environmental problems since hydrogen peroxide is not itself a source of pollution, and the only reaction by-products are water and oxygen. Therefore, hydrogen peroxide can be used safely in the invention.

The pH of the water that is contacted with the $CO_2$ source may vary. In some instances, the pH of the water that is contacted with the $CO_2$ source is acidic, such that the pH is lower than 7, such as 6.5 or lower, 6 or lower, 5.5 or lower, 5 or lower, 4.5 or lower, or 4 or lower. In yet other embodiments, the pH of the water may be neutral to slightly basic, by which is meant that the pH of the water may range from pH 7 to pH 9, such as pH 7 to pH 8.5, including pH 7.5 to pH 8.5.

In some instances, the water, such as alkaline earth metal ion-containing water (including alkaline solutions or natural saline alkaline waters), is basic when contacted with the $CO_2$ source, such as a carbon dioxide containing gaseous stream. In these instances, while being basic the pH of the water is generally insufficient to cause precipitation of the storage-stable carbon dioxide sequestering product. As such, the pH may be 9.5 or lower, such as 9.3 or lower, including 9 or lower.

In some instances, the pH as described above may be maintained at a substantially constant value during contact with the carbon dioxide containing gaseous stream, or the pH may be manipulated to maximize $CO_2$ absorption while minimizing base consumption or other means of removing protons, such as by starting at a certain pH and gradually causing the pH to rise as $CO_2$ continues to be introduced. In embodiments where the pH is maintained substantially constant, whereby "substantially constant" is meant that the magnitude of change in pH during some phase of contact with the carbon dioxide source is 0.75 or less, such as 0.50 or less, including 0.25 or less, such as 0.10 or less. The pH may be maintained at substantially constant value, or manipulated to maximize $CO_2$ absorption but prevent hydroxide precipitation without precipitation, using any convenient approach. In some instances, the pH is maintained at substantially constant value, or manipulated to maximize $CO_2$ absorption without precipitation, during $CO_2$ charging of the water by adding a sufficient amount of base to the water in a manner that provides the substantially constant pH. In some cases it is desirable to control the pH to maximize the absorption of carbon dioxide and other components from the gaseous stream (e.g. SOx, NOx, heavy metals, other acid gases) without precipitation of solids and without the release of $CO_2$ from the water (i.e. absorbing solution). Any convenient base or combination of bases may be adding, including but not limited to oxides and hydroxides, such as magnesium hydroxide, where further examples of suitable bases are reviewed below. In yet other instances, the pH may be maintained at substantially constant value, or manipulated to maximize $CO_2$ absorption, through use of electrochemical protocols, such as the protocols described below, so that the pH of the water is electrochemically maintained at the substantially constant value. Surprisingly, as shown in Example IV, it has been found that it is possible to absorb, e.g., more than 50% of the $CO_2$ contained in a gas comprising 20% $CO_2$ through simple sparging of seawater with addition of base (removal of protons).

In some embodiments, the methods and systems of the invention are capable of absorbing 5% or more, 10% or more, 15% or more, 20% or more, 25% or more, 30% or more, 35% or more, 40% or more, 45% or more, 50% or more, 55% or more, 60% or more, 65% or more, 70% or more, 75% or more, 80% or more, 85% or more, 90% or more, 95% or more, or 99% or more of the $CO_2$ in a gaseous source of $CO_2$, such as an industrial source of $CO_2$, e.g., flue gas from a power plant or waste gas from a cement plant. In some embodiments, the methods and systems of the invention are capable of absorbing 50% or more of the $CO_2$ in a gaseous source of $CO_2$, such as an industrial source of $CO_2$, e.g., flue gas from a power plant or waste gas from a cement plant.

In some embodiments, the methods and systems of the invention are capable of absorbing more than 20 tons/hour of carbon dioxide into an absorbing solution as averaged over 72 hours of continuous operation. In some embodiments, the methods and systems of the invention are capable of absorbing more than 40 tons/hour of carbon dioxide into an absorbing solution. In some embodiments, the methods and systems of the invention are capable of absorbing more than 60 tons/hour of carbon dioxide into an absorbing solution. In some embodiments, the methods and systems of the invention are capable of absorbing more than 70 tons/hour of carbon dioxide into an absorbing solution. In some embodiments, the methods and systems of the invention are capable of absorbing more than 80 tons/hour of carbon dioxide into an absorbing solution. In some embodiments, the methods and systems of the invention are capable of absorbing more than 90 tons/hour of carbon dioxide into an absorbing solution. In some embodiments, the methods and systems of the invention are capable of absorbing more than 100 tons/hour of carbon dioxide into an absorbing solution. In some embodiments, the methods and systems of the invention are capable of absorbing more than 110 tons/hour of carbon dioxide into an absorbing solution. In some embodiments, the methods and systems of the invention are capable of absorbing more than 120 tons/hour of carbon dioxide into an absorbing solution. In some embodiments, the methods and systems of the invention are capable of absorbing more than 130 tons/hour of carbon dioxide into an absorbing solution. In some embodiments, the methods and systems of the invention are capable of absorbing more than 140 tons/hour of carbon dioxide into an absorbing solution. In some embodiments, the methods and systems of the invention are capable of absorbing more than 150 tons/hour of carbon dioxide into an absorbing solution. In some embodiments, the methods and systems of the invention are capable of absorbing more than 160 tons/hour of carbon dioxide into an absorbing solution. In some embodiments, the methods and systems of the invention are capable of absorbing more than 170 tons/hour of carbon dioxide into an absorbing solution. In some embodiments, the methods and systems of the invention are capable of absorbing more than 180 tons/hour of carbon dioxide into an absorbing solution. In some embodiments, the methods and systems of the invention are capable of absorbing more than 190 tons/hour of carbon dioxide into an absorbing solution. In some embodiments, the methods and systems of the invention are capable of absorbing more than 200 tons/hour of carbon dioxide into an absorbing solution.

In some embodiments, the invention provides for contacting a volume of an aqueous solution with a source of carbon dioxide to produce a composition comprising carbonates, bicarbonates, or carbonates and bicarbonates, wherein the composition is a solution or slurry. Contacting the aqueous solution with the source of carbon dioxide facilitates dissolution of $CO_2$ into the aqueous solution producing carbonic acid, a species in equilibrium with both bicarbonate and carbonate. In order to produce compositions of the invention (e.g., precipitation material comprising carbonates, bicarbonates, or carbonates and bicarbonates), protons are removed from various species (e.g. carbonic acid, bicarbonate, hydronium, etc.) in the aqueous solution to shift the equilibrium toward bicarbonate, carbonate, or somewhere in between. As protons are removed, more $CO_2$ goes into solution. In some embodiments, proton-removing agents and/or methods are used while contacting an aqueous solution with $CO_2$ to increase $CO_2$ absorption in one phase of the reaction, wherein the pH may remain constant, increase, or even decrease, followed by a rapid removal of protons (e.g., by addition of a base), which, In some embodiments, may cause rapid precipitation of precipitation material. Protons may be removed from the various species (e.g. carbonic acid, bicarbonate, hydronium, etc.) by any convenient approach, including, but not limited to use of naturally occurring proton-removing agents, use of microorganisms and fungi, use of synthetic chemical proton-removing agents, recovery of waste streams from industrial processes, and using electrochemical means.

Naturally occurring proton-removing agents encompass any proton-removing agents found in the wider environment that may create or have a basic local environment. Some embodiments provide for naturally occurring proton-removing agents including minerals that create basic environments upon addition to solution. Such minerals include, but are not limited to, lime (CaO); periclase (MgO); iron hydroxide minerals (e.g., goethite and limonite); and volcanic ash. Methods for digestion of such minerals and rocks comprising such minerals are described in U.S. patent application Ser. No. 12/501,217, filed 10 Jul. 2009, which is incorporated herein by reference in its entirety. Some embodiments provide for using naturally occurring bodies of water as a source proton-removing agents, which bodies of water comprise carbonate, borate, sulfate, or nitrate alkalinity, or some combination thereof. Any alkaline brine (e.g., surface brine, subsurface brine, a deep brine, etc.) is suitable for use in the invention. In some embodiments, a surface brine comprising carbonate alkalinity provides a source of proton-removing agents. In some embodiments, a surface brine comprising borate alkalinity provides a source of proton-removing agents. In some embodiments, a subsurface brine comprising carbonate alkalinity provides a source of proton-removing agents. In some embodiments, a subsurface brine comprising borate alkalinity provides a source of proton-removing agents. In some embodiments, a deep brine comprising carbonate alkalinity provides a source of proton-removing agents. In some embodiments, a deep brine comprising borate alkalinity provides a source of proton-removing agents. Examples of naturally alkaline bodies of water include, but are not limited to surface water sources (e.g. alkaline lakes such as Mono Lake in California) and ground water sources (e.g. basic aquifers such as the deep geologic alkaline aquifers located at Searles Lake in California). Other embodiments provide for use of deposits from dried alkaline bodies of water such as the crust along Lake Natron in Africa's Great Rift Valley. For additional sources of brines and evaporites, see U.S. Provisional Patent Application No. 61/264,564, filed 25 Nov. 2009, which are incorporated herein by reference in its entirety. In some embodiments, organisms that excrete basic molecules or solutions in their normal metabolism are used as proton-removing agents. Examples of such organisms are fungi that produce alkaline protease (e.g., the deep-sea fungus *Aspergillus ustus* with an optimal pH of 9) and bacteria that create alkaline molecules (e.g., cyanobacteria such as *Lyngbya* sp. from the Atlin wetland in British Columbia, which increases pH from a byproduct of photosynthesis). In some embodiments, organisms are used to produce proton-removing agents, wherein the organisms (e.g., *Bacillus pasteurii*, which hydrolyzes urea to ammonia) metabolize a contaminant (e.g. urea) to produce proton-removing agents or solutions comprising proton-removing agents (e.g., ammonia, ammonium hydroxide). In some embodiments, organisms are cultured separately from the precipitation reaction mixture, wherein proton-removing agents or solution comprising proton-removing agents are used for addition to the precipitation reaction mixture. In some embodiments, naturally occurring or manufactured enzymes are used in combination with proton-removing agents to invoke precipitation of precipitation material. Carbonic anhydrase, which is an enzyme produced by plants and animals, accelerates transformation of carbonic acid to bicarbonate in aqueous solution. As such, carbonic anhydrase may be used to enhance dissolution of $CO_2$ and accelerate precipitation of precipitation material, as described in further detail herein.

Chemical agents for effecting proton removal generally refer to synthetic chemical agents that are produced in large quantities and are commercially available. For example, chemical agents for removing protons include, but are not limited to, hydroxides, organic bases, super bases, oxides, ammonia, and carbonates. Hydroxides include chemical species that provide hydroxide anions in solution, including, for example, sodium hydroxide (NaOH), potassium hydroxide (KOH), calcium hydroxide ($Ca(OH)_2$), or magnesium hydroxide ($Mg(OH)_2$). Organic bases are carbon-containing molecules that are generally nitrogenous bases including primary amines such as methyl amine, secondary amines such as diisopropylamine, tertiary amines such as diisopropylethylamine, aromatic amines such as aniline, heteroaromatics such as pyridine, imidazole, and benzimidazole, and various forms thereof. In some embodiments, an organic base selected from pyridine, methylamine, imidazole, benzimidazole, histidine, and a phosphazene is used to remove protons from various species (e.g., carbonic acid, bicarbonate, hydronium, etc.) for preparation of compositions of the invention. In some embodiments, ammonia is used to raise pH to a level sufficient for preparation of compositions of the invention. Super bases suitable for use as proton-removing agents include sodium ethoxide, sodium amide ($NaNH_2$), sodium hydride (NaH), butyl lithium, lithium diisopropylamide, lithium diethylamide, and lithium bis(trimethylsilyl)amide. Oxides including, for example, calcium oxide (CaO), magnesium oxide (MgO), strontium oxide (SrO), beryllium oxide (BeO), and barium oxide (BaO) are also suitable proton-removing agents that may be used. Carbonates for use in the invention include, but are not limited to, sodium carbonate.

In addition to comprising cations (e.g., $Ca^{2+}$, $Mg^{2+}$, etc.) and other suitable metal forms suitable for use in the invention, waste streams from various industrial processes (i.e., industrial waste streams) may provide proton-removing agents. Such waste streams include, but are not limited to, mining wastes; ash (e.g., coal ash such as fly ash, bottom ash, boiler slag); slag (e.g. iron slag, phosphorous slag); cement kiln waste (e.g., cement kiln dust (CKD)); oil refinery/petrochemical refinery waste (e.g. oil field and methane seam brines); coal seam wastes (e.g. gas production brines and coal seam brine); paper processing waste; water softening waste brine (e.g., ion exchange effluent); silicon processing wastes; agricultural waste; metal finishing waste; high pH textile waste; and caustic sludge. Mining wastes include any wastes from the extraction of metal or another precious or useful mineral from the earth. In some embodiments, wastes from mining are used to modify pH, wherein the waste is selected from red mud from the Bayer aluminum extraction process; waste from magnesium extraction from seawater (e.g., $Mg(OH)_2$ such as that found in Moss Landing, Calif.); and wastes from mining processes involving leaching. For example, red mud may be used to modify pH as described in U.S. Provisional Patent Application No. 61/161,369, filed 18 Mar. 2009 and PCT Application No. PCT/US10/25970, filed 2 Mar. 2010, titled "Gas Stream Multi-Pollutants Control Systems And Methods" and U.S. patent application Ser. No. 12/716,235, filed 2 Mar. 2010, titled "Gas Stream Multi-Pollutants Control Systems And Methods", which are incorporated herein by reference in their entirety. Red mud, depending on processing conditions and source material (e.g., bauxite) might comprise $Fe_2O_3$, $Al_2O_3$, $SiO_2$, $Na_2O$, CaO, $TiO_2$, $K_2O$, MgO, $CO_2$, $S_2O$, $MnO_2$, $P_2O_5$, each of which species are loosely listed in order from most abundant to least abundant, and each of which species are expressed as oxides for convenience. Coal ash, cement kiln dust, and slag, collectively waste sources of metal oxides, further described in U.S. patent application Ser. No. 12/486,692, filed 17 Jun. 2009, Publication Number US 2010-0000444 A1, published 7 Jan. 2010, titled, "Methods And Systems For Utilizing Waste Sources Of Metal Oxides." the disclosure of which is incorporated herein in its entirety, may be used in alone or in combination with other proton-removing agents to provide proton-removing agents for the invention. Agricultural waste, either through animal waste or excessive fertilizer use, may contain potassium hydroxide (KOH) or ammonia ($NH_3$) or both. As such, agricultural waste may be used in some embodiments of the invention as a proton-removing agent. This agricultural waste is often collected in ponds, but it may also percolate down into aquifers, where it can be accessed and used.

In some embodiments of the invention, ash may be employed for proton-removing agents, e.g., to increase the pH of $CO_2$-charged water. The ash may be used as a as the sole pH modifier or in conjunction with one or more additional pH modifiers. Of interest in certain embodiments is use of a coal ash as the ash. The coal ash as employed in this invention refers to the residue produced in power plant boilers or coal burning furnaces, for example, chain grate boilers, cyclone boilers and fluidized bed boilers, from burning pulverized anthracite, lignite, bituminous or sub-bituminous coal. Such coal ash includes fly ash which is the finely divided coal ash carried from the furnace by exhaust or flue gases; and bottom ash which collects at the base of the furnace as agglomerates.

Fly ashes are generally highly heterogeneous, and include of a mixture of glassy particles with various identifiable crystalline phases such as quartz, mullite, and various iron oxides. Fly ashes of interest include Type F and Type C fly ash. The Type F and Type C fly ashes referred to above are defined by CSA Standard A23.5 and ASTM C618. The chief difference between these classes is the amount of calcium, silica, alumina, and iron content in the ash. The chemical properties of the fly ash are largely influenced by the chemical content of the coal burned (i.e., anthracite, bituminous, and lignite). Fly ashes of interest include substantial amounts of silica (silicon dioxide, $SiO_2$) (both amorphous and crystalline) and lime (calcium oxide, CaO, magnesium oxide, MgO).

Table 3 below provides the chemical makeup of various types of fly ash that find use in embodiments of the invention.

TABLE 3

Chemical makeup of various types of fly ash.

| Component | Bituminous | Subbituminous | Lignite |
|---|---|---|---|
| $SiO_2$ (%) | 20-60 | 40-60 | 15-45 |
| $Al_2O_3$ (%) | 5-35 | 20-30 | 20-25 |
| $Fe_2O_3$ (%) | 10-40 | 4-10 | 4-15 |
| CaO (%) | 1-12 | 5-30 | 15-40 |

The burning of harder, older anthracite and bituminous coal typically produces Class F fly ash. Class F fly ash is pozzolanic in nature, and contains less than 10% lime (CaO). Fly ash produced from the burning of younger lignite or subbituminous coal, in addition to having pozzolanic properties, also has some self-cementing properties. In the presence of water, Class C fly ash will harden and gain strength over time. Class C fly ash generally contains more than 20% lime (CaO). Alkali and sulfate ($SO_4$) contents are generally higher in Class C fly ashes.

Fly ash material solidifies while suspended in exhaust gases and is collected using various approaches, e.g., by electrostatic precipitators or filter bags. Since the particles solidify while suspended in the exhaust gases, fly ash particles are generally spherical in shape and range in size from 0.5 μm to 100 μm. Fly ashes of interest include those in which at least 80%, by weight comprises particles of less than 45 microns. Also of interest in certain embodiments of the invention is the use of highly alkaline fluidized bed combustor (FBC) fly ash.

Also of interest in embodiments of the invention is the use of bottom ash. Bottom ash is formed as agglomerates in coal combustion boilers from the combustion of coal. Such combustion boilers may be wet bottom boilers or dry bottom boilers. When produced in a wet or dry bottom boiler, the bottom ash is quenched in water. The quenching results in agglomerates having a size in which 90% fall within the particle size range of 0.1 mm to 20 mm, where the bottom ash agglomerates have a wide distribution of agglomerate size within this range. The main chemical components of a bottom ash are silica and alumina with lesser amounts of oxides of Fe, Ca, Mg, Mn, Na and K, as well as sulfur and carbon.

Also of interest in certain embodiments is the use of volcanic ash as the ash. Volcanic ash is made up of small tephra, i.e., bits of pulverized rock and glass created by volcanic eruptions, less than 2 millimeters (0.079 in) in diameter.

In one embodiment of the invention, cement kiln dust (CKD) is added to the reaction vessel as a means of modifying pH. The nature of the fuel from which the ash and/or CKD were produced, and the means of combustion of said fuel, will influence the chemical composition of the resultant ash and/or CKD. Thus ash and/or CKD may be used as a portion of the means for adjusting pH, or the sole means, and a variety of other components may be utilized with specific ashes and/or CKDs, based on chemical composition of the ash and/or CKD.

In embodiments of the invention, ash is added to the reaction as one source of these additional reactants, to produce carbonate mineral precipitates which contain one or more components such as amorphous silica, crystalline silica, calcium silicates, calcium alumina silicates, or any other moiety which may result from the reaction of ash in the carbonate mineral precipitation process.

The ash employed in the invention may be contacted with the water to achieve the desired pH modification using any convenient protocol, e.g., by placing an amount of ash into the reactor holding the water, where the amount of ash added is sufficient to raise the pH to the desired level, by flowing the water through an amount of the ash, e.g., in the form of a column or bed, etc.

In certain embodiments where the pH is not raised to a level of 12 or higher, the fly ash employed in the method, e.g., as described below, may not dissolve but instead will remain as a particulate composition. This un-dissolved ash may be separated from the remainder of the reaction product, e.g., filtered out, for a subsequent use. Alternatively, the water may be flowed through an amount of ash that is provided in an immobilized configuration, e.g., in a column or analogous structure, which provides for flow through of a liquid through the ash but does not allow ash solid to flow out of the structure with the liquid. This embodiment does not require separation of un-dissolved ash from the product liquid. In yet other embodiments where the pH exceeds 12, the ash dissolved and provides for pozzolanic products, e.g., as described in greater detail elsewhere.

In embodiments of the invention where ash is utilized in the precipitation process, the ash may first be removed from the flue gas by means such as electrostatic precipitation, or may be utilized directly via the flue gas. The use of ash in embodiments of the invention may provide reactants such as alumina or silica in addition to raising the pH.

In certain embodiments of the invention, slag is employed as a pH modifying agent, e.g., to increase the pH of the $CO_2$ charged water. The slag may be used as a as the sole pH modifier or in conjunction with one or more additional pH modifiers, e.g., ashes, etc. Slag is generated from the processing of metals, and may contain calcium and magnesium oxides as well as iron, silicon, and aluminum compounds. In certain embodiments, the use of slag as a pH modifying material provides additional benefits via the introduction of reactive silicon and alumina to the precipitated product. Slags of interest include, but are not limited to, blast furnace slag from iron smelting, slag from electric-arc or blast furnace processing of steel, copper slag, nickel slag and phosphorus slag.

Electrochemical methods provide another means to remove protons from various species in a solution, either by removing protons from solute (e.g., deprotonation of carbonic acid or bicarbonate) or from solvent (e.g., deprotonation of hydronium or water). Deprotonation of solvent may result, for example, if proton production from $CO_2$ dissolution matches or exceeds electrochemical proton removal from solute molecules. In some embodiments, low-voltage electrochemical methods are used to remove protons, for example, as $CO_2$ is dissolved in the precipitation reaction mixture or a precursor solution to the precipitation reaction mixture (i.e., a solution that may or may not contain divalent cations). In some embodiments, $CO_2$ dissolved in an aqueous solution that does not contain divalent cations is treated by a low-voltage electrochemical method to remove protons from carbonic acid, bicarbonate, hydronium, or any species or combination thereof resulting from the dissolution of $CO_2$. A low-voltage electrochemical method operates at an average voltage of 2, 1.9, 1.8, 1.7, or 1.6 V or less, such as 1.5, 1.4, 1.3, 1.2, 1.1 V or less, such as 1 V or less, such as 0.9 V or less, 0.8 V or less, 0.7 V or less, 0.6 V or less, 0.5 V or less, 0.4 V or less, 0.3 V or less, 0.2 V or less, or 0.1 V or less. Low-voltage electrochemical methods that do not generate chlorine gas are convenient for use in systems and methods of the invention. Low-voltage electrochemical methods to remove protons that do not generate oxygen gas are also convenient for use in systems and methods of the invention. In some embodiments, low-voltage methods do not generate any gas at the anode. In some embodiments, low-voltage electrochemical methods generate hydrogen gas at the cathode and transport it to the anode where the hydrogen gas is converted to protons. Electrochemical methods that do not generate hydrogen gas may also be convenient. In some instances, electrochemical methods to remove protons do not generate any gaseous by-byproduct. Electrochemical methods for effecting proton removal are further described in U.S. patent application Ser. No. 12/344,019, filed 24 Dec. 2008; U.S. patent application Ser. No. 12/375,632, filed 23 Dec. 2008; International Patent Application No. PCT/US08/088,242, filed 23 Dec. 2008; International Patent Application No. PCT/US09/32301, filed 28 Jan. 2009; and International Patent Application No. PCT/US09/48511, filed 24 Jun. 2009, each of which are incorporated herein by reference in their entirety.

Alternatively, electrochemical methods may be used to produce caustic molecules (e.g., hydroxide) through, for example, the chlor-alkali process, or modification thereof (e.g., low-voltage modification). Electrodes (i.e., cathodes and anodes) may be present in the apparatus containing the aqueous solution or waste gas-charged (e.g., $CO_2$-charged) solution, and a selective barrier, such as a membrane, may separate the electrodes. Electrochemical systems and methods for removing protons may produce by-products (e.g., hydrogen) that may be harvested and used for other purposes. Additional electrochemical approaches that may be used in systems and methods of the invention include, but are not limited to, those described in U.S. Provisional Patent Application No. 61/081,299, filed 16 Jul. 2008, and U.S. Provisional Patent Application No. 61/091,729, the disclosures of which are incorporated herein by reference. Combinations of the above mentioned sources of proton-removing agents and methods for effecting proton removal may be employed.

In embodiments in which an electrochemical process is used to remove protons and/or to produce base, often an acid stream, such as an HCl stream, is also generated, and this stream, alone or any other convenient source of acid, or a combination thereof, may be used to enhance dissolution of, e.g., magnesium-bearing minerals such as olivine or serpentine, or sources of calcium such as cement waste. Dissolution may be further enhanced by sonication methods, which can produce localized pockets of extreme temperature and pressure, enhancing reaction rates by one hundred to over one million-fold. Such methods are known in the art.

In some embodiments the methods of the invention allow large amounts of magnesium and, in some cases, calcium, to be added to the water used in some embodiments of the invention, increasing the amount of precipitate that may be formed per unit of water in a single precipitation step, allowing surprisingly high yields of carbonate-containing precipitate when combined with methods of dissolution of $CO_2$ from an industrial source in water, e.g., seawater or other saltwater source. In some embodiments, the methods of the invention include a method of removing $CO_2$ from a gaseous source, e.g., an industrial gaseous source of $CO_2$ such as flue gas from a power plant, or such as exhaust gas from a cement plant, by performing a precipitation step on water into which $CO_2$ has been dissolved from the gaseous source of $CO_2$, where the precipitation step provides precipitate in an amount of 10 g/L or more in a single precipitation step, 15 g/L or more in a single precipitation step, 20 g/L or more in a single precipitation step, 25 g/L or more in a single precipitation step, 30 g/L or more in a single precipitation step, 40 g/L or more in a single precipitation step, 50 g/L or more in a single precipitation step, 60 g/L or more in a single precipitation step, 70 g/L or more in a single precipitation step, 80 g/L or more in a single precipitation step, 90 g/L or more in a single precipitation step, 100 g/L or more in a single precipitation step, 125 g/L or more in a single precipitation step, or 150 g/L or more in a single precipitation step.

In some embodiments, the methods of the invention include a method of removing $CO_2$ from a gaseous source, e.g., an industrial gaseous source of $CO_2$ such as flue gas from a power plant, or such as exhaust gas from a cement plant, by subjecting a water (e.g. a sea water, a brine, an absorbing solution) into which $CO_2$ has been dissolved from the gaseous source of $CO_2$ (e.g. an industrial source of carbon dioxide) to precipitation conditions, where the precipitation conditions provide precipitate in an amount of 136 ton/hour to 445 ton/hour averaged over a period of 72 hours of continuous application of the precipitation conditions.

In some embodiments, the methods of the invention include a method of removing $CO_2$ from a gaseous source, e.g., an industrial gaseous source of $CO_2$ such as flue gas from a power plant, or such as exhaust gas from a cement plant, by subjecting a water (e.g. a sea water, a brine, an absorbing solution) into which $CO_2$ has been dissolved from the gaseous source of $CO_2$ (e.g. an industrial source of carbon dioxide) to precipitation conditions, where the precipitation conditions provide precipitate in an amount of 2.6 grams of precipitate per liter of absorbing solution to 26.11 grams of precipitate per liter of absorbing solution averaged over a period of 72 hours of continuous application of the precipitation conditions. In some embodiments, the precipitation conditions provide precipitate in an amount of 5.2 grams of precipitate per liter of absorbing solution to 26.11 grams of precipitate per liter of absorbing solution averaged over a period of 72 hours of continuous application of the precipitation conditions. In some embodiments, the precipitation conditions provide precipitate in an amount of 7.83 grams of precipitate per liter of absorbing solution to 26.11 grams of precipitate per liter of absorbing solution averaged over a period of 72 hours of continuous application of the precipitation conditions, such as 9.14 to 26.11, such as 10.44 to 26.11, such as 11.75 to 26.11, such as 13.05 to 26.11, such as 14.36 to 26.11, such as 15.66 to 26.11, such as 16.97 to 26.11, such as 18.27 to 26.11, such as 19.58 to 26.11, such as 20.88 to 26.11, such as 22.19 to 26.11, such as 23.5 to 26.11, such as 24.8 to 26.11 grams of precipitate per liter of absorbing solution.

In some embodiments, the precipitate comprises magnesium carbonate; in some embodiments the precipitate comprises calcium carbonate; in some embodiments, the precipitate comprises magnesium and calcium, and/or magnesium/calcium carbonates. In some embodiments the ratio of magnesium to calcium in the precipitated material produced in a single precipitation step is at least 0.5:1, or at least 1:1, or at least 2:1, or at least 3:1, or at least 4:1, or at least 5:1, or at least 6:1, or at least 7:1, or at least 8:1, or at least 9:1, or at least 10:1. In some embodiments the ratio of magnesium to calcium in the precipitated material produced in a single precipitation step is at least 2:1. In some embodiments the ratio of magnesium to calcium in the precipitated material produced in a single precipitation step is at least 4:1. In some embodiments the ratio of magnesium to calcium in the precipitated material produced in a single precipitation step is at least 6:1. In some embodiments, the precipitate contains calcium and magnesium carbonates, and contains components that allow at least a portion of the carbon in the carbonate to be traced back to a fossil fuel origin.

In some embodiments, the precipitate comprises magnesium carbonate; in some embodiments the precipitate comprises calcium carbonate; in some embodiments, the precipitate comprises magnesium and calcium, and/or magnesium/calcium carbonates. In some embodiments the ratio of magnesium to calcium in the precipitated material produced averaged over 72 hours of application of precipitation conditions is at least 0.5:1, or at least 1:1, or at least 2:1, or at least 3:1, or at least 4:1, or at least 5:1, or at least 6:1, or at least 7:1, or at least 8:1, or at least 9:1, or at least 10:1. In some embodiments the ratio of magnesium to calcium in the precipitated material produced in averaged over 72 hours of application of precipitation conditions is at least 2:1. In some embodiments the ratio of magnesium to calcium in the precipitated material produced averaged over 72 hours of application of precipitation conditions is at least 4:1. In some embodiments the ratio of magnesium to calcium in the precipitated material produced averaged over 72 hours of application of precipitation conditions is at least 6:1. In some embodiments, the precipitate contains calcium and magnesium carbonates, and contains components that allow at least a portion of the carbon in the carbonate to be traced back to a fossil fuel origin.

As reviewed above, methods of the invention include subjecting water (which may or may have been charged in a charging reactor with $CO_2$, as described above) to precipitation conditions sufficient to produce a storage-stable precipitated carbon dioxide sequestering product. Any convenient precipitation conditions may be employed, which conditions result in the production of the desired sequestering product.

Precipitation conditions of interest include those that modulate the physical environment of the water to produce the desired precipitate product. For example, the temperature of the water may be adjusted to a level suitable for precipitation of the desired product to occur. In such embodiments, the temperature of the water may be adjusted to a value from 0° C. to 90° C., such as from 20° C. to 50° C. and including from 25° C. to 45° C. As such, while a given set of precipitation conditions may have a temperature ranging from 0° C. to 100° C., the temperature may be adjusted in certain embodiments to produce the desired precipitate. The temperature of the water may be adjusted using any convenient protocol. In some instances, the temperature is adjusted using energy generated from low or zero carbon dioxide emission sources, e.g., solar energy sources, wind energy sources, hydroelectric energy sources, geothermal energy sources, from the waste heat of the flue gas which can range up to 500° C. when heating is needed, etc.

While the pH of the water may range from 7 to 14 during a given precipitation process, in some instances the pH is raised to alkaline levels in order to produce the desired precipitation product. In these embodiments, the pH is raised to a level sufficient to cause precipitation of the desired $CO_2$-sequestering product, as described above. As such, the pH may be raised to 9.5 or higher, such as 10 or higher, including 10.5 or higher. Where desired, the pH may be raised to a level that minimizes if not eliminates $CO_2$ production during precipitation. For example, the pH may be raised to a value of 10 or higher, such as a value of 11 or higher. In certain embodiments, the pH is raised to between 7 and 11, such as between 8 and 11, including between 9 and 11, for example between 10 and 11. In this step, the pH may be raised to and maintained at the desired alkaline level, such that the pH is maintained at a constant alkaline level, or the pH may be transitioned or cycled between two or more different alkaline levels, as desired.

In normal seawater, 93% of the dissolved $CO_2$ is in the form of bicarbonate ions ($HCO_3^-$) and 6% is in the form of carbonate ions ($CO_3^{2-}$). When calcium carbonate precipitates from normal seawater, $CO_2$ is released. In fresh water, above pH 10.33, greater than 90% of the carbonate is in the form of carbonate ion, and no $CO_2$ is released during the precipitation of calcium carbonate. In seawater this transition occurs at a slightly lower pH, closer to a pH of 9.7. While the pH of the water employed in methods may range from 5 to 14 during a given precipitation process, in certain embodiments the pH is raised to alkaline levels in order to drive the precipitation of carbonate compounds, as well as other compounds, e.g., hydroxide compounds, as desired. In certain of these embodiments, the pH is raised to a level which minimizes if not eliminates $CO_2$ production during precipitation, causing dissolved $CO_2$, e.g., in the form of carbonate and bicarbonate, to be trapped in the carbonate compound precipitate. In these embodiments, the pH may be raised to 9 or higher, such as 10 or higher, including 11 or higher.

As summarized above, the pH of the water source, e.g., alkaline earth metal ion-containing water, is raised using any convenient approach. In certain embodiments, a pH raising agent may be employed, where examples of such agents include oxides (calcium oxide, magnesium oxide), hydroxides (e.g., potassium hydroxide, sodium hydroxide, brucite ($Mg(OH)_2$, etc.), carbonates (e.g., sodium carbonate) and the like.

As indicated above, ash (or slag in certain embodiments) is employed in certain embodiments as the sole way to modify the pH of the water to the desired level. In yet other embodiments, one or more additional pH modifying protocols is employed in conjunction with the use of ash.

Alternatively or in conjunction with the use of a pH-elevating agent (such as described above), the pH of the water (e.g., alkaline earth metal ion-containing water) source can be raised to the desired level by electrolysis of the water using an electrolytic or electrochemical protocol. Electrochemical protocols of interest include, but are not limited to, those described above as well as those described in U.S. Provisional Patent Application No. 61/081,299, filed 16 Jul. 2008 and U.S. Provisional Patent Application No. 61/091,729, filed 25 Aug. 2008, each of which is incorporated herein by reference in its entirety. Also of interest are the electrolytic approaches described in U.S. Patent Application Publication No. 2006/0185985, published 24 Aug. 2006 and U.S. Patent Application Publication No. 2008/0248350, published 9 Oct. 2008, as well as International Patent Application Publication No. WO 2008/018928, published 14 Feb. 2008, each of which is incorporated herein by reference in its entirety.

Where desired, additives other than pH elevating agents may also be introduced into the water in order to influence the nature of the precipitate that is produced. As such, certain embodiments of the methods include providing an additive in the water before or during the time when the water is subjected to the precipitation conditions. Certain calcium carbonate polymorphs can be favored by trace amounts of certain additives. For example, vaterite, a highly unstable polymorph of $CaCO_3$ that precipitates in a variety of different morphologies and converts rapidly to calcite, can be obtained at very high yields by including trace amounts of lanthanum as lanthanum chloride in a supersaturated solution of calcium carbonate. Other additives besides lanthanum that are of interest include, but are not limited to transition metals and the like. For instance, the addition of ferrous or ferric iron is known to favor the formation of disordered dolomite (protodolomite) where it would not form otherwise.

The nature of the precipitate can also be influenced by selection of appropriate major ion ratios. Major ion ratios also have considerable influence of polymorph formation. For example, as the magnesium:calcium ratio in the water increases, aragonite becomes the favored polymorph of calcium carbonate over low-magnesium calcite. At low magnesium:calcium ratios, low-magnesium calcite is the preferred polymorph.

Rate of precipitation also has a large effect on compound phase formation. The most rapid precipitation can be achieved by seeding the solution with a desired phase. Without seeding, rapid precipitation can be achieved by rapidly increasing the pH of the sea water, which results in more amorphous constituents. When silica is present, the more rapid the reaction rate, the more silica is incorporated with the carbonate precipitate. The higher the pH is, the more rapid the precipitation is, and the more amorphous the precipitate is.

Accordingly, a set of precipitation conditions to produce a desired precipitate from a water include, in certain embodiments, the water's temperature and pH, and in some instances the concentrations of additives and ionic species in the water. Precipitation conditions may also include factors such as mixing rate, forms of agitation such as ultrasonics, and the presence of seed crystals, catalysts, membranes, or substrates. In some embodiments, precipitation conditions include supersaturated conditions, temperature, pH, and/or concentration gradients, or cycling or changing any of these parameters. The protocols employed to prepare carbonate compound precipitates according to the invention may be batch or continuous protocols. It will be appreciated that precipitation conditions may be different to produce a given precipitate in a continuous flow system compared to a batch system.

In certain embodiments, contact between the water (e.g., alkaline earth metal ion-containing water) and $CO_2$ may be accomplished using any convenient protocol, (e.g., spray gun, segmented flow-tube reactor) to control the range of sizes of precipitate particles. One or more additives may be added to the metal-ion containing water source, e.g., flocculants, dispersants, surfactants, antiscalants, crystal growth retarders, sequestration agents etc, in the methods and systems of the claimed invention in order to control the range of sizes of precipitate particles.

The pH of the water may be raised using any convenient approach. Approaches of interest as described in greater detail herein include, but are not limited to: use of a pH raising agent, electrochemical approaches, using naturally alkaline water such as from an alkaline lake, etc. In some instances, a pH-raising agent may be employed, where examples of such agents include oxides (such as calcium oxide, magnesium oxide, etc.), hydroxides (such as sodium hydroxide, potassium hydroxide, and magnesium hydroxide), carbonates (such as sodium carbonate), and the like. The amount of pH elevating agent which is added to the water will depend on the particular nature of the agent and the volume of water being modified, and will be sufficient to raise the pH of the water to the desired value.

Described below are electrochemical processes and systems that may be used in embodiments of the invention. The processes and systems make use of one or more ion-selective membranes (a low-voltage system for producing hydroxide). These processes and systems are further described in International Patent Application No. PCT/US08/88242, filed 23 Dec. 2008, titled "Low-Energy Electrochemical Hydroxide System and Method," and International Patent Application No. PCT/US08/88246, filed 23 Dec. 2008, titled "Low-Energy Electrochemical Proton Transfer System and Method," each of which is incorporated herein by reference in its entirety.

Low Voltage System for Production of Hydroxide

A second set of methods and systems for removing protons from aqueous solution/producing hydroxide pertains to a low energy process for electrochemically preparing an ionic solution utilizing an ion exchange membrane in an electrochemical cell. In one embodiment, the system comprises an electrochemical system wherein an ion exchange membrane separates a first electrolyte from a second electrolyte, the first electrolyte contacting an anode and the second electrolyte contacting a cathode. In the system, on applying a voltage across the anode and cathode, hydroxide ions form at the cathode and a gas does not form at the anode.

In an another embodiment, the system comprises an electrochemical system comprising a first electrolytic cell including an anode contacting a first electrolyte, and an anion exchange membrane separating the first electrolyte from a third electrolyte; and a second electrolytic cell including a second electrolyte contacting a cathode and a cation exchange membrane separating the first electrolyte from the third electrolyte; wherein on applying a voltage across the anode and cathode, hydroxide ions form at the cathode and a gas does not form at the anode.

In one embodiment the method comprises placing an ion exchange membrane between a first electrolyte and a second electrolyte, the first electrolyte contacting an anode and the second electrolyte contacting a cathode; and migrating ions across the ion exchange membrane by applying a voltage across the anode and cathode to form hydroxide ions at the cathode without forming a gas at the anode.

In another embodiment the method comprises placing a third electrolyte between an anion exchange membrane and a cation exchange membrane; a first electrolyte between the anion exchange and an anode; and second electrolyte between the cation exchange membrane and a cathode; and migrating ions across the cation exchange membrane and the anion exchange membrane by applying a voltage to the anode and cathode to form hydroxide ions at the cathode without forming a gas at the anode.

By the methods and systems, ionic species from one solution are transferred to another solution in a low voltage electrochemical manner, thereby providing anionic solutions for various applications, including preparing a solution of sodium hydroxide for use in sequestration carbon dioxide as described herein. In one embodiment, a solution comprising OH— is obtained from salt water and used in sequestering $CO_2$ by precipitating calcium and magnesium carbonates and bicarbonates from a salt solution comprising alkaline earth metal ions as described herein.

The methods and systems in various embodiments are directed to a low voltage electrochemical system and method for generating a solution of sodium hydroxide in an aqueous solution utilizing one or more ion exchange membranes wherein, a gas is not formed at the anode and wherein hydroxyl ions are formed at the cathode. Thus, in some embodiments, hydroxide ions are formed in an electrochemical process without the formation of oxygen or chlorine gas. In some embodiments, hydroxide ions are formed in an electrochemical process where the voltage applied across the anode and cathode is less than 2.8 V, 2.7 V, 2.5 V, 2.4 V, 2.3 V, 2.2 V, 2.1 V, 2.0 V, 1.9 V, 1.8 V, 1.7 V, 1.6 V, 1.5 V, 1.4 V, 1.3 V, 1.2 V, 1.1 V, 1.0 V, 0.9 V, 0.8 V, 0.7 V, 0.6 V, 0.5 V, 0.4 V, 0.3 V, 0.2 V, or 0.1 V. In various embodiments, an ionic membrane is utilized to separate a salt water in contact with the anode, from a solution of e.g., sodium chloride in contact with the cathode. On applying a low voltage across the cathode and anode, a solution of e.g., sodium hydroxide is formed in the solution around the cathode; concurrently, an acidified solution comprising hydrochloric acid is formed in the solution around the anode. In various embodiments, a gas such as chorine or oxygen does not form at the anode.

In various embodiments, the sodium hydroxide solution is useable to sequester $CO_2$ as described herein, and the acidic solution is useable to dissolve calcium and magnesium bearing minerals to provide a calcium and magnesium ions for sequestering $CO_2$, also as described herein.

Figure 8:
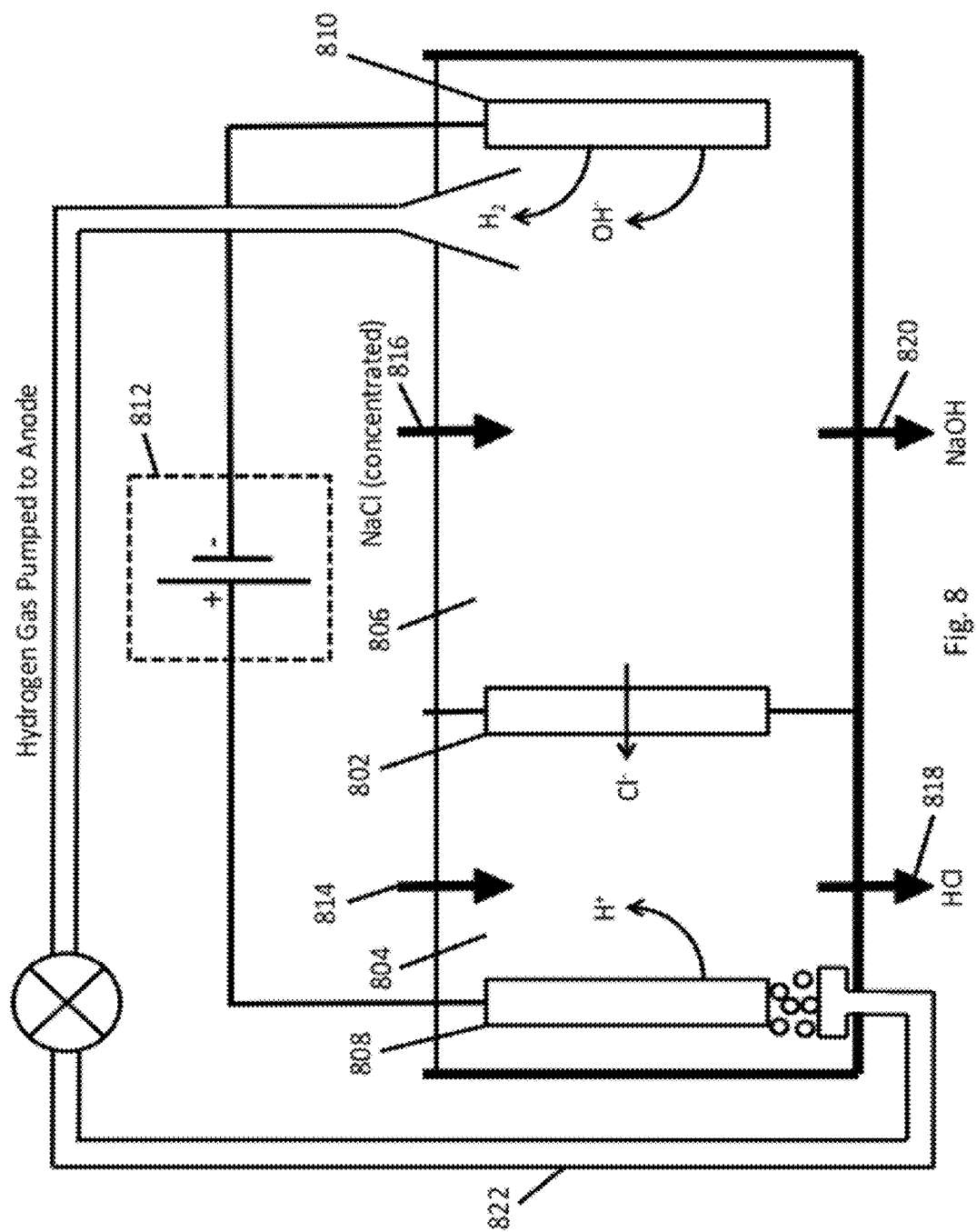
Figure 9:
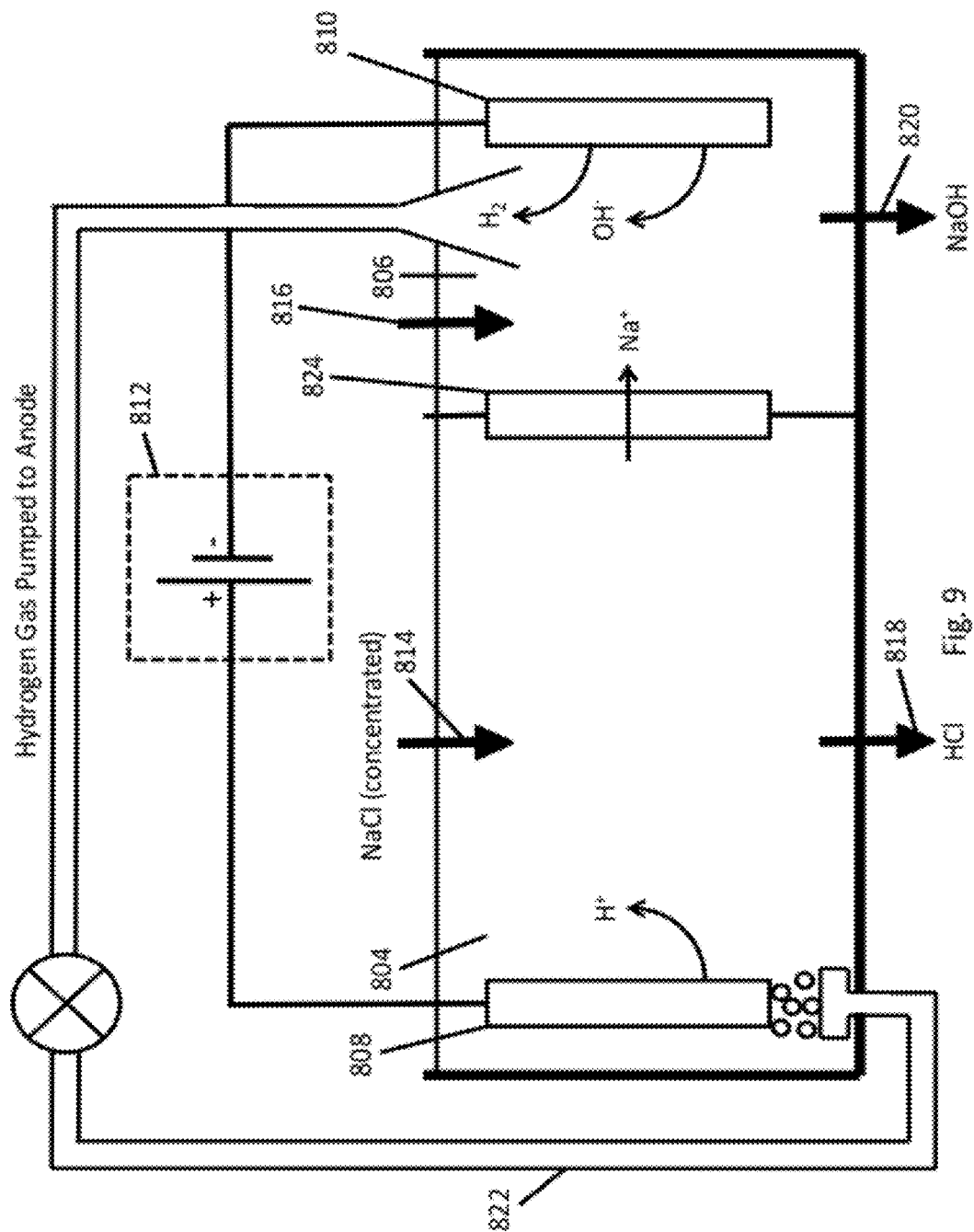
Figure 10:
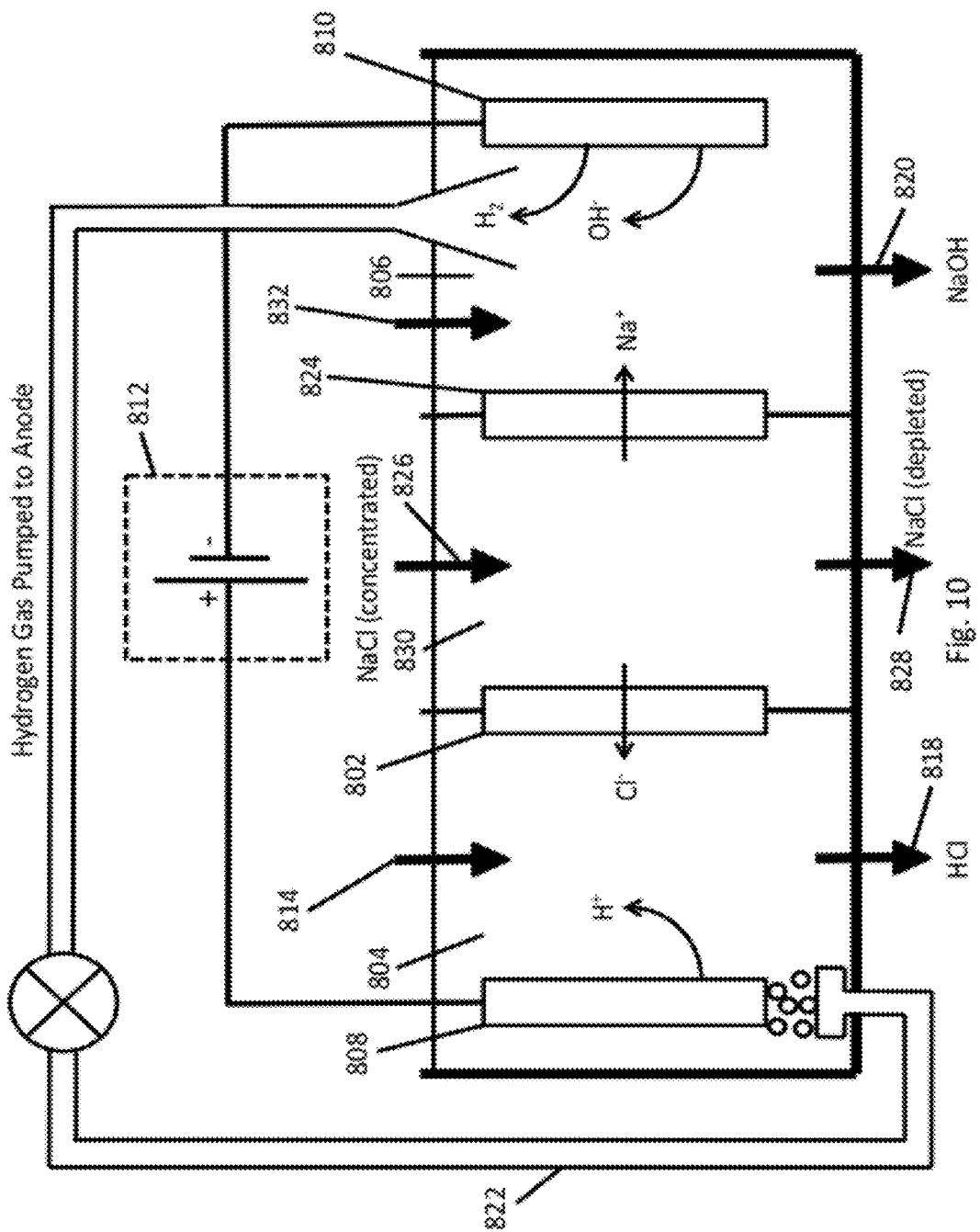

Turning to FIGS. 8-10, in various embodiments the system is adaptable for batch and continuous processes as described herein. Referring to FIGS. 8-9, in one embodiment the system includes an electrochemical cell wherein an ion exchange membrane (802, 824) is positioned to separate a first electrolyte (804) from a second electrolyte (806), the first electrolyte contacting an anode (808) and the second electrolyte contacting a cathode (810). As illustrated in FIG. 8, an anion exchange membrane (802) is utilized; in FIG. 9, a cation exchange membrane (824) is utilized.

In various embodiments as illustrated in FIGS. 8 and 9, first electrolyte (804) comprises an aqueous salt solution comprising seawater, freshwater, brine, or brackish water or the like; and second electrolyte comprises a solution substantially of sodium chloride. In various embodiments, second (806) electrolyte may comprise seawater or a concentrated solution of sodium chloride. In various embodiments anion exchange membrane (802) and cation exchange membrane (824) comprise a conventional ion exchange membranes suitable for use in an acidic and/or basic solution at operating temperatures in an aqueous solution up to 100° C. As illustrated in FIGS. 8 and 9, first and second electrolytes are in contact with the anode and cathode to complete an electrical circuit that includes voltage or current regulator (812). The current/voltage regulator is adaptable to increase or decrease the current or voltage across the cathode and anode in the system as desired.

With reference to FIGS. 8 and 9, in various embodiments, the electrochemical cell includes first electrolyte inlet port (814) adaptable for inputting first electrolyte (804) into the system and in contact with anode (808). Similarly, the cell includes second electrolyte inlet port (816) for inputting second electrolyte (806) into the system and in contact with cathode (810). Additionally, the cell includes outlet port (818) for draining first electrolyte from the cell, and outlet port (820) for draining second electrolyte from the cell. As will be appreciated by one ordinarily skilled, the inlet and outlet ports are adaptable for various flow protocols including batch flow, semi-batch flow, or continuous flow. In alternative embodiments, the system includes a duct (822) for directing gas to the anode; in various embodiments the gas comprises hydrogen formed at the cathode (810).

With reference to FIG. 8 where an anion membrane (802) is utilized, upon applying a low voltage across the cathode (810) and anode (808), hydroxide ions form at the cathode (810) and a gas does not form at the anode (808). Further, where second electrolyte (806) comprises sodium chloride, chloride ions migrate into the first electrolyte (804) from the second electrolyte (806) through the anion exchange membrane (802); protons form at the anode (808); and hydrogen gas forms at the cathode (810). As noted above, a gas e.g., oxygen or chlorine does not form at the anode (808).

With reference to FIG. 9 where a cation membrane (824) is utilized, upon applying a low voltage across the cathode (810) and anode (808), hydroxide ions form at the cathode (810) and a gas does not form at the anode (808). In various embodiments cation exchange membrane (824) comprises a conventional cation exchange membrane suitable for use with an acidic and basic solution at operating temperatures in an aqueous solution up to 100° C. As illustrated in FIG. 9, first and second electrolytes are in contact with the anode and cathode to complete an electrical circuit that includes voltage and/or current regulator (812). The voltage/current regulator is adaptable to increase or decrease the current or voltage across the cathode and anode in the system as desired. In the system as illustrated in FIG. 9 wherein second electrolyte (806) comprises sodium chloride, sodium ions migrate into the second electrolyte (806) from the first electrolyte (804) through the cation exchange membrane (824); protons form at the anode (808); and hydrogen gas forms at the cathode (810). As noted above, a gas e.g., oxygen or chlorine does not form at the anode (808).

As can be appreciated by one ordinarily skilled in the art, and with reference to FIG. 8 in second electrolyte (806) as hydroxide ions from the anode (810) and enter in to the second electrolyte (806) concurrent with migration of chloride ions from the second electrolyte, an aqueous solution of sodium hydroxide will form in second electrolyte (806). Consequently, depending on the voltage applied across the system and the flow rate of the second electrolyte (806) through the system, the pH of the second electrolyte is adjusted. In one embodiment, when a potential of 0.1 V or less, 0.2 V or less, 0.3 V or less, 0.4 V or less, 0.5 V or less, 0.6 V or less, 0.7 V or less, 0.8 V or less, 0.9 V or less, 1.0 V or less, 1.1 V or less, 1.2 V or less, 1.3 V or less, 01.4 V or less, 1.5 V or less, 1.6 V or less, 1.7 V or less, 1.8 V or less, 1.9 V or less, or 2.0 V or less, is applied across the anode and cathode, the pH of the second electrolyte solution increased; in another embodiment, when a volt of 0.1 V to 2.0 V is applied across the anode and cathode the pH of the second electrolyte increased; in yet another embodiment, when a voltage of 0.1 V to 1 V is applied across the anode and cathode the pH of the second electrolyte solution increased. Similar results are achievable with voltages of 0.1 V to 0.8 V; 0.1 V to 0.7 V; 0.1 V to 0.6 V; 0.1 V to 0.5 V; 0.1 V to 0.4 V; and 0.1 V to 0.3 V across the electrodes. Exemplary results achieved in accordance with the system are summarized in Table 2.

TABLE 2

Low energy electrochemical method and system.

| Volt across Electrodes | Time (sec) | Initial pH at Anode | End pH at Anode | Initial pH at Cathode | End pH at Cathode |
|---|---|---|---|---|---|
| 0.6 | 2000 | 6.7 | 3.8 | 6.8 | 10.8 |
| 1.0 | 2000 | 6.6 | 3.5 | 6.8 | 11.1 |

In this example, both the anode and the cathode comprise platinum, and the first and second electrolytes comprise a solution of sodium chloride.

Similarly, with reference to FIG. 9, in second electrolyte (806) as hydroxide ions from the anode (810) enter into the solution concurrent with migration of sodium ions from the first electrolyte to the second electrolyte, increasingly an aqueous solution of sodium hydroxide will form in second electrolyte (806). Depending on the voltage applied across the system and the flow rate of the second electrolyte through the system, the pH of the solution will be adjusted. In one embodiment, when a volt of 0.1 V or less, 0.2 V or less, 0.3 V or less, 0.4 V or less, 0.5 V or less, 0.6 V or less, 0.7 V or less, 0.8 V or less, 0.9 V or less, 1.0 V or less, 1.1 V or less, 1.2 V or less, 1.3 V or less, 1.4 V or less, 1.5 V or less, 1.6 V or less, 1.7 V or less, 1.8 V or less, 1.9 V or less, or 2.0 V or less is applied across the anode and cathode, the pH of the second electrolyte solution increased; in another embodiment, when a volt of 0.1 V to 2.0 V is applied across the anode and cathode the pH of the second electrolyte increased; in yet another embodiment, when a voltage of 0.1 V to 1 V is applied across the anode and cathode the pH of the second electrolyte solution increased. Similar results are achievable with voltages of 0.1 V to 0.8 V; 0.1 V to 0.7 V; 0.1 V to 0.6 V; 0.1 V to 0.5 V; 0.1 V to 0.4 V; and 0.1 V to 0.3 V across the electrodes. In one embodiment, a volt of 0.6 V or less is applied across the anode and cathode; in another embodiment, a volt of 0.1 V to 0.6 V or less is applied across the anode and cathode; in yet another embodiment, a voltage of 0.1 to 1 V or less is applied across the anode and cathode.

In various embodiments and with reference to FIGS. 8-10, hydrogen gas formed at the cathode (810) is directed to the anode (808) where, without being bound to any theory, it is believed that the gas is adsorbed and/or absorbed into the anode and subsequently forms protons at the anode. Accordingly, as can be appreciated, with the formation of protons at the anode and migration of e.g., chloride ions into the first electrolyte (804) as in FIG. 8, or migration of e.g., sodium ions from the first electrolyte as in FIG. 10, an acidic solution comprising e.g., hydrochloric acid is obtained in the first electrolyte (804).

In another embodiment as illustrated in FIG. 10, the system comprises an electrochemical cell including anode (808) contacting first electrolyte (804) and an anion exchange membrane (802) separating the first electrolyte from a third electrolyte (830); and a second electrolytic cell comprising a second electrolyte (806) contacting a cathode (880) and a cation exchange membrane (824) separating the first electrolyte from the third electrolyte, wherein on applying a voltage across the anode and cathode, hydrogen ions form at the cathode without a gas forming at the anode. As with the system of FIGS. 8 and 9, the system of FIG. 10 is adaptable for batch and continuous processes.

In various embodiments as illustrated in FIG. 10, first electrolyte (804) and second electrolyte (806) comprise an aqueous salt solution comprising seawater, freshwater, brine, or brackish water or the like; and second electrolyte comprises a solution substantially of sodium chloride. In various embodiments, first (804) and second (806) electrolytes may comprise seawater. In the embodiment illustrated in FIG. 10, the third electrolyte (830) comprises substantially sodium chloride solution.

In various embodiments anion exchange membrane (802) comprises any suitable anion exchange membrane suitable for use with an acidic and basic solution at operating temperatures in an aqueous solution up to 100° C. Similarly, cation exchange membrane (824) comprises any suitable cation exchange membrane suitable for use with an acidic and basic solution at operating temperatures in an aqueous solution up to 100° C.

As illustrated in FIG. 10, in various embodiments first electrolyte (804) is in contact with the anode (808) and second electrolyte (806) is in contact with the cathode (810). The third electrolyte (830), in contact with the anion and cation exchange membrane, completes an electrical circuit that includes voltage or current regulator (812). The current/voltage regulator is adaptable to increase or decrease the current or voltage across the cathode and anode in the system as desired.

With reference to FIG. 10, in various embodiments, the electrochemical cell includes first electrolyte inlet port (814) adaptable for inputting first electrolyte 804 into the system; second electrolyte inlet port (816) for inputting second electrolyte (806) into the system; and third inlet port (826) for inputting third electrolyte into the system. Additionally, the cell includes outlet port (818) for draining first electrolyte; outlet port (820) for draining second electrolyte; and outlet port (828) for draining third electrolyte. As will be appreciated by one ordinarily skilled, the inlet and outlet ports are adaptable for various flow protocols including batch flow, semi-batch flow, or continuous flow. In alternative embodiments, the system includes a duct (822) for directing gas to the anode; in various embodiments the gas is hydrogen formed at the cathode (810).

With reference to FIG. 10, upon applying a low voltage across the cathode (810) and anode (808), hydroxide ions form at the cathode (810) and a gas does not form at the anode (808). Further, where third electrolyte (830) comprises sodium chloride, chloride ions migrate into the first electrolyte (804) from the third electrolyte (830) through the anion exchange membrane (802); sodium ions migrate to the second electrolyte (806) from the third electrolyte (830); protons form at the anode; and hydrogen gas forms at the cathode. As noted previously, a gas e.g., oxygen or chlorine does not form at the anode (808).

As can be appreciated by one ordinarily skilled in the art, and with reference to FIG. 10 in second electrolyte (806) as hydroxide ions from the cathode (810) enter into the solution concurrent with migration of sodium ions from the third electrolyte, increasingly an aqueous solution of sodium hydroxide will form in second electrolyte (806). Depending on the voltage applied across the system and the flow rate of the second electrolyte through the system, the pH of the solution will be adjusted. In one embodiment, when a volt of 0.1 V or less, 0.2 V or less, 0.3 V or less, 0.4 V or less, 0.5 V or less, 0.6 V or less, 0.7 V or less, 0.8 V or less, 0.9 V or less, 1.0 V or less, 1.1 V or less, 1.2 V or less, 1.3 V or less, 01.4 V or less, 1.5 V or less, 1.6 V or less, 1.7 V or less, 1.8 V or less, 1.9 V or less, or 2.0 V or less or less is applied across the anode and cathode, the pH of the second electrolyte solution increased; in another embodiment, when a volt of 0.1 to 2.0 V is applied across the anode and cathode the pH of the second electrolyte increased; in yet another embodiment, when a voltage of 0.1 V to 1 V is applied across the anode and cathode the pH of the second electrolyte solution increased. Similar results are achievable with voltages of 0.1 V to 0.8 V; 0.1 V to 0.7 V; 0.1 V to 0.6 V; 0.1 V to 0.5 V; 0.1 V to 0.4 V; and 0.1 V to 0.3 V across the electrodes. In one embodiment, a volt of 0.6 volt or less is applied across the anode and cathode; in another embodiment, a volt of 0.1 V to 0.6 V or less is applied across the anode and cathode; in yet another embodiment, a voltage of 0.1 V to 1 V or less is applied across the anode and cathode.

Similarly, with reference to FIG. 10, in first electrolyte (804) as proton form at the anode (808) and enter into the solution concurrent with migration of chloride ions from the third electrolyte to the first electrolyte, increasingly an acidic solution will form in first electrolyte (804). Depending on the voltage applied across the system and the flow rate of the second electrolyte through the system, the pH of the solution will be adjusted. In one embodiment, when a volt of 0.1 V or less, 0.2 V or less, 0.3 V or less, 0.4 V or less, 0.5 V or less, 0.6 V or less, 0.7 V or less, 0.8 V or less, 0.9 V or less, 1.0 V or less, 1.1 V or less, 1.2 V or less, 1.3 V or less, 1.4 V or less, 1.5 V or less, 1.6 V or less, 1.7 V or less, 1.8 V or less, 1.9 V or less, or 2.0 V or less is applied across the anode and cathode, the pH of the second electrolyte solution increased; in another embodiment, when a volt of 0.1 V to 2.0 V is applied across the anode and cathode the pH of the second electrolyte increased; in yet another embodiment, when a voltage of 0.1 V to 1 V is applied across the anode and cathode the pH of the second electrolyte solution increased. Similar results are achievable with voltages of 0.1 V to 0.8 V; 0.1 V to 0.7 V; 0.1 V to 0.6 V; 0.1 V to 0.5 V; 0.1 V to 0.4 V; and 0.1 V to 0.3 V across the electrodes. In one embodiment, a volt of 0.6 V or less is applied across the anode and cathode; in another embodiment, a volt of 0.1 V to 0.6 V or less is applied across the anode and cathode; in yet another embodiment, a voltage of 0.1 V to 1 V or less is applied across the anode and cathode as indicated in Table 2.

As illustrated in FIG. 10, hydrogen gas formed at the cathode (810) is directed to the anode (808) where, without being bound to any theory, it is believed that hydrogen gas is adsorbed and/or absorbed into the anode and subsequently forms protons at the anode and enters the first electrolyte (804). Also, in various embodiments as illustrated in FIGS. 8-10, a gas such as oxygen or chlorine does not form at the anode (808). Accordingly, as can be appreciated, with the formation of protons at the anode and migration of chlorine into the first electrolyte, hydrochloric acid is obtained in the first electrolyte (804).

As described with reference to FIGS. 8-9, as hydroxide ions from the anode (810) and enter in to the second electrolyte (806) concurrent with migration of chloride ions from the second electrolyte, an aqueous solution of sodium hydroxide will form in second electrolyte (806). Consequently, depending on the voltage applied across the system and the flow rate of the second electrolyte (806) through the system, the pH of the second electrolyte is adjusted. In one embodiment, when a volt of 0.1 V or less, 0.2 V or less, 0.3 V or less, 0.4 V or less, 0.5 V or less, 0.6 V or less, 0.7 V or less, 0.8 V or less, 0.9 V or less, 1.0 V or less, 1.1 V or less, 1.2 V or less, 1.3 V or less, 1.4 V or less, 1.5 V or less, 1.6 V or less, 1.7 V or less, 1.8 V or less, 1.9 V or less, or 2.0 V or less is applied across the anode and cathode, the pH of the second electrolyte solution increased; in another embodiment, when a volt of 0.1 V to 2.0 V is applied across the anode and cathode the pH of the second electrolyte increased; in yet another embodiment, when a voltage of 0.1 V to 1 V is applied across the anode and cathode the pH of the second electrolyte solution increased. Similar results are achievable with voltages of 0.1 V to 0.8 V; 0.1 V to 0.7 V; 0.1 V to 0.6 V; 0.1 V to 0.5 V; 0.1 V to 0.4 V; and 0.1 V to 0.3 V across the electrodes. In one embodiment, when a volt of 0.6 V or less is applied across the anode and cathode, the pH of the second electrolyte solution increased; in another embodiment, when a volt of 0.1 V to 0.6 volt or less is applied across the anode and cathode the pH of the second electrolyte increased; in yet another embodiment, when a voltage of 0.1 V to 1 V or less is applied across the anode and cathode the pH of the second electrolyte solution increased.

Optionally, a gas including $CO_2$ is dissolved into the second electrolyte solution by bubbling the gas into the second electrolyte solution 806 as describe above. In an optional step the resulting second electrolyte solution is used to precipitate a carbonate and/or bicarbonate compounds such as calcium carbonate or magnesium carbonate and or their bicarbonates, as described herein. The precipitated carbonate compound can be used as cements and build material as described herein.

In another optional step, acidified first electrolyte solution 804 is utilized to dissolve a calcium and/or magnesium rich mineral, such as mafic mineral including serpentine or olivine for use as the solution for precipitating carbonates and bicarbonates as described herein. In various embodiments, the resulting solution can be used as the second electrolyte solution. Similarly, in embodiments where hydrochloric acid is produced in first electrolyte 804, the hydrochloric acid can be used in place of, or in addition to, the acidified second electrolyte solution.

Embodiments described above produce electrolyte solutions enriched in bicarbonate ions and carbonate ions, or combinations thereof as well as an acidified stream. The acidified stream can also find application in various chemical processes. For example, the acidified stream can be employed to dissolve calcium and/or magnesium rich minerals such as serpentine and olivine to create the electrolyte solution used in the reservoir 816 (or 832). Such an electrolyte solution can be charged with bicarbonate ions and then made sufficiently basic so as to precipitate carbonate compounds as described herein.

In some embodiments, a first electrochemical process may be used to remove protons from solution to facilitate $CO_2$ absorption, without concomitant production of hydroxide, while a second electrochemical process may be used to produce hydroxide in order to further remove protons to shift equilibrium toward carbonate and cause precipitation of carbonates. The two processes may have different voltage requirements, e.g., the first process may require lower voltage than the second, thus minimizing total overall voltage used in the process. For example, the first process may be a bielectrode process as described in U.S. patent application Ser. No. 12/344,019, filed 24 Dec. 2008, which is incorporated herein by reference in its entirety, operating at 1.0 V or less, or 0.9 V or less, or 0.8 V or less, or 0.7 V or less, or 0.6 V or less, or 0.5 V or less, or 0.4 V or less, or 0.3 V or less, or 0.2 V or less, or 0.1 V or less, while the second process may be a low-voltage hydroxide producing process as described above, operating at 1.5 V or less, or 1.4 V or less, or 1.3 V or less, or 1.2 V or less, or 1.1 V or less, 1.0 V or less, or 0.9 V or less, or 0.8 V or less, or 0.7 V or less, or 0.6 V or less, or 0.5 V or less, or 0.4 V or less, or 0.3 V or less, or 0.2V or less, or 0.1 V or less. For example, in some embodiments the first process is a bielectrode process operating at 0.6 V or less and the second process is a low-voltage hydroxide producing process operating at 1.2 V or less.

Also of interest are the electrochemical approaches described in published U.S. Patent Application Publication No. 2006/0185985, published 24 Aug. 2006; U.S. Patent Application Publication No. 2008/0248350, published 9 Oct. 2008; International Patent Application Publication No. WO 2008/018928, published 14 Feb. 2008; and International Patent Application Publication No. WO 2009/086460, published 7 Jul. 2009, each of which is incorporated herein by reference in its entirety.

Stoichiometry dictates that the production of a carbonate to be precipitated in order to sequester $CO_2$ from a source of $CO_2$ requires the removal of two protons from the initial carbonic acid that is formed when $CO_2$ is dissolved in water (see equations 1-5, above). Removal of the first proton produces bicarbonate and removal of the second produces carbonate, which may be precipitated as, e.g., a carbonate of a divalent cation, such as magnesium carbonate or calcium carbonate. The removal of the two protons requires some process or combination of processes that typically require energy. For example, if the protons are removed through the addition of sodium hydroxide, the source of renewable sodium hydroxide is typically the chloralkali process, which uses an electrochemical process requiring at least 2.8 V and a fixed amount of electrons per mole of sodium hydroxide. That energy requirement may be expressed in terms of a carbon footprint, i.e., amount of carbon produced to provide the energy to drive the process.

A convenient way of expressing the carbon footprint for a given process of proton removal is as a percentage of the $CO_2$ removed from the source of $CO_2$. That is, the energy required for the removal of the protons may be expressed in terms of $CO_2$ emission of a conventional method of power generation to produce that energy, which may in turn be expressed as a percent of the $CO_2$ removed from the source of $CO_2$. For convenience, and as a definition in this aspect of the invention, the "$CO_2$ produced" in such a process will be considered the $CO_2$ that would be produced in a conventional coal/steam power plant to provide sufficient energy to remove two protons. Data are publicly available for such power plants for the last several years that show tons of $CO_2$ produced per total MWh of energy produced. See, e.g., the website having the address produced by combining "http://carma." with "org/api/". For purposes of definition here, a value of 1 ton $CO_2$ per MWh will be used, which corresponds closely to typical coal-fired power plants; for example, the WA Parish plant produced 18,200,000 MWh of energy in 2000 while producing approximately 19,500,000 tons of $CO_2$ and at present produces 21,300,00 MWh of energy while producing 20,900,000 tons of $CO_2$, which average out very close to the definitional 1 ton $CO_2$ per MWh that will be used herein. These numbers can then be used to calculate the $CO_2$ production necessary to remove sufficient protons to remove $CO_2$ from a gas stream, and compare it to the $CO_2$ removed. For example, in a process utilizing the chloralkali process operating at 2.8 V to provide base, and used to sequester $CO_2$ from a coal/stem power plant, the amount of $CO_2$ produced by the power plant to supply the energy to create base by the chloralkali process to remove two protons, using the 1 ton $CO_2$/1 MWh ratio, would be well above 200% of the amount of $CO_2$ sequestered by the removal of the two protons and precipitation of the $CO_2$ in stable form. As a further condition of the definition of "$CO_2$ produced" in this aspect of the invention, no theoretical or actual calculations of reduction of the energy load due to, e.g., reuse of byproducts of the process for removing the protons (e.g., in the case of the chloralkali process, use of hydrogen produced in the process in a fuel cell or by direct combustion to produce energy) are included in the total of "$CO_2$ produced." In addition, no theoretical or actual supplementation of the power supplied by the power plant with renewable sources of energy is considered, e.g., sources of energy that produce little or no carbon dioxide, such as wind, solar, tide, hydroelectric, and the like. If the process of removing protons includes the use of a hydroxide or other base, including a naturally-occurring or stockpiled base, the amount of $CO_2$ produced would be the amount that may be stoichiometrically calculated based on the process by which the base is produced, e.g., for industrially produced base, the standard chloralkali process or other process by which the base is produced, and for natural base, the best theoretical model for the natural production of the base.

Using this definition of "$CO_2$ produced," in some embodiments the invention includes forming a stable $CO_2$-containing precipitate from a human-produced gaseous source of $CO_2$, wherein the formation of the precipitate utilizes a process for removing protons from an aqueous solution in which a portion or all of the $CO_2$ of the gaseous source of $CO_2$ is dissolved, and wherein the $CO_2$ produced by the process of removing protons is less than 100, 90, 80, 70, 65, 60, 55, 50, 45, 40, 35, 30, 25, 20, 15, 10, or 5% of the $CO_2$ removed from the gaseous source of $CO_2$ by said formation of precipitate. In some embodiments, the invention includes forming a stable $CO_2$-containing precipitate from a human-produced gaseous source of $CO_2$, wherein the formation of the precipitate utilizes a process for removing protons from an aqueous solution in which a portion or all of the $CO_2$ of the gaseous source of $CO_2$ is dissolved, and wherein the $CO_2$ produced by the process of removing protons is less than 70% of the $CO_2$ removed from the gaseous source of $CO_2$ by the formation of precipitate. In some embodiments the invention includes forming a stable $CO_2$-containing precipitate from a human-produced gaseous source of $CO_2$, wherein the formation of the precipitate utilizes a process for removing protons from an aqueous solution in which a portion or all of the $CO_2$ of the gaseous source of $CO_2$ is dissolved, and wherein the $CO_2$ produced by the process of removing protons is less than 50% of the $CO_2$ removed from the gaseous source of $CO_2$ by the formation of precipitate. In some embodiments the invention includes forming a stable $CO_2$-containing precipitate from a human-produced gaseous source of $CO_2$, wherein the formation of the precipitate utilizes a process for removing protons from an aqueous solution in which a portion or all of the $CO_2$ of the gaseous source of $CO_2$ is dissolved, and wherein the $CO_2$ produced by the process of removing protons is less than 30% of the $CO_2$ removed from the gaseous source of $CO_2$ by the formation of precipitate. In some embodiments, the process of removing protons is a process, such as an electrochemical process as described herein, that removes protons without producing a base, e.g., hydroxide. In some embodiments, the process of removing protons is a process, such as an electrochemical process as described herein, that removes protons by producing a base, e.g., hydroxide. In some embodiments, the process is a combination of a process, such as an electrochemical process as described herein, that removes protons without producing a base, e.g., hydroxide, and a process, such as an electrochemical process as described herein, that removes protons by producing a base, e.g., hydroxide. In some embodiments, the process of proton removal comprises an electrochemical process, either removes protons directly (e.g., direct removal of protons) or indirectly (e.g., production of hydroxide). In some embodiments a combination of processes, e.g., electrochemical processes is used, where a first process, e.g., electrochemical process, removes protons directly and a second process, e.g., electrochemical process, removes protons indirectly (e.g., by production of hydroxide).

In some instances, precipitation of the desired product following $CO_2$ charging (e.g., as described above) occurs without addition of a source divalent metal ions. As such, after the water is charged in a charging reactor with $CO_2$, the water is not then contacted with a source of divalent metal ions, such as one or more divalent metal ion salts, e.g., calcium chloride, magnesium chloride, sea salts, etc.

In one embodiment of the invention, a carbonate precipitation process may be employed to selectively precipitate calcium carbonate materials from the solution in order to provide the desired ratio of magnesium to calcium, followed by additional $CO_2$ charging, and in some embodiments additional Mg ion charging, and a final carbonate precipitation step. This embodiment is useful in utilizing concentrated waters such as desalination brine, wherein the cation content is sufficiently high that addition of more Mg ions is difficult. This embodiment is also useful in solutions of any concentration where two different products are desired to be produced—a primarily calcium carbonate material, and then a magnesium carbonate dominated material.

The yield of product from a given precipitation reaction may vary depending on a number of factors, including the specific type of water employed, whether or not the water is supplemented with divalent metal ions, the particular precipitation protocol employed, etc. In some instances, the precipitate protocols employed to precipitate the product are high yield precipitation protocols. In these instances, the amount of product produced from a single precipitation reaction (by which is meant a single time that that the water is subjected to precipitation conditions, such as increasing the pH to a value of 9.5 or higher, such as 10 or higher as reviewed above in greater detail) may be 5 g or more, such as 10 g or more, 15 g or more, 20 g or more, 25 g or more, 30 g or more, 35 g or more, 40 g or more, 45 g or more, 50 g or more, 60 g or more, 70 g or more, 80 g or more, 90 g or more, 100 g or more, 120 g or more, 140 g or more, 160 g or more, 180 g or more, 200 g or more of the storage-stable carbon dioxide sequestering product for every liter of water. In some instances, the amount of product produced for every liter of water ranges from 5 to 200 g, such as 10 to 100 g, including 20 to 100 g. In instances where the divalent metal ion content of the water is not supplemented prior to subjecting the water to precipitate conditions (for example where the water is seawater and the seawater is not supplemented with a source of divalent metal ion or ions), the yield of product may range from 5 to 20 g product per liter of water, such as 5 to 10, e.g., 6 to 8, g product per liter of water. In other instances where the water is supplemental with a source of divalent metal ions, such as magnesium and/or calcium ions, the yield of product may be higher, 2-fold higher, 3-fold higher, 5-fold higher, 10-fold higher, 20-fold higher or more, such that the yield of such processes may range in some embodiments from 10 to 200, such as 50 to 200 including 100 to 200 g product for every liter of water subjected to precipitation conditions.

The yield of product from a given precipitation reaction may vary depending on a number of factors, including the specific type of water employed, whether or not the water is supplemented with divalent metal ions, the particular precipitation protocol employed, etc. In some instances, the precipitate protocols employed to precipitate the product are high yield precipitation protocols. In these instances, the amount of product produced from per liter of water (i.e. absorbing solution) averaged over 72 hours of continuous operation (i.e. application of the precipitation conditions to the water or absorbing solution) may be 5 g or more, such as 10 g or more, 15 g or more, 20 g or more, 25 g or more, 30 g or more, 35 g or more, 40 g or more, 45 g or more, 50 g or more, 60 g or more, 70 g or more, 80 g or more, 90 g or more, 100 g or more, 120 g or more, 140 g or more, 160 g or more, 180 g or more, 200 g or more of the storage-stable carbon dioxide sequestering product for every liter of water. In some instances, the amount of product produced for every liter of water ranges from 5 to 200 g, such as 10 to 100 g, including 20 to 100 g averaged 72 hours of continuous operation. In instances where the divalent metal ion content of the water is not supplemented prior to subjecting the water to precipitate conditions (for example where the water is seawater and the seawater is not supplemented with a source of divalent metal ion or ions), the yield of product may range from 5 to 20 g product per liter of water, such as 5 to 10, e.g., 6 to 8, g product per liter of water as averaged over 72 hours of continuous operation. In other instances where the water is supplemental with a source of divalent metal ions, such as magnesium and/or calcium ions, the yield of product may be higher, 2-fold higher, 3-fold higher, 5-fold higher, 10-fold higher, 20-fold higher or more, such that the yield of such processes may range in some embodiments from 10 to 200, such as 50 to 200 including 100 to 200 g product for every liter of water subjected to precipitation conditions averaged over 72 hours of continuous operation.

In certain embodiments, a multi-step process is employed. In these embodiments, a carbonate precipitation process may be employed to selectively precipitate calcium carbonate materials from the solution, followed by additional steps of $CO_2$ charging and subsequent carbonate precipitation. The steps of additional $CO_2$ charging and carbonate precipitation can in some cases be repeated one, two, three, four, five, six, seven, eight, nine, ten, or more times, precipitating additional amounts of carbonate material with each cycle. In some cases, the final pH ranges from pH 8 to pH 10, such as from pH 9 to pH 10, including from pH 9.5 to pH 10, for example, from pH 9.6 to pH 9.8.

In certain embodiments, two or more reactors may be used to carry out the methods described herein. In these embodiments, the method may include a first reactor and a second reactor. In these cases, the first reactor is used for contacting the initial water with a magnesium ion source and for charging the initial water with $CO_2$, as described above. The water may be agitated to facilitate the dissolution of the magnesium ion source and to facilitate contact of the initial water with the $CO_2$. In some cases, before the $CO_2$ charged water is transferred to the second reactor, agitation of the $CO_2$ charged water is stopped, such that undissolved solids may settle by gravity. The $CO_2$ charged water is then transferred from the first reactor to the second reactor. After transferring the $CO_2$ charged water to the second reactor, the step of carbonate precipitation may be performed, as described herein.

In certain embodiments, a multi-step process, as described above, employing two or more reactors, as described above, can be used to carry out the methods described herein. In these embodiments, a first reactor is used for contacting the initial water with a magnesium ion source and for charging the initial water with $CO_2$, as described above. Subsequently, the $CO_2$ charged water is transferred from the first reactor to a second reactor for the carbonate precipitation reaction. In certain embodiments, one or more additional steps of $CO_2$ charging and subsequent carbonate precipitation may be performed in the second reactor, as described above.

In certain embodiments, precipitation conditions can be used that favor the formation of particular morphologies of carbonate compound precipitates. For instance, precipitation conditions can be used that favor the formation of amorphous carbonate compound precipitates over the formation of crystalline carbonate compound precipitates. In these cases, in addition to contacting the initial water with a magnesium ion source and charging the initial water with $CO_2$, as described above, a precipitation facilitator may be added. In these cases, the precipitation facilitator facilitates the formation of carbonate compound precipitates at lower pH's sufficient for nucleation, but insufficient for crystal formation and growth. Examples of precipitation facilitators include, but are not limited to, aluminum sulfate $(Al_2SO_4)_3$. In certain embodiments, the amount of precipitation facilitator added ranges from 1 ppm to 1000 ppm, such as from 1 ppm to 500, including from 10 ppm to 200 ppm, for example from 25 ppm to 75 ppm. Additionally, the pH of the water can be maintained between 6 and 8, such as between 7 and 8, during carbonate compound precipitation formation by alternating $CO_2$ charging and subsequent carbonate precipitation, as described above.

Alternatively, in yet other embodiments, precipitation conditions can be used that favor the formation of crystalline carbonate compound precipitates over the formation of amorphous carbonate compound precipitates.

Further details regarding specific precipitation protocols employed in certain embodiments of the invention are provided below with respect to the description of the figures of the application.

Following production of the precipitate product from the water, a composition is produced which includes precipitated product and a mother liquor (i.e., the remaining liquid from which the precipitated product was produced). This composition may be a slurry of the precipitate and mother liquor.

As summarized above, in sequestering carbon dioxide, the precipitated product is disposed of in some manner following its production. The phrase "disposed of" means that the product is either placed at a storage site or employed for a further use in another product, i.e., a manufactured or man-made item, where it is stored in that other product at least for the expected lifetime of that other product. In some instances, this disposal step includes forwarding the slurry composition described above to a long-term storage site. The storage site could be an above ground site, a below ground site or an underwater site. In these embodiments, following placement of the slurry at the storage site, the supernatant component of the slurry may naturally separate from the precipitate, e.g., via evaporation, dispersal, etc.

Where desired, the resulting precipitated product may be separated from the supernatant component of the slurry. Separation of the precipitated product may be achieved using any of a number of convenient approaches. As detailed further herein, liquid-solid separators such as Epuramat's Extrem-Separator ("ExSep") liquid-solid separator, Xerox PARC's spiral concentrator, or a modification of either of Epuramat's ExSep or Xerox PARC's spiral concentrator, are useful in some embodiments. Separation may also be achieved by drying the precipitated product to produce a dried precipitated product. Drying protocols of interest include filtering the precipitate from the mother liquor to produce a filtrate and then air-drying the filtrate. Where the filtrate is air dried, air-drying may be at a temperature ranging from −70 to 120° C., as desired. In some instances, drying may include placing the slurry at a drying site, such as a tailings pond, and allowing the liquid component of the precipitate to evaporate and leave behind the desired dried product. Also of interest are freeze-drying (i.e., lyophilization) protocols, where the precipitate is frozen, the surrounding pressure is reduced and enough heat is added to allow the frozen water in the material to sublime directly from the frozen precipitate phase to gas. Yet another drying protocol of interest is spray drying, where the liquid containing the precipitate is dried by feeding it through a hot gas, e.g., where the liquid feed is pumped through an atomizer into a main drying chamber and a hot gas is passed as a co-current or counter-current to the atomizer direction.

Where the precipitated product is separated from the mother liquor, the resultant precipitate may be disposed of in a variety of different ways, as further elaborated below. For example, the precipitate may be employed as a component of a building material, as reviewed in greater detail below. Alternatively, the precipitate may be placed at a long-term storage site (sometimes referred to in the art as a carbon bank), where the site may be above ground site, a below ground site or an underwater site. Further details regarding disposal protocols of interest are provided below.

The resultant mother liquor may also be processed as desired. For example, the mother liquor may be returned to the source of the water, e.g., ocean, or to another location. In certain embodiments, the mother liquor may be contacted with a source of $CO_2$, e.g., as described above, to sequester further $CO_2$. For example, where the mother liquor is to be returned to the ocean, the mother liquor may be contacted with a gaseous source of $CO_2$ in a manner sufficient to increase the concentration of carbonate ion present in the mother liquor. Contact may be conducted using any convenient protocol, such as those described above. In certain embodiments, the mother liquor has an alkaline pH, and contact with the $CO_2$ source is carried out in a manner sufficient to reduce the pH to a range between 5 and 9, e.g., 6 and 8.5, including 7.5 to 8.2.

The methods of the invention may be carried out at land or sea, e.g., at a land location where a suitable water is present at or is transported to the location, or in the ocean or other body of alkali-earth-metal-containing water, be that body naturally occurring or manmade. In certain embodiments, a system is employed to perform the above methods, where such systems include those described below in greater detail.

The above portion of this application provides an overview of various aspects of the methods of the invention. Certain embodiments of the invention are now reviewed further in greater detail in terms of the certain figures of the invention.

Figure 6A:
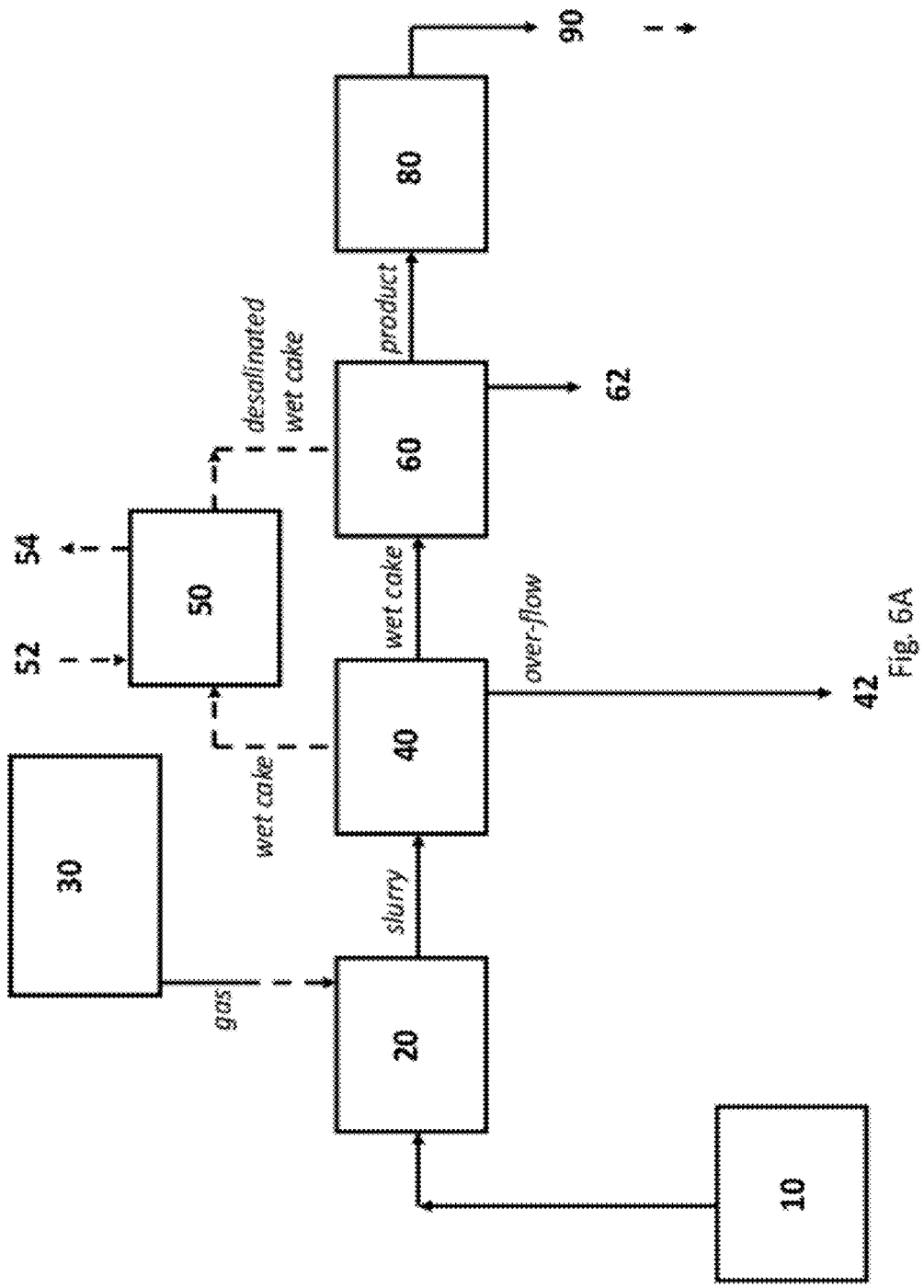

FIG. 6A provides a schematic flow diagram of a carbon dioxide sequestration process that may be implemented in a system, where the system may be manifested as a stand-alone plant or as an integrated part of another type of plant, such as a power generation plant, a cement production plant, etc. In FIG. 6A, water 10 is delivered to a precipitation reactor 20, e.g., via a pipeline or other convenient manner, and subjected to carbonate mineral precipitation conditions. The water employed in the process illustrated in FIG. 6A is one that includes, for example, one or more alkaline earth metal ions such as $Ca^{2+}$ and $Mg^{2+}$. In certain embodiments of the invention, the water of interest is one that includes calcium in amounts ranging from 50 ppm to 20,000 ppm, such as 200 ppm to 5000 ppm and including 400 ppm to 1000 ppm. Also of interest are waters that include magnesium in amounts ranging from 50 ppm to 40,000 ppm, such as 100 ppm to 10,000 ppm and including 500 ppm to 2500 ppm. In embodiments of the invention, the water (e.g., alkaline earth metal ion-containing water) is a saltwater. As reviewed above, salt-waters of interest include a number of different types of aqueous fluids other than fresh water, such as brackish water, sea water and brine (including man-made brines, for example geothermal plant wastewaters, desalination waste waters, etc., as well as naturally occurring brines as described herein), as well as other salines having a salinity that is greater than that of freshwater. Brine is water saturated or nearly saturated with salt and has a salinity that is 50 ppt (parts per thousand) or greater. Brackish water is water that is saltier than fresh water, but not as salty as seawater, having a salinity ranging from 0.5 to 35 ppt. Seawater is water from a sea or ocean and has a salinity ranging from 35 to 50 ppt. Freshwater is water that has a salinity of less than 5 ppt dissolved salts. Saltwaters of interest may be obtained from a naturally occurring source, such as a sea, ocean, lake, swamp, estuary, lagoon, etc., or a man-made source, as desired.

As reviewed above, waters of interest also include fresh-waters. In certain embodiments, the water employed in the invention may be a mineral rich, e.g., calcium and/or magnesium rich, freshwater source. In some embodiments, fresh-waters, such as calcium rich waters may be combined with magnesium silicate minerals, such as olivine or serpentine, in a solution that has become acidic due to the addition of carbon dioxide from carbonic acid, which dissolves the magnesium silicate, leading to the formation of calcium magnesium silicate carbonate compounds. In certain embodiments, the water source can be freshwater wherein metal-ions, e.g., sodium, potassium, calcium, magnesium, etc. are added. Metal-ions can be added to the freshwater source using any convenient protocol, e.g., as a solid, aqueous solution, suspension etc.

In certain embodiments, the water may be obtained from the industrial plant that is also providing the gaseous waste stream. For example, in water cooled industrial plants, such as seawater cooled industrial plants, water that has been employed by the industrial plant may then be sent to the precipitation system and employed as the water in the precipitation reaction. Where desired, the water may be cooled prior to entering the precipitation reactor. Such approaches may be employed, e.g., with once-through cooling systems. For example, a city or agricultural water supply may be employed as a once-through cooling system for an industrial plant. The water from the industrial plant may then be employed in the precipitation protocol, where output water has a reduced hardness and greater purity. Where desired, such systems may be modified to include security measures, e.g., to detect tampering (such as addition of poisons) and coordinated with governmental agencies, e.g., Homeland Security or other agencies. Additional tampering or attack safeguards may be employed in such embodiments.

As shown in FIG. 6A, an industrial plant gaseous waste stream 30 is contacted with the water at precipitation step 20 to produce a $CO_2$ charged water (which may occur in a charging reactor in certain embodiments). The water may be an absorbing solution, where the absorbing solution allows for incorporation of carbon dioxide and/or other components from a gas into the absorbing solution. The absorbing solution may be a salt water, (e.g. sea water and/or brine), or an alkaline solution. The absorbing solution may include solid particulates and may be described as a slurry. By $CO_2$ charged water is meant water that has had $CO_2$ gas contacted with it, where $CO_2$ molecules have combined with water molecules to produce, e.g., carbonic acid, bicarbonate and carbonate ion. Charging water in this step results in an increase in the "$CO_2$ content" of the water, e.g., in the form of carbonic acid, bicarbonate and carbonate ion, and a concomitant decrease in the amount of $CO_2$ of the waste stream that is contacted with the water. The $CO_2$ charged water is acidic in some embodiments, having a pH of 6.0 or less, such as 4.0 or less, and including 3.0 and less. In certain embodiments, the amount of $CO_2$ of the gas that is used to charge the water decreases by 85% or more, such as 99% or more as a result of this contact step, such that the methods remove 50% or more, such as 75% or more, e.g., 85% or more, including 99% or more of the $CO_2$ originally present in the gaseous waste stream that is contacted with the water. Contact protocols of interest include, but are not limited to: direct contacting protocols, e.g., bubbling the gas through the volume of water, concurrent contacting means, i.e., contact between unidirectionally flowing gaseous and liquid phase streams, countercurrent means, i.e., contact between oppositely flowing gaseous and liquid phase streams, and the like. The gaseous stream may contact the water source vertically, horizontally, or at some other angle.

The $CO_2$ may be contacted with the water source from one or more of the following positions: below, above, or at the surface level of the water (e.g., alkaline earth metal ion-containing water). Contact may be accomplished through the use of infusers, bubblers, fluidic Venturi reactor, sparger, gas filter, spray, tray, catalytic bubble column reactors, draft-tube type reactors or packed column reactors, and the like, as may be convenient. Where desired, two or more different $CO_2$ charging reactors (such as columns or other types of reactor configurations) may be employed, e.g., in series or in parallel, such as three or more, four or more, etc. In certain embodiments, various means, e.g., mechanical stirring, electromagnetic stirring, spinners, shakers, vibrators, blowers, ultrasonication, to agitate or stir the reaction solution are used to increase the contact between $CO_2$ and the water source.

In the embodiment depicted in FIG. 6A, the water (e.g., water comprising alkaline earth metal ions) from the water source 10 is first charged with $CO_2$ to produce $CO_2$ charged water, which $CO_2$ is then subjected to carbonate mineral precipitation conditions. As depicted in FIG. 6A, a $CO_2$ gaseous stream 30 is contacted with the water at precipitation step 20. The provided gaseous stream 30 is contacted with a suitable water at precipitation step 20 to produce a $CO_2$ charged water. By $CO_2$ charged water is meant water that has had $CO_2$ gas contacted with it, where $CO_2$ molecules have combined with water molecules to produce, e.g., carbonic acid, bicarbonate and carbonate ion. Charging water in this step results in an increase in the "$CO_2$ content" of the water, e.g., in the form of carbonic acid, bicarbonate and carbonate ion, and a concomitant decrease in the p$CO_2$ of the waste stream that is contacted with the water. The $CO_2$ charged water can be acidic, having a pH of 6 or less, such as 5 or less and including 4 or less. In some embodiments, the $CO_2$ charged water is not acidic, e.g., having a pH of 7 or more, such as a pH of 7-10, or 7-9, or 7.5-9.5, or 8-10, or 8-9.5, or 8-9. In certain embodiments, the concentration of $CO_2$ of the gas that is used to charge the water is 10% or higher, 25% or higher, including 50% or higher, such as 75% or higher.

$CO_2$ charging and carbonate mineral precipitation may occur in the same or different reactors of the system. As such, charging and precipitation may occur in the same reactor of a system, e.g., as illustrated in FIG. 6A at step 20, according to certain embodiments of the invention. In yet other embodiments of the invention, these two steps may occur in separate reactors, such that the water is first charged with $CO_2$ in a charging reactor and the resultant $CO_2$ charged water is then subjected to precipitation conditions in a separate reactor. Further reactors may be used to, e.g., charge the water with desired minerals.

Contact of the water with the source $CO_2$ may occur before and/or during the time when the water is subjected to $CO_2$ precipitation conditions. Accordingly, embodiments of the invention include methods in which the volume of water is contacted with a source of $CO_2$ prior to subjecting the volume of water (e.g., alkaline earth metal ion-containing water) to mineral precipitation conditions. Embodiments of the invention also include methods in which the volume of water is contacted with a source of $CO_2$ while the volume of water is being subjected to carbonate compound precipitation conditions. Embodiments of the invention include methods in which the volume of water is contacted with a source of a $CO_2$ both prior to subjecting the volume of water (e.g., alkaline earth metal ion-containing water) to carbonate compound precipitation conditions and while the volume of water is being subjected to carbonate compound precipitation conditions. In some embodiments, the same water may be cycled more than once, wherein a first cycle of precipitation removes primarily calcium carbonate and magnesium carbonate minerals and leaves water to which metal ions, for example, alkaline earth metal ions, may be added, and that may have more $CO_2$ cycled through it, precipitating more carbonate compounds.

Regardless of when the $CO_2$ is contacted with the water, in some instances when the $CO_2$ is contacted with the water, the water is not exceedingly alkaline, such that the water contacted with the $CO_2$ may have a pH of 10 or lower, such as 9.5 or lower, including 9 or lower and even 8 or lower. In some embodiments, the water that is contacted with the $CO_2$ is not a water that has first been made basic from an electrochemical protocol. In some embodiments, the water that is contacted with the $CO_2$ is not a water that has been made basic by addition of hydroxides, such as sodium hydroxide. In some embodiments, the water is one that has been made only slightly alkaline, such as by addition of an amount of an oxide, such as calcium oxide or magnesium oxide.

As mentioned above, one of the parameters affecting the efficiency of incorporation of gas into a liquid is the solution chemistry of the liquid. Gases will have different solubility specific to a solution based upon the ionic content and the pH of the solution. For example, carbon dioxide gas incorporates more readily into solutions with basic pH, such as an aqueous solution of NaOH, than into solutions with neutral or acid pH. In some embodiments, the gas is the flue gas of an industrial process. In some embodiments, that industrial process comprises the burning of fossil fuels. In some embodiments, the gas comprises $CO_2$. In these embodiments, the method and apparatus may be tailored to optimize the incorporation of $CO_2$ gas into the liquid from the gas. In such embodiments, conditions are provided (e.g. solution chemistry, surface area to volume ratio, liquid flow rate to gas flow rate ratio (L/G), residence time) which allow at least 10 grams of $CO_2$ to be absorbed per 100 ml of the liquid. In some embodiments, conditions are provided that allow at least 20 grams of $CO_2$ to be absorbed per 100 ml of the liquid, such as at least 30 grams, at least 40 grams, at least 50 grams, at least 60 grams, at least 70 grams, at least 80 grams, at least 90 grams, at least 100 grams, or more than 100 grams of $CO_2$ to be absorbed per 100 ml of the liquid. In some embodiments, the methods and apparatus provide conditions (e.g. solution chemistry, surface are to volume ratio, residence time) where at least 50% of the $CO_2$ in a gas is removed from the gas into the liquid or the slurry. In some embodiments, conditions are provided which allow at least 60% of the $CO_2$ in a gas to be removed, such as at least 70%, at least 80%, or at least 90% of the $CO_2$ in a gas is removed from the gas into the liquid or the slurry. In some embodiments, conditions are provided which allow at least 95% of the $CO_2$ in a gas to be removed from the gas into the liquid or the slurry. In some embodiments, the methods and apparatus provide conditions (e.g. solution chemistry, surface are to volume ratio, liquid flow rate to gas flow rate ratio (L/G), residence time) where at least 50% of a component of a gas (e.g. NOx, SOx, mercury) is removed from the gas into the liquid or the slurry. In some embodiments, conditions are provided which allow at least 60% of a component of a gas to be removed, such as at least 70%, at least 80%, or at least 90% of a component of a gas to be removed from the gas into the liquid or the slurry. In some embodiments, conditions are provided which allow at least 95% of a component of a gas is removed from the gas into the liquid or the slurry.

Optimization of precipitation reactions is one goal of high-efficiency gas-liquid contacting methods and apparatus. In some embodiments, precipitates are formed which include carbonate and/or bicarbonate materials. Precipitates of divalent cation carbonate and/or bicarbonate materials are formed in some embodiments. In some embodiments calcium carbonate and/or bicarbonate materials are formed. In some embodiments magnesium carbonate and/or bicarbonate materials are formed. In some embodiments, both calcium and magnesium carbonate and/or bicarbonate materials are formed. In some embodiments, carbonates and/or bicarbonates of both calcium and magnesium, e.g. dolomite, are formed.

In some embodiments presented herein, streams and/or droplets are formed from a slurry and then are contacted with a gas in the methods and apparatus. The slurry used to make liquid droplets and/or streams can depend on what is available at the site where the gas-liquid contactor is located as well as the gas which will contact the droplets and the desired outcome from the interaction between the gas and liquid droplets. Liquids that can make up the liquid component of the slurry include, but are not limited to: aqueous solutions containing divalent cations with a pH 10 or greater; sea water; brackish water; man-made liquid waste from desalination processes; naturally occurring brines; industrial waste brines; a synthetic brine; a solution augmented with cations; a solution augmented with silica; or any combination thereof. Compositions of the slurries used can include, but are not limited to, a liquid and industrial waste particulate, a liquid and mineral particulates, a liquid and a precipitate or combinations thereof. As mentioned above herein, the solution chemistry may be tailored to increase the incorporation of gas into the liquid or slurry. In some embodiments, liquid droplets and/or streams comprising an aqueous solution are provided. In some embodiments, liquid droplets and/or streams comprising an aqueous solution of pH between 4 and 11 are provided. Some embodiments provide for liquid droplets and/or streams comprising an aqueous solution comprising ions. Some embodiments provide for liquid droplets and/or streams comprising an aqueous solution comprising divalent cations. Some embodiments provide for liquid droplets and/or streams comprising an aqueous solution comprising sea water, dissolved mineral solutions, brines or any combination thereof. In some embodiments, liquid droplets comprising a basic solution are provided. In some embodiments, liquid droplets and/or streams comprising an alkali metal hydroxide are provided. In some embodiments, liquid droplets and/or streams comprising NaOH or KOH or combinations thereof are provided. Some embodiments provide liquid droplets and/or streams that comprise solid material. In some embodiments, the liquid droplets and/or streams comprise a precipitated material resulting from contacting the liquid droplets with the gas. In some embodiments, the liquid droplets and/or streams comprise particulates of an industrial waste such as, but not limited to, fly ash, slag, cement kiln dust, mining waste, or any combination thereof. In some embodiments, the liquid droplets and/or streams comprise a precipitated material and particulates of an industrial waste. In some embodiments, liquid droplets and/or streams comprising particulates of a mineral are provided. In some embodiments, liquid droplets and/or streams comprising particulates of a mineral and particulates of an industrial waste are provided. In some embodiments, liquid droplets and/or streams comprising particulates of a mineral, particulates of an industrial waste, and a precipitated material are provided.

There are many ways to make liquid droplets. Very fine mists of droplets can be made using evaporation, such as evaporating water to humidify an area. Non-evaporative technologies for creating droplets include, but are not limited to: pressure atomizers (nozzles), rotary atomizers, air-assisted atomizers, airblast atomizers, ultrasonic atomizers, ink jet atomizers, MEMS atomizers, eductor-jet nozzles, and electrostatic spray atomizers. In embodiments describing liquid and/or slurry droplets, any method of droplet formation may be used. In some embodiments, liquid droplets are made utilizing systems comprising ultrasonic transducers. In some embodiments, liquid droplets are made utilizing systems comprising pressure atomizers (nozzles), rotary atomizers, air-assisted atomizers, airblast atomizers or any combination thereof. In some embodiments, liquid droplet-producing systems or devices (i.e. liquid introduction units) are provided that comprise ultrasonic transducers. In some embodiments, liquid droplet-producing systems or devices are provided that comprise nozzles. In some embodiments, liquid droplet-producing systems or devices are provided that comprise dual-fluid nozzles, eductor-jet nozzles, or both. In some embodiments, liquid droplet-producing systems and/or devices are provided with nozzles that have openings 5 micrometers or less. In some embodiments, liquid droplet-producing systems and/or devices are provided with nozzles that have openings 10 micrometers or less. In some embodiments, liquid droplet-producing systems and/or devices are provided with nozzles that have openings 10 micrometers or more. In some embodiments, liquid droplet-producing systems and/or devices are provided with nozzles that have openings 25 micrometers or more, such as 50 micrometers or more, 100 micrometers or more, 250 micrometers or more, 500 micrometers or more. In some embodiments, liquid droplet-producing systems and/or devices are provided with nozzles that have openings 1 millimeter or more. In some embodiments, liquid droplet-producing systems and/or devices are provided that comprise pressure atomizers (nozzles), rotary atomizers, air-assisted atomizers, airblast atomizers or any combination thereof. Some embodiments provide for systems and/or apparatus that are capable of accepting slurry to create droplets. In some embodiments, systems and/or apparatus that produce liquid droplets are provided, wherein the liquid droplets range from 50 to 1000 micrometers (µm) in diameter. In some embodiments, systems and/or apparatus that produce liquid droplets are provided, wherein the liquid droplets are of average diameter greater than 1000 micrometers (µm). In some embodiments, systems and/or apparatus that produce liquid droplets are provided, wherein the liquid droplets are of average diameter greater than 500 micrometers. In some embodiments, systems and/or apparatus that produce liquid droplets are provided, wherein the liquid droplets are of average diameter less than 1 micrometer. In some embodiments, systems and/or apparatus that produce liquid droplets are provided where the average diameter of the droplets is greater than 5 micrometers, such as greater than 10 micrometers, greater than 20 micrometers, greater than 50 micrometers, greater than 100 micrometers, greater than 200 micrometers, greater than 300 micrometers, or greater than 400 micrometers. In some embodiments, systems and/or apparatus that produce liquid droplets are provided where the average diameter of the droplets ranges from 1 to 400 micrometers. In some embodiments, systems and/or apparatus that produce liquid droplets are provided where the average diameter of the droplets is greater ranges from 1 to 500 micrometers. In some embodiments, systems and/or apparatus that produce neutrally buoyant liquid droplets are provided. Neutrally buoyant liquid droplets are liquid droplets which neither rise nor sink in the environment in which they are neutrally buoyant, e.g. the gas which surrounds the droplets.

It may be possible to optimize the area of a cross-section of the contacting chamber or column of an apparatus that is covered by droplets by varying the type of droplet producing technology used. In particular, it may be possible to optimize the area of a cross-section of the apparatus covered by droplets by utilizing sprays of differing angles. In some embodiments, sprays of 60° are used near the walls of the contacting chamber and sprays of 90° are used in the inner cross section of the contacting chamber.

The surface area to volume ratio of a liquid in contact with a gas is one factor that dictates the efficiency of incorporation of the gas into the liquid. In some embodiments, droplets and/or liquid streams are provided that have surface area to volume ratios (SA:V) of 12 $m^2$/liter or more. In some embodiments, droplets and/or liquid streams are provided that have surface area to volume ratios (SA:V) of 24 $m^2$/liter or more, such as 60 $m^2$/liter or more, 80 $m^2$/liter or more, 120 $m^2$/liter or more, 600 $m^2$/liter or more, or 6000 $m^2$/liter or more. In some embodiments, liquid droplets are provided of average diameter greater than 500 micrometers. In some embodiments, liquid droplets are provided of average diameter less than 1 micrometer. In some embodiments, liquid droplets are provided of average diameter greater than 5 micrometers, such as greater than 10 micrometers, greater than 20 micrometers, greater than 50 micrometers, greater than 100 micrometers, greater than 200 micrometers, greater than 300 micrometers, or greater than 400 micrometers. In some embodiments, liquid droplets are provided of average diameter ranging from 1 to 400 micrometers. In some embodiments, liquid droplets are provided of average diameter ranging from 1 to 500 micrometers. In some embodiments, liquid droplets are provided of diameter ranging from 50 to 1000 micrometers (µm). In some embodiments, liquid droplets are provided of an average diameter of 100 micrometers (µm). In some embodiments, methods that produce and/or utilize neutrally buoyant liquid droplets are provided. Neutrally buoyant liquid droplets are liquid droplets which neither rise nor sink in the environment in which they are neutrally buoyant, e.g. the gas which surrounds the droplets.

In some embodiments of the invention specific L/G ratios are indicated. The L/G ratio is a number that is the ratio of the flow rate of the liquid to the flow rate of the gas in an apparatus. Without being bound by theory, the absorption of the gas or components of the gas into the liquid are directly proportional to the L/G ratio. In some uses of the ratio, the L/G ratio is a dimensionless number, and as such will indicate a volume flow per unit time relative to another volume flow per unit time or a mass flow per unit time relative to another mass flow per unit time. In some embodiments, the L/G ratio employed ranges from 3 to 50. In some embodiments, the L/G ratio employed ranges from 3 to 20. In some embodiments, the L/G ratio employed is 15. In some embodiments, the L/G ratio employed ranges from 50 to 4000. In some embodiments, the L/G ratio employed ranges from 100 to 1000. In some embodiments, the L/G ratio employed ranges from 200 to 400. In some embodiments, the L/G ratio employed is 300. In some embodiments, the apparatus and/or system is configured to employ a L/G ratio ranging from 3 to 50. In some embodiments, the apparatus and/or system is configured to employ a L/G ratio ranging from 3 to 20. In some embodiments, the apparatus and/or system is configured to employ a L/G ratio of 15. In some embodiments, the apparatus and/or system is configured to employ a L/G ratio ranging from 50 to 4000. In some embodiments, the apparatus and/or system is configured to employ a L/G ratio ranging from 100 to 1000. In some embodiments, the apparatus and/or system is configured to employ a L/G ratio ranging from 200 to 400. In some embodiments, the apparatus and/or system is configured to employ a L/G ratio of 300. In some uses of the L/G ratio, units are cited to identify that either volumes or mass are compared in the ratio. In some embodiments, the L/G ratio employed ranges from 0 to 10,000 gallons per minute/1000 actual cubic feet. In some embodiments, the L/G ratio employed ranges from 50 to 5,000 gallons per minute/1000 actual cubic feet. In some embodiments, the L/G ratio employed ranges from 100 to 500 gallons per minute/1000 actual cubic feet. In some embodiments, the apparatus and/or system is configured to operate at a liquid flow rate to gas flow rate ratio (L/G ratio) of between 0 and 10,000 gallons per minute/1000 actual cubic feet. In some embodiments, the apparatus and/or system is configured to operate at a liquid flow rate to gas flow rate ratio (L/G ratio) of between 50 and 5,000 gallons per minute/1000 actual cubic feet. In some embodiments, the apparatus and/or system is configured to operate at a liquid flow rate to gas flow rate ratio (L/G ratio) of between 100 and 500 gallons per minute/1000 actual cubic feet.

There are structural features that may be added to a chamber in which liquids or slurries and gases are contacted that enhance the incorporation of a gas into a liquid or slurry. Such structural features are meant to increase the interaction between a gas as it flows past a liquid or slurry either by: 1) providing an area or areas for the liquid/gas system to come to equilibrium or 2) allowing the liquid or slurry the opportunity to become entrained by the gas and to follow a more convoluted path as the liquid or slurry passes through the space of the chamber (e.g. as liquid or slurry droplets fall). In some embodiments either type of structural feature is used to contact an absorbing solution, contacting mixture, or slurry with a gas. In some embodiments an apparatus or a system comprises either type of structural feature to contact absorbing solution, contacting mixture, or slurry with a gas. In some embodiments, or a combination of both types of structural features are used to contact an absorbing solution, contacting mixture, or slurry with a gas. In some embodiments an apparatus or a system comprises both types of structural feature to contact absorbing solution, contacting mixture, or slurry with a gas.

Structural features that increase the probability of a liquid and gas coming to equilibrium within a confined space include packing materials and trays. Packing materials may be structured or not structured, may be ceramic, plastic, or metal spherical, honeycomb shaped, ribbon shaped, saddle shaped, ring shaped or randomly shaped forms. Trays are typically metal sheets with perforations or openings which allow the flow of gas and liquid through the trays. The materials from which packing materials and trays are made are selected based upon the chemistry of the gas, liquid, and products anticipated in the column or reactor as well as concerns such as physical wear. Columns or reactors which utilize packing material or trays can be thought of as a collection of stages (i.e. lengths of the column or reactor) in which the gas leaving the stage is in equilibrium with the liquid leaving the stage. A theoretical stage describes a physical section of a column where the bulk vapor and bulk liquid phases can be approximated as being in equilibrium with respect to the concentration the species that are exchanged as the gas and liquid traverse the column. The efficiency of a volume can be adjusted by tailoring the packing materials or configuration of trays. Columns or reactors utilizing packing materials or trays are characterized by a high pressure drop across the overall length of the column or reactor due to the liquid head associated with trays or the bed drop associated with packing materials. Columns utilizing packing materials are generally not well suited to contacting slurries with gas, but packing materials have been made commercially available to accommodate slurries. In some embodiments, trays, packing material, or both are used to contact an absorbing solution, contacting mixture, or slurry with a gas. In some embodiments, an apparatus or system comprises packing materials, trays or a combination thereof to contact absorbing solution, contacting mixture, or slurry with a gas.

Membranes are another type of structural feature that may be included in a column or reactor to facilitate the interaction between a gas and a liquid. Membranes that are utilized in columns or reactors are used to increase the interfacial area between a liquid and gas so as to maximize the mass transfer rate. Membranes may be composed of many hollow fibers. In such membranes, the gas-liquid interface occurs at the entrance to each hollow fiber pore. Thus, membranes of this type may be termed microporous membranes. In some embodiments, one or more membranes are used to contact an absorbing solution, contacting mixture, or slurry with a gas. In some embodiments, an apparatus or system comprises one or more membranes to contact absorbing solution, contacting mixture, or slurry with a gas. In some embodiments, one or more membranes in combination with packing material and/or trays are used to contact an absorbing solution, contacting mixture, or slurry with a gas. In some embodiments, an apparatus or system comprises one or more membranes in combination with packing material and/or trays to contact absorbing solution, contacting mixture, or slurry with a gas. In some embodiments, one or more microporous membranes are used to contact an absorbing solution, contacting mixture, or slurry with a gas. In some embodiments, an apparatus or system comprises one or more microporous membranes to contact absorbing solution, contacting mixture, or slurry with a gas. In some embodiments, one or more microporous membranes in combination with packing material and/or trays are used to contact an absorbing solution, contacting mixture, or slurry with a gas. In some embodiments, an apparatus or system comprises one or more microporous membranes in combination with packing material and/or trays to contact absorbing solution, contacting mixture, or slurry with a gas.

Structural features that allow liquid or slurry to become entrained within a gas as it is passing through a column or chamber while simultaneously encouraging both the gas and liquid to follow a more convoluted path include shed rows. Shed rows are arrays of sheets of material with a greater length than width, typically metal, bent in the middle to form an inverted "v" shape that are supported by rings. Typically, shed rows are placed such that the location of the sheds alternates with each level within the column or reactor. In this way, the mixture (e.g. a slurry) or liquid falling from a shed will land near the apex of a shed below it, leading the mixture or liquid to follow a longer, more convoluted path down the length of the column or reactor than it would have in the absence of shed rows. The shed rows also influence the flow of the gas through the column or reactor. In the space between the apex of a shed and the bottom of the shed above it is a one where entrainment of the falling mixture or liquid into the gas may occur. This entrainment increases the amount of time the mixture or liquid and gas have to interact within the column or reactor. Shed rows are compatible with liquids and slurries. The angle of repose, which dictates how wide or narrow the sheds are, allows for the use of shed rows with a variety of solutions and to accommodate solid particulates. The steepness of the sheds can be adjusted to allow the liquids or slurries to roll down the tops of the shed at a rate that permits the desired interaction with gas in the column or reactor. Shed rows also allow for a lower drop in gas pressure across the height of the column or reactor as compared to those filled with trays or packing material. In some embodiments, shed rows are present in the apparatus or systems of the invention. In some embodiments, the chamber where absorbing solution and gas are contacted includes shed rows. In some embodiments, the chamber where contacting mixture and gas are contacted includes shed rows. In some embodiments, the apparatus includes a contacting chamber that includes shed rows. In some embodiments, the system includes an apparatus that includes shed rows. In some embodiments shed rows are comprised of concentric circles of sheds. In some embodiments, the chamber includes protrusions along the walls of the chamber into the center of the chamber. In such embodiments the protrusions resemble halves of sheds that are sloping downwards.

There are embodiments where it is desirable to condense or coalesce the liquid droplets or fine particulate material after contact with a gas. In such embodiments, various methods can be employed to cause coalescence of the liquid droplets, including but not limited to: variations in temperature, use of an element with additional surface area, the use of an electrostatic precipitator, or use of streams, sheets, or larger droplets of liquid to entrain the liquid droplets after contacting a gas. In some embodiments, a precipitate forms within the liquid droplets while the droplets are still in contact with the gas. In some embodiments where a precipitate is formed within the liquid droplet while still in contact with the gas, an electrostatic precipitator is used to collect and coalesce the liquid droplets based upon the charge on the precipitate within the droplets. In some embodiments, fine particulates are formed, and an electrostatic precipitator is used to collect these particulates.

In some embodiments, it is necessary to redirect falling liquid or slurry that descends the height of an apparatus as droplets, streams, or sheets so that the liquid or slurry does not impart excessive energy into a reservoir of liquid or slurry and create a foam. In particular, it is desirable to avoid the creation of a stable foam layer in some embodiments where the stable foam layer may impair the ability of pumps to function optimally. Structural elements may be used to redirect falling liquid or slurry. In some embodiments, an inverted cone is present within the apparatus to mitigate foaming. The classical method of removing a foam layer is to mechanically break the bubbles that make up the foam layer. In some embodiments, sprays are used in to mechanically break bubbles and mitigate foaming. In some embodiments, an inverted cone and sprays are used to mitigate foaming.

In some embodiments, an apparatus of the invention for transferring (i.e. incorporating) a component of a gas into a liquid includes a gas inlet, a chamber configured to contact the liquid and gas; a first liquid introduction unit at a first location within the chamber and a second liquid introduction unit at a second location within the chamber for contacting the gas; a reservoir configured to contain the liquid after it has contacted the gas; an outlet for the liquid after it has contacted the gas, and at least one of the flowing features: i) a least one array of shed rows within the chamber; ii) an anti-foaming device; iii) at least one pump per liquid introduction unit for pumping the liquid through the introduction unit; iv) configuration of the liquid introduction units such that the direction of the flow of the liquid out of the first unit is different than the direction of the liquid out of the second unit; v) one or more restriction orifice mechanism release valve) configured to direct liquid flow to at least one of the liquid introduction units, into the gas inlet, or a combination thereof; and vi) varying the area covered by the liquid introduction units. In such embodiments, the liquid introduction units may be sprays, columns of liquid, flat jets of liquid, or a combination thereof. In such embodiments, the shed rows may be configured to redistribute the flow of the gas as it enters the chamber such that the gas flows axially along the chamber to cover a greater area of the cross section of the chamber than the gas flow upon entering the chamber, prior to interacting with the shed rows. In some embodiments, the anti-foaming device may include a cone (e.g. inverted cone) situated over the reservoir. In such embodiments, sprays oriented towards the cone may also be used. In some embodiments, in which the area covered by liquid introduction units is varied, sprays of varying angles may be used. In some embodiments, the pumps used to pump liquid through the liquid introduction units are variable frequency drive pumps.

An exemplary method and system for contacting a gaseous stream and water employs contacting the gaseous stream to a flat jet stream of the water. Thus in some embodiments the invention provides an apparatus for separating carbon dioxide from an industrial waste stream that comprises a gas-liquid contactor that is configured to contact a flat jet stream of a liquid, e.g., water, with all or a portion of the industrial waste stream to dissolve $CO_2$ and, in some embodiments, other constituents of the industrial waste stream, and further comprises a unit operably connected to the gas-liquid contactor for producing a solid composition that comprises all or a portion of the $CO_2$ dissolved in the water in the contactor, e.g., through evaporation, precipitation, or the like. In some embodiments, the solid composition is a composition that comprises bicarbonates. In some embodiments, the solid composition is a composition that comprises carbonates. In some embodiments, the solid composition comprises carbonates and bicarbonates. In some embodiments, the solid composition comprises carbonates and/or bicarbonates and also one or more further components of the industrial waste gas, e.g. SOx or a SOx derivative, NOx or a NOx derivative, a heavy metal or derivative thereof, particulates, VOCs or a VOC derivative, or a combination thereof.

U.S. Pat. No. 7,379,487 describes an exemplary flat jet stream/gas contacting system, the disclosure of which is herein incorporated by reference. In some embodiments, contacting a gaseous stream comprising $CO_2$ comprises use of the two-phase reactor as described in U.S. Pat. No. 7,379,487. A brief description of the flat jet stream methods and system is provided below.

In many gas-liquid contacting systems the rate of gas transport to the liquid phase is controlled by the liquid phase mass transfer coefficient, k, the interfacial surface area, A, and the concentration gradient, AC, between the bulk fluid and the gas-liquid interface. A practical form for the rate of gas absorption into the liquid is then:

$$\Phi = \phi a = k_G a(p-p_i) = k_L a(C_L^* - C_L)$$

where $\Phi$ is the rate of gas absorption per unit volume of reactor (mole/cm$^3$·s), a is the average rate of absorption per unit interfacial area (mole/cm$^2$·s), a is the gas liquid interfacial area per unit volume (cm$^2$/cm$^3$, or cm$^{-1}$), p and $p_i$ are the partial pressures (bar) of reagent gas in the bulk gas and at the interface, respectively, $C_L^*$ is the liquid side concentration (mole/cm$^3$) that would be in equilibrium with the existing gas phase concentration, $p_i$, and $C_L$ (mole/cm$^3$) is the average concentration of dissolved gas in the bulk liquid. $k_G$ and $k_L$ are gas side and liquid side mass transfer coefficients (cm/s), respectively.

In many gas-liquid reaction systems the solubility of the $C_L^*$ is very low and control of the concentration gradient is therefore limited. Thus, the primary parameters to consider in designing an efficient gas-liquid flow reactor are mass transfer and the interfacial surface area to reactor volume ratio, which is also known as the specific surface area.

In certain embodiments, the flat jet gas-liquid contacting system of the invention is a gas-liquid contacting system that uses the enhanced specific surface area of a flat jet to improve the interaction between the $CO_2$-containing gaseous stream with the water, e.g., alkaline earth metal ion-containing water. In certain embodiments, a rigid nozzle plate containing a plurality of orifices that generate very thin flat jets is employed. The flat jet orifice has in one configuration a V-shaped chamber attached to the source of the water, e.g., alkaline earth metal ion-containing water. The flat jet orifice may have a pair of opposing planar walls attached to a vertex of the V-shaped chamber. The flat jet nozzle may have a conical nozzle attached to an opposite end of the opposing planar walls as the V-shaped chamber. In another configuration, the jet orifice may have a circular orifice attached to the liquid source chamber. The flat jet nozzle may have a V-shaped groove intersecting the circular orifice to create an oval shaped orifice. The flat jet orifice may be oriented perpendicularly, opposed, or parallel to the inlet source of the $CO_2$-containing gaseous stream. A smallest passage of the flat jet nozzles may be larger than 600 microns. The nozzle may produce a liquid flat jet that has a width that is at least ten times its thickness, or at least 8 times its thickness, or at least 6 times its thickness, or at least 4 times its thickness. The flat jets may be made as thin as 10 microns, e.g., 10-15 microns, 10-20 microns, or 10-40 microns, and be separated by less than 1.1, 1.0, 0.9, 0.8, 0.7, 0.6, 0.5, 0.4, 0.3, or 0.2 mm, e.g., less than 1 millimeter to generate high packing jet densities ($\beta$=0.01) and large specific surface areas, a=10-20 cm$^{-1}$. The thin jet allows more of the water, e.g., alkaline earth metal ion-containing water, to be exposed to the $CO_2$-containing gaseous stream, generating a higher yield of reaction product per unit liquid mass flow than conventional contactors, e.g., greater transfer of $CO_2$ and/or other components of the gas stream, such as SOx, NOx, heavy metals, particulates, VOCs, and derivatives and combinations thereof, to the liquid, e.g., water.

One embodiment of the invention is to provide a gas liquid solid contactor that includes a $CO_2$ charging reactor having a plurality of thin flat jet streams, that are closely and uniformly spaced, that have high specific surface area, that have uniform jet velocity, that are aerodynamically shaped to minimize gas flow disruption of the liquid jets, orifices that are free from salt obstruction and clogging and that are operated within co-flow, counter-flow and parallel flow gaseous process streams. In one embodiment the jets are operated in a cross-flow configuration with the gas, e.g., the jets drop vertically from a nozzle and the gas flow horizontally or near-horizontally across the jets.

The flat jet gas-liquid contacting system of the invention is employed to contact the $CO_2$-containing gaseous stream with the liquid, e.g. water, such as alkaline earth metal ion-containing water. The charging reactor includes a chamber with an inlet source for the $CO_2$-containing gaseous stream and a flat jet nozzle for a source of liquid, e.g., water such as alkaline earth metal ion-containing water. The nozzle may have a multitude of orifices that have a minimum dimension that is greater than 200, 300, 400, 500, or 600 microns in length, e.g., greater than 600 microns In length and generate thin flat jets of high specific surface area. The nozzle may have a pair of parallel opposing plates having a second end attached to a conical nozzle. The nozzle may have a pair of V-shaped plates coupled to a first end of the pair of parallel opposing plates. The liquid, e.g., water such as alkaline earth metal-containing water, orifice may produce a flat jet of water that has a width that is at least 5, 6, 7, 8, 9, 10, 11, 12, 13, 14, or 15 times its thickness, e.g., at least 10 times its thickness. The source of liquid, e.g. water such as alkaline earth metal-containing water, may be any convenient source (as described above). In certain embodiments, the water source includes a reservoir having an input for water, e.g., alkaline earth metal ion-containing water, such as a pipe or conduit from an ocean. Where the liquid, e.g., water such as alkaline earth metal ion-containing water, source is seawater, the input is in fluid communication with a source of seawater, e.g., such as where the input is a pipe line or feed from ocean water to a land based system.

The gas-liquid contacting system may include a small segment of orifice arrays. The orifices may be staggered such that the jet orifices are separated by 1.5-2.5 cm, e.g., 1.7-2.3 cm, e.g. 1.9-2.1 cm, or 2 cm in one direction, 1.5-2.5 mm, e.g., 1.7-2.3 mm, e.g. 1.9-2.1 mm, or 2 mm in another direction and 0.5-1.5 mm, e.g., 0.7-1.3 mm, e.g. 0.9-1.1 mm, or 1 mm diagonally. The orifice has a V-shaped entrance and conical exit channels for jet development. The intersection of the entrance and exit channels creates the orifice. The jet length to jet width ratio may be 5:1 to 20:1, or 7:1 to 15:1, or 8:1 to 12:1, or 9:1 to 11:1, or 10:1 with a thickness of 10-100 microns, e.g., 10-20 microns.

The charging reactor of the invention may include a flat jet gas-liquid contacting system to create a large specific area of water (e.g., alkaline earth metal ion-containing water). The charging reactor has a $CO_2$-containing gaseous stream source (gas reactant) attached to the manifold of the reactor. In certain embodiments, the manifold has a number of holes (openings) that allow the $CO_2$-gaseous stream jets to enter the charging reactor. The charging reactor also may have an inlet for the water (e.g., water such as alkaline earth metal ion-containing water) ("liquid reactant") that is coupled by a piping to a plurality of flat jet nozzles, which create a flat stream of the water. The flat streams of the water (e.g., alkaline earth metal ion-containing water) interact with the $CO_2$-containing gaseous stream to produce the $CO_2$-charged water composition, which will be subjected to precipitation conditions.

In some embodiments, the nozzle of the flat jet gas-liquid contacting system of the charging reactor may have a V-shaped chamber that attaches at the vertex to a first end of a pair of opposing plates. A second end of the opposing plates is attached to a conical nozzle. The water (e.g., alkaline earth metal ion-containing water) flows into the V-shaped chambers and is forced through the passage between the opposing plates and out the nozzle and creates a flat jet. Depending on the nozzle area, jet flow rate and velocity, the jet thickness is on the order of 5 to 100 microns and the width is on the order of 1 to 5 centimeters. As a result, the width to thickness may be significantly greater than a factor of ten. For jet velocities of approximately 10 m/s, the length of the flat jet stream may be fifteen or more centimeters. The narrowest passage where the conical nozzle meets the opposing planar plates is greater than 600 microns. This nozzle allows for larger surface area of water (e.g., alkaline earth metal ion-containing water), which significantly increases the efficiency of the transfer of $CO_2$ and other components (e.g., SOx, NOx, particulates, heavy metals, and/or VOCs) between the $CO_2$-containing gaseous stream and the liquid sheet. Further, due to large jet surface area and small jet thickness this nozzle produces a very large specific surface area, 10-20 cm-1, which enables a higher volume of contacting between the water and the gaseous stream. In addition to increasing the surface area of the water (e.g., alkaline earth metal ion-containing water), the flat jets have a throat size of 600 microns or larger. The large throat size of the flat jets makes it unlikely that they will clog. In some embodiments where clogging is not as much of an issue, the throat size may be smaller, e.g., 50 microns or larger, 100 microns or larger, 200 microns or larger, 300 microns or larger, 400 microns or larger, or 500 microns or larger. The system may also include a component for collecting the water (e.g., alkaline earth metal ion-containing water) and $CO_2$-depleted gaseous stream for reuse.

The $CO_2$-containing gaseous stream is contacted with the water (e.g., alkaline earth metal ion-containing water) by directing the gas to contact the flat jet stream of water. The $CO_2$-containing gaseous stream may be flowed in virtually any direction with respect to the flat jet stream, including orthogonal to the flat jet stream, parallel to the flat jet stream, anti-parallel to the flat jet stream, or at an angle to the flat jet stream.

As reviewed above, the gas from the industrial plant 30 may be processed before being used to charge the water. For example, the gas may be subjected to oxidation conditions to improve solubility of the components of the gaseous stream (e.g., to convert CO to $CO_2$, NO to $NO_2$, and $SO_2$ to $SO_3$, etc.).

Figure 11:
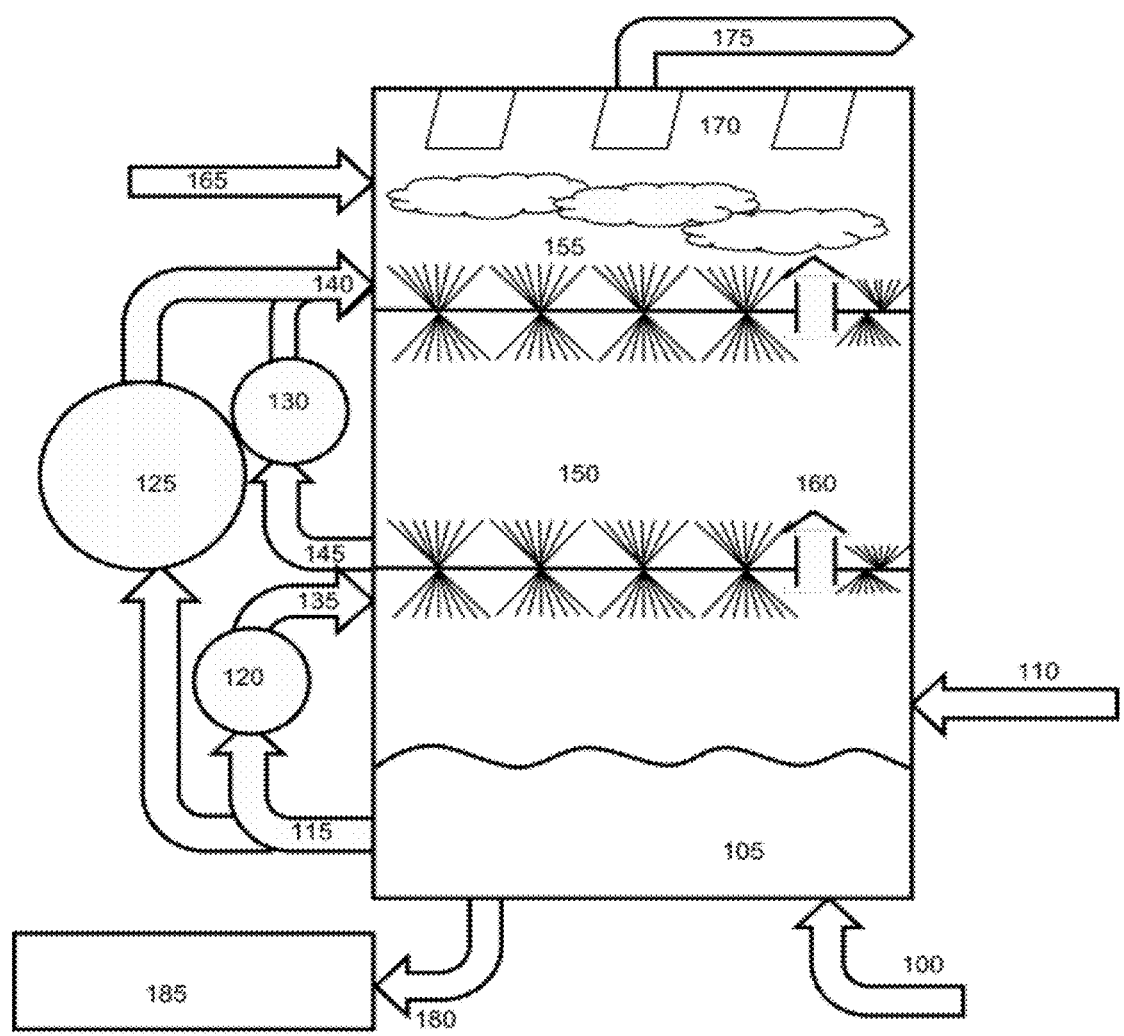
FIG. 11 is a schematic of an embodiment the apparatus for contacting solid material, liquid, and gas with a tower configuration.

FIG. 11 shows an embodiment of the apparatus of the invention. A slurry comprising a liquid and a solid component enters the contacting chamber through an inlet conduit [100] to a reservoir [105] which also contains the slurry that has contacted the gas. In some embodiments, a screw conveyor provides comminution and mixing of the slurry with a gas as it enters the chamber [110]. In some embodiments, a gas enters the chamber through an inlet [110]. In some embodiments there are at least two levels, or sections, of droplet or stream production [150 and 155] with conduits for the gas to travel upwards in the chamber [160] within the arrays of droplet or stream producing systems. A slurry conveyance system [115, 120, 135, 125, 140, 130] moves the slurry from the reservoirs to the droplet or stream producing systems as well as recirculates the slurry within the distinct levels of droplet or stream production. Comminution systems [120, 125, 130] provide particle size reduction for the solid component of the slurry, thereby improving the participation of the solid in the incorporation of the gas into the liquid. In some embodiments, the comminution systems are screw conveyors in the conduits of the slurry conveyance system [115, 145]. In some embodiments, a high-efficiency gas-liquid contactor is employed to remove more of the desired component from the gas stream. Clear liquid, without solids, is provided to the high-efficiency gas-liquid contactor [165] and either very fine droplets or thin sheets of liquid or other high surface area to volume means are used to contact the liquid and the gas. In some embodiments, condensers [170] are needed to have the droplets and/or particulates produced by the high-efficiency gas-liquid contactor fall to the reservoir. The gas after contacting the liquid leaves the chamber [175] and is either passed through another system or released to the air. The liquid after contacting, including precipitate material from the contact between the gas and liquid as well as a minimal amount of the solid component of the slurry leaves the reservoir [180] and is passed to other systems [185] such as a precipitating tank, dewatering systems, and building fabrication system.

Figure 12:
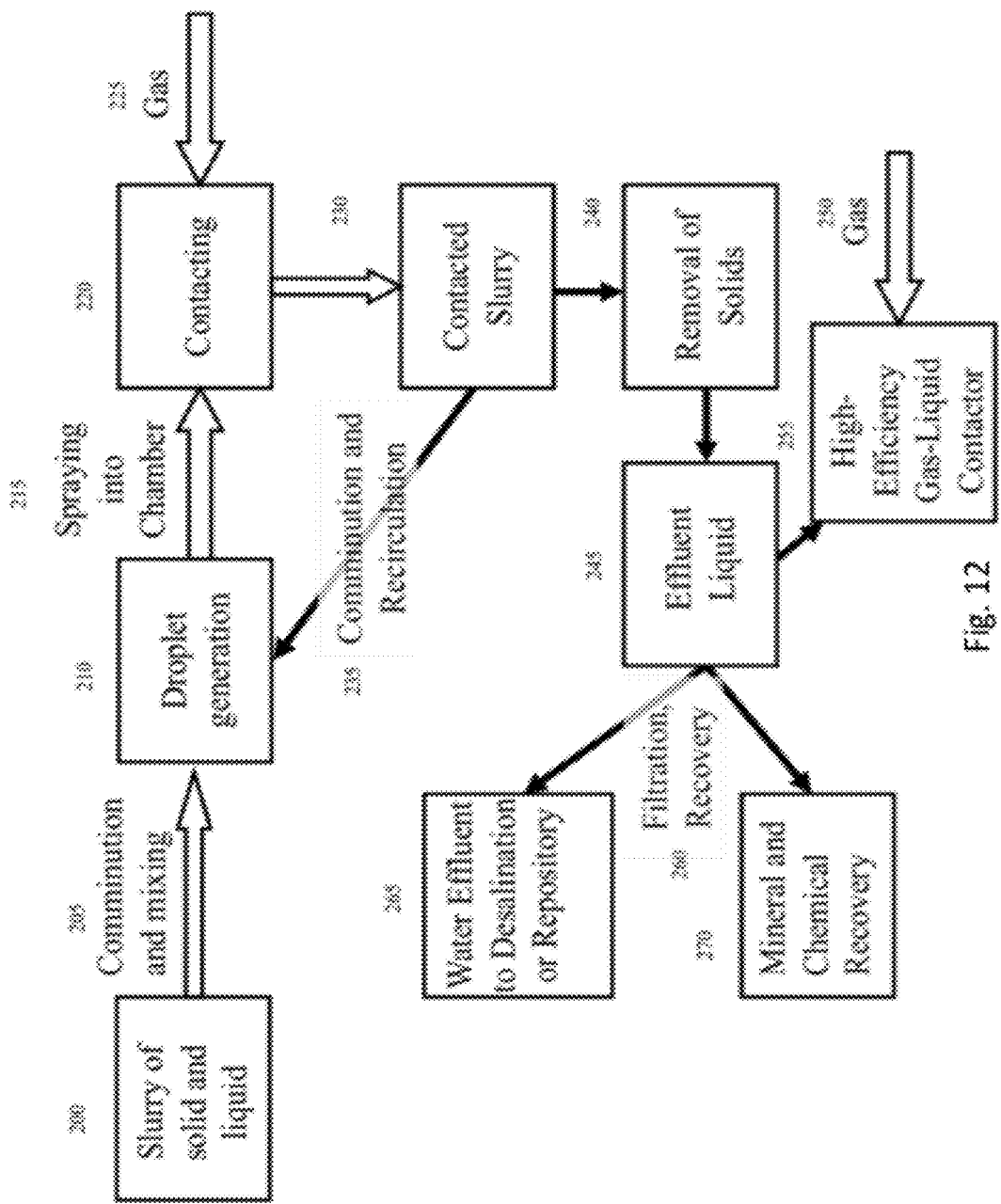
FIG. 12 is a schematic of the method for contacting solid material, liquid, and gas.

FIG. 12 shows a flow diagram of an embodiment of a method of the invention. In most embodiments, a slurry comprising a liquid and a solid component is provided [200]. The slurry undergoes comminution to reduce the particle size of the solid component as well mix the slurry [205]. Droplets or streams are formed from the slurry [210], and the liquid as droplets or streams are introduced [215] to the chamber for contacting [220]. Gas is introduced to the contacting chamber [225]. The source of the gas can be an industrial flue gas, such as that from burning fossil fuels, such as coal. After the contact, a contacted slurry is formed and is collected in a reservoir in the contacting chamber [230] and part of this contacted slurry is recirculated after comminution [235] and part is pumped off for separation of the solids and liquids [240]. The solids are removed and can be used in many applications, including, but not limited to, building materials, as soil stabilization, paint fabrication, and lubricant fabrication. The effluent liquid [245] can have a solution chemistry favorable for use in a high-efficiency gas-liquid contactor [255] which is located in the apparatus to maximize contact with the gas [250] as it moves through the larger droplets and streams to the final stage of contacting. The effluent liquid can also be processed using nanofiltration and reverse osmosis [260] to provide mineral and chemical recovery as well as water that might be suitable as a feed water for desalination or suitable for release into the environment [265].

Figure 13:
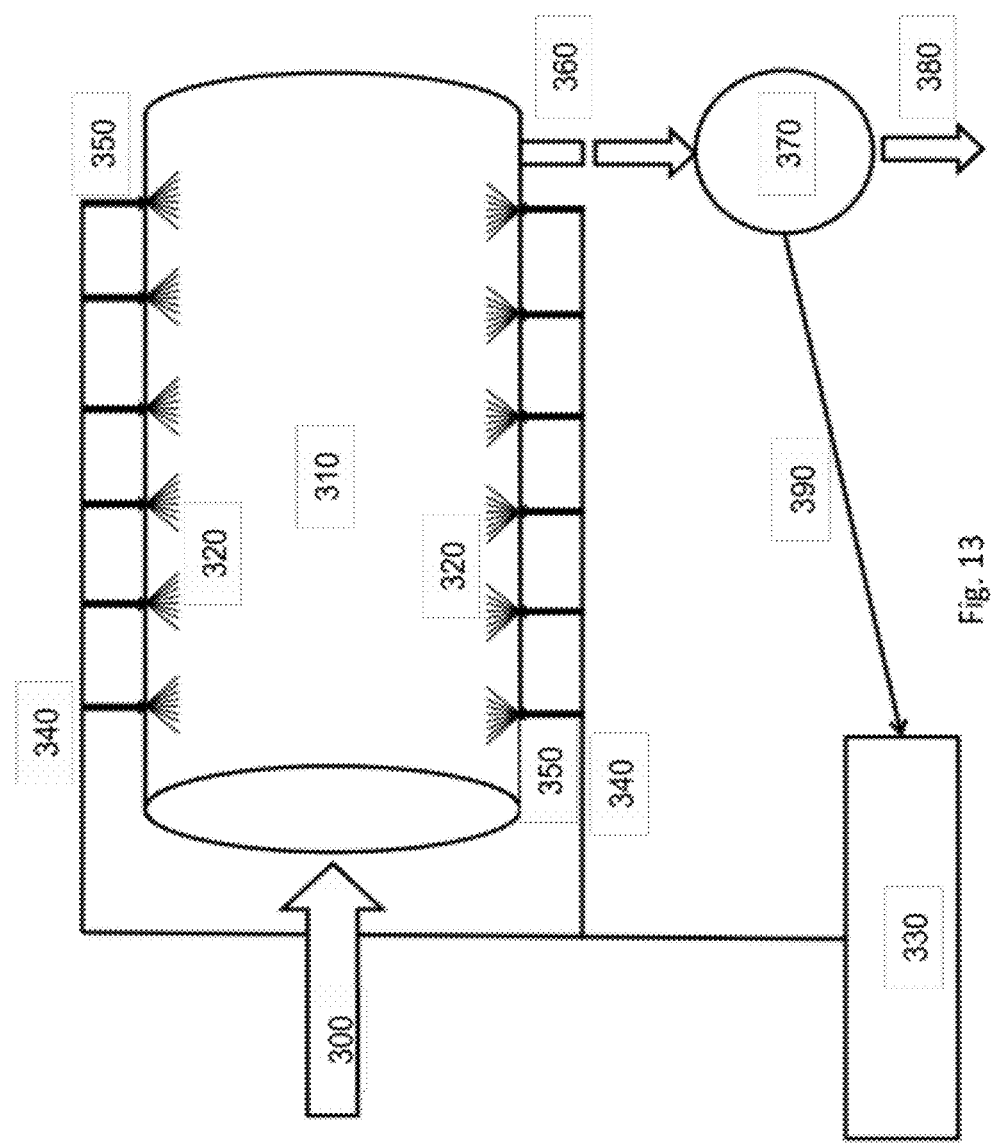
FIG. 13 is a schematic of an embodiment of the apparatus for contacting solid material, liquid, and gas with a horizontal configuration as seen lengthwise in cross-section.

FIG. 13 shows a horizontally configured embodiment of the apparatus of the invention. A gas enters the chamber through an inlet [300]. A slurry comprising a liquid and a solid component is conveyed from a reservoir where the slurry is subjected to comminution [330] and enters the contacting chamber [310] through an array of droplet producing devices [350] to produce sprays of droplets [320] which fill the chamber. In some embodiments there are at least two sections of droplet production that are operably connected such that the gas travels the length of the sections and becomes depleted in a component of the gas over the length of the contacting chamber. A slurry conveyance system [340, 350, 360, 370] moves the slurry from the contacting chamber to the droplet producing systems as well as recirculates the slurry within the distinct sections of droplet or stream production. A comminution system within the slurry reservoir [330] provides particle size reduction for the solid component of the slurry, thereby improving the participation of the solid in the incorporation of the gas into the liquid. The gas after contacting the liquid leaves the chamber and is either passed through another system or released to the air. The liquid after contacting, including precipitate material from the contact between the gas and liquid as well as a minimal amount of the solid component of the slurry leaves the contacting chamber [370] and is passed to other systems [380] such as a precipitating tank, dewatering systems, and building fabrication system.

Figure 14:
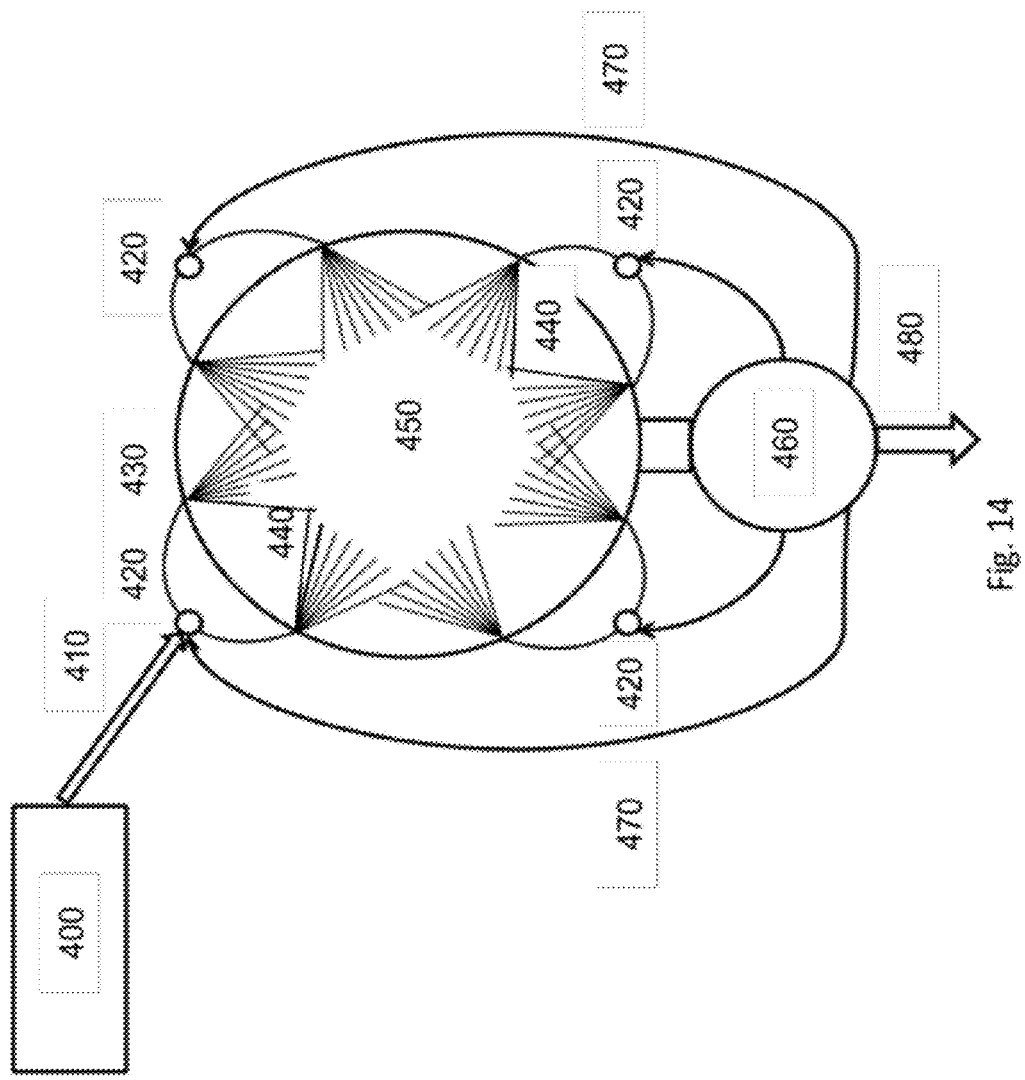
FIG. 14 is a schematic of an embodiment of the apparatus for contacting solid material, liquid, and gas with a horizontal configuration as seen end-on in cross-section.

FIG. 14 shows a horizontally configured embodiment of the apparatus of the invention from an end-on view. A slurry comprising a liquid and a solid component is conveyed from a reservoir where the slurry is subjected to comminution [400] and enters the contacting chamber [410] through an array of droplet producing devices [430] to produce sprays of droplets [440] which fill the chamber. A gas enters the chamber through an inlet and moves through the chamber [450]. In some embodiments there are at least two sections of droplet production that are operably connected such that the gas travels the length of the sections and becomes depleted in a component of the gas over the length of the contacting chamber. A slurry conveyance system [420, 460, 470] moves the slurry from the contacting chamber to the droplet producing systems as well as recirculates the slurry within the distinct sections of droplet or stream production. A comminution system within the slurry conveyance system [460] provides particle size reduction for the solid component of the slurry, thereby improving the participation of the solid in the incorporation of the gas into the liquid. The gas after contacting the liquid leaves the chamber and is either passed through another system or released to the air. The liquid after contacting, including precipitate material from the contact between the gas and liquid as well as a minimal amount of the solid component of the slurry leaves the contacting chamber and is passed to other systems [480] such as a precipitating tank, dewatering systems, and building fabrication system.

Figure 15:
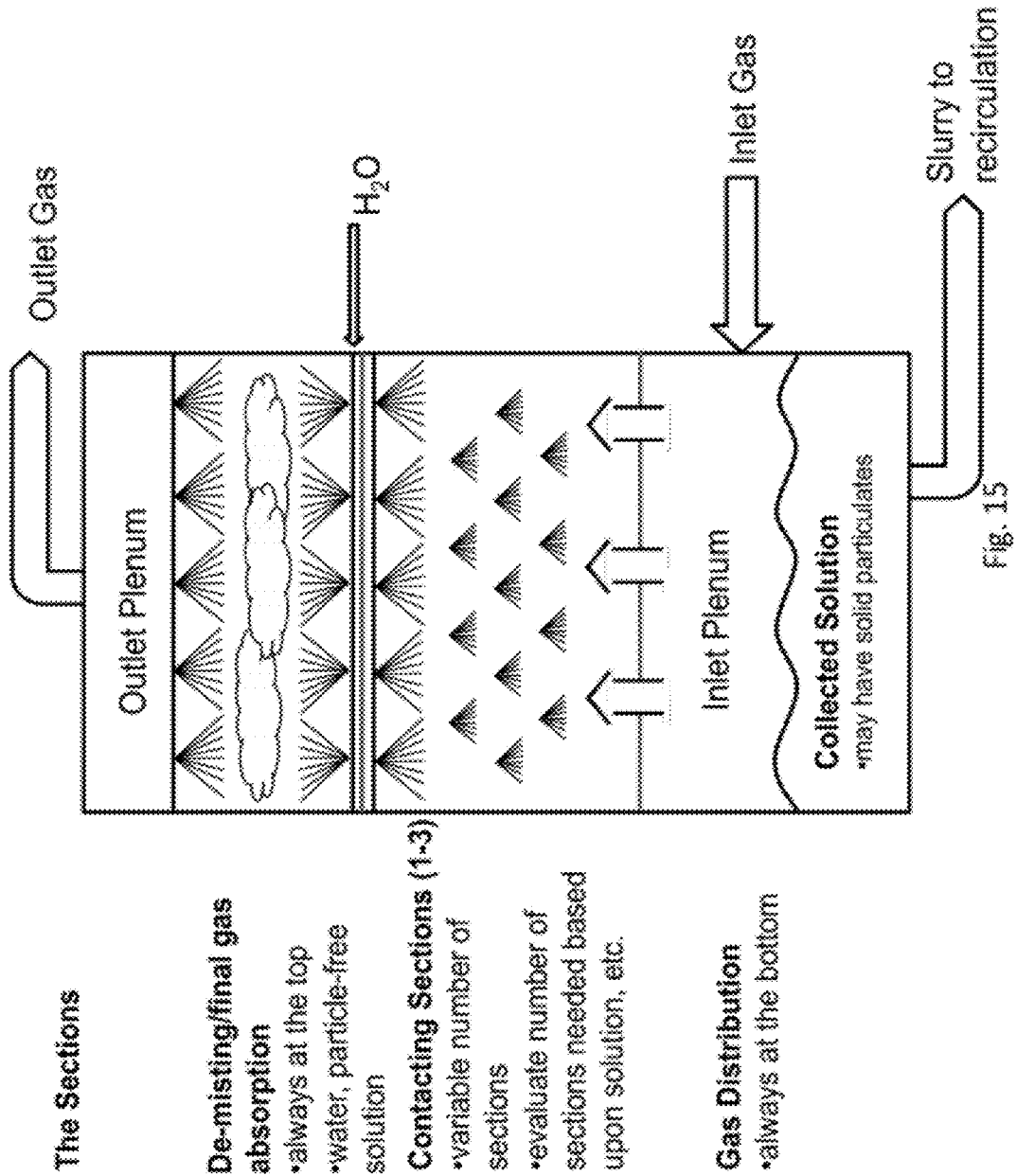
FIG. 15 is a schematic of an embodiment of the apparatus.

FIG. 15 shows an embodiment of the invention which includes a gas distribution section, a variable number of contacting sections, and a de-misting or final gas absorption section that is always located at the top of the apparatus. Gas enters the apparatus at the lower-most section, the gas distribution section, above the collected solution. The gas flows up through the apparatus and exits the top of the apparatus. The contacting sections may number from 1 to more than one, such as two or three or more. The number of contacting sections will be determined based upon the type of final product desired, the absorbing solution or contacting mixture used, the sprays (or other form of liquid stream), and optionally, shed rows used. The section just before the gas exits the apparatus is the demisting section. That section may include a high-efficiency gas absorbing system that uses, for example, flat sheets of clear liquid or very fine droplets, on the order of less than 100 µm, such as less than 50 µm diameter droplets. In the final section, solution free of particulates will be used to maximize absorption and/or droplet collection. The chemistry of the solution used in the demisting and final gas absorption section may be different from the solution used in any of the contacting sections. Recirculation of the solution collected at the bottom of the apparatus may include comminution of any solids that may be in the solution. Recirculation may also include separating any solids that may exist from the solution and passing the effluent back to the apparatus, with or without treatment to make up any chemical deficiencies in the solution. The apparatus may be portable in nature, such that the entire apparatus is contained within a shipping container that may be shipped via rail (train), waterways (barge), and/or road (truck). The apparatus may also be modular, such that the different sections may each be contained within a shipping container and stacked or otherwise operably connected to one another.

Figure 16:
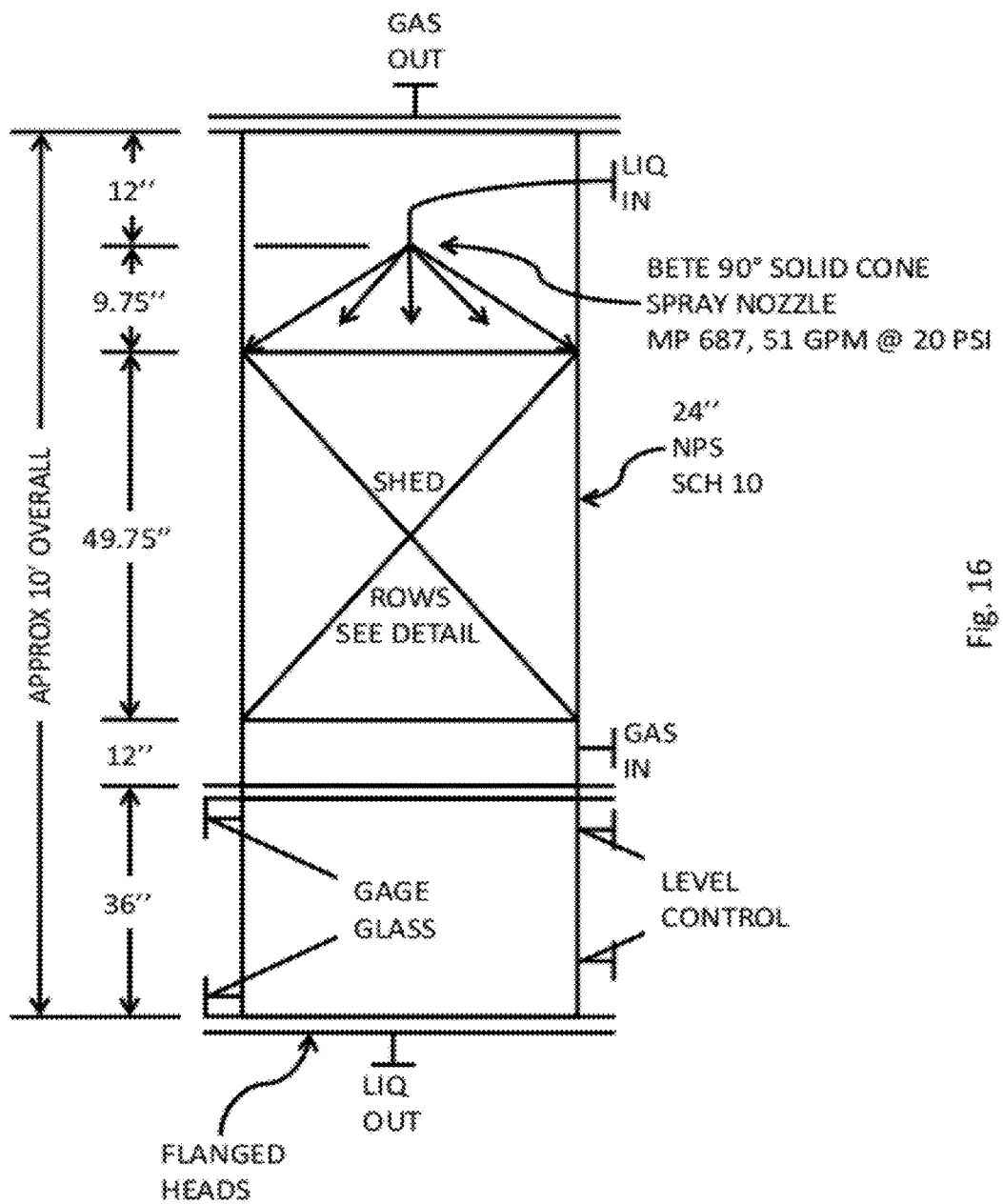
FIG. 16 is a schematic of an embodiment of the overall apparatus.
Figure 17:
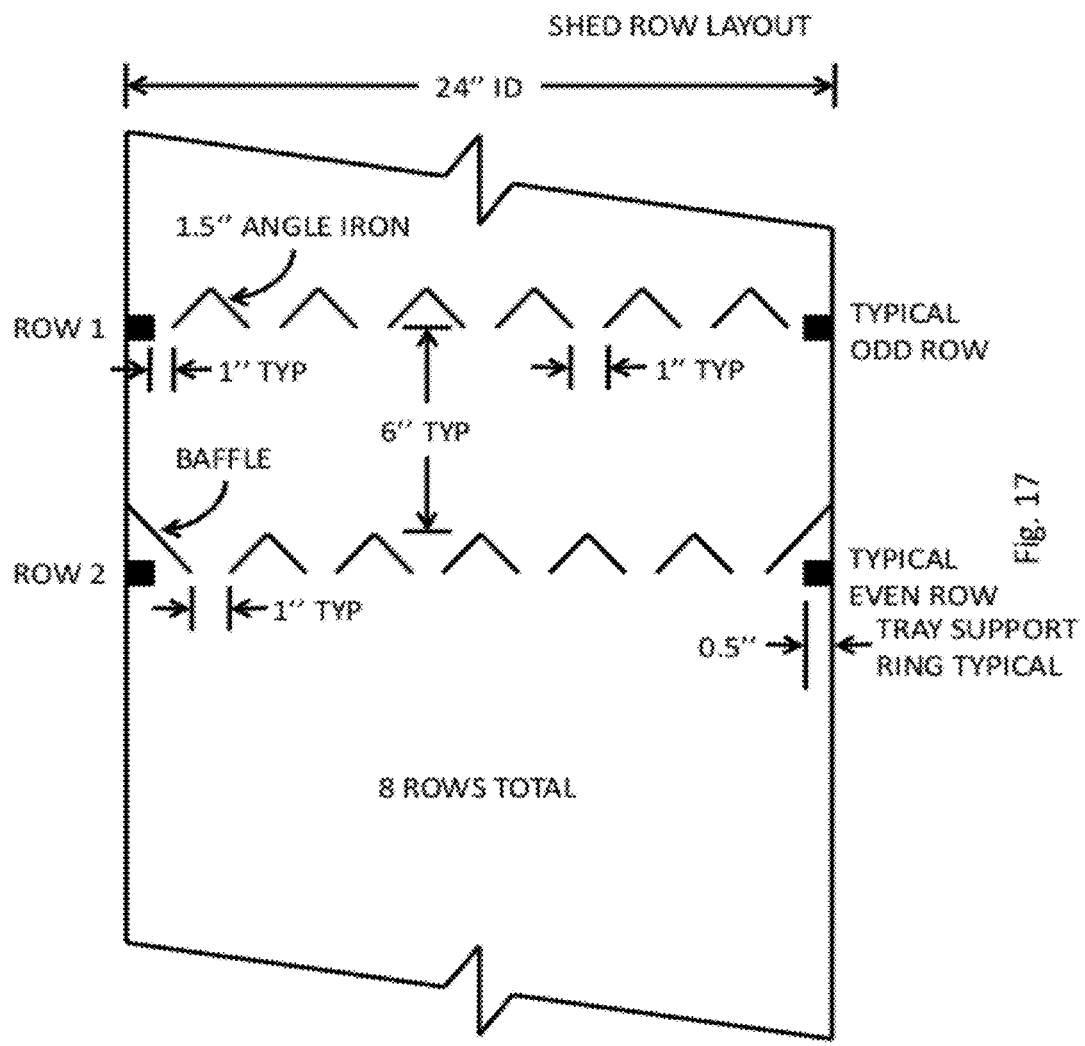
FIG. 17 is a schematic of a portion of an embodiment of the apparatus showing shed row lay out.

FIGS. 16 and 17 are schematics of an embodiment of the apparatus of the invention in which shed rows are used. FIG. 16 shows the overall apparatus, with the gas inlet above the lower portion of the apparatus where collected solution will be stored then removed to further processing. The center section is comprised of shed rows, the configuration for which is indicated in FIG. 17. The upper section of the apparatus shown in FIG. 16 includes a spray to introduce the absorbing solution or contacting mixture to the apparatus and the gas outlet.

Figure 18:
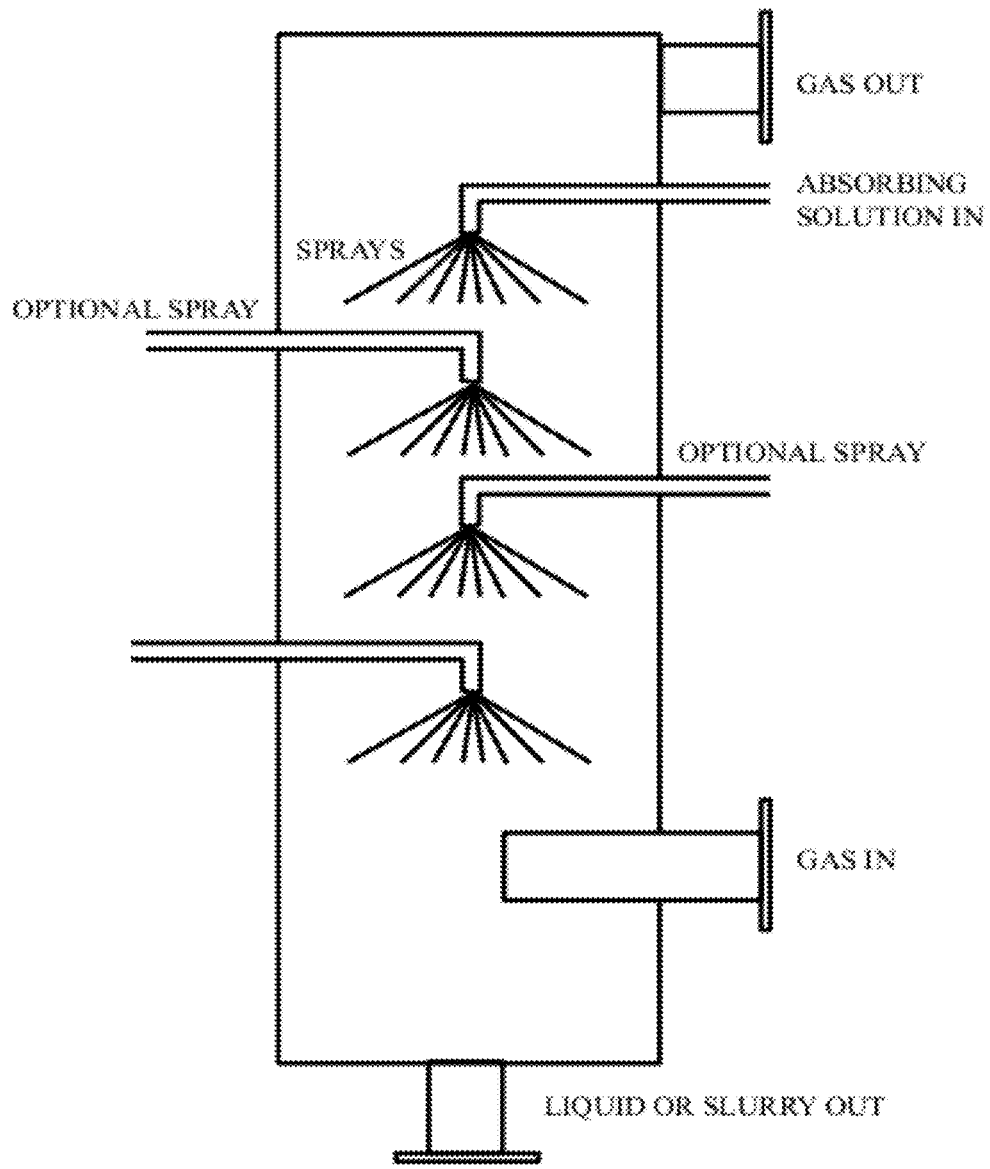
FIG. 18 is a schematic of an embodiment of the apparatus showing a possible arrangement of sprays.

FIG. 18 are schematics of an embodiment of the invention in which the apparatus comprises an array of sprays. Shown are 4 sprays; the sprays are all directed downwards in the vertically oriented apparatus. The sprays may be made in any convenient manner including using eductor or eductor-jet nozzles, dual fluid nozzles, a pressure atomizer, a rotary atomizer, an air-assist atomizer, an airblast atomizer, or an ultrasonic atomizer or any combination thereof. The flow of the gas in the apparatus is upwards, so that all of the sprays encounter the gas flow in a counter-current fashion. The gas enters the apparatus at the bottom and flows up the length of the apparatus. The apparatus may include a demisting section positioned before the gas outlet (not shown). The absorbing solution or contacting mixture may be clear liquid or it may be a slurry that contains a solid component such as a mineral, industrial waste (e.g. fly ash, cement kiln dust), and/or a precipitated material if recirculation is employed. In the case that recirculation is employed, comminution of any solids in the absorbing solution may occur. The absorbing solution or contacting mixture may include industrial waste brine, naturally occurring alkaline brine, seawater, an artificially composed or synthetic brine, or any combination thereof.

Figure 19:
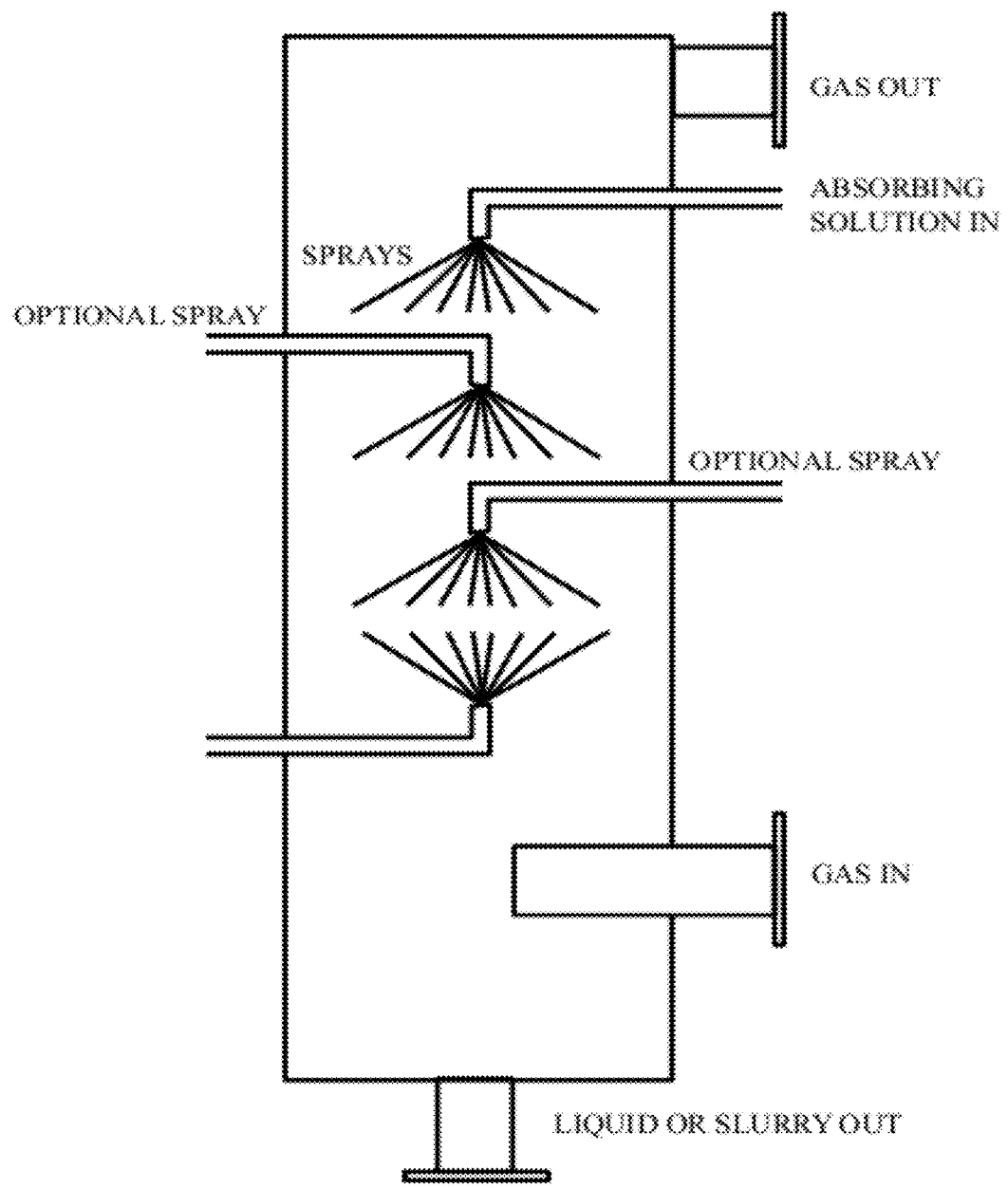
FIG. 19 is a schematic of an embodiment of the apparatus showing a possible arrangement of sprays.

FIG. 19 is a schematic of an embodiment of the invention in which the apparatus comprises an array of sprays. Shown are 4 sprays, the two center sprays are optional. The topmost spray is oriented such that the liquid (i.e. absorbing solution or contacting mixture) flows counter-current to the flow of the gas. The bottom-most spray is oriented such that the liquid flows cocurrent with the flow of the gas (up the center of the apparatus that is vertically oriented). The gas enters the apparatus at the bottom and flows up the length of the apparatus. The apparatus may include shed rows in place of the two optional sprays in the center of the apparatus. The apparatus may include a demisting section positioned before the gas outlet (not shown). The absorbing solution may be clear liquid or it may be a slurry that contains a solid component such as a mineral, industrial waste (e.g. fly ash, cement kiln dust), and/or a precipitated material if recirculation is employed. In the case that recirculation is employed, comminution of any solids in the absorbing solution may occur.

FIG. 20 shows representations of shed row configurations. On the left hand side are shown top-down, or plan, views of configurations. On the right hand side are show side sections of shed row configurations. The top-most configuration is the standard configuration of shed rows within a cylindrical chamber or column supported by a ring. The sheds are staggered such that liquid falling from the upper sheds will arrive near the apex of the sheds below. On the sides where a complete shed would not occur, a downward sloping insert is indicated. The middle configuration is that of sheds that are made into rings that are concentric. These rings of sheds are supported by wires beneath the sheds going from one side of the chamber or column to the other. The sheds are staggered, again such that liquid falling from the upper sheds will arrive near the apex of the sheds below. The bottom-most configuration of shed rows are configured such that instead of all of the sheds being aligned parallel to each other through the entire height of the chamber or column, every other level of sheds are oriented 90° to the row above and below.

Figure 21A:
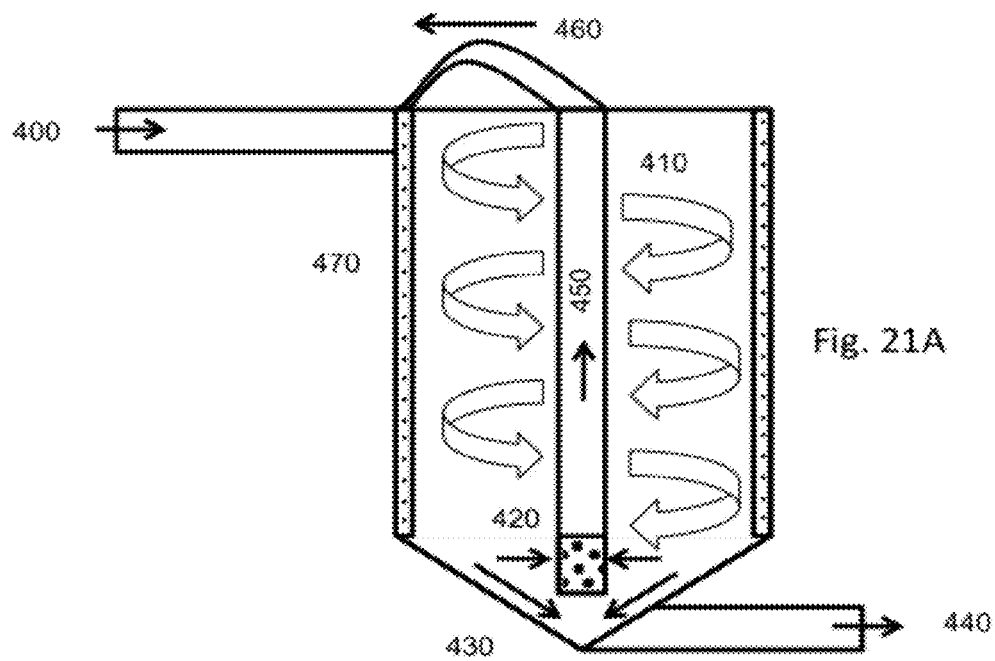
FIG. 21A shows a side view of an embodiment of the invention where liquid droplets and a gas follow a long path about a compartment wherein the gas inlet is at the top of the compartment.
Figure 21B:
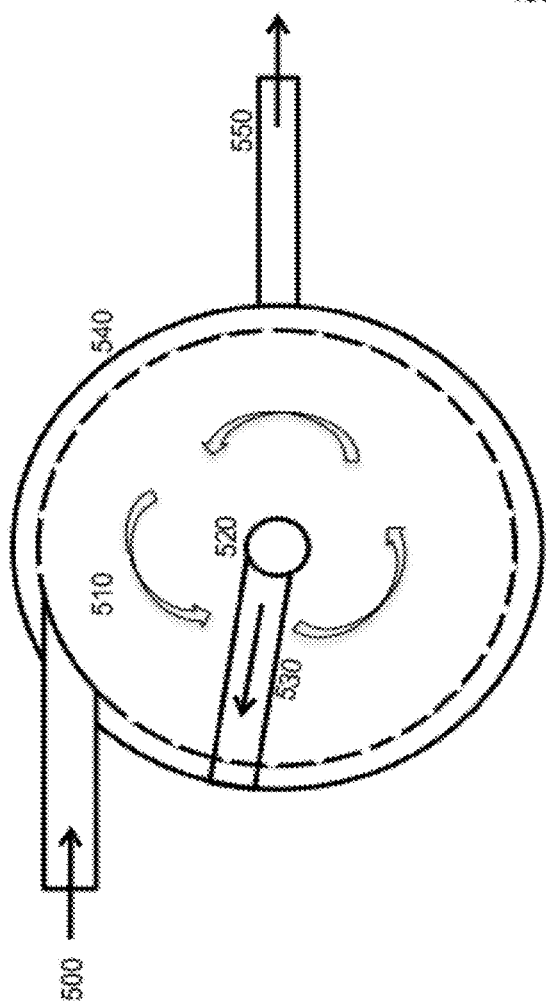
FIG. 21B shows a top-down cross-sectional view of an embodiment of the invention where liquid droplets and a gas follow a long path about a compartment wherein the gas inlet is at the top of the compartment.
Figure 22A:
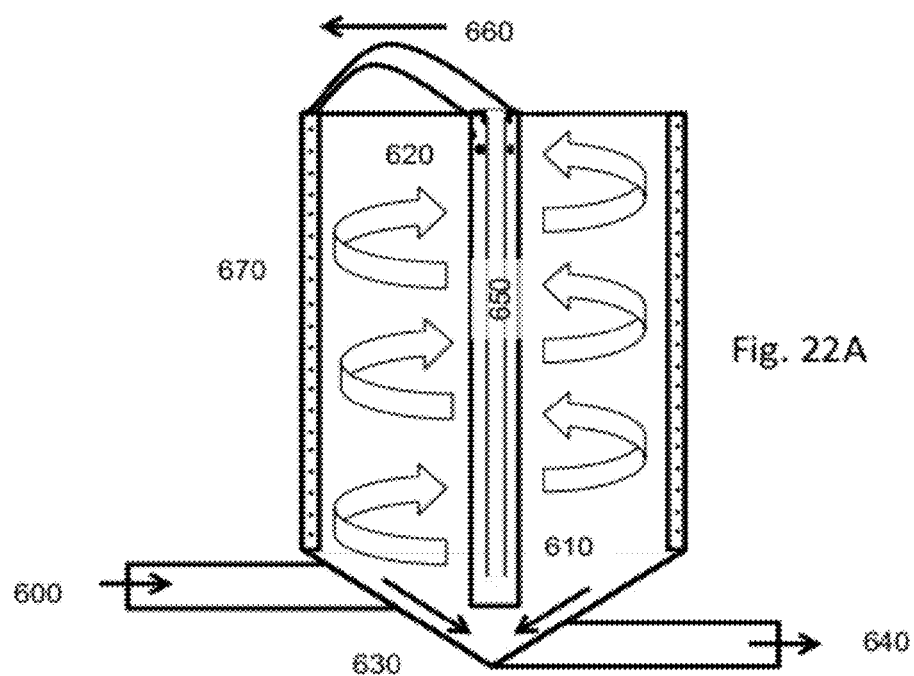
FIG. 22A shows a side view of an embodiment of the invention where liquid droplets and a gas follow a long path about a compartment wherein the gas inlet is at the bottom of the compartment.
Figure 22B:
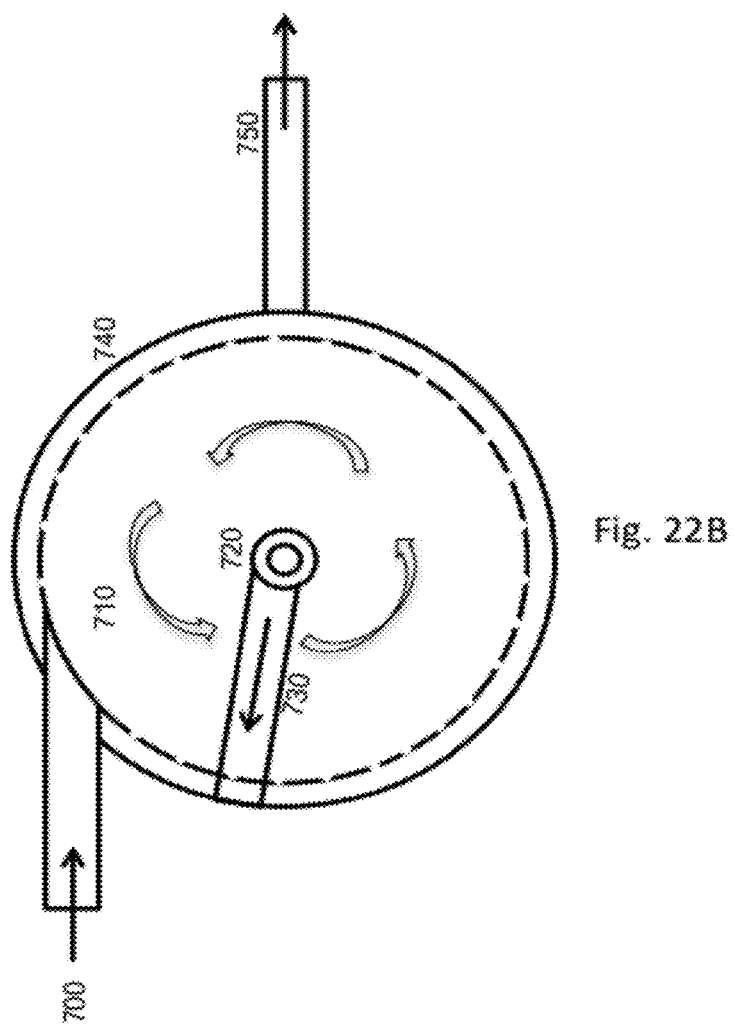
FIG. 22B shows a top-down cross-sectional view of an embodiment of the invention where liquid droplets and a gas follow a long path about a compartment wherein the gas inlet is at the bottom of the compartment.

Another aspect of highly-efficient gas-liquid contacting is the time that the liquid and gas are in contact so that the gas can incorporate into the liquid. In the case of gas bubbles in a liquid column or liquid droplets surrounded by gas, this contact time can also be called residence time. The residence time of liquid droplets in gas can be increased by creating neutrally buoyant liquid droplets, as described above. The residence time of liquid droplets in gas can also be increased by increasing the path length that the droplets follow while in contact with the gas. In some embodiments, the path length is provided by the configuration of the apparatus. Some embodiments utilize convection or movement of the liquid droplets within the contacting compartment to increase the path length, and thus the residence time, of the droplets in contact with the gas. In some embodiments, the path length is provided by a conduit joining a compartment where liquid droplets are generated with a compartment where liquid droplets are coalesced. Some embodiments provide for liquid droplets to contact a gas along a long path. In some embodiments, the long path is a helical path, as in FIGS. 21A-22B]]. In some embodiments, the gas is introduced into an apparatus with an involuted feed [FIG. 21A: 400, FIG. 21B: 500, FIG. 22A: 600, FIG. 22B: 700], such that the gas and the liquid droplets in contact with the gas follow a helical path within the contacting compartment of the apparatus [FIG. 21A: 410, FIG. 21B: 510, FIG. 22A: 610, FIG. 22B: 710]. Some embodiments utilize arrays of gas-inlets [FIG. 21A: 470, FIG. 21B: 540, FIG. 22A: 670, FIG. 22B: 740] to increase the residence time of liquid droplets in the gas, e.g. in the main contacting compartment.

A divalent cation-containing solution source and a $CO_2$-containing gas source may be operably connected to an absorber (e.g., gas-liquid contactor) of a $CO_2$ absorber as described herein. The absorber may include any of a number of different designs, including, for example, gas-liquid contactor 321 of FIGS. 23A and 23B. As shown in FIG. 23B, the gas-liquid contactor may be configured with an inlet (310) in the bottom, through which an aqueous solution of divalent cations may be introduced to the gas-liquid contactor. The gas-liquid contactor may also comprise a header or manifold 320 (FIG. 23A, FIG. 23B), into which $CO_2$-containing gas (330$i$) may be introduced. FIG. 23B provides an illustration of a vortex (i.e., turbulent mixing) that may be created in the divalent cation-containing solution when the $CO_2$-containing gas is passed through nozzles 322 (e.g., adjustable nozzles). Although it is not illustrated, the gas-liquid contactor may comprise a number of additional adjustable nozzles along the length of the gas liquid contactor. Additional adjustable nozzles may serve to maintain the vortex, especially in systems such as that illustrated FIG. 23A. The gas-liquid contactor may also be configured to have a conical shape, which shape helps to maintain and/or enhance the vortex created in the header or manifold 320. In such embodiments, additional adjustable nozzles may be still be desired, especially when enhanced mixing is desired.

A gas liquid-contactor may comprise a chamber comprising a plurality of adjustable nozzles, wherein the nozzles are configured to inject an aqueous solution comprising divalent cations into a chamber comprising an atmosphere of $CO_2$-containing gas (e.g., flue gas from a coal-fired power plant). As shown in FIG. 24, the nozzle 410 (e.g., plain orifice pressure atomizer, or the like) is configured to direct the divalent cation-containing aqueous solution against jagged surface 420 (i.e., a surface comprising numerous projections) such that the divalent cation-containing solution is dispersed into fine droplets of aqueous solution, effectively increasing the surface area of the incoming divalent cation-containing solution and optimizing the interaction of the divalent cation-containing solution with the $CO_2$-containing gas. In such embodiments, the nozzles are configured to operate at low pressure, which low-pressure operation minimizes energy demands of the process. In some embodiments, the nozzle operate at a pressure of less than 15 psi, 50 psi, 100 psi, 200 psi, 400 psi, 800 psi, or 1000 psi. In some embodiments, the nozzles are configured to have an orifice size of at least 100 microns, 200 microns, 300 microns, 400 microns, 500 microns, 750 microns, or 1000 microns. At such pressures, the nozzles, together with the jagged surface, are able to produce droplets of divalent cation-containing solution, wherein the droplets have an average diameter of less than 0.5 microns, 1 micron, 10 microns, 15 microns, 30 microns, 60 microns, 125 microns, 250 microns, 500 microns, 1000 microns, 2000 microns, or 4000 microns.

Another way in which the contact time between a gas and liquid can be effectively increased is to recirculate one within the other. In some embodiments, liquid droplets that have contacted a gas are coalesced into a liquid solution from which droplets are created and contacted with the gas again. In some embodiments, gas that has been contacted with liquid droplets is passed through an array of gas-inlets back into the contacting compartment or apparatus [FIG. 21A: 470, FIG. 21B: 540, FIG. 22A: 670, FIG. 22B: 740]. In some embodiments, both the gas and the liquid are recirculated. In embodiments where methods and apparatus are provided to increase the contact time between the gas and liquid by increasing the path length of the liquid droplets in the gas, the size of the liquid droplets can vary from an average diameter of 100 micrometers to 1 millimeter or more, such as from an average diameter of 200 micrometers to 1 millimeter, from an average diameter of 300 micrometers to 900 micrometers, from an average diameter of 400 micrometers to 900 micrometers, from an average diameter of 400 micrometers to 800 micrometers, from an average diameter of 500 micrometers to 900 micrometers, from an average diameter of 500 micrometers to 800 micrometers, from an average diameter of 500 micrometers to 700 micrometers, or from an average diameter of 400 micrometers to 700 micrometers. In some embodiments, liquid droplets of average diameter ranging from 500 micrometers to greater than 1 millimeter are provided.

Some embodiments utilize extended path length, recirculation, and high-surface area techniques in one contacting compartment. In some embodiments, the liquid used to make the liquid droplets is a slurry and contains solid material. In such embodiments, comminution, mixing of phases with size reduction of the solid component, is used with recirculation. In some embodiments, the apparatus comprises multiple droplet formation stages, some of which utilize comminution with recirculation and some of which utilize high-surface area techniques with a liquid that is does not contain solid material before exposure to gas. In some embodiments, the method comprises mixing a solid with a liquid in a manner utilizing comminution; contacting the solid and liquid mixture, or slurry, with a gas; and separating out the solids from the liquid after contact with the gas. In some embodiments, the slurry is recirculated and contacted with the gas multiple times. In some embodiments, the liquid that has been separated from the solids after the slurry has contacted the gas is recirculated.

In some embodiments, the apparatus and systems of the invention are configured to incorporate more than 20 tons/hour of carbon dioxide into an absorbing solution as averaged over 72 hours of continuous operation. In some embodiments, the apparatus and systems of the invention are configured to incorporate more than 40 tons/hour of carbon dioxide into an absorbing solution. In some embodiments, the apparatus and systems of the invention are configured to incorporate more than 60 tons/hour of carbon dioxide into an absorbing solution. In some embodiments, the apparatus and systems of the invention are configured to incorporate more than 70 tons/hour of carbon dioxide into an absorbing solution. In some embodiments, the apparatus and systems of the invention are configured to incorporate more than 80 tons/hour of carbon dioxide into an absorbing solution. In some embodiments, the apparatus and systems of the invention are configured to incorporate more than 90 tons/hour of carbon dioxide into an absorbing solution. In some embodiments, the apparatus and systems of the invention are configured to incorporate more than 100 tons/hour of carbon dioxide into an absorbing solution. In some embodiments, the apparatus and systems of the invention are configured to incorporate more than 110 tons/hour of carbon dioxide into an absorbing solution. In some embodiments, the apparatus and systems of the invention are configured to incorporate more than 120 tons/hour of carbon dioxide into an absorbing solution. In some embodiments, the apparatus and systems of the invention are configured to incorporate more than 130 tons/hour of carbon dioxide into an absorbing solution. In some embodiments the apparatus and systems of the invention are configured to incorporate more than 140 tons/hour of carbon dioxide into an absorbing solution. In some embodiments, the apparatus and systems of the invention are configured to incorporate more than 150 tons/hour of carbon dioxide into an absorbing solution. In some embodiments the apparatus and systems of the invention are configured to incorporate more than 160 tons/hour of carbon dioxide into an absorbing solution. In some embodiments, the apparatus and systems of the invention are configured to incorporate more than 170 tons/hour of carbon dioxide into an absorbing solution. In some embodiments, the apparatus and systems of the invention are configured to incorporate more than 180 tons/hour of carbon dioxide into an absorbing solution. In some embodiments, the apparatus and systems of the invention are configured to incorporate more than 190 tons/hour of carbon dioxide into an absorbing solution. In some embodiments, the apparatus and systems of the invention are configured to incorporate more than 200 tons/hour of carbon dioxide into an absorbing solution.

In some embodiments, the apparatus and systems of the invention include a apparatus and systems for removing $CO_2$ from a gaseous source, e.g., an industrial gaseous source of $CO_2$ such as flue gas from a power plant, or such as exhaust gas from a cement plant, in which the apparatus and systems are configured to subject a water (e.g. a sea water, a brine, an absorbing solution) into which $CO_2$ has been dissolved from the gaseous source of $CO_2$ (e.g. an industrial source of carbon dioxide) to precipitation conditions, where the precipitation conditions provide precipitate in an amount of 2.6 grams of precipitate per liter of absorbing solution to 26.11 grams of precipitate per liter of absorbing solution averaged over a period of 72 hours of continuous application of the precipitation conditions. In some embodiments, the apparatus and systems are configured to provide precipitation conditions that provide precipitate in an amount of 5.2 grams of precipitate per liter of absorbing solution to 26.11 grams of precipitate per liter of absorbing solution averaged over a period of 72 hours of continuous application of the precipitation conditions. In some embodiments, the apparatus and systems are configured to provide precipitation conditions that provide precipitate in an amount of 7.83 grams of precipitate per liter of absorbing solution to 26.11 grams of precipitate per liter of absorbing solution averaged over a period of 72 hours of continuous application of the precipitation conditions, such as 9.14 to 26.11, such as 10.44 to 26.11, such as 11.75 to 26.11, such as 13.05 to 26.11, such as 14.36 to 26.11, such as 15.66 to 26.11, such as 16.97 to 26.11, such as 18.27 to 26.11, such as 19.58 to 26.11, such as 20.88 to 26.11, such as 22.19 to 26.11, such as 23.5 to 26.11, such as 24.8 to 26.11 grams of precipitate per liter of absorbing solution.

The carbonate mineral precipitation station 20 (i.e., reactor) may include any of a number of different components, such as temperature control components (e.g., configured to heat the water to a desired temperature), chemical additive components, e.g., for introducing chemical pH elevating agents (such as KOH, NaOH) into the water, electrolysis components, e.g., cathodes/anodes, etc, gas charging components, pressurization components (for example where operating the protocol under pressurized conditions, such as from 50-800 psi, or 100-800 psi, or 400 to 800 psi, or any other suitable pressure range, is desired) etc, mechanical agitation and physical stirring components and components to re-circulate industrial plant flue gas through the precipitation plant.

The carbonate mineral precipitation station 20 may include any of a number of different components that allow for the monitoring (e.g., inline monitoring) of one or more parameters such as internal reactor pressure, pH, precipitate particle size, metal-ion concentration, conductivity of the aqueous solution, alkalinity of the aqueous solution, and $pCO_2$. Monitoring conditions during the carbonate precipitation process may allow for corrective adjustments to be made during the precipitation process. For example, corrective adjustments may be made to increase or decrease carbonate compound precipitation production. In some embodiments, the carbonate precipitation process is monitored with an inline monitoring apparatus operably connected to the carbonate mineral precipitation station, the inline monitoring apparatus comprising a dilution manifold, an ion selective electrode, a voltmeter, a controller, and a source of diluent. FIG. 25 illustrates one possible inline monitor 1600. Operationally, a controller (1660) controls a variable flow control valve (1621), the controller-operated variable flow control valve allowing precipitation station effluent to enter a dilution manifold (1630), typically after passing through a filter (not shown in FIG. 25) to remove carbonate mineral precipitate. Undiluted precipitation station effluent is then measured for ion concentration. To effect an ion concentration measurement, a voltmeter (1650) coupled to one or more electrodes (1640) selective for a particular ion (e.g., $Ca^{2+}$ or $Mg^{2+}$), for example, is employed. Should a measured voltage be outside an accepted voltage range (e.g., outside the linear portion of a plot of voltage vs. ion concentration), the precipitation station effluent in the dilution manifold is diluted with diluent (1610). The controller, operably connected to both the voltmeter and the diluent, monitors and logs diluent delivery through a controller-operated variable control valve (1610). Controlled diluent delivery is slowed or stopped when voltage readings fall within the accepted range. Depending upon controller-determined ion concentration for the ion of interest in the original precipitation station effluent, diluent may be added to the precipitation station via variable flow control valve 1612 (e.g., if ion concentration is high) or precipitation station effluent may be drained from the precipitation station via valve 1622 (e.g., if ion concentration is low) occur with concomitant delivery of a more concentrated ion solution through an inlet to the precipitation station.

It may be desirable to incorporate one or more components from a gaseous stream into an absorbing solution, such as removing carbon dioxide and optionally SOx, NOx, and other non-$CO_2$ acid gases from an industrial flue gas, without the formation of solid precipitates. In such cases, the controllers, monitoring apparatus, and precipitation conditions described in more detail elsewhere herein may be used to optimize incorporation of at least one component from a gas into an absorbing solution and continue the prevention of the release of the one or more components to the Earth's atmosphere. In cases where incorporation of components of a gaseous stream into an absorbing solution does not lead to precipitation, the resulting solution may be further processed by a system to recover a useable absorbing solution or to recover water that is potable or suitable for irrigation purposes. Alternatively, in cases where incorporation of components of a gaseous stream into an absorbing solution does not lead to precipitation, the resulting solution may be sent to a retention facility, such as, but not limited to, a subterranean location, including a geological formation such as an aquifer. Such solutions resulting from the incorporation of components of a gaseous stream into an absorbing solution may be transported to a retention facility using any convenient method, including, but not limited to, conduits such as pipes or trenches, tanker trucks, pumps, tanks transported via rail or barge, or a combination thereof.

As illustrated in FIG. 6A, the precipitation product resulting from precipitation at step 20 may be separated from the precipitation station effluent at step 40 to produce separated precipitation product. As a freshly separated precipitation product may be dried in a later step, the separated precipitation product may also be a "wet dewatered precipitate." Separation of the precipitation product from the precipitation station effluent is achieved using any of a number of convenient approaches, including draining (e.g., gravitational sedimentation of the precipitation product followed by draining), decanting, filtering (e.g., gravity filtration, vacuum filtration, filtration using forced air), centrifuging, pressing, or any combination thereof. In some embodiments, precipitation product is separated from precipitation station effluent by flowing precipitation station effluent against a baffle, against which supernatant deflects and separates from particles of precipitation product, which is collected in a collector. In some embodiments, precipitation product is separated from precipitation station effluent by flowing precipitation station effluent in a spiral channel separating particles of precipitation product and collecting the precipitation product in from an array of spiral channel outlets. Mechanically, at least one liquid-solid separation apparatus is operably connected to the precipitation station such that precipitation station effluent may flow from the precipitation station to the liquid-solid separation apparatus (e.g., liquid-solid separation apparatus comprising either a baffle or a spiral channel). The precipitation station effluent may flow directly to the liquid-solid separation apparatus, or the effluent may be pre-treated as described in more detail below.

Energy requirements for any of the foregoing separation approaches may be fulfilled by adapting the approach to utilize any of a number of energy-containing waste streams (e.g., waste heat or waste gas streams) provided by industrial plants; however, it will be appreciated by a person having ordinary skill in the art that separation approaches requiring less energy are desirable in terms of lessening the carbon footprint of the invention.

Concentration and separation of the precipitation product from the precipitation station effluent may be achieved continuously or batch wise with methods and liquid-solid separation apparatus described in WO 2007/051640 and CA 02628270, the disclosures of which are incorporated herein by reference. In some embodiments, the liquid-solid separation apparatus comprises a container having a funnel shaped section, a precipitation station effluent pipe arranged in the container to extend in a longitudinal direction and opening into the container through an inlet opening for introducing the precipitation station effluent flow falling through the precipitation station effluent pipe, and a removal opening formed at the lower end of the funnel-shaped section for removing separated precipitation product from the container characterized by a baffle arranged in the region of the inlet opening by which the precipitation station effluent flow is deflected. Liquid-solid separators such as Epuramat's Extrem-Separator ("ExSep") liquid-solid separator, or a modification thereof, are useful in some embodiments for separation of the precipitation product from precipitation station effluent.

To separate precipitation product from the water, the precipitation station effluent is introduced in the direction of gravity into a bath, in which precipitation product particles descend under the action of gravity and are removed from the lower region thereof. This removal of the precipitation product particles may be performed continuously or batch-wise. Precipitation station effluent, upon its introduction into the bath, is flowed against a baffle, by which the flow in the bath is deflected. By this process control a hydraulic-physical reaction zone is generated in the region of the inlet opening, in which at least the predominant flow energy of the precipitation station effluent flowing in the direction of gravity is destroyed. Deflecting the precipitation station effluent flow flowing into the precipitation station effluent pipe in a vertical direction favors the separation of the precipitation product particles due to the density differences over the water. On deflecting the precipitation station effluent, the heavier precipitation product particles have a greater tendency to continue their path of motion in the direction of the precipitation station effluent pipe (i.e., in the downward direction, while the water is deflected and, separated from the heavy precipitation product particles, ascends. The destruction of the flow energy is substantially caused by the deflection losses when flowing against the baffle (i.e., in the flow direction of precipitation station effluent flowing through the precipitation station effluent pipe on and predominantly after exiting the precipitation station effluent pipe downstream of the baffle. Precipitation station effluent is particularly deflected in such a way that precipitation product particles (i.e., particles having a higher density than the water, which, generally, are to descend with the container continue their descending motion initiated by the precipitation station effluent pipe during the introduction in to the bath in a substantially undisturbed manner. The deflection should not have the result that the precipitation product particles having higher density, that is, the precipitation product particles have an upwardly directed speed compound imposed on them during the deflection. Such speed component should solely be imposed on the light water during the deflection so that as a result of the deflection at the baffle, the water receives the desired speed component for ascending in the bath.

Alternatively, concentration and separation of the precipitation product from the precipitation station effluent may be achieved continuously or batch wise with methods and liquid-solid separation apparatus described in US 2008/018331, the disclosure of which is incorporated herein by reference. In some embodiments, the liquid-solid separation apparatus comprises an inlet operative to receive precipitation station effluent; a channel operative to allow flow of the precipitation station effluent, the channel being in a spiral configuration; a separating means for separating precipitation product from precipitation station effluent; and at least one outlet for precipitation product-depleted supernatant. Liquid-solid separators such as Xerox PARC's spiral concentrator, or a modification thereof, are useful in some embodiments for separation of the precipitation product from precipitation station effluent.

Precipitation product is separated from the precipitation station effluent based on size and mass separation of precipitation product particles, which are made to flow in a spiral channel. On the spiral sections, the inward directed transverse pressure field from fluid shear competes with the outward directed centrifugal force to allow for separation of precipitation product particles. At high velocity, centrifugal force dominates and precipitation product particles move outward. At low velocities, transverse pressure dominates and the precipitation product particles move inward. The magnitudes of the two opposing forces depend on flow velocity, particle size, radius of curvature of the spiral section, channel dimensions, and viscosity of the precipitation station effluent. At the end of the spiral channel, a parallel array of outlets collects separated particles of precipitation product. For any particle size, the required channel dimension is determined by estimating the transit time to reach the side-wall. This time is a function of flow velocity, channel width, viscosity, and radius of curvature. Larger particles of precipitation product may reach the channel wall earlier than the smaller particles which need more time to reach the side wall. Thus, a spiral channel may have multiple outlets along the channel. This technique is inherently scalable over a large size range from sub-millimeter down to 1 micron.

It may be desirable to pre-treat (e.g., coarse filtration) the precipitation station effluent to remove large-sized particles of precipitation product from the effluent prior to providing the effluent to the liquid-solid separation apparatus as large-sized particles may interfere with the liquid-solid separation apparatus or process. Separation of the precipitation product from the precipitation station effluent may be achieved with a single liquid-solid separation apparatus. In some embodiments, a combination of two, three, four, five, or more than five liquid-solid separation apparatus may be used to separate the precipitation product from the precipitation station effluent. Combinations of liquid-solid separators may be used in series, parallel, or in combination of series and parallel depending on desired throughput. In some embodiments, liquid-solid separation apparatus or combinations thereof are capable of processing precipitation station effluent at 100 L/min to 2,000,000 L/min, 100 L/min to 1,000,000 L/min, 100 L/min to 500,000 L/min, 100 L/min to 250,000 L/min, 100 L/min to 100,000 L/min, 100 L/min to 50,000 L/min, 100 L/min to 25,000 L/min, and 100 L/min to 20,000 L/min. In some embodiments, liquid-solid separation apparatus or combinations thereof are capable of processing precipitation station effluent at 1000 L/min to 2,000,000 L/min, 5000 L/min to 2,000,000 L/min, 10,0000 L/min to 2,000,000 L/min, 20,000 L/min to 2,000,000 L/min, 25,000 L/min to 2,000,000 L/min, 50,000 L/min to 2,000,000 L/min, 100,000 L/min to 2,000,000 L/min, 250,000 L/min to 2,000,000 L/min, 500,000 L/min to 2,000,000 L/min, and 1,000,000 L/min to 2,000,000 L/min. In some embodiments, liquid-solid separation apparatus or combinations thereof are capable of processing precipitation station effluent at 1000 L/min to 20,000 L/min, 5000 L/min to 20,000 L/min, 10,000 L/min to 20,000 L/min, 1000 L/min to 10,000 L/min, 2000 L/min to 10,000 L/min, 3000 L/min to 10,000 L/min, 4000 L/min to 10,000 L/min, 5000 L/min to 10,000 L/min, 6000 L/min to 10,000 L/min, 7000 L/min to 10,000 L/min, 8000 L/min to 10,000 L/min, 9000 L/min to 10,000 L/min, or 9500 L/min to 10,000 L/min.

Combinations of liquid-solid separators in series, parallel, or in combination of series and parallel may also be used to increase separation efficiencies. In addition, the supernatant resulting from one or more liquid-solid separation apparatus may be recirculated through the liquid-solid separation apparatus to increase separation efficiency. In some embodiments, 30% to 100%, 40% to 100%, 50% to 100%, 60% to 100%, 70% to 100%, 75% to 100%, 80% to 100%, 85% to 100%, 90% to 100%, 95% to 100%, 96% to 100%, 97% to 100%, 98% to 100%, 99% to 100% of precipitation product is collected from the precipitation station effluent. Depending on the amount of precipitation product removed from the precipitation station effluent, the supernatant may be delivered back to the precipitation station or provided to an electrolytic cell of the invention. In some embodiments, supernatant with a relatively high concentration of precipitation product is delivered back to the precipitation station for agglomeration of precipitation product particles. In some embodiments, supernatant with a relatively high concentration of dissolved divalent cations (e.g., $Ca^{2+}$ or $Mg^{2+}$) is delivered back to the precipitation station as a source of divalent cations. In some embodiments, supernatant with a relatively low concentration of precipitation product and dissolved divalent cations is filtered to remove a substantial amount of the remaining divalent cations and provided to an electrolytic cell of the invention.

This removal of the precipitation product particles may be performed continuously or batch-wise.

In some embodiments the precipitation product is not separated, or is only partially separated, from the precipitation station effluent. In such embodiments, the effluent, including some (e.g., after passing through a liquid-solid separation apparatus) or all of the precipitation product, may be disposed of in any of a number of different ways. In some embodiments, the effluent from the precipitation station, including some or all of the precipitation product, is transported to a land or water location and deposited at the location, Transportation to the ocean is especially useful in embodiments wherein the source of water is seawater. It will be appreciated that the carbon footprint, amount of energy used, and/or amount of $CO_2$ produced for sequestering a given amount of $CO_2$ from an industrial exhaust gas is minimized in a process where no further processing beyond disposal occurs with the precipitate.

In the embodiment illustrated in FIG. 6A, the resultant dewatered precipitate is then dried to produce a product, as illustrated at step 60 of FIG. 6A. Drying can be achieved by air drying the filtrate. Where the filtrate is air dried, air drying may be at room or elevated temperature. In certain embodiments, the elevated temperature is provided by the industrial plant gaseous waste stream, as illustrated at step 70 of FIG. 7. In these embodiments, the gaseous waste stream (e.g., flue gas) from the power plant may be first used in the drying step, where the gaseous waste stream may have a temperature ranging from 30 to 700° C., such as 75 to 300° C. The gaseous waste stream may be contacted directly with the wet precipitate in the drying stage, or used to indirectly heat gases (such as air) in the drying stage. The desired temperature may be provided in the gaseous waste stream by having the gas conveyer, e.g., duct, from the industrial plant originate at a suitable location, e.g., at a location a certain distance in the HRSG or up the flue, as determined based on the specifics of the exhaust gas and configuration of the industrial plant. In yet another embodiment, the precipitate is spray dried to dry the precipitate, where the liquid containing the precipitate is dried by feeding it through a hot gas (such as the gaseous waste stream from the industrial plant), e.g., where the liquid feed is pumped through an atomizer into a main drying chamber and hot gas is passed as a co-current or counter-current to the atomizer direction. In certain embodiments, drying is achieved by freeze-drying (i.e., lyophilization), where the precipitate is frozen, the surrounding pressure is reduced and enough heat is added to allow the frozen water in the material to sublime directly from the frozen precipitate phase to gas. Depending on the particular drying protocol of the system, the drying station may include a filtration element, freeze drying structure, spray drying structure, etc.

Where desired, the dewatered precipitate product from the separation reactor 40 may be washed before drying, as illustrated at optional step 50 of FIG. 6A. The precipitate may be washed with freshwater, e.g., to remove salts (such as NaCl) from the dewatered precipitate. Used wash water may be disposed of as convenient, e.g., disposing of it in a tailings pond, etc.

In certain embodiments of the invention, the precipitate can be separated, washed, and dried in the same station for all processes, or in different stations for all processes or any other possible combination. For example, in one embodiment, the precipitation and separation may occur in precipitation reactor 20, but drying and washing occur in different reactors. In yet another embodiment, precipitation, separation, and drying may occur all in the precipitation reactor 20 and washing occurring in a different reactor.

Following separation of the precipitate from the mother liquor, e.g., as described above, the separated precipitate may be further processed as desired. In certain embodiments, the precipitate may then be transported to a location for long term storage, effectively sequestering $CO_2$. For example, the precipitate may be transported and placed at long term storage sites, e.g., above ground, below ground, in the deep ocean, etc. as desired.

The dried product may be disposed of in a number of different ways. In certain embodiments, the precipitate product is transported to a location for long term storage, effectively sequestering $CO_2$ in a stable precipitated product, e.g., as a storage-stable above ground $CO_2$-sequestering material. For example, the precipitate may be stored at a long term storage site adjacent to the industrial plant and precipitation system. In yet other embodiments, the precipitate may be transported and placed at long term storage sites, e.g., above ground, below ground, etc. as desired, where the long term storage site is distal to the power plant (which may be desirable in embodiments where real estate is scarce in the vicinity of the power plant). In these embodiments where the precipitate is transported to a long term storage site, it may be transported in empty conveyance vehicles (e.g., barges, train cars, trucks, etc.) that were employed to transport the fuel or other materials to the industrial plant and/or precipitation plant. In this manner, conveyance vehicles used to bring fuel to the industrial plant, materials to the precipitation plant (e.g., alkali sources) may be employed to transport precipitated product, and therefore sequester $CO_2$ from the industrial plant.

In certain embodiments, the composition is disposed of in an underwater location. Underwater locations may vary depending on a particular application. While the underwater location may be an inland underwater location, e.g., in a lake, including a freshwater lake, or interest in certain embodiments are ocean or sea underwater locations. The composition may be still in the mother liquor, without separation or without complete separation, or the composition may have been separated from the mother liquor. The underwater location may be shallow or deep. Shallow locations are locations which are 200 feet or less, such as 150 feet or less, including 1000 feet or less. Deep locations are those that are 200 feet or more, e.g., 500 feet or more, 1000 feet or more, 2000 feet or more, including 5000 feet or more.

Where desired, the compositions made up of the precipitate and the mother liquor may be stored for a period of time following precipitation and prior to disposal. For example, the composition may be stored for a period of time ranging from 1 to 1000 days or longer, such as 1 to 10 days or longer, at a temperature ranging from 1° C. to 40° C., such as 20° C. to 25° C.

Any convenient protocol for transporting the composition to the site of disposal may be employed, and will necessarily vary depending on the locations of the precipitation reactor and site of disposal relative to each other, where the site of disposal is an above ground or below ground site disposal, etc. In certain embodiments, a pipeline or analogous slurry conveyance structure is employed, where these approaches may include active pumping, gravitational mediated flow, etc., as desired.

While in certain embodiments the precipitate is directly disposed at the disposal site without further processing following precipitation, in yet other embodiments the composition may be further processed prior to disposal. For example, in certain embodiments solid physical shapes may be produced from the composition, where the resultant shapes are then disposed of at the disposal site of interest. One example of this embodiment is where artificial reef structures are produced from the carbonate compound compositions, e.g., by placing the flowable composition in a suitable mold structure and allowing the composition to solidify over time into the desired shape. The resultant solid reef structures may then be deposited in a suitable ocean location, e.g., a shallow underwater locations, to produce an artificial reef, as desired.

In certain embodiments, the precipitate produced by the methods of the invention is disposed of by employing it in an article of manufacture. In other words, the product is employed to make a man-made item, i.e., a manufactured item. The product may be employed by itself or combined with one or more additional materials, such that it is a component of the manufactured items. Manufactured items of interest may vary, where examples of manufactured items of interest include building materials and non-building materials, such as non-cementitious manufactured items. Building materials of interest include components of concrete, such as cement, aggregate (both fine and coarse), supplementary cementitious materials, etc. Building materials of interest also include pre-formed building materials.

Where the product is disposed of by incorporating the product in a building material, the $CO_2$ from the gaseous waste stream of the industrial plant is effectively sequestered in the built environment. Examples of using the product in a building material include instances where the product is employed as a construction material for some type of manmade structure, e.g., buildings (both commercial and residential), roads, bridges, levees, dams, and other manmade structures etc. The building material may be employed as a structure or nonstructural component of such structures. In such embodiments, the precipitation plant may be co-located with a building products factory.

In certain embodiments, the precipitate product is refined (i.e., processed) in some manner prior to subsequent use. Refinement as illustrated in step 80 of FIG. 6A may include a variety of different protocols. In certain embodiments, the product is subjected to mechanical refinement, e.g., grinding, in order to obtain a product with desired physical properties, e.g., particle size, etc. In certain embodiments, the precipitate is combined with a hydraulic cement, e.g., as a supplemental cementitious material, as a sand, a gravel, as an aggregate, etc. In certain embodiments, one or more components may be added to the precipitate, e.g., where the precipitate is to be employed as a cement, e.g., one or more additives, sands, aggregates, supplemental cementitious materials, etc. to produce final product, e.g., concrete or mortar, 90.

In certain embodiments, the carbonate compound precipitate is utilized to produce aggregates. Such aggregates, methods for their manufacture, and use thereof are described in co-pending U.S. Patent Application Publication No. US 2010-0024686 A1, published 4 Feb. 2010, which is incorporated herein by reference in its entirety.

In certain embodiments, the carbonate compound precipitate is employed as a component of hydraulic cement. The term "hydraulic cement" is employed in its conventional sense to refer to a composition that sets and hardens after combining with water. Setting and hardening of the product produced by combination of the cements of the invention with an aqueous fluid result from the production of hydrates that are formed from the cement upon reaction with water, where the hydrates are essentially insoluble in water. Such carbonate compound component hydraulic cements, methods for their manufacture and use are described in co-pending U.S. Patent Application Publication No. US 2009-0020044 A1, published 22 Jan. 2009, which is incorporated herein by reference in its entirety.

Also of interest are formed building materials. The formed building materials of the invention may vary greatly. By "formed" is meant shaped, e.g., molded, cast, cut or otherwise produced, into a man-made structure defined physical shape, i.e., configuration. Formed building materials are distinct from amorphous building materials, e.g., particulate (such as powder) compositions that do not have a defined and stable shape, but instead conform to the container in which they are held, e.g., a bag or other container. Illustrative formed building materials include, but are not limited to: bricks; boards; conduits; beams; basins; columns; drywalls; etc. Further examples and details regarding formed building materials include those described in U.S. patent application Ser. No. 12/571,398, filed 30 Sep. 2009, which is incorporated herein by reference in its entirety.

Also of interest are non-cementitious manufactured items that include the product of the invention as a component. Non-cementitious manufactured items of the invention may vary greatly. By non-cementitious is meant that the compositions are not hydraulic cements. As such, the compositions are not dried compositions that, when combined with a setting fluid, such as water, set to produce a stable product. Illustrative compositions include, but are not limited to: paper products; polymeric products; lubricants; asphalt products; paints; personal care products, such as cosmetics, toothpastes, deodorants, soaps and shampoos; human ingestible products, including both liquids and solids; agricultural products, such as soil amendment products and animal feeds; etc. Further examples and details non-cementitious manufactured items include those described in U.S. patent application Ser. No. 12/609,491, filed 30 Oct. 2009, which is incorporated herein by reference in its entirety.

The resultant mother liquor may also be processed as desired. For example, the mother liquor may be returned to the source of the water, e.g., ocean, or to another location. In certain embodiments, the mother liquor may be contacted with a source of $CO_2$, e.g., as described above, to sequester further $CO_2$. For example, where the mother liquor is to be returned to the ocean, the mother liquor may be contacted with a gaseous source of $CO_2$ in a manner sufficient to increase the concentration of carbonate ion present in the mother liquor. Contact may be conducted using any convenient protocol, such as those described above. In certain embodiments, the mother liquor has an alkaline pH, and contact with the $CO_2$ source is carried out in a manner sufficient to reduce the pH to a range between 5 and 9, e.g., 6 and 8.5, including 7.5 to 8.2. Accordingly, the resultant mother liquor of the reaction, e.g., mineral carbonate depleted water, may be disposed of using any convenient protocol. In certain embodiments, it may be sent to a tailings pond for disposal. In certain embodiments, it may be disposed of in a naturally occurring body of water, e.g., ocean, sea, lake, or river. In certain embodiments, it may be employed as a coolant for the industrial plant, e.g., by a line running between the precipitation system and the industrial plant. In certain embodiments, it may be employed as grey water, as water input for desalination and subsequent use as fresh water, e.g., in irrigation, for human and animal consumption, etc. Accordingly, of interest are configurations where the precipitation plant is co-located with a desalination plant, such that output water from the precipitation plant is employed as input water for the desalination plant.

As mentioned above, in certain embodiments the mother liquor produced by the precipitation process may be employed to cool the power plant that supplies the source of $CO_2$, e.g., in a once through cooling system. In such embodiments, heat picked up in the process may then be recycled back to precipitation plant for further use, as desired. In such embodiments, the initial water source may come from the industrial plant. Such embodiments may be modified to employ pumping capacity provided by the industrial plant, e.g., to increase overall efficiencies.

Where desired and subsequent to the production of a $CO_2$-sequestering product, e.g., as described above, the amount of $CO_2$ sequestered in the product is quantified. By "quantified" is meant determining an amount, e.g., in the form of a numeric value, of $CO_2$ that has been sequestered (i.e., fixed) in the $CO_2$-sequestering product. The determination may be an absolute quantification of the product where desired, or it may be an approximate quantification, i.e., not exact. In some embodiments, the quantification is adequate to give a market-acceptable measure of the amount of $CO_2$ sequestered.

The amount of $CO_2$ in the $CO_2$-sequestering product may be quantified using any convenient method. In certain embodiments the quantification may be done by actual measurement of the composition. A variety of different methods may be employed in these embodiments. For example, the mass or volume of the composition is measured. In certain embodiments, such measurement can be taken while the precipitate is in the mother liquor. In these cases, additional methods such as x-ray diffraction may be used to quantify the product. In other embodiments, the measurement is taken after the precipitate has been washed and/or dried. The measurement is then used to quantify the amount of $CO_2$ sequestered in the product, for example, by mathematical calculation. For example, a Coulometer may be used to obtain a reading of the amount of carbon in the precipitated sequestration product. This Coulometer reading may be used to determine the amount of carbonate in the precipitate, which may then be converted into $CO_2$ sequestered by stoichiometry based on several factors, such as the initial metal ion content of the water, the limiting reagent of the chemical reaction, the theoretical yield of the starting materials of the reaction, waters of hydration of the precipitated products, etc. In some embodiments, contaminants may be present in the product, and other determinations of the purity of the product, e.g., elemental analysis, may be necessary to determine the amount of $CO_2$ sequestered.

In yet other embodiments, an isotopic method is employed to determine the carbon content of the product. The ratio of carbon isotopes in fossil fuels is substantially different than the ratio of such isotopes in geologic sources such as limestone. Accordingly, the source or ratio of sources of carbon in a sample is readily elucidated via mass spectrometry that quantitatively measures isotopic mass. So even if limestone aggregate is used in concrete (which will increase total carbon determined via coulometry), the utilization of mass spectrometry for isotopic analysis will allow elucidation of the amount of the carbon attributable to captured $CO_2$ from fossil fuel combustion. In this manner, the amount of carbon sequestered in the precipitate or even a downstream product that incorporates the precipitate, e.g., concrete, may be determined, particularly where the $CO_2$ gas employed to make the precipitate is obtained from combustion of fossil fuels, e.g., coal. Benefits of this isotopic approach include the ability to determine carbon content of pure precipitate as well as precipitate that has been incorporated into another product, e.g., as an aggregate or sand in a concrete, etc.

In other embodiments, the quantification may be done by making a theoretical determination of the amount of $CO_2$ sequestered, such as by calculating the amount of $CO_2$ sequestered. The amount of $CO_2$ sequestered may be calculated by using a known yield of the above-described method, such as where the yield is known from previous experimentation. The known yield may vary according to a number of factors, including one or more of the input of gas (e.g. $CO_2$) and water, the concentration of metal ions (e.g., alkaline earth metal ions), pH, salinity, temperature, the rate of the gaseous stream, the embodiment of the method selected, etc., as reviewed above. Standard information, e.g., a predetermined amount of $CO_2$ sequestered per amount of product produced by a given reference process, may be used to readily determine the quantity of $CO_2$ sequestered in a given process that is the same or approximately similar to the reference process, e.g., by determining the amount produced and then calculating the amount of $CO_2$ that must be sequestered therein.

Systems of $CO_2$ Sequestration

Aspects of the invention further include systems, e.g., processing plants or factories, for sequestering $CO_2$, e.g., by practicing methods as described above. Systems of the invention may have any configuration that enables practice of the particular production method of interest.

Figure 2:
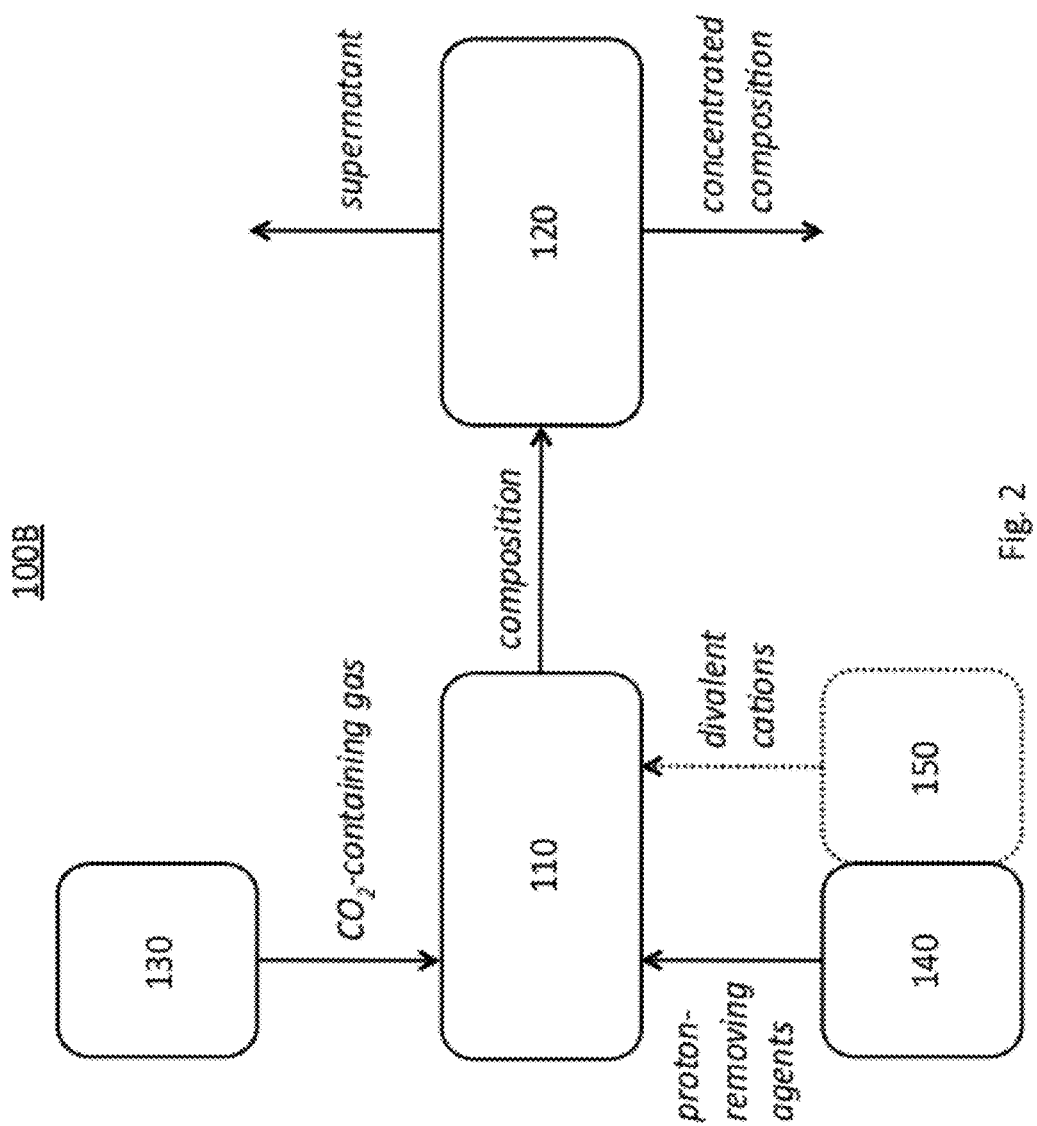

In some embodiments, the invention provides a system for processing carbon dioxide as shown in FIG. 1, wherein the system comprises a processor (110) configured for an aqueous-based process for processing carbon dioxide from a source of carbon dioxide (130) using a source of proton-removing agents (140), and wherein the source of carbon dioxide comprises one or more additional components in addition to carbon dioxide. As shown in FIG. 1, the system may further comprise a source of divalent cations (150) operably connected to the processor. The processor may comprise a contactor such as a gas-liquid or a gas-liquid-solid contactor, wherein the contactor is configured for charging an aqueous solution or slurry with carbon dioxide to produce a carbon dioxide-charged composition, which composition may be a solution or slurry. In some embodiments, the contactor is configured to produce compositions from the carbon dioxide, such as from solvated or hydrated forms of carbon dioxide (e.g., carbonic acid, bicarbonates, carbonates), wherein the compositions comprise carbonates, bicarbonates, or carbonates and bicarbonates. In some embodiments, the processor may further comprise a reactor configured to produce compositions comprising carbonates, bicarbonates, or carbonates and bicarbonates from the carbon dioxide. In some embodiments, the processor may further comprise a settling tank configured for settling compositions comprising precipitation material comprising carbonates, bicarbonates, or carbonates and bicarbonates. As shown in FIG. 2, the system may further comprise a treatment system (e.g., treatment system 120 of FIG. 2) configured to concentrate compositions comprising carbonates, bicarbonates, or carbonates and bicarbonates and produce a supernatant; however, in some embodiments the compositions are used without further treatment. For example, systems of the invention may be configured to directly use compositions from the processor (optionally with minimal post-processing) in the manufacture of building materials. In another non-limiting example, systems of the invention may be configured to directly inject compositions from the processor (optionally with minimal post-processing) into a subterranean site as described in U.S. Provisional Patent Application No. 61/232,401, filed 7 Aug. 2009, which is incorporated herein by reference in its entirety. The source of carbon dioxide may be any of a variety of industrial sources of carbon dioxide, including, but not limited to, coal-fired power plants and cement plants. The source of proton-removing agents may be any of a variety of sources of proton-removing agents, including, but not limited to, natural sources of proton-removing agents and industrial sources of proton-removing agents (including industrial waste sources). The source of divalent cations may be from any of a variety of sources of divalent cations, including, but not limited to, seawater, brines, and freshwater with added minerals. In such embodiments, the source of divalent cations may be operably connected to the source of proton-removing agents or directly to the processor. In some embodiments, the source of divalent cations comprises divalent cations of alkaline earth metals (e.g., $Ca^{2+}$, $Mg^{2+}$).

Systems of the invention such as that shown in FIG. 1 may further comprise a treatment system. As such, in some embodiments, the invention provides a system for processing carbon dioxide as shown in FIG. 2, wherein the system comprises a processor (110) and a treatment system (120) configured for an aqueous-based process for processing carbon dioxide from a source of carbon dioxide (130) using a source of proton-removing agents (140), and wherein the source of carbon dioxide comprises one or more additional components in addition to carbon dioxide. As with FIG. 1, the system of FIG. 2 may further comprise a source of divalent cations (150) operably connected to the processor. The processor may comprise a contactor such as a gas-liquid or a gas-liquid-solid contactor, wherein the contactor is configured for charging an aqueous solution or slurry with carbon dioxide to produce a carbon dioxide-charged composition, which composition may be a solution or slurry. In some embodiments, the contactor is configured to produce compositions from the carbon dioxide, such as from solvated or hydrated forms of carbon dioxide (e.g., carbonic acid, bicarbonates, carbonates), wherein the compositions comprise carbonates, bicarbonates, or carbonates and bicarbonates. In some embodiments, the processor may further comprise a reactor configured to produce compositions comprising carbonates, bicarbonates, or carbonates and bicarbonates from the carbon dioxide. In some embodiments, the processor may further comprise a settling tank configured for settling compositions comprising precipitation material comprising carbonates, bicarbonates, or carbonates and bicarbonates. The treatment system may comprise a dewatering system configured to concentrate compositions comprising carbonates, bicarbonates, or carbonates and bicarbonates. The treatment system may further comprise a filtration system, wherein the filtration system comprises at least one filtration unit configured for filtration of supernatant from the dewatering system, filtration of the composition from the processor, or a combination thereof. For example, in some embodiments, the filtration system comprises one or more filtration units selected from a microfiltration unit, an ultrafiltration unit, a nanofiltration unit, and a reverse osmosis unit. In some embodiments, the carbon dioxide processing system comprises a nanofiltration unit configured to increase the concentration of divalent cations in the retentate and reduce the concentration of divalent cations in the retentate. In such embodiments, nanofiltration unit retentate may be recirculated to a processor of the system for producing compositions of the invention. As shown in FIG. 4, systems of the invention may be further configured to recirculate at least a portion of the supernatant from the treatment system.

Systems such as that shown in FIG. 3 may further comprise a processor (110) comprising a contactor (112) (e.g., gas-liquid contactor, gas-liquid-solid contactor, etc.) and a reactor (114), wherein the processor is operably connected to each of a source of $CO_2$-containing gas (130), a source of proton-removing agents (140), and a source of divalent cations (150). Such systems of the invention are configured for aqueous-based processing of carbon dioxide from the source of carbon dioxide using both the source of proton-removing agents and the source of divalent cations, wherein the source of carbon dioxide comprises one or more additional components in addition to carbon dioxide. The contactor (112) may be operably connected to each of the source of carbon dioxide (130) and the source of proton-removing agents (140), and the contactor may be configured for charging an aqueous solution or slurry with carbon dioxide to produce a carbon dioxide-charged solution or slurry. In some embodiments, the contactor is configured to charge an aqueous solution with carbon dioxide to produce a substantially clear solution (i.e., substantially free of precipitation material, such as at least 95% or more free). As shown in FIG. 3, the reactor (114) may be operably connected to the contactor (112) and the source of divalent cations (150), and the reactor may be configured to produce a composition of the invention, wherein the composition is a solution or slurry comprising carbonates, bicarbonates, or carbonates and bicarbonates. In some embodiments, the reactor is configured to receive a substantially clear solution of carbonates, bicarbonates, or carbonates and bicarbonates from the processor and produce a composition comprising precipitation material (e.g., a slurry of carbonates, bicarbonates, or carbonates and bicarbonates of divalent cations). Systems such as the one shown in FIG. 3 may optionally be operably connected to a treatment system, which treatment system may comprise a liquid-solid separator (122) or some other dewatering system configured to treat processor-produced compositions to produce supernatant and concentrated compositions (e.g., concentrated with respect to carbonates and/or bicarbonates, and any other co-products resulting from processing an industrial waste gas stream). The treatment system may further comprise a filtration system, wherein the filtration system comprises at least one filtration unit configured for filtration of supernatant from the dewatering system, filtration of the composition from the processor, or a combination thereof.

In some embodiments, the invention provides a system for processing carbon dioxide as shown in FIG. 4, wherein the system comprises a processor (110) and a treatment system (120) configured for an aqueous-based process for processing carbon dioxide from a source of carbon dioxide (130) using a source of proton-removing agents (140), wherein the source of carbon dioxide comprises one or more additional components in addition to carbon dioxide, and further wherein the processor and the treatment system are operably connected for recirculating at least a portion of treatment system supernatant. The treatment system of such carbon dioxide-processing systems may comprise a dewatering system and a filtration system. As such, the dewatering system, the filtration system, or a combination of the dewatering system and the filtration system may be configured to provide at least a portion of supernatant to the processor for processing carbon dioxide. Although not shown in FIG. 4, the treatment system may also be configured to provide at least a portion of supernatant to a washing system configured to wash compositions of the invention, wherein the compositions comprise precipitation material (e.g., $CaCO_3$, $MgCO_3$, or combinations thereof). The processor of carbon dioxide-processing systems of the invention may be configured to receive treatment system supernatant in a contactor (e.g., gas-liquid contactor, gas-liquid-solid contactor), a reactor, a combination of the contactor and the reactor, or in any other unit or combination of units in the processor. In some embodiments, the carbon dioxide-processing system is configured to provide at least a portion of the supernatant to a system or process external to the carbon-dioxide processing system. For example, a system of the invention may be operably connected to a desalination plant such that the system provides at least a portion of treatment system supernatant to the desalination plant for desalination.

In some embodiments, the invention provides a system for processing carbon dioxide as shown in FIG. 5, wherein the system comprises a processor (110) and a treatment system (120) configured for an aqueous-based process for processing carbon dioxide from a source of carbon dioxide (130) using a source of proton-removing agents (140), wherein the source of carbon dioxide comprises one or more additional components in addition to carbon dioxide, wherein the system further comprises an electrochemical system (160), and further wherein the processor, the treatment system, and the electrochemical system are operably connected for recirculating at least a portion of treatment system supernatant. As described above in reference to the treatment system of FIG. 4, the dewatering system, the filtration system, or a combination of the dewatering system and the filtration system may be configured to provide at least a portion of treatment system supernatant to the processor for processing carbon dioxide. The treatment system may also be configured to provide at least a portion of the treatment system supernatant to the electrochemical system, wherein the electrochemical system may be configured to produce proton-removing agents or effect proton removal. As described in reference to FIG. 4, the treatment system may also be configured to provide at least a portion of supernatant to a washing system configured to wash compositions of the invention, wherein the compositions comprise precipitation material (e.g., $CaCO_3$, $MgCO_3$, or combinations thereof). The processor of carbon dioxide-processing systems of the invention may be configured to receive treatment system supernatant or an electrochemical system stream in a contactor (e.g., gas-liquid contactor, gas-liquid-solid contactor), a reactor, a combination of the contactor and the reactor, or in any other unit or combination of units in the processor. In some embodiments, the carbon dioxide-processing system may be configured to provide at least a portion of the supernatant to a system (e.g., desalination plant) or process (e.g., desalination) external to the carbon-dioxide processing system.

Recirculation of treatment system supernatant is advantageous as recirculation provides efficient use of available resources; minimal disturbance of surrounding environments; and reduced energy requirements, which reduced energy requirements provide for lower (e.g., small, neutral, or negative) carbon footprints for systems and methods of the invention. When a carbon dioxide-processing system of the invention is operably connected to an industrial plant (e.g., fossil fuel-fired power plant such as coal-fired power plant) and utilizes power generated at the industrial plant, reduced energy requirements provided by recirculation of treatment system supernatant provide for a reduced parasitic load on the industrial plant. A carbon dioxide-processing system not configured for recirculation (i.e., a carbon-dioxide processing system configured for a once-through process) such as that shown in FIG. 2, may have a parasitic load on the industrial plant of at least 10% attributable to continuously pumping a fresh source of alkalinity (e.g., seawater, brine) into the system. In such an example, a 100 MW power plant (e.g., a coal-fired power plant) would need to devote 10 MW of power to the carbon dioxide-processing system for continuously pumping a fresh source of alkalinity into the system. In contrast, a system configured for recirculation such as that shown in FIG. 4 or FIG. 5 may have a parasitic load on the industrial plant of less than 10%, such as less than 8%, including less than 6%, for example, less than 4% or less than 2%, which parasitic load may be attributable to pumping make-up water and recirculating supernatant. Carbon dioxide-processing systems configured for recirculation, may, when compared to systems designed for a once-through process, exhibit a reduction in parasitic load of at least 2%, such as at least 5%, including at least 10%, for example, at least 25% or at least 50%. For example, if a carbon dioxide-processing system configured for recirculation consumes 9 MW of power for pumping make-up water and recirculating supernatant and a carbon dioxide-processing system designed for a once-through process consumes 10 MW attributable to pumping, then the carbon dioxide-processing system configured for recirculation exhibits a 10% reduction in parasitic load. For systems such as those shown in FIGS. 4 and 5 (i.e., carbon dioxide-processing systems configured for recirculation), the reduction in the parasitic load attributable to pumping and recirculating may also provide a reduction in total parasitic load, especially when compared to carbon dioxide-processing systems configured for once-through process. In some embodiments, recirculation provides a reduction in total parasitic load of a carbon dioxide-processing system, wherein the reduction is at least 2%, such as at least 4%, including at least 6%, for example at least 8% or at least 10% when compared to total parasitic load of a carbon dioxide-processing system configured for once-through process. For example, if a carbon dioxide-processing system configured for recirculation has a 15% parasitic load and a carbon dioxide-processing system designed for a once-through process has a 20% parasitic load, then the carbon dioxide-processing system configured for recirculation exhibits a 5% reduction in total parasitic load. For example, a carbon dioxide-processing system configured for recirculation, wherein recirculation comprises filtration through a filtration unit such as a nanofiltration unit (e.g., to concentrate divalent cations in the retentate and reduce divalent cations in the permeate), may have a reduction in total parasitic load of at least 2%, such as at least 4%, including at least 6%, for example at least 8% or at least 10% when compared to a carbon dioxide-processing system configured for once-through process.

Figure 6B:
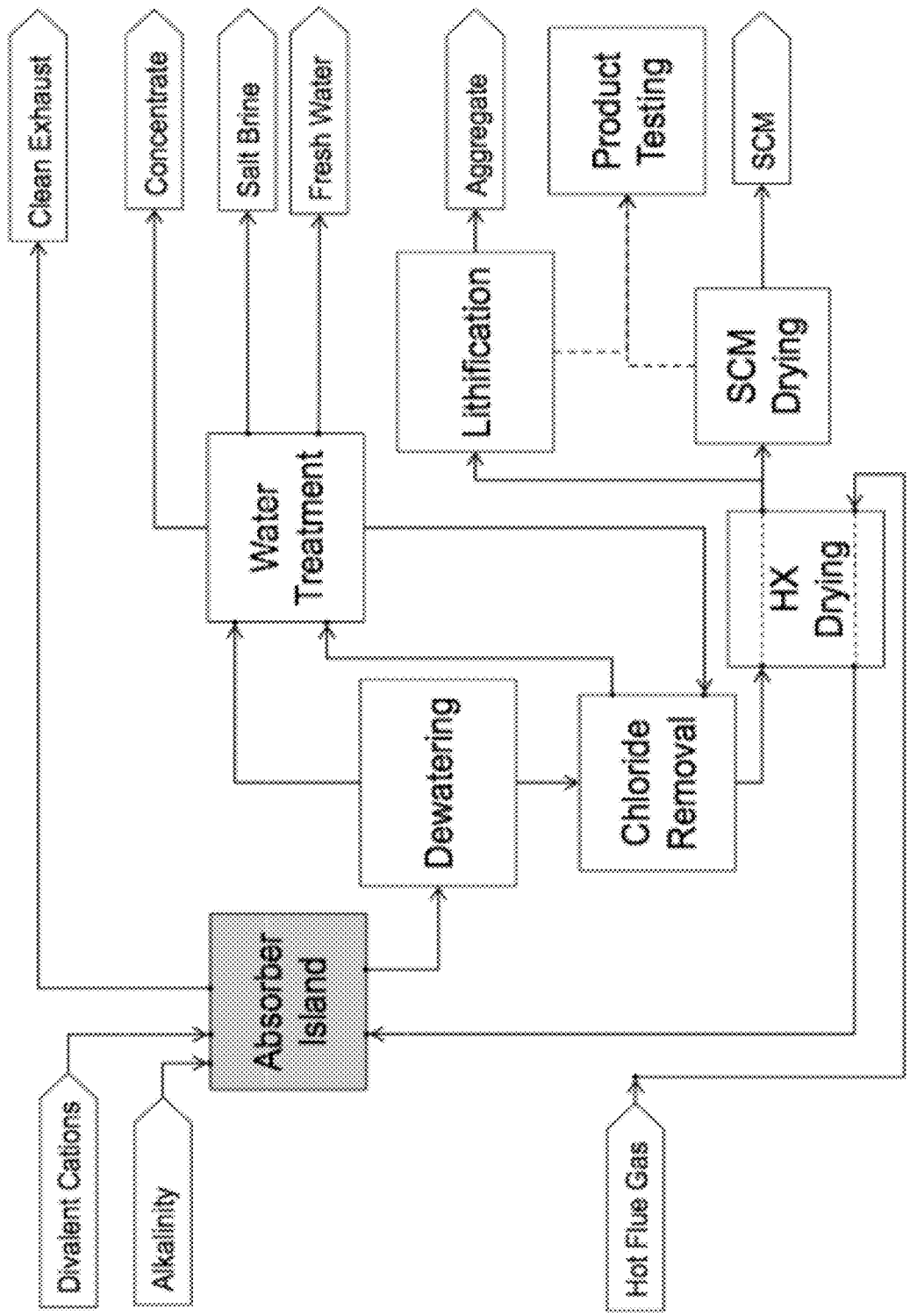

FIG. 6B provides a schematic diagram of a $CO_2$-processing system according to an embodiment of the invention. As described herein, and provided in FIG. 6B, systems of the invention may comprise a source of $CO_2$-containing gas (e.g., an industrial waste gas stream such as flue gas from a coal-fired power plant), a source of alkalinity (e.g., a source proton-removing agents), and a source of divalent cations. The source of $CO_2$-containing gas, the source of alkalinity, and the source of divalent cations may each be operably connected to a $CO_2$ processor such as an absorber described herein, or, as shown in FIG. 6B, the source of $CO_2$-containing gas may be operably connected to a heat exchange (HX) dryer configured to dry precipitation material, which dryer, in turn, is operably connected to the $CO_2$ processor. The $CO_2$ processor may be configured for gas-liquid or gas-liquid-solid contacting and comprise a gas-liquid contactor, a gas-liquid-solid contactor, a reactor, a settling tank, or any combination thereof effecting absorption as described herein. The $CO_2$ processor (e.g., absorber) may be configured to provide a composition (e.g., solution, slurry, etc.) comprising carbonates, bicarbonates, or carbonates and bicarbonates to a treatment system of the invention, which, as shown in the embodiment provided in FIG. 6B, comprises systems for dewatering, water treatment, chloride removal, drying, and lithification. The dewatering system may be configured to remove bulk water producing dewatered precipitation material, which, depending upon the source of divalent cations and/or the source of alkalinity, may comprise chloride. Configured to use water provided by the water treatment system (e.g., one or more filtration units selected from the group of filtration units consisting of microfiltration, ultrafiltration, nanofiltration, reverse osmosis, forward osmosis filtration units), the chloride removal system may remove chloride, and depending upon the end product, other salts from the precipitation material. The system as described in FIG. 6B may be further configured to provide precipitation material depleted in chloride to subsequent drying in a SCM drying system to provide supplementary cementitious material (SCM). Alternatively, or in addition, the system may be configured to provide precipitation material depleted in chloride to a lithification system for production of fine aggregate coarse aggregate. FIG. 6B also shows that the system is configured to provide clean exhaust (e.g., $CO_2$-depleted waste gas stream comprising mostly $N_2$), fresh water (e.g., potable water), brine (e.g., NaCl(aq)), and a concentrated source of divalent cations, which comprises divalent cations left over from $CO_2$ processing.

Figure 6C:
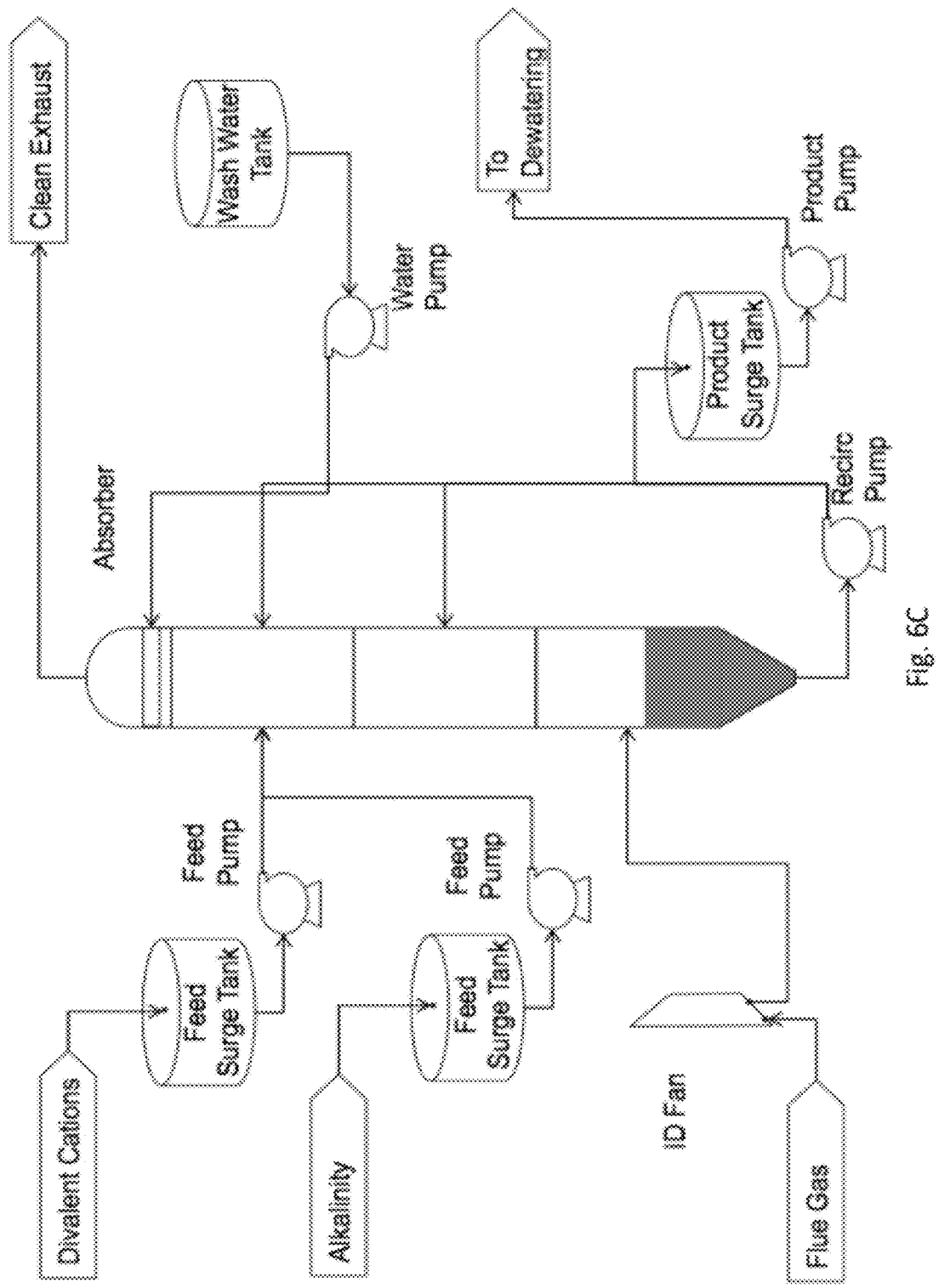

FIG. 6C provides a more detailed representation of a $CO_2$ processor of the invention. For example, in some embodiments, FIG. 6C provides a more detailed representation of the $CO_2$ processor of FIG. 6B. $CO_2$ processors of the invention such as that shown in FIG. 6B may comprise an induced draft fan (ID fan) configured to provide an industrial source of $CO_2$ (e.g., flue gas) to an absorber. The absorber may further comprise surge tanks for the source of divalent cations and/or the source of alkalinity (e.g., source of proton-removing agents). Regarding the source of divalent cations, for example, the source of divalent cations may be operably connected to a surge tank configured to regulate potentially discontinuous flow (e.g., a surge in flow), which surge tank may be operably connected to a feed pump configured to pump the source of divalent cations to an absorber. As shown in FIG. 6C, the $CO_2$ processor may further comprise a recirculation pump configured to recirculate solution or slurry from the bottom of the absorber to one or more upper stages of the absorber. Solution or slurry that is not recirculated may be provided to a product surge tank, which, in conjunction with the operably connected product pump, is configured to provide a regulated flow of product to a dewatering system of the invention. The system may be further configured to cease recirculation, divert all absorber solution of slurry to the product surge tank, and wash the absorber with wash water. As with the source of divalent cations and the source of alkalinity (e.g., source of proton-removing agents), the wash water may be provided to the absorber from a tank containing the wash water through the intermediacy of a pump.

Figure 7:
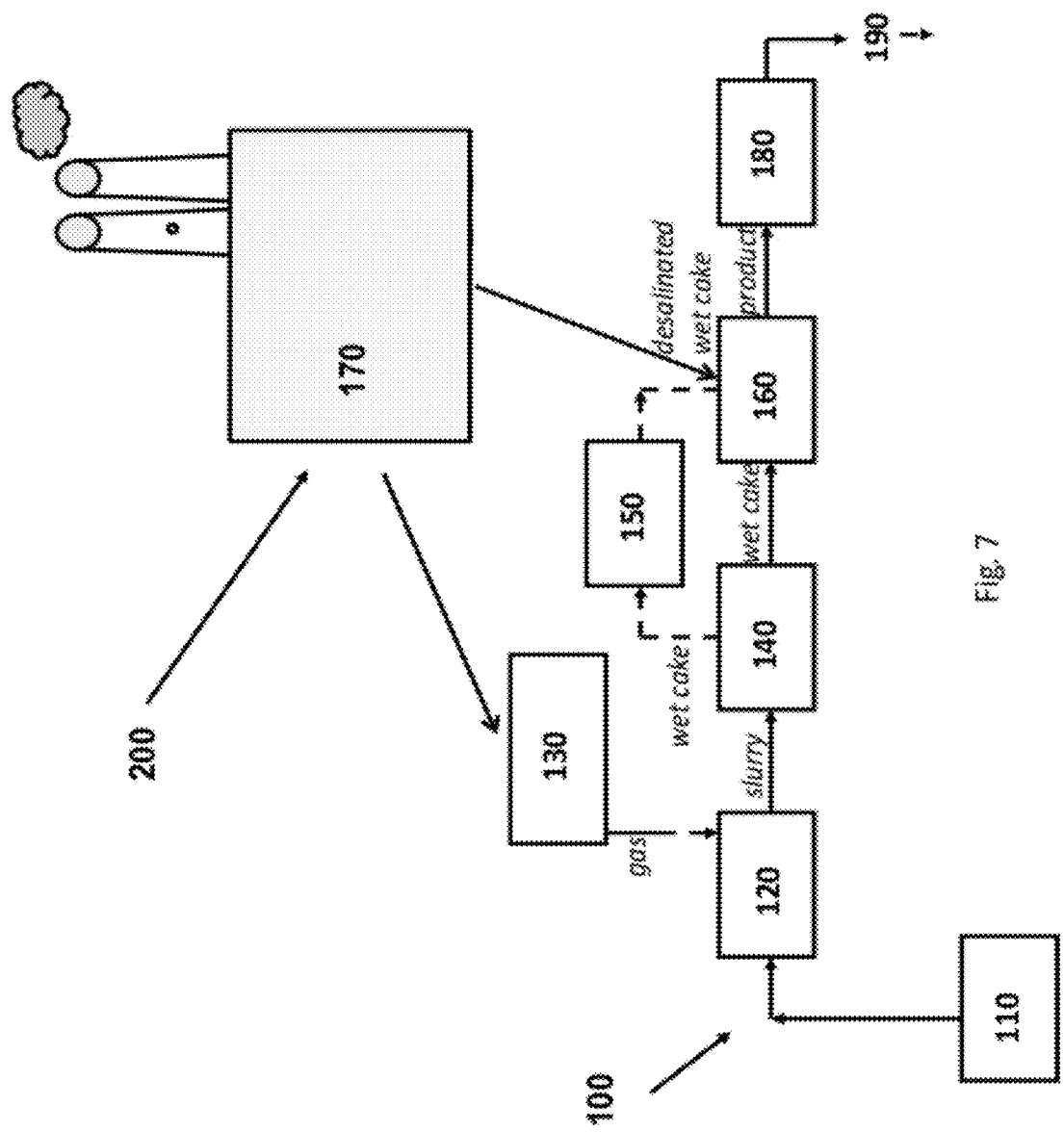

FIG. 7 provides a schematic of a system according to one embodiment of the invention. In FIG. 7, system 100 includes water source 110. In certain embodiments, water source 110 includes a structure having an input for water (e.g., alkaline earth metal ion-containing water), such as a pipe or conduit from an ocean, etc. Where the water source that is processed by the system to produce the precipitate is seawater, the input is in fluid communication with a source of sea water, e.g., such as where the input is a pipe line or feed from ocean water to a land based system or a inlet port in the hull of ship, e.g., where the system is part of a ship, e.g., in an ocean based system.

Also shown in FIG. 7, is $CO_2$ source 130. This system also includes a pipe, duct, or conduit, which directs $CO_2$ to system 100. The gaseous waste stream employed in methods of the invention may be provided from the industrial plant to the site of precipitation in any convenient manner that conveys the gaseous waste stream from the industrial plant to the precipitation plant. In certain embodiments, the waste stream is provided with a gas conveyer, e.g., a duct, which runs from a site of the industrial plant, e.g., a flue of the industrial plant, to one or more locations of the precipitation site. The source of the gaseous waste stream may be a distal location relative to the site of precipitation, such that the source of the gaseous waste stream is a location that is 1 mile or more, such as 10 miles or more, including 100 miles or more, from the precipitation location. For example, the gaseous waste stream may have been transported to the site of precipitation from a remote industrial plant via a $CO_2$ gas conveyance system, e.g., a pipeline. The industrial plant generated $CO_2$ containing gas may or may not be processed, e.g., remove other components, etc., before it reaches the precipitation site (i.e., a carbonate compound precipitation plant). In yet other instances, source of the gaseous waste stream is proximal to the precipitation site, where such instances may include instances where the precipitation site is integrated with the source of the gaseous waste stream, such as a power plant that integrates a carbonate compound precipitation reactor.

Where desired, a portion of but less than the entire gaseous waste stream from the industrial plant may be employed in precipitation reaction. In these embodiments, the portion of the gaseous waste stream that is employed in precipitation may be 75% or less, such as 60% or less and including 50% and less. In yet other embodiments, substantially the entire gaseous waste stream produced by the industrial plant, e.g., substantially all of the flue gas produced by the industrial plant, is employed in precipitation. In these embodiments, 80% or more, such as 90% or more, including 95% or more, up to 100% of the gaseous waste stream (e.g., flue gas) generated by the source may be employed during precipitation.

As indicated above, the gaseous waste stream may be one that is obtained from a flue or analogous structure of an industrial plant. In these embodiments, a line, e.g., duct, is connected to the flue so that gas leaves the flue through the line and is conveyed to the appropriate location(s) of a precipitation system (described in greater detail below). Depending on the particular configuration of the portion of the precipitation system at which the gaseous waste stream is employed, the location of the source from which the gaseous waste stream is obtained may vary, e.g., to provide a waste stream that has the appropriate or desired temperature. As such, in certain embodiments where a gaseous waste stream having a temperature ranging for 0° C. to 1800° C., such as 60° C. to 700° C. is desired, the flue gas may be obtained at the exit point of the boiler or gas turbine, the kiln, or at any point through the power plant or stack, that provides the desired temperature. Where desired, the flue gas is maintained at a temperature above the dew point, e.g., 125° C., in order to avoid condensation and related complications. Where such is not possible, steps may be taken to reduce the adverse impact of condensation, e.g., employing ducting that is stainless steel, fluorocarbon (such as poly(tetrafluoroethylene)) lined, diluted with water and pH controlled, etc., so the duct does not rapidly deteriorate.

To provide for efficiencies, the industrial plant that generates the gaseous waste stream may be co-located with the precipitation system. By "co-located" is meant that the distances between the industrial plant and precipitation system range from 10 to 500 yards, such as 25 to 400 yards, including 30 to 350 yards. Where desired, the precipitation and industrial plants may be configured relative to each other to minimize temperature loss and avoid condensation, as well as minimize ducting costs, e.g., where the precipitation plant is located within 40 yards of the industrial plant.

Also of interest in certain embodiments is a fully integrated plant that includes an industrial function (such as power generation, cement production, etc.) and a precipitation system of the invention. In such integrated plants, conventional industrial plants and precipitation system, such as described below, are modified to provide for the desired integrated plant. Modifications include, but are not limited to: coordination of stacks, pumping, controls, instrumentation, monitoring, use of plant energy, e.g., steam turbine energy to run portions of the precipitation component, e.g., mechanical press, pumps, compressors, use of heat from cement and/or power plant obtained from steam or heat from air to air heat exchanger, etc.

In certain embodiments, the $CO_2$-containing gaseous stream may be pretreated or preprocessed (e.g., treated with $H_2O_2$) prior to contacting it with water, e.g., alkaline earth metal-containing water (e.g., in a charging reactor). Illustrative pretreatment or preprocessing steps may include: temperature modulation (e.g., heating or cooling), decompression, compression, incorporation of additional components (e.g., hydrate promoter gases), oxidation of various components to convert them to forms more amenable to sequestration in a stable form, and the like. In certain embodiments, pretreatment of the gaseous waste stream improves the absorption of components of the $CO_2$-containing gaseous stream into water, e.g., alkaline earth metal-containing water. An exemplary pretreatment for improving absorption includes subjecting the $CO_2$-containing gaseous stream to oxidizing conditions.

The water source 110 of FIG. 7 and the $CO_2$ gaseous stream source 130 are connected to a $CO_2$ charger in precipitation reactor 120. The precipitation reactor 120 may include any of a number of different design features, such as temperature regulators (e.g., configured to heat the water to a desired temperature), chemical additive components, e.g., for introducing chemical pH elevating agents (such as hydroxides, metal oxides, or fly ash) into the water, electrochemical components, e.g., cathodes/anodes, mechanical agitation and physical stirring mechanisms and components to re-circulate industrial plant flue gas through the precipitation plant. Precipitation reactor 120 may also contain design features that allow for the monitoring of one or more parameters such as internal reactor pressure, pH, precipitate particle size, metal-ion concentration, conductivity and alkalinity of the aqueous solution, and $pCO_2$. This reactor 120 may operate as a batch process or a continuous process.

In some embodiments, the contacting apparatus (e.g. gas-liquid or gas-liquid-solid contactor) is apart of a system. In such a system, the absorbing solution after contacting the gas is sent to a processing station. In some embodiments, the absorbing solution after contacting the gas and any products of the contact of the absorbing solution with the gas, is passed to other systems (i.e. a processing station), including but not limited to, a precipitating tank, dewatering systems, and building fabrication system. In some embodiments, the contacting mixture after contacting the gas, comprising a liquid component, any products of the contact of the contacting mixture with the gas, and a optionally a solid component that is not a precipitate, is passed to other systems including, but not limited to, a precipitating tank, dewatering systems, and building fabrication system. In some embodiments, the slurry after contacting the gas, comprising a liquid component, a solid component, and any products of the contact of the slurry with the gas, is passed to other systems including, but not limited to, a precipitating tank, dewatering systems, and building fabrication system. In some embodiments, the solid component (if any) of the absorbing solution and the products of contacting the absorbing solution with the gas are separated from the absorbing solution that has been contacted with the gas. In some embodiments, the solid component (if any) of the contacting mixture and the products of contacting the contacting mixture with the gas are separated from the contacting mixture that has been contacted with the gas. In some embodiments, the solid component (if any) of the slurry and the products of contacting the slurry with the gas are separated from the slurry that has been contacted with the gas. In some embodiments, the separation of solids from the absorbing solution, contacting mixture, or slurry that has contacted the gas is accomplished by a sieve, a press, a centrifuge, a spray dryer, an air assisted method, a heated method of dewatering or any combination thereof. In some embodiments, the effluent liquid remaining after separation of the solids from the absorbing solution, contacting mixture, or slurry that has contacted the gas is treated by a system that includes, but is not limited to, nanofiltration, reverse-osmosis, chemical recovery, desalination, adjustment in solution chemistry for recirculation, pH adjustment for release or any combination thereof. In some embodiments, the solids separated from the absorbing solution, contacting mixture, or slurry that has contacted the gas is passed to a building materials producing system. In some embodiments, the apparatus is a portable apparatus that is contained within a shipping container such that it is capable of being transported via rail (train), waterways (barge), road (truck), or any combination thereof to any desired location. In some embodiments, the portable apparatus is apart of a system. In some embodiments, the entire system is a portable system that is contained within one or more shipping containers that are capable of being transported via rail (train), waterways (barge), road (truck), or any combination thereof to any desired location.

At times, to affect the amount of incorporation of a component of a gas into a liquid or slurry, the gas needs to be contacted with a liquid or slurry for more time than is possible with one pass through an apparatus of the invention. In some embodiments, the gas is recirculated to affect the amount of incorporation of a component of a component of a gas into a liquid or slurry. Multiple apparatus may be used to effect the incorporation of a component of a gas into a liquid or slurry, such that the gas is passed from one apparatus to one or more subsequent apparatus. The subsequent apparatus may utilize different: liquid or slurries; structural features inside the column, chamber, or reactor of the apparatus; droplet producing systems or apparatus; or have a different overall orientation from the first apparatus. In some embodiments, the system of the invention includes an array of the apparatus of the invention. In such embodiments, the array may include apparatus through which the gas passes serially, one apparatus after the other, or the array may include apparatus through which the gas passes simultaneously, such that the apparatus are used in parallel. In some embodiments, the array includes rows of multiple apparatus. In some embodiments, the gas enters the first apparatus of the rows of multiple apparatus simultaneously, then flows into the subsequent apparatus, such that effectively the series of apparatus are working in parallel.

In some embodiments, systems of the invention seek to optimize the horsepower needed to accomplish the absorption and the physical footprint of the apparatus. In such embodiments, the system comprises at least two apparatus of the invention for contacting a mixture (e.g. a slurry or contacting liquid) with a gas to remove one or more component gas (e.g. $CO_2$, SOx). The first apparatus is oriented such that its long axis is horizontal and such that it is placed low to the ground. The purpose of this orientation is that this portion of the absorber will have a low liquid head requirement, thus making it easier to pump the contacting mixture (i.e. absorbing solution) to the top of the contacting chamber of the apparatus, i.e. require less energy. The contacting mixture in the horizontal portion of the apparatus may be different along the length of that portion, or it may be the same mixture. The contacting mixture in the horizontal portion of the apparatus may be clear solution or a slurry, and it may or may not be recirculated. The flow of the inlet gas and the flow of the contacting mixture may be co-current or counter current, or the flow of the gas and solution may vary in stages within the horizontal length of the apparatus. The contacting mixture in the horizontally oriented apparatus may be recirculated within the apparatus to in effect cause countercurrent flow of the contacting mixture with respect to the flow of the inlet gas. The second apparatus in system is oriented vertically, such that the length of it is perpendicular to the ground. The vertically oriented apparatus could be staged (is more often than not staged) and the contacting mixture flow could be cocurrent or countercurrent to the flow of the inlet gas. The vertical section of the absorber would have a demister prior to the gas outlet. This section could also recirculate the contacting mixture either to various stages within the vertically oriented apparatus or to the horizontally oriented apparatus. The contacting mixture could also be in some of the lower stages either clear solution or slurry. The slurry includes a solid component that may be a mineral, an industrial waste (e.g. fly ash, cement kiln dust), and/or solid precipitate from the process in the case where recirculation is employed. Comminution may be apart of the recirculation system if the contacting mixture includes slurry. The clear solution or liquid component of the slurry may be seawater, a naturally occurring alkaline brine, an industrial waste brine, a desalination effluent brine, a synthetic brine, freshwater, a solution augmented with additional divalent cations, a solution augmented with additional alkalinity, or a combination thereof.

FIG. 26 is a schematic of an embodiment of the invention in which the system comprises two apparatus, one horizontally oriented, low to the ground, and the second apparatus, vertically oriented. The configuration shown in FIG. 26 (and similarly, FIGS. 27 and 28) minimizes both the horsepower requirement and the physical footprint requirements of the system. The lower, horizontally oriented apparatus requires less liquid pressure head, and thus less horsepower to operate. The taller, vertically oriented apparatus requires less area for its physical footprint. The solution in the vertically oriented apparatus may be recirculated to the horizontally oriented apparatus, recirculated solely within the vertically oriented apparatus, recirculated partially within the vertically oriented apparatus and partially within the horizontally oriented apparatus, or not recirculated. The vertically oriented apparatus may have a demisting section just prior to the gas outlet with accepts clear liquid (i.e. without solid particulates) as its intake. The vertically oriented apparatus may accept clear liquid or a slurry as its intake for the main portion of the apparatus, shown as three sprays in the figure. The system that includes the two apparatus may be a portable system, such that the system is contained in a shipping container that may be shipped via rail, waterways and/or road.

FIG. 27 is a schematic of an embodiment of the invention, similar to that shown in FIG. 26 in that the system comprises two apparatus, one horizontally oriented, low to the ground, and the second apparatus, vertically oriented. In the embodiment shown in FIG. 27, the flow of the gas in the first apparatus (that which is horizontally oriented, low to the ground) is forced to follow a convoluted path. The nature of the path that the gas follows creates areas of countercurrent and cocurrent contact between the gas and the solution in the first (i.e., lower) apparatus. As in FIG. 26, the solution in the vertically oriented apparatus may be recirculated to the horizontally oriented apparatus, recirculated solely within the vertically oriented apparatus, recirculated partially within the vertically oriented apparatus and partially within the horizontally oriented apparatus, or not recirculated. The vertically oriented apparatus may have a demisting section just prior to the gas outlet with accepts clear liquid (i.e. without solid particulates) as its intake. The vertically oriented apparatus may accept clear liquid or a slurry as its intake for the main portion of the apparatus, shown as three sprays in the figure. The system that includes the two apparatus may be a portable system, such that the system is contained in a shipping container that may be shipped via rail, waterways and/or road.

FIG. 28 is a schematic of an embodiment of the invention, similar to those shown in FIGS. 26 and 27 in that the system comprises two apparatus, one horizontally oriented, low to the ground, and the second apparatus, vertically oriented. In the embodiment shown in FIG. 28, the solution (e.g. absorbing solution, contacting mixture) in the horizontally oriented apparatus is recirculated within that apparatus such that solution enters the apparatus initially at the point in the apparatus furthest away from the gas inlet. The solution is then recirculated using pumps closer to the gas inlet area. This recirculation in effect creates a countercurrent flow between the overall fluid flow and gas flow in the apparatus, though the construction of the apparatus may convolute the flow of the gas so that relative to the solution falling from the sprays, the gas is locally flowing alternately cocurrently and countercurrently. As in FIGS. 26 and 27, the solution in the vertically oriented apparatus may be recirculated to the horizontally oriented apparatus, recirculated solely within the vertically oriented apparatus, recirculated partially within the vertically oriented apparatus and partially within the horizontally oriented apparatus, or not recirculated. The vertically oriented apparatus may have a demisting section just prior to the gas outlet with accepts clear liquid (i.e. without solid particulates) as its intake. The vertically oriented apparatus may accept clear liquid or a slurry as its intake for the main portion of the apparatus, shown as three sprays in the figure. The system that includes the two apparatus may be a portable system, such that the system is contained in a shipping container that may be shipped via rail, waterways and/or road.

FIG. 29 is a schematic of an embodiment of the invention in which different types of apparatus are used in series. The apparatus are ones that employ arrays of sprays or sprays and shed rows combined. The apparatus also have fluid (i.e. absorbing solution or contacting mixture) flowing cocurrent and countercurrent with respect to the gas flow. The fluid (i.e. absorbing solution or contacting mixture) in each apparatus may be the same or different, and it maybe recirculated within each apparatus or from one apparatus to another to cause the desired gas incorporation (i.e. absorption), and in some cases, precipitation.

FIGS. 30 and 31 are schematics of embodiments of the invention showing systems of the invention in which apparatus are arranged in rows and the gas flows into the apparatus both in parallel and in series. FIG. 30 shows a configuration where the gas flows into more than one apparatus, and in these first apparatus, the gas and liquid (e.g. absorbing solution, contacting mixture) flows are cocurrent, then the gas flows into more than one subsequent apparatus where the flows are countercurrent. FIG. 31 shows a configuration where gas flows into more than one apparatus, where in the first of the multiple apparatus, the gas and liquid flows are countercurrent, then in the subsequent multiple apparatus, the flows are cocurrent. In each apparatus, the solution or contacting mixture may be recirculated within the apparatus or from one apparatus to another to obtain the desired removal of a component of the gas (e.g. $CO_2$, SOx) or precipitate.

Precipitation reactor 120, further includes an output conveyance for mother liquor. In some embodiments, the output conveyance may be configured to transport the mother liquor to a tailings pond for disposal or in a naturally occurring body of water, e.g., ocean, sea, lake, or river. In other embodiments, the systems may be configured to allow for the mother liquor to be employed as a coolant for an industrial plant by a line running between the precipitation system and the industrial plant. In certain embodiments, the precipitation plant may be co-located with a desalination plant, such that output water from the precipitation plant is employed as input water for the desalination plant. The systems may include a conveyance (i.e., duct) where the output water (e.g., mother liquor) may be directly pumped into the desalination plant.

FIG. 32 shows a piping and instrument diagram for an embodiment of the invention. The diagram shows two possible flue gas sources coming from a power plant. The flue gas is shown entering the bottom of a contacting chamber (i.e. the item labeled absorber). The contacting chamber has at the bottom an exit conduit as well as a connection to a recirculation system, including pumps and switching valves. In the center of the contacting chamber are sprays, and at the top of the chamber is a demisting section (i.e. mist eliminator) before the gas outlet. Shown is a source of spray water for the demister section that is separate from the source of water for the center section of the chamber. The source of solution for the center of the chamber also has connections to at least one source of sodium hydroxide (e.g. an electrochemical process, alkaline brine). A slurry mill is also shown in FIG. 32. This mill may be a location for comminution of the solid component of a slurry, in which the solid component may be precipitate material, mineral or industrial waste (e.g. fly ash, cement kiln dust). In some embodiments, the contacting chamber, or absorber, shown in FIG. 32 may be portable, such that it fits within a standard shipping container and may be shipped via train, barge and/or truck to any facility where desired.

The system illustrated in FIG. 7 further includes a liquid-solid separation apparatus 140 for separating a precipitated carbonate mineral composition from the precipitation system effluent. The liquid-solid separation apparatus may achieve separation of a precipitation product from precipitation system effluent by draining (e.g., gravitational sedimentation of the precipitation product followed by draining), decanting, filtering (e.g., gravity filtration, vacuum filtration, filtration using forced air), centrifuging, pressing, or any combination thereof. In some embodiments, the liquid-solid separation apparatus comprises a baffle, against which precipitation station effluent is flowed to effect precipitation product and supernatant separation. In such embodiments, the liquid-solid separation apparatus may further comprise a collector for collecting precipitation product. A source of liquid-solid separators useful in some embodiments is Epuramat's Extrem-Separator ("ExSep") liquid-solid separator, or a modification thereof. In some embodiments, the liquid-solid separation apparatus comprises a spiral channel, into which precipitation station effluent is flowed to effect precipitation product and supernatant separation. In such embodiments, the liquid-solid separation apparatus may further comprise an array of spiral channel outlets for collecting precipitation product. A source of liquid-solid separators useful in some embodiments is Xerox PARC's spiral concentrator, or a modification thereof. At least one liquid-solid separation apparatus is operably connected to the precipitation station such that precipitation station effluent may flow from the precipitation station to the liquid-solid separation apparatus (e.g., liquid-solid separation apparatus comprising either a baffle or a spiral channel). As detailed above, any of a number of different liquid-solid apparatus may be used in combination, in any arrangement (e.g., parallel, series, or combinations thereof), and the precipitation station effluent may flow directly to the liquid-solid separation apparatus, or the effluent may be pre-treated.

The system also includes a washing station, 150, where bulk dewatered precipitate from separation station, 140 is washed, e.g., to remove salts and other solutes from the precipitate, prior to drying at the drying station.

The system further includes a drying station 160 for drying the precipitated carbonate mineral composition produced by the carbonate mineral precipitation station. Depending on the particular drying protocol of the system, the drying station may include a filtration element, freeze drying structure, spray drying structure, etc as described more fully above. The system may include a conveyer, e.g., duct, from the industrial plant that is connected to the dryer so that a gaseous waste stream (i.e., industrial plant flue gas) may be contacted directly with the wet precipitate in the drying stage.

The dried precipitate may undergo further processing, e.g., grinding, milling, in refining station, 180, in order to obtain desired physical properties. One or more components may be added to the precipitate where the precipitate is used as a building material.

The system further includes outlet conveyers, e.g., conveyer belt, slurry pump, that allow for the removal of precipitate from one or more of the following: the reactor, drying station, washing station or from the refining station. The product of the precipitation reaction may be disposed of in a number of different ways. The precipitate may be transported to a long term storage site in empty conveyance vehicles, e.g., barges, train cars, trucks, etc., that may include both above ground and underground storage facilities. In other embodiments, the precipitate may be disposed of in an underwater location. Any convenient protocol for transporting the composition to the site of disposal may be employed. In certain embodiments, a pipeline or analogous slurry conveyance structure may be employed, where these approaches may include active pumping, gravitational mediated flow, etc.

In certain embodiments, the system will further include a station for preparing a building material, such as cement, from the precipitate. This station can be configured to produce a variety of cements, aggregates, or cementitious materials from the precipitate, e.g., as described in co-pending U.S. Patent Application Publication No. 2009/0020044, published 25 Nov. 2008, which is incorporated herein by reference in its entirety.

As indicated above, the system may be present on land or sea. For example, the system may be a land based system that is in a coastal region, e.g., close to a source of seawater, or even an interior location, where water is piped into the system from a salt water source, e.g., ocean. Alternatively, the system may be a water-based system, i.e., a system that is present on or in water. Such a system may be present on a boat, ocean based platform etc., as desired. In certain embodiments, the system may be co-located with an industrial plant at any convenient location. The precipitation plant may be a land-based plant that is co-located with the land-based industrial plant, e.g., in a coastal region, such as close to a source of water (e.g., seawater). Also of interest are interior locations, where water is piped into the system directly from a water source (e.g., an industrial plant, a distal lake, a distal ocean). Alternatively, the precipitation plant may be present on water, e.g., on a barge, boat, ocean based platform etc., as desired, for example where real-estate next to a industrial plant is scarce. In certain embodiments, the precipitation plant may be a mobile plant, such that it is readily co-located with an industrial plant.

Systems of the invention that are co-located with an industrial plant, such as a power plant, may be configured to allow for synchronizing the activities of the industrial plant and precipitation plant. In certain instances, the activity of one plant may not be matched to the activity of the other. For example, the precipitation plant may need to reduce or stop its acceptance of the gaseous waste stream but the industrial plant may need to keep operating. Conversely, situations may arise where the industrial plant reduces or ceases operation and the precipitation plant does not. To address situations where either the precipitation plant or industrial plant may need to reduce or stop its activities, design features that provide for continued operation of one of the co-located plants while the other reduces or ceases operation may be employed, as described in detail above. For example, the systems of the invention may include in certain embodiments, blowers, fans, and/or compressors at various points along the connecting line between the industrial plant and the precipitation plant in order to control the occurrence of backpressure in the ducts that connect the industrial plant to the precipitation plant. In certain embodiments, a gas storage facility may be present between the industrial plant and the precipitation plant. Where desired, the precipitation plant may include emissions monitors to evaluate any gaseous emissions produced by the precipitation plant as required by Air Quality Agencies.

Aspects of the invention include the use of a $CO_2$ containing industrial plant gaseous waste stream, e.g., an industrial plant flue gas, at one or more stages of a process in which a storage-stable $CO_2$ containing product is precipitated. As such, the $CO_2$ containing industrial plant gaseous waste stream is employed in a precipitation process. In embodiments of the invention, the gaseous waste stream is employed at one or more steps of the precipitation process, such as in a precipitation step, e.g., where it is employed to charge water with $CO_2$, or during a precipitate drying step, e.g., where precipitated carbonate compound is dried, etc.

Where desired, the flue gas from the industrial plant can be re-circulated through the precipitation plant until total adsorption of the remnant $CO_2$ approaches 100%, or a point of diminishing returns is achieved such that the remaining flue gas can be processed using alternative protocols and/or released into the atmosphere.

In some embodiments, the apparatus and systems of the invention may be operably connected to a power plant that produces power and an industrial waste gas (i.e. flue gas). In such embodiments, the apparatus and systems of the invention may be considered an emissions control system that removes certain constituents from the industrial waste gas. In some embodiments, the industrial waste gas comprises carbon dioxide, SOx, NOx, heavy metals, non-$CO_2$ acid gas, and fly ash. In some embodiments, the apparatus and systems of the invention may act as an emissions control system that is configured to remove carbon dioxide from an industrial waste gas. In some embodiments, the apparatus and systems of the invention may act as an emission control system that is configured to remove at least carbon dioxide from an industrial waste gas and additionally remove SOx from the industrial waste gas. In some embodiments, carbon dioxide and optionally SOx are removed by an emissions control system comprising apparatus and/or systems of the invention, while utilizing an minimized amount of the power produced by the power plant, such as less than 30% of the power produced by the power plant. In some embodiments, the emissions control system of the invention may achieve utilizing less than 30% of the power produced by the power plant by employing or accepting an alkaline solution from an electrochemical system configured to produce a caustic solution, particularly of the type of the low-voltage electrochemical system described further herein. In some embodiments, the emissions control system of the invention is connected to a power plant and configured to absorb at least 50% of the carbon dioxide from the waste gas and use less than 30% of the energy generated by the power plant. In some embodiments, the emissions control system of the invention is connected to a power plant and configured to absorb at least 90% of the oxides of sulfur (SOx) from the waste gas and use less than 30% of the energy generated by the power plant. In some embodiments, the emissions control system of the invention is connected to a power plant and configured to absorb at least 50% of the carbon dioxide and at least 80% of the sulfur oxide (SOx) from the waste gas and use less than 30% of the energy generated by the power plant. In some embodiments, the apparatus and systems of the invention may be used in conjunction with existing emissions control system in place at a plant that combusts fossil fuel. In some embodiments, the existing emissions control system may include or utilize: an electrostatic precipitator to collect particulates, SOx control technology, NOx control technology, physical filtering technology to collect particulates, mercury control technology, among other control measures.

As reviewed above, precipitation systems of the invention may be co-located with an industrial plant. An example of such a system is illustrated in FIG. 7. In FIG. 7, flue gas outlet 170 from power plant 200 is used in both the precipitation reactor 120 as the source of $CO_2$ 130 and the dryer 160 and the source of heat. Where desired, backpressure controls are employed to at least reduce, if not eliminate, the occurrence of backpressure which could arise from directing a portion of, if not all of, the industrial plant gaseous waste stream to the precipitation plant 100. Any convenient manner of controlling backpressure occurrence may be employed. In certain embodiments, blowers, fans, and/or compressors are provided at some point along the connecting line between the industrial plant and precipitation plant. In certain embodiments, the blowers are installed to pull the flue gas into ducts that port the flue gas to the precipitation plant. The blowers employed in these embodiments may be electrically or mechanically driven blowers. In these embodiments, if present at all, backpressure is reduced to a level of 5 inches or less, such as one inch or less. In certain embodiments, a gas storage facility may be present between the industrial plant and the precipitation plant. When present, the gas storage facility may be employed as a surge, shutdown and smoothing system so that there is an even flow of flue gases to the precipitation plant.

Aspects of the invention include synchronizing the activities of the industrial plant and precipitation plant. In certain instances, the activity of one plant may not be matched to the activity of the other. For example, the precipitation plant may need to reduce or stop its acceptance of the gaseous waste stream but the industrial plant may need to keep operating. Conversely, situations may arise where the industrial plant reduces or ceases operation and yet the precipitation plant does not. To address such situations, the plants may be configured to provide for continued operation of one of the co-located plants while the other reduces or ceases operation may be employed. For example, to address the situation where the precipitation plant has to reduce or eliminate the amount of gaseous waste stream it accepts from the industrial plant, the system may be configured so that the blowers and ducts conveying waste stream to the precipitation plant shut off in a controlled sequence to minimize pressure swings and the industrial plant flue acts as a bypass stack for discharge of the gaseous waste stream. Similarly, if the industrial plant reduces or eliminates its production of gaseous waste stream, e.g., the industrial plant is dispatched wholly or partially down, or there is curtailment of industrial plant output under some pre-agreed level, the system may be configured to allow the precipitation plant to continue operation, e.g., by providing an alternate source of $CO_2$, by providing for alternate heating protocols in the dryer, etc.

Where desired, the precipitation plant may include emissions monitors to evaluate any gaseous emissions produced by the precipitation plant and to make required reports to regulatory agencies, both electronic (typically every 15 minutes), daily, weekly, monthly, quarterly, and annually. In certain embodiments, gaseous handling at the precipitation plant is sufficiently closed that exhaust air from the precipitation plant which contains essentially all of the unused flue gas from the industrial plant is directed to a stack so that required Continuous Emissions Monitoring Systems can be installed in accordance with the statutory and regulatory requirements of the Country, province, state city or other political jurisdiction.

In certain embodiments, the gaseous waste stream generated by the industrial plant and conveyed to the precipitation plant has been treated as required by Air Quality Agencies, so the flue gas delivered to the precipitation plan already meets Air Quality requirements. In these embodiments, the precipitation plant may or may not have alternative treatment systems in place in the event of a shutdown of the precipitation plant. However, if the flue gas delivered to has been only partially treated or not treated at all, the precipitation plant may include air pollution control devices to meet regulatory requirements, or seek regulatory authority to emit partially-treated flue gas for short periods of time. In yet other embodiments, the flue gas is delivered to precipitation plant for all processing. In such embodiments, the system may include a safeguard for the situation where the precipitation plant cannot accept the waste stream, e.g., by ensuring that the pollution controls installed in the industrial plant turn on and control emissions as required by the Air Quality Agencies.

The precipitation plant that is co-located with the industrial plant may be present at any convenient location, be that on land or water. For example, the precipitation plant may be a land-based plant that is co-located with the land-based industrial plant, e.g., in a coastal region, such as close to a source of sea water. Also of interest are interior locations, where water is piped into the system directly from a water source (e.g., an industrial plant, a distal lake, a distal ocean). Alternatively, the precipitation plant may be present on water, e.g., on a barge, boat, ocean based platform etc., as desired, for example where real-estate next to a industrial plant is scarce. In certain embodiments, the precipitation plant may be a mobile plant, such that it is readily co-located with a industrial plant.

As indicated above, of interest in certain embodiments are waste streams produced by integrated gasification combined cycle (IGCC) plants. In these types of plants, the initial fuel, e.g., coal, biomass, etc., is first subjected to a gasification process to produce syngas, which may be shifted, generating amounts of $CO_2$, CO and $H_2$. The product of the gasification protocol may be conveyed to the precipitation plant to first remove $CO_2$, with the resultant $CO_2$ scrubbed product being returned to a power plant for use as fuel. In such embodiments, a line from the gasification unit of a power plant may be present between a power plant and precipitation plant, and a second return line may be present between the precipitation plant and a power plant to convey scrubbed syngas back to a power plant.

In certain embodiments, the co-located industrial plant and precipitation plant (or integrated plant) is operated with additional $CO_2$ emission reduction approaches. For example, material handling, vehicles and earthmoving equipment, locomotives, may be configured to use biofuels in lieu of fossil fuels. In such embodiments, the site may include fuel tanks to store the biofuels.

In addition to sequestering $CO_2$, embodiments of the invention also sequester other components of industrial plant generated gaseous waste streams. For example, embodiments of the invention results in sequestration of at least a portion of one or more of NOx, SOx, VOC, Mercury and particulates that may be present in the waste stream, such that one or more of these products are fixed in the solid precipitate product.

In FIG. 7, precipitation system 100 is co-located with industrial plant 200. However, precipitation system 100 is not integrated with the industrial plant 200. Of further interest in certain embodiments therefore is an integrated facility, which, in addition to an industrial plant, includes power generation, water treatment (seawater desalinization or mineral rich freshwater treatment) and precipitation components' as described in U.S. Patent Application Publication No. 2009/0001020, published 1 Jan. 2009, which is incorporated herein by reference in its entirety. The water source for the precipitation plant may be derived from the waste streams of the water treatment plant. The resultant mother liquor from the carbonate precipitation plant may be used as the feedstock for the water treatment plant. The resultant integrated facility essentially uses fuel, minerals and untreated water as inputs, and outputs energy, a processed industrial product, e.g., cement, clean water, clean air and carbon-sequestering building materials.

FIG. 33 provides an example of where a precipitation system 100 is integrated with an industrial plant, in this case a coal fired power plant 300. In power plant 300, coal 310 fuels steam boiler 315 to produce steam, which, in turn, runs a turbine (not shown) to produce power. Steam boiler 315 also produces bottom ash or boiler slag 325 and flue gas 320. Flue gas 320 contains fly ash, $CO_2$, and sulfates. Flue gas 320 and bottom ash 325 are combined with water from water source 330 in reactor 340 and subjected to precipitation reactions, as described above. Pump 350 facilitates transport of precipitated product from reactor 340 to spray dryer 360, which employs flue gas 320 to spray dry the precipitated product for subsequent disposal, e.g., by placement in a landfill or use in a building product. Treated flue gas 370 exits spray dryer 360 and is then discharged to the atmosphere in stack 380. Treated flue gas 370 is gas in which the fly ash, sulfur, and $CO_2$ content has been substantially reduced, if not completely removed, as compared to flue gas 320. As an example of the system shown in FIG. 33, the $CO_2$ source may be flue gas from coal or other fuel combustion, which is contacted with the volume of saltwater with little or no pretreatment of the flue gas. In these embodiments, the use of fuels such as high-sulfur coal, sub-bituminous coal, lignite and the like, which are often inexpensive and considered low quality, is practical due to the ability of the process to remove the SOx and other pollutants as well as removing $CO_2$. These fuels may also provide higher levels of co-reactants such as alumina and silica in fly ash carried by the flue gas, producing modified carbonate mineral precipitates with beneficial properties.

When co-located with a power plant, methods of the invention provide sequestration of substantial amounts of $CO_2$ from the gaseous waste stream produced by the power plant with a limited energy demand. In some instances, the methods provide for removal of 5% or more, 10% or more, 25% or more, 50% or more, 75% or more of the $CO_2$ from the gaseous waste stream with an energy demand of 50% or less, such as 30% or less, including 25% or less. The energy demand is the amount of energy generated by the power plant that is required to operate the carbon dioxide sequestration process. In some instances the above levels of $CO_2$ removal are achieve with an energy demand of 20% or less, 15% or less, 10% or less.

Another type of industrial plant that may be co-located with a precipitation plant of the invention is a cement plant, such as a Portland cement production plant. FIG. 34 provides a schematic of an exemplary Portland cement production facility. In FIG. 34, limestone 400 along with shales and other additives 410 are milled to appropriate size and moved through precalciner 500, which uses waste heat from flue gas 430 to preheat the mixture, utilizing waste heat from kiln 510 to improve operational efficiency. The preheated mixture enters kiln 510 where it is further heated by burning coal 420. The resultant clinker 480 is collected and stored in silos 570, where it is blended with additives 571 such as gypsum, limestone, etc. and ground to desired size in ball mill 580. The product that exits the ball mill is Portland cement 490, which is stored in cement silo 590 prior to shipment to customers.

The flue gas 430 that comes from kiln 510 contains both gaseous and particulate contaminants. The particulate contaminants are known as kiln dust 440, and are removed from the flue gas via electrostatic precipitators or baghouses 520. The kiln dust so removed is commonly sent to landfill 600, though occasionally kiln dust is recycled into the kiln, or sold as a supplementary cementitious material. The flue gas is then pulled by fan 540 into wet scrubber 550, where the sulfur oxides in the flue gas are removed by reaction with a calcined lime slurry, producing a calcium sulfite (e.g., gypsum) slurry 480 which is normally dewatered in reclaim tank 572 and disposed of in landfill 600. The flue gas 430 exits wet scrubber 430 and is released to the atmosphere via stack 560. The flue gas so released has a high concentration of $CO_2$, which is released both by the burning of coal and via the calcination required to oxidize limestone to Portland cement.

FIG. 35 shows a schematic of an exemplary co-located cement plant and precipitation plant according to one embodiment of the invention. The process in this example is the same as that in FIG. 34, except that a carbonate precipitation plant replaces the flue gas treatment system of FIG. 34. Once the flue gas exits the precalciner 500, it is pulled by fan 540 to reactor 630, wherein a precipitation reaction is initiated utilizing seawater 620 and alkali 625. The resultant slurry 631 is pumped via pump 640 to drying station 650, where water 651 is discharged and dried cementitious material 660 is stored for shipment to customers. Flue gas 430 is emitted from stack 670 with a portion if not all of the contaminants removed, including mercury, SOx, particulates, and $CO_2$.

FIG. 35 shows a schematic of an exemplary cement plant that does not require a limestone quarry, according to one embodiment of the invention. In this embodiment, the product of reactor 630 may take the form of a relatively pure calcium carbonate during portions of time during its operation, and other forms of building materials during other portions of time. In this example, rather than mined limestone, the precalciner 500 and kiln 510 is charged with a mixture of shale and other ingredients 410 blended with a relatively pure precipitated calcium carbonate 670. Previously mentioned and incorporated by reference U.S. Patent Application Publication No. 2009/0020044, published 25 Nov. 2008 details protocols of precipitating an aragonite calcium carbonate from seawater using flue gas. By using the product of the flue gas treatment reactor as a feedstock, the cement plant draws its calcium ion from the sea via the precipitated product, and only requires mined limestone in the first short period of operation until sufficient precipitated calcium carbonate is generated to charge the kiln.

In some embodiments of the invention, an absorbing solution is contacted with a gaseous source of carbon dioxide to incorporate carbon dioxide and possibly one or more other component from the gaseous source of carbon dioxide within one apparatus or system, such that a separate emissions control system or apparatus is not needed. In some embodiments, an absorbing solution is contacted with a gaseous source of carbon dioxide to incorporate carbon dioxide and possibly one or more other component from the gaseous source of carbon dioxide and the resulting contacted absorbing solution is disposed of without exposing the solution to precipitation conditions.

In embodiments of the invention, the carbonate precipitation is performed in two stages. The first stage selectively precipitates calcium carbonate, which can then be used as a feedstock for the cement plant as illustrated in FIG. 36. The second precipitation stage can produce a number of different materials, including cements, aggregates, above ground carbon sequestering materials, and the like.

Portland cement is 60-70% by mass CaO, which is produced by heating $CaCO_3$, requiring heat, and releasing one molecule of $CO_2$ for every molecule of CaO released. Because of the additional $CO_2$ released from the burning of fuel, the output of precipitated $CaCO_3$ from the precipitation plant will exceed the amount required to provide feedstock for the cement plant. In this instance a portion of the time of operation of the precipitation plant may be devoted to production of other cementitious materials 660 such as those described in U.S. Patent Application Publication No. 2009/0020044, published 25 Nov. 2008, which is incorporated herein by reference in its entirety.

The Portland cement 490 produced as shown in FIG. 36 is carbon neutral as the $CO_2$ from its manufacture is sequestered into precipitated carbonate mineral 670 and cementitious materials 660. The Portland cement 490 may be sold as is, or blended or interground with cementitious material 660 to produce a blended cement.

An example of a continuous feed system of interest is depicted in FIG. 37. In FIG. 37, system 1100 includes water source (e.g., pipe from ocean to provide seawater) 1101, which is in fluid communication with reactor 1110. Also present in reactor 1110 is Ca/Mg/OH ion sources and catalysts 1111, which have been added in amounts sufficient to raise the Mg/Ca ion ratio in water present in reactor 1110 to 3 or more. Reactor 1110 may configured as a packed bed column, and configured from bicarbonate charging, if desired. $CO_2$ containing gas, e.g., flue gas 1112 is combined with water in reactor 1110 by sparger/bubbler 1113. The Mg ion source and $CO_2$ are combined with the water in reactor 1110 to produce $CO_2$ charged acidic water, which flows out of reactor 1110 at a pH of between 4.8 and 7.5. Next, the $CO_2$ charged acidic water flows through conduit 1120 where it is cycled with mixing through different levels of alkalinity, e.g., 8.5 and 9.8, with the use of various $CO_2$ gas injectors 1121, OH-modulators 1123 (such as introduces of pH elevating agents, electrodes, etc.) and static mixers 1122 positioned at various locations along conduit 1120. The flow rate through conduit 1120 may be controlled as desired, e.g., to be between 1 GPM and 1,000,000 GPM, such as 30 GPM and 100,000 GPM and including 4,000 GPM and 60,000 GPM. The length of conduit 1120 may vary, ranging from 100 ft to 20,000 ft, such as 1000 ft to 7000 ft. At the end of conduit 1120, as slurry product 1130 is obtained, which slurry product includes the precipitated $CO_2$-sequestering product and mother liquor. The resulting slurry is then forwarded to a liquid-solid separation apparatus or settling tank, as illustrated at 1140.

In certain embodiments, two or more reactors may be used to carry out the methods described herein. A schematic of an embodiment using two reactors is shown in FIGS. 38, 39, and 40. In this embodiment, the method may include a first reactor 1210 and a second reactor 1220. In these cases, the first reactor 1210 is used for contacting the initial water, e.g. fresh seawater 1230, with a magnesium ion source 1240 and for charging the initial water with $CO_2$ containing gas, e.g. flue gas 1250 (where this step is also referred to as bicarbonate charging). The flue gas 1250 may be contacted with the water in the first reactor 1210 through a sparger/bubbler 1280. The water is agitated with agitator 1260 to facilitate the dissolution of the magnesium ion source and to facilitate contact of the initial water with the $CO_2$ containing gas. In some cases, before the $CO_2$ charged acidic water is transferred to the second reactor 1220, agitation of the $CO_2$ charged acidic water is stopped, such that undissolved solids may settle by gravity. The $CO_2$ charged acidic water is then transferred through conduit 1270 from the first reactor 1210 to the second reactor 1220.

After transferring the $CO_2$ charged acidic water to the second reactor 1220, the step of carbonate precipitation may be performed. In some cases, a pH raising agent 1290 is contacted with the water in the second reactor 1220 to facilitate formation of the carbonate containing precipitate. The contents of the second reactor 1220 may be agitated with agitator 1295. In certain embodiments, one or more additional steps of $CO_2$ charging and subsequent carbonate precipitation may be performed in the second reactor, as described above. In these cases, additional $CO_2$ containing gas, e.g. flue gas 1255, is contacted with the water in the second reactor 520 through sparger/bubbler 1285. The resulting slurry product includes the precipitated $CO_2$-sequestering product and mother liquor, which is then forwarded to a water/solids separator or settling tank, as described above.

Compositions

Compositions of the invention may be solutions, solids, or multiphasic materials (e.g., slurries) comprising carbonates, bicarbonates, or carbonates and bicarbonates, optionally of divalent cations such as $Ca^{2+}$, $Mg^{2+}$, or combination thereof. The amount of carbon in such compositions (e.g., storage-stable carbon dioxide sequestering products such as precipitation material) produced by methods of the invention may vary. In some embodiments, compositions comprise an amount of carbon (as determined by using protocols described in greater detail below, such as isotopic analysis, e.g., $^{13}C$ isotopic analysis) ranging from 1% to 15% (w/w), such as 5 to 15% (w/w), including 5 to 14% (w/w), 5 to 13% (w/w), 6 to 14% (w/w), 6 to 12% (w/w), and 7 to 12% (w/w), wherein a substantial amount of the carbon may be carbon that originated (as determined by protocols described in greater detail below) in the source of $CO_2$. In such embodiments, 10 to 100%, such as 50 to 100%, including 90 to 100% of the carbon present in composition (e.g., storage-stable carbon dioxide sequestering products such as precipitation material) is from the source of CO2 (e.g., industrial waste gas stream comprising carbon dioxide). In some instances, the amount of carbon present in the composition that is traceable to the carbon dioxide source is 50% or more, 60% or more, 70% or more, 80% or more, 90% or more, 95% or more, 99% or more, including 100%.

Compositions of the invention (e.g., precipitation material comprising carbonates, bicarbonates, or carbonates and bicarbonates) may store 50 tons or more of $CO_2$, such as 100 tons or more of $CO_2$, including 150 tons or more of $CO_2$, for instance 200 tons or more of $CO_2$, such as 250 tons or more of $CO_2$, including 300 tons or more of $CO_2$, such as 350 tons or more of $CO_2$, including 400 tons or more of $CO_2$, for instance 450 tons or more of $CO_2$, such as 500 tons or more of $CO_2$, including 550 tons or more of $CO_2$, such as 600 tons or more of $CO_2$, including 650 tons or more of $CO_2$, for instance 700 tons or more of $CO_2$, for every 1000 tons of the composition. Thus, in some embodiments, the compositions of the invention (e.g., precipitation material comprising carbonates, bicarbonates, or carbonates and bicarbonates) comprise 5% or more of $CO_2$, such as 10% or more of $CO_2$, including 25% or more of $CO_2$, for instance 50% or more of $CO_2$, such as 75% or more of $CO_2$, including 90% or more of $CO_2$. Such compositions, particularly precipitation material of the invention may be used in the built environment. In some embodiments, the composition may be employed as a component of a manufactured item, such as a building material (e.g., component of a cement, aggregate, concrete, or a combination thereof). The composition remains a storage-stable $CO_2$-sequestering product, as use of the composition in a manufactured item (such as building material) does not result in rerelease of sequestered $CO_2$. In some embodiments, compositions of the invention (e.g., precipitation material comprising carbonates, bicarbonates, or carbonates and bicarbonates), when combined with Portland cement, may dissolve and combine with compounds of the Portland cement without releasing $CO_2$.

Conditions employed to convert $CO_2$ into carbonates, bicarbonates, or carbonates and bicarbonates may result in one or more additional components and/or co-products (i.e., products produced from the one or more additional components) thereof, wherein such additional components include sulfur oxides (SOx); nitrogen oxides (NOx); carbon monoxide (CO); metals such as antimony (Sb), arsenic (As), barium (Ba), beryllium (Be), boron (B), cadmium (Cd), chromium (Cr), cobalt (Co), copper (Cu), lead (Pb), manganese (Mn), mercury (Hg), molybdenum (Mo), nickel (Ni), radium (Ra), selenium (Se), silver (Ag), strontium (Sr), thallium (Tl), vanadium (V), and zinc (Zn); particulate matter; halides; organics; toxic substances; radioactive isotopes, and the like. In some embodiments, such one or more additional components and/or co-products may be part of a solution comprising carbonates, bicarbonates, or carbonates and bicarbonates. In some embodiments, such one or more additional components and/or co-products may be part of precipitation material of the invention by precipitating the one or more additional components and/or co-products along with carbonates, bicarbonates, or carbonates and bicarbonates, by trapping the one or more additional components and/or co-products in precipitation material comprising carbonates, bicarbonates, or carbonates and bicarbonates, or by some combination thereof. In some embodiments, such one or more additional components and/or co-products may be part of a slurry comprising any combination of the foregoing solutions with precipitation material.

Compositions of the invention may comprise sulfates, sulfites, or the like in addition to carbonate and/or bicarbonates. In some embodiments, compositions comprise 70-99.9% carbonates and/or bicarbonates along with 0.05-30% sulfates and/or sulfites. For example, compositions may comprise at least 50%, 55%, 60%, 65%, 70%, 75%, 80%, 85%, 90%, 95%, or 99.9% carbonates and/or bicarbonates. Such compositions may further comprise at least 0.05%, 0.1%, 0.5%, 1.0%, 5.0%, 10%, 15%, 20%, 25%, or 30% sulfates and/or sulfites. In some embodiments, compositions of the invention comprise sulfur-based compounds of calcium, magnesium, or combinations thereof, optionally precipitated or trapped in precipitation material produced from waste gas streams comprising SOx (e.g., $SO_2$, $SO_3$, etc.). For example, magnesium and calcium may react to form $MgSO_4$ and $CaSO_4$, respectively, as well as other magnesium- and calcium-containing compounds (e.g., sulfites), effectively removing sulfur from the waste gas stream (e.g., flue gas stream) without a desulfurization step such as flue gas desulfurization ("FGD"). In addition, compositions comprising $CaSO_4$, $MgSO_4$, and related compounds may be formed without additional release of $CO_2$. In instances where high levels of sulfur-based compounds (e.g., sulfate) are present, the aqueous solution may be enriched with calcium and/or magnesium so that calcium and/or magnesium are available to form carbonate compounds before, during, or after formation of $CaSO_4$, $MgSO_4$, and/or related compounds. In some embodiments, multiple reaction products (e.g., $MgCO_3$, $CaCO_3$, $CaSO_4$, mixtures of the foregoing, and the like) are collected at different stages, while in other embodiments a single reaction product (e.g., precipitation material comprising carbonates, sulfates, etc.) is collected.

Compositions of the invention may comprise nitrates, nitrites, and/or the like. In some embodiments, compositions of the invention comprise such nitrogen-based compounds of calcium, magnesium, or combinations thereof, optionally precipitated or trapped in precipitation material produced from waste gas streams comprising NOx (e.g., $NO_2$, $NO_3$, etc.). For example, magnesium and calcium may react to form $Mg(NO_3)_2$ and $Ca(NO_3)_2$, respectively, as well as other magnesium- and calcium-containing compounds (e.g., nitrates), effectively removing nitrogen from the waste gas stream (e.g., flue gas stream) without a selective catalytic reduction ("SCR") step or non-selective catalytic reduction ("NSCR") step. In addition, compositions comprising $Ca(NO_3)_2$, $Mg(NO_3)_2$, and related compounds may be formed without additional release of $CO_2$. Compositions of the invention may further comprise other components, such as trace metals (e.g., mercury). Using mercury as a non-limiting example of a trace metal, compositions of the invention may comprise elemental mercury (Hg), mercury salts comprising $Hg^{2+}$ (e.g., $HgCl_2$, $HgCO_3$, etc.), mercury salts comprising $Hg^+$ (e.g., $Hg_2Cl_2$, $Hg_2CO_3$, etc.), mercury compounds comprising $Hg^{2+}$ (e.g., HgO, organomercury compounds, etc.), mercury compounds comprising $Hg^+$ (e.g., $Hg_2O$, organomercury compounds, etc.), particulate mercury (Hg(p)), and the like. In some embodiments, compositions of the invention comprise such mercury-based compounds, optionally precipitated or trapped in precipitation material produced from waste gas streams comprising trace metals such as mercury. In some embodiments, compositions comprise mercury (or another metal) in a concentration of at least 0.1, 0.5, 1, 5, 10, 50, 100, 500, 1,000, 5,000, 10,000 ppb. Mercury may react to form $HgCO_3$ or $Hg_2CO_3$ as well as other mercury-containing compounds (e.g., chlorides, oxides), effectively removing mercury from the waste gas stream (e.g., flue gas stream) without a specific or non-specific mercury removal technology. In addition, compositions comprising mercury and/or other trace metals may be formed without additional release of $CO_2$.

Precipitation material of the invention may comprise several carbonates and/or several carbonate mineral phases resulting from co-precipitation, wherein the precipitation material may comprise, for example, calcium carbonate (e.g., calcite) together with magnesium carbonate (e.g., nesquehonite). Precipitation material may also comprise a single carbonate in a single mineral phase including, but not limited to, calcium carbonate (e.g., calcite), magnesium carbonate (e.g., nesquehonite), calcium magnesium carbonate (e.g., dolomite), or a ferro-carbo-aluminosilicate. As different carbonates may be precipitated in sequence, the precipitation material may be, depending upon the conditions under which it was obtained, relatively rich (e.g., 90% to 95%) or substantially rich (e.g., 95%-99.9%) in one carbonate and/or one mineral phase, or the precipitation material may comprise an amount of other carbonates and/or other mineral phase (or phases), wherein the desired mineral phase is 50-90% of the precipitation material. It will be appreciated that, in some embodiments, the precipitation material may comprise one or more hydroxides (e.g., $Ca(OH)_2$, $Mg(OH)_2$) in addition to the carbonates. It will also be appreciated that any of the carbonates or hydroxides present in the precipitation material may be wholly or partially amorphous. In some embodiments, the carbonates and/or hydroxides are wholly amorphous. It will also be appreciated that any of the carbonates or hydroxides present in the precipitation material may be wholly or partially crystalline. In some embodiments, the carbonates and/or hydroxides are wholly crystalline.

While many different carbonate-containing salts and compounds are possible due to variability of starting materials, precipitation material comprising magnesium carbonate, calcium carbonate, or combinations thereof is particularly useful. Precipitation material may comprise two or more different carbonate compounds, three or more different carbonate compounds, four or more different carbonate compounds, five or more different carbonate compounds, etc., including non-distinct, amorphous carbonate compounds. Precipitation material of the invention may comprise compounds having a molecular formulation $X_m(CO_3)_n$, wherein X is any element or combination of elements that can chemically bond with a carbonate group or its multiple and m and n are stoichiometric positive integers. In some embodiments, X may be an alkaline earth metal (elements found in column IIA of the periodic table of elements) or an alkali metal (elements found in column IA of the periodic table of elements), or some combination thereof. In some embodiments, the precipitation material comprises dolomite ($CaMg(CO_3)_2$), protodolomite, huntite ($CaMg_3(CO_3)_4$), and/or sergeevite ($Ca_2Mg_{11}(CO_3)_{13} \cdot H_2O$), which are carbonate minerals comprising both calcium and magnesium. In some embodiments, the precipitation material comprises calcium carbonate in one or more phases selected from calcite, aragonite, vaterite, or a combination thereof. In some embodiments, the precipitation material comprises hydrated forms of calcium carbonate (e.g., $Ca(CO_3) \cdot nH_2O$) where there are one or more structural waters in the molecular formula.) selected from ikaite ($CaCO_3 \cdot 6H_2O$), amorphous calcium carbonate ($CaCO_3 \cdot nH_2O$), monohydrocalcite ($CaCO_3 \cdot H_2O$), or combinations thereof. In some embodiments, the precipitation material comprises magnesium carbonate, wherein the magnesium carbonate does not have any waters of hydration. In some embodiments, the precipitation material comprises magnesium carbonate, wherein the magnesium carbonate may have any of a number of different waters of hydration (e.g., $Mg(CO_3) \cdot nH_2O$) selected from 1, 2, 3, 4, or more than 4 waters of hydration. In some embodiments, the precipitation material comprises 1, 2, 3, 4, or more than 4 different magnesium carbonate phases, wherein the magnesium carbonate phases differ in the number of waters of hydration. For example, precipitation material may comprise magnesite ($MgCO_3$), barringtonite ($MgCO_3 \cdot 2H_2O$), nesquehonite ($MgCO_3 \cdot 3H_2O$), lansfordite ($MgCO_3 \cdot 5H_2O$), and amorphous magnesium carbonate. In some embodiments, precipitation material comprises magnesium carbonates that include hydroxide and waters of hydration such as artinite ($MgCO_3 \cdot Mg(OH)_2 \cdot 3H_2O$), hydromagnesite ($Mg_5(CO_3)_4(OH)_2 \cdot 3H_2O$), or combinations thereof. As such, precipitation material may comprise carbonates of calcium, magnesium, or combinations thereof in all or some of the various states of hydration listed herein. Precipitation rate may also influence the nature of the precipitation material with the most rapid precipitation rate achieved by seeding the solution with a desired phase. Without seeding, rapid precipitation may be achieved by, for example, rapidly increasing the pH of the precipitation reaction mixture, which results in more amorphous constituents. Furthermore, the higher the pH, the more rapid the precipitation, which precipitation results in a more amorphous precipitation material.

In some instances, the amount by weight of calcium carbonate compounds in the precipitation material may exceed the amount by weight of magnesium carbonate compounds in the precipitation material. For example, the amount by weight of calcium carbonate compounds in the precipitation material may exceed the amount by weight magnesium carbonate compounds in the precipitation material by 5% or more, such as 10% or more, 15% or more, 20% or more, 25% or more, 30% or more. In some instances, the weight ratio of calcium carbonate compounds to magnesium carbonate compounds in the precipitation material ranges from 1.5-5 to 1, such as 2-4 to 1, including 2-3 to 1. In some instances, the amount by weight of magnesium carbonate compounds in the precipitation material may exceed the amount by weight of calcium carbonate compounds in the precipitation material. For example, the amount by weight of magnesium carbonate compounds in the precipitation material may exceed the amount by weight calcium carbonate compounds in the precipitation material by 5% or more, such as 10% or more, 15% or more, 20% or more, 25% or more, 30% or more. In some instances, the weight ratio of magnesium carbonate compounds to calcium carbonate compounds in the precipitation material ranges from 1.5-5 to 1, such as 2-4 to 1, including 2-3 to 1.

Precipitation material produced by methods of the invention may comprise carbonate compounds that, upon combination with fresh water, dissolve the initial precipitation material to produce a fresh water precipitation material comprising carbonate compounds that are more stable in the fresh water than the carbonate compounds of the initial precipitation material. (Although the carbonate compounds of the initial precipitation material may dissolve upon combination with fresh water, a new composition is produced. Thus, $CO_2$ gas is not liberated in significant amounts, or in some cases, at all, in any such reaction.) The carbonate compounds of the initial precipitation material may be compounds that are more stable in salt water than they are in fresh water, such that the carbonate compounds may be viewed as metastable in salt water. The amount of carbonate in precipitation material, as determined by coulometric titration, may be 40% or higher, such as 70% or higher, including 80% or higher.

Adjusting major ion ratios during precipitation may influence the nature of the precipitation material. Major ion ratios have considerable influence on polymorph formation. For example, as the magnesium:calcium ratio in the water increases, aragonite becomes the major polymorph of calcium carbonate in the precipitation material over low-magnesium calcite. At low magnesium:calcium ratios, low-magnesium calcite becomes the major polymorph. In some embodiments, where $Ca^{2+}$ and $Mg^{2+}$ are both present in the water, the ratio of $Ca^{2+}$ to $Mg^{2+}$ (i.e., $Ca^{2+}:Mg^{2+}$) in the water is between 500:1 and 1:500, such as between 100:1 and 1:100, such as between 50:1 and 1:50, such as between 20:1 and 1:20, such as between 10:1 and 1:10. In some embodiments, where $Ca^{2+}$ and $Mg^{2+}$ are both present in the water, the ratio of $Ca^{2+}$ to $Mg^{2+}$ (i.e., $Ca^{2+}:Mg^{2+}$) in the water is 5:1 and 1:1. In some embodiments, where $Ca^{2+}$ and $Mg^{2+}$ are both present in the water, the ratio of $Ca^{2+}$ to $Mg^{2+}$ (i.e., $Ca^{2+}:Mg^{2+}$) in the water is 4:1. In some embodiments, where $Ca^{2+}$ and $Mg^{2+}$ are both present in the water, the ratio of $Ca^{2+}$ to $Mg^{2+}$ (i.e., $Ca^{2+}:Mg^{2+}$) in the water is between 1:1 and 1:10. In some embodiments, where $Ca^{2+}$ and $Mg^{2+}$ are both present in the water, the ratio of $Mg^{2+}$ to $Ca^{2+}$ (i.e., $Mg^{2+}:Ca^{2+}$, which is the reverse of $Ca^{2+}:Mg^{2+}$) in the water is between 10:1 and 1:1, such as between 5:1 and 2:1. In some embodiments, where $Ca^{2+}$ and $Mg^{2+}$ are both present in the water, the ratio of $Mg^{2+}$ to $Ca^{2+}$ (i.e., $Mg^{2+}:Ca^{2+}$, which is the reverse of $Ca^{2+}:Mg^{2+}$) in the water is 4:1. In some embodiments, where $Ca^{2+}$ and $Mg^{2+}$ are both present, the ratio of $Ca^{2+}$ to $Mg^{2+}$ (i.e., $Ca^{2+}:Mg^{2+}$) in the precipitation material is between 10:1 and 1:1; 1:1 and 1:2.5; 1:2.5 and 1:5; 1:5 and 1:10; 1:10 and 1:25; 1:25 and 1:50; 1:50 and 1:100; 1:100 and 1:150; 1:150 and 1:200; 1:200 and 1:250; 1:250 and 1:500; 1:500 and 1:1000, or a range thereof. For example, in some embodiments, the ratio of $Ca^{2+}$ to $Mg^{2+}$ in the precipitation material is between 1:1 and 1:10; 1:5 and 1:25; 1:10 and 1:50; 1:25 and 1:100; 1:50 and 1:500; or 1:100 and 1:1000. In some embodiments, the ratio of $Mg^{2+}$ to $Ca^{2+}$ (i.e., $Mg^{2+}:Ca^{2+}$) in the precipitation material is between 1:1 and 1:2.5; 1:2.5 and 1:5; 1:5 and 1:10; 1:10 and 1:25; 1:25 and 1:50; 1:50 and 1:100; 1:100 and 1:150; 1:150 and 1:200; 1:200 and 1:250; 1:250 and 1:500; 1:500 and 1:1000, or a range thereof. For example, in some embodiments, the ratio of $Mg^{2+}$ to $Ca^{2+}$ in the precipitation material is between 1:1 and 1:10; 1:5 and 1:25; 1:10 and 1:50; 1:25 and 1:100; 1:50 and 1:500; or 1:100 and 1:1000.

Due to variability of starting materials, carbonate-containing salts and compounds comprising counterions other than calcium or magnesium are possible. For example, in some embodiments, compositions of the invention (e.g., precipitation material) comprise calcium carbonate in the form of aragonite. In such embodiments, calcium may be replaced by a number of different metals including, but not limited to strontium, lead, and zinc, each of which, in one form or another, may be found in one or more starting materials (e.g., waste gas stream, source of proton-removing agents, source of divalent cations, etc.) of the invention. Compositions may comprise, for example, mossottite, which is aragonite rich in strontium, or compositions may comprise a mixture of aragonite and strontianite (e.g., $(Ca,Sr)CO_3$). Compositions may comprise, for example, tarnowitzite, which is aragonite rich in lead, or compositions may comprise a mixture of aragonite and cerussite (e.g., $(Ca,Pb)CO_3$). Compositions may comprise, for example, nicholsonite, which is aragonite rich in Zn, or compositions may comprise a mixture of aragonite and smithsonite (e.g., $(Ca,Zn)CO_3$). In view of the foregoing exemplary embodiments, compositions (e.g., precipitation material) may comprise carbonates, bicarbonates, or carbonates and bicarbonates of As, Ag, Ba, Be, Cd, Co, Cr, Cu, Hg, Mo, Ni, Pb, Se, Sb, Tl, V, or Zn. By way of example, compositions of the invention may comprise carbonates of Ag, Ba, Be, Cd, Co, Cu, Ni, Pb, Tl, Zn, or combinations thereof. Carbonates, bicarbonates, or carbonates and bicarbonates of the foregoing metals may be independently formed (e.g., strontianite) or exist in a magnesium and/or calcium matrix (e.g., mossottite). Metals such as As, Ag, Ba, Be, Cd, Co, Cr, Cu, Hg, Mo, Ni, Pb, Se, Sb, Tl, V, and Zn may be provided by a waste gas stream, a source of proton-removing agents, a source of divalent cations, or a combination thereof. Metals and other components found in such source (e.g., waste gas streams, sources of proton-removing agents, sources of divalent cations) that do not form carbonates, bicarbonates, or carbonates and bicarbonates may be trapped in or adsorbed on precipitation material.

Precipitation material, which comprises one or more synthetic carbonates derived from industrial CO2, reflects the relative carbon isotope composition ($\delta^{13}C$) of the fossil fuel (e.g., coal, oil, natural gas, or flue gas) from which the industrial $CO_2$ (from combustion of the fossil fuel) was derived. The relative carbon isotope composition ($\delta^{13}C$) value with units of ‰ (per mille) is a measure of the ratio of the concentration of two stable isotopes of carbon, namely $^{12}C$ and $^{13}C$, relative to a standard of fossilized belemnite (the PDB standard).

$$\delta^{13}C\ ‰=[(^{13}C/^{12}C\ sample - ^{13}C/^{12}C\ PDB\ standard)/(^{13}C/^{12}C\ PDB\ standard)]\times 1000$$

As such, the $\delta^{13}C$ value of the synthetic carbonate-containing precipitation material serves as a fingerprint for a $CO_2$ gas source. The $\delta^{13}C$ value may vary from source to source (i.e., fossil fuel source), but the $\delta^{13}C$ value for composition of the invention generally, but not necessarily, ranges between –9‰ to –35‰. In some embodiments, the δ13C value for the synthetic carbonate-containing precipitation material is between –1‰ and –50‰, between –5‰ and –40‰, between –5‰ and –35‰, between –7‰ and –40‰, between –7‰ and –35‰, between –9‰ and –40‰, or between –9‰ and –35‰. In some embodiments, the $\delta^{13}C$ value for the synthetic carbonate-containing precipitation material is less than (i.e., more negative than) –3‰, –5‰, –6‰, –7‰, –8‰, –9‰, –10‰, –11‰, –12‰, –13‰, –14‰, –15‰, –16‰, –17‰, –18‰, –19‰, –20‰, –21‰, –22‰, –23‰, –24‰, –25‰, –26‰, –27‰, –28‰, –29‰, –30‰, –31‰, –32‰, –33‰, –34‰, –35‰, –36‰, –37‰, –38‰, –39‰, –40‰, –41‰, –42‰, –43‰, –44‰, or –45‰, wherein the more negative the $\delta^{13}C$ value, the more rich the synthetic carbonate-containing composition is in $^{12}C$. Any suitable method may be used for measuring the $\delta^{13}C$ value, methods including, but no limited to, mass spectrometry or off-axis integrated-cavity output spectroscopy (off-axis ICOS).

In addition to magnesium- and calcium-containing products of the precipitation reaction, compounds and materials comprising silicon, aluminum, iron, and others may also be prepared and incorporated within precipitation material with methods and systems of the invention. Precipitation of such compounds in precipitation material or addition of such compounds to the precipitation material may be desired to alter the reactivity of cements comprising the precipitation material resulting from the process, or to change the properties of cured cements and concretes made from them. Material comprising metal silicates may be added to the precipitation reaction mixture as one source of these components, to produce carbonate-containing precipitation material which contains one or more components, such as amorphous silica, amorphous aluminosilicates, crystalline silica, calcium silicates, calcium alumina silicates, etc. In some embodiments, the precipitation material comprises carbonates (e.g., calcium carbonate, magnesium carbonate) and silica in a carbonate:silica ratio between 1:1 and 1:1.5; 1:1.5 and 1:2; 1:2 and 1:2.5; 1:2.5 and 1:3; 1:3 and 1:3.5; 1:3.5 and 1:4; 1:4 and 1:4.5; 1:4.5 and 1:5; 1:5 and 1:7.5; 1:7.5 and 1:10; 1:10 and 1:15; 1:15 and 1:20, or a range thereof. For example, in some embodiments, the precipitation material comprises carbonates and silica in a carbonate:silica ratio between 1:1 and 1:5, 1:5 and 1:10, or 1:5 and 1:20. In some embodiments, the precipitation material comprises silica and carbonates (e.g., calcium carbonate, magnesium carbonate) in a silica:carbonate ratio between 1:1 and 1:1.5; 1:1.5 and 1:2; 1:2 and 1:2.5; 1:2.5 and 1:3; 1:3 and 1:3.5; 1:3.5 and 1:4; 1:4 and 1:4.5; 1:4.5 and 1:5; 1:5 and 1:7.5; 1:7.5 and 1:10; 1:10 and 1:15; 1:15 and 1:20, or a range thereof. For example, in some embodiments, the precipitation material comprises silica and carbonates in a silica:carbonate ratio between 1:1 and 1:5, 1:5 and 1:10, or 1:5 and 1:20. In general, precipitation material produced by methods of the invention comprises mixtures of silicon-based material and at least one carbonate phase. In general, the more rapid the reaction rate, the more silica is incorporated with the carbonate-containing precipitation material, provided silica is present in the precipitation reaction mixture (i.e., provided silica was not removed after digestion of material comprising metal silicates).

Precipitation material may be in a storage-stable form (which may simply be air-dried precipitation material), and may be stored above ground under exposed conditions (i.e., open to the atmosphere) without significant, if any, degradation (or loss of $CO_2$) for extended durations. In some embodiments, the precipitation material may be stable under exposed conditions for 1 year or longer, 5 years or longer, 10 years or longer, 25 years or longer, 50 years or longer, 100 years or longer, 250 years or longer, 1000 years or longer, 10,000 years or longer, 1,000,000 years or longer, or even 100,000,000 years or longer. A storage-stable form of the precipitation material may be stable under a variety of different environment conditions, for example, from temperatures ranging from –100° C. to 600° C. and humidity ranging from 0 to 100%, where the conditions may be calm, windy, or stormy. As the storage-stable form of the precipitation material undergoes little if any degradation while stored above ground under normal rainwater pH, the amount of degradation, if any, as measured in terms of $CO_2$ gas release from the product, does not exceed 5% per year, and in certain embodiments will not exceed 1% per year or 0.001% per year. Indeed, precipitation material provided by the invention does not release more than 1%, 5%, or 10% of its total $CO_2$ when exposed to normal conditions of temperature and moisture, including rainfall of normal pH for at least 1, 2, 5, 10, or 20 years, or for more than 20 years, for example, for more than 100 years. In some embodiments, the precipitation material does not release more than 1% of its total $CO_2$ when exposed to normal conditions of temperature and moisture, including rainfall of normal pH for at least 1 year. In some embodiments, the precipitation material does not release more than 5% of its total $CO_2$ when exposed to normal conditions of temperature and moisture, including rainfall of normal pH for at least 1 year. In some embodiments, the precipitation material does not release more than 10% of its total $CO_2$ when exposed to normal conditions of temperature and moisture, including rainfall of normal pH for at least 1 year. In some embodiments, the precipitation material does not release more than 1% of its total $CO_2$ when exposed to normal conditions of temperature and moisture, including rainfall of normal pH for at least 10 years. In some embodiments, the precipitation material does not release more than 1% of its total $CO_2$ when exposed to normal conditions of temperature and moisture including rainfall of normal pH for at least 100 years. In some embodiments, the precipitation material does not release more than 1% of its total $CO_2$ when exposed to normal conditions of temperature and moisture, including rainfall of normal pH for at least 1000 years.

Any suitable surrogate marker or test that is reasonably able to predict such stability may be used. For example, an accelerated test comprising conditions of elevated temperature and/or moderate to more extreme pH conditions is reasonably able to indicate stability over extended periods of time. For example, depending on the intended use and environment of the precipitation material, a sample of the precipitation material may be exposed to 50, 75, 90, 100, 120, or 150° C. for 1, 2, 5, 25, 50, 100, 200, or 500 days at between 10% and 50% relative humidity, and a loss less than 1%, 2%, 3%, 4%, 5%, 10%, 20%, 30%, or 50% of its carbon may be considered sufficient evidence of stability of precipitation material of the invention for a given period (e.g., 1, 10, 100, 1000, or more than 1000 years).

Any of a number of suitable methods may be used to test the stability of the precipitation material including physical test methods and chemical test methods, wherein the methods are suitable for determining that the compounds in the precipitation material are similar to or the same as naturally occurring compounds known to have the above specified stability (e.g., limestone). $CO_2$ content of the precipitation material may be monitored by any suitable method, one such non-limiting example being coulometry. Other conditions may be adjusted as appropriate, including pH, pressure, UV radiation, and the like, again depending on the intended or likely environment. It will be appreciated that any suitable conditions may be used that one of skill in the art would reasonably conclude indicate the requisite stability over the indicated time period. In addition, if accepted chemical knowledge indicates that the precipitation material would have the requisite stability for the indicated period this may be used as well, in addition to or in place of actual measurements. For example, some carbonate compounds that may be part of a precipitation material of the invention (e.g., in a given polymorphic form) may be well-known geologically and known to have withstood normal weather for decades, centuries, or even millennia, without appreciable breakdown, and so have the requisite stability.

The carbonate-containing precipitation material, which serves to sequester $CO_2$ in a form that is stable over extended periods of time (e.g., geologic time scales), may be stored for extended durations, as described above. The precipitation material, if needed to achieve a certain ratio of carbonates to silica, may also be mixed with silicon-based material (e.g., from separated silicon-based material after material comprising metal silicates digestion; commercially available $SiO_2$; etc.) to form pozzolanic material. Pozzolanic materials of the invention are siliceous or aluminosiliceous materials which, when combined with an alkali such as calcium hydroxide ($Ca(OH)_2$), exhibit cementitious properties by forming calcium silicates and other cementitious materials. $SiO_2$-containing materials such as volcanic ash, fly ash, silica fume, high reactivity metakaolin, and ground granulated blast furnace slag, and the like may be used to fortify compositions of the invention producing pozzolanic materials. In some embodiments, pozzolanic materials of the invention are fortified with 0.5% to 1.0%, 1.0% to 2.0%; 2.0% to 4.0%, 4.0% to 6.0%, 6.0% to 8.0%, 8.0% to 10.0%, 10.0% to 15.0%, 15.0% to 20.0%, 20.0% to 30.0%, 30.0% to 40.0%, 40.0% to 50.0%, or an overlapping range thereof, an $SiO_2$-containing material. Such $SiO_2$-containing material may be obtained from, for example, an electrostatic precipitator or fabric filter of the invention.

As indicated above, in some embodiments, precipitation material comprises metastable carbonate compounds that are more stable in salt water than in fresh water, such that upon contact with fresh water of any pH they dissolve and re-precipitate into other fresh water stable minerals. In certain embodiments, the carbonate compounds are present as small particles, for example, with particle sizes ranging from 0.1 µm to 100 µm, 1 to 100 µm, 10 to 100 µm, 50 to 100 µm as determined by scanning electron microscopy (SEM). In some embodiments, particle sizes of the carbonate compounds range from 0.5 to 10 µm as determined by SEM. In some embodiments, the particles size exhibit a single modal distribution. In some embodiments, the particle sizes exhibit a bimodal or multi-modal distribution. In certain embodiments, the particles have a high surface are ranging from, for example, 0.5 to 100 $m^2/gm$, 0.5 to 50 $m^2/gm$, or 0.5 to 2.0 $m^2/gm$ as determined by Brauner, Emmit, & Teller (BET) Surface Area Analysis. In some embodiments, precipitation material may comprise rod-shaped crystals and/or amorphous solids. The rod-shaped crystals may vary in structure, and in certain embodiments have a length to diameter ratio ranging from 500 to 1, 250 to 1, or 10 to 1. In certain embodiments, the length of the crystals ranges from 0.5 µm to 500 µm, 1 µm to 250 µm, or 5 µm to 100 µm. In yet other embodiments, substantially completely amorphous solids are produced.

Spray-dried material (e.g., precipitation material, silicon-based material, pozzolanic material, etc.), by virtue of being spray dried, may have a consistent particle size (i.e., the spray-dried material may have a relatively narrow particle size distribution). As such, in some embodiments, at least 50%, 60%, 70%, 80%, 90%, 95%, 97%, or 99% of the spray-dried material falls within ±10 microns, ±20 microns, ±30 microns, ±40 microns, ±50 microns, ±75 microns, ±100 microns, or ±250 microns of a given mean particle diameter. In some embodiments, the given mean particle diameter is between 5 and 500 microns. In some embodiments, the given mean particle is between 5 and 250 microns. In some embodiments, the given mean particle diameter is between 5 and 100 microns. In some embodiments, the given mean particle diameter is between 5 and 50 microns. In some embodiments, the given mean particle diameter is between 5 and 25 microns. For example, in some embodiments, at least 70% of the spray-dried material falls within ±50 microns of a given mean particle diameter, wherein the given mean particle diameter is between 50 and 500 microns, such as between 50 and 250 microns, or between 100 and 200 microns. Such spray-dried material may be used to manufacture cement, fine aggregate, mortar, coarse aggregate, concrete, and/or pozzolans of the invention; however, one of skill in the art will recognize that manufacture of cement, fine aggregate, mortar, coarse aggregate, concrete, and/or pozzolans does not require spray-dried precipitation material. Air-dried precipitation material, for example, may also be used to manufacture cement, fine aggregate, mortar, coarse aggregate, concrete, and/or pozzolans of the invention.

EXAMPLES

In combination with the above description, the following examples provide those of ordinary skill in the art with a complete disclosure and description of how to make and use the invention. The examples are presented to provide what is believed to be the most useful and readily understood procedural and conceptual description of certain embodiments of the invention. As such, the examples are not intended to limit the scope of what the inventors regard as their invention, nor do the examples represent all of the experiments or the only experiments performed. Efforts have been made to ensure accuracy with respect to numbers used (e.g., amounts, temperature, etc.), but some experimental errors and deviations should be accounted for. Unless indicated otherwise, parts are parts by weight, molecular weight is weight average molecular weight, temperature is in degrees Centigrade, and pressure is at or near atmospheric.

Example I

Precipitation of P00099

A. P00099 Precipitation Process

The following protocol was used to produce the P00099 precipitate. 380 L of filtered seawater was pumped into a cylindrical polyethylene 60°-cone bottom graduated tank. This reaction tank was an open system, left exposed to the ambient atmosphere. The reaction tank was constantly stirred using an overhead mixer. pH, room temperature, and water temperature were constantly monitored throughout the reaction.

25 g of granulated (Ca,Mg)O (a.k.a., dolime or calcined dolomite) was mixed into the seawater. Dolime that settled to the bottom of the tank was manually re-circulated from the bottom of the tank through the top again, in order to facilitate adequate mixing and dissolution of reactants. A second addition of 25 g of dolime was performed in an identical manner, including a manual recirculation of settled reactant. When the pH of the water reached 9.2, a gas mixture of 10% $CO_2$ (and 90% compressed air) was slowly diffused through a ceramic airstone into solution. When the pH of the solution fell to 9.0, another 25 g addition of dolime was added to the reaction tank, which caused the pH to rise again. The additions of dolime were repeated whenever the pH of the solution dropped to 9.0 (or below), until a total of 225 g were added. A manual recirculation of settled reactant was performed in between each dolime addition.

After the final addition of dolime, the continuous diffusion of gas through the solution was stopped. The reaction was stirred for an additional 2 hours. During this time, the pH continued to rise. To maintain a pH between 9.0 and 9.2, additional gas was diffused through the reaction when the pH rose above 9.2 until it reached 9.0. Manual re-circulations of settled reactant were also performed 4 times throughout this 2 hour period.

2 hours after the final addition of dolime, stirring, gas diffusion and recirculation of settled reactant was stopped. The reaction tank was left undisturbed for 15 hours (open to the atmosphere).

After the 15 hour period, supernatant was removed through the top of the reaction tank using a submersible pump. The remaining mixture was removed through the bottom of the tank. The collected mixture was allowed to settle for 2 hours. After settling, the supernatant was decanted. The remaining slurry was vacuum filtered through 11 μm pore size filter paper, in a Büchner funnel. The collected filter cake was placed into a Pyrex dish and baked at 110° C. for 24 hours.

The dried product was ground in a ball mix and fractioned by size through a series of sieves to produce the P00099 precipitate.

B. Materials Analysis

Of the different sieve fractions collected, only the fraction containing particles retained on the 38 μm-opening sieve and passing through the 75 μm-opening sieve was used.

1. Chemical Characteristics

The P00099 precipitate used for the blend was analyzed for elemental composition using XRF. Results for the main elements are reported for the QUIKRETE™ type I/II Portland cement used in this blend as well as for the P00099 precipitate in Table 4, below.

TABLE 4

XRF analysis of the type I/II Portland cement and P00099-002 used in this blend.

| Sample | $Na_2O$ (%) | MgO (%) | $Al_2O_3$ (%) | $SiO_2$ (%) | $P_2O_5$ (ppm) | $SO_3$ (%) | Cl (%) | $K_2O$ (%) | CaO (%) | $Fe_2O_3$ (%) | Sr (ppm) | $CO_3$ (% diff) |
|---|---|---|---|---|---|---|---|---|---|---|---|---|
| OPC1 | 2.15 | 1.95 | 4.32 | 20.31 | 2336 | 2.54 | 0.072 | 0.36 | 62.88 | 3.88 | 1099 | 0.002 |
| P00099 | 1.36 | 3.44 | 0.14 | 0.083 | 462 | 0.65 | 1.123 | 0.04 | 45.75 | 0.12 | 3589 | 46.82 |

The XRD analysis of this precipitate indicates the presence of aragonite and magnesium calcite (composition close to $Mg_{0.1}Ca_{0.9}CO_3$) and in minor amounts, brucite and halite (Table 5). The FT-IR analysis of the P00099 precipitate confirmed the presence of aragonite, calcite, and brucite.

TABLE 5

XRD analysis of this precipitate.

| Sample | Aragonite | Magnesium Calcite | Brucite | Halite |
|---|---|---|---|---|
| P00099 | 79.9 | 17.1 | 2.8 | 0.2 |

The total inorganic carbon content measured by coulometry is in fair agreement with the same value derived from the XRD Rietveld estimated composition coupled with XRF elemental composition. Table 6 provides a coulometric analysis of P00099 compared to % C derived from XRD/XRF data

TABLE 6

Coulometric analysis of P00099 compared to % C derived from XRD/XRF data.

| Total C from coulometry | Total C derived from other analytical data |
|---|---|
| 10.93 ± 0.16% | 11.5% |

2. Physical Characteristics

SEM observations on the precipitate confirmed the dominance of aragonite (needle-like) as well as the size of the particle agglomerates. The determined BET specific surface areas ("SSA") of the Portland cement and the P00099 precipitate are given in Table 7.

TABLE 7

BET specific surface areas ("SSA") of the
Portland cement and the P00099 precipitate.

| Type I/II Quikrete Portland cement | P00099 |
|---|---|
| 1.18 ± 0.04 m²/g | 8.31 ± 0.04 m²/g |

The particle size distribution was determined after 2 min of pre-sonication to dissociate the agglomerated particles.

Example II

Use of Fly Ash as an Alkali Source

A. Methods 500 mol of seawater (initial pH=8.01) was continuously stirred in a glass beaker using a magnetic stir bar. The pH and temperature of the reaction was continuously monitored. Class F fly ash (~10% CaO) was incrementally added as a powder, allowing the pH to equilibrate in between additions.

B. Results and Observations:

After the additions of 5.00 g of fly ash the pH reached 9.00.
34.14 g→pH 9.50
168.89 g→pH 9.76
219.47 g→pH 10.94
254.13 g→pH 11.20
300.87 g→pH 11.28
(Amounts of fly ash listed are the cumulative totals, i.e. the total amount added at that point in the experiment.)

Much more fly ash was needed to raise the pH of the seawater than distilled water. The initial pH raise (8 to 9) required much less fly ash than the further raises. The pH remained fairly stable around 9.7 for much of the reaction. The rate of rate of pH increase went up after ~10. Also of note was an initial drop in pH when the fly ash was added. This drop in pH is quickly overcome by the effects of the calcium hydroxide. SEM images of vacuum dried slurry from the reaction showed some spheres of the fly ash that had partially dissolved. The remaining spheres also seemed to be embedded in a possibly cementitious material.

C. Conclusions

In fresh (distilled) water, it was found that small amounts of class F fly ash (<1 g/L) immediately raised the pH from 7 (neutral) to ~11. The small amount necessary to raise the pH is most likely due to the unbuffered nature of nature of distilled water. Seawater is highly buffered by the carbonate system, and thus it took much more fly ash to raise the pH to similar levels.

Example III

Production of High Yields

A. Process 1

A 20% $CO_2$/80% Air gas mixture was sparged into 1 L of seawater until a pH<5 was reached. Once reached, 1.0 g of $Mg(OH)_2$ was added to the 1 L of carbonic acid/seawater solution. The 20/80 gas mixture continued to be sparged for 20 minutes to ensure maximal dissolution of the $Mg(OH)_2$ and gases. After dissolution, sparging was stopped and 2M NaOH was added until a pH of 9.8 was reached. Sparging of the 20/80 gas was resumed until a pH of 8.5 was reached. 2M NaOH and counter-additions of the 20/80 gas were continued maintaining a pH range between 8.5 and 9.8 until a total of 200 ml of 2M NaOH was added. A yield of 6.91 g was observed having a Coulometer reading of 10.6% carbon (~80% carbonate).

B. Process 2

A 20% $CO_2$/80% Air gas mixture was sparged into 1 L of seawater until a pH<5 was reached. Once reached, 2.69 g of $Mg(OH)_2$ was added to the 1 L of carbonic acid/seawater solution. The 20/80 gas mixture continued to be sparged for 20 minutes to ensure maximal dissolution of the $Mg(OH)_2$ and gases. After dissolution, sparging was stopped and 2M NaOH was added until a pH of 9.8 was reached. Sparging of the 20/80 gas was resumed until a pH of 8.5 was reached. 2M NaOH and counter-additions of the 20/80 gas were continued maintaining a pH range between 8.5 and 9.8 until a total of 200 ml of 2M NaOH was added. A yield of 10.24 g was observed having a Coulometer reading of 9.7% carbon (~75% carbonate).

SEM, EDS, and X-Ray Diffraction of the precipitated carbonates showed amorphous and crystalline Ca and Mg carbonates, and also the presence of Ca/Mg carbonates. Pictures of the precipitates are provided in FIGS. 41 and 42.

C. Process 3

$CO_2$ was sparged into 1 L seawater until a pH 7 or lower was reached. 0 to 5.0 g Mg ion supplement referred to as "Moss Mag" and obtained from Calera Corporation's Moss Landing site (which is the former site of the Kaiser Aluminum & Chemical Corporation and National Refractorie in Moss Landing Calif., where the supplement is Mg rich waste product found in tailings ponds of the site) was added while mixing and continuing to sparge $CO_2$. 0.1 75 ppm $Al_2(SO_4)_3$ was added. $CO_2$ was continued to be sparged and base was added while maintaining a pH between 7 and 8 ending at a pH of 7. Sparging of $CO_2$ was stopped and base was added until a pH between 9.0 and 10.4 was reached. As shown in FIG. 43, the above reaction conditions favor the formation of amorphous carbonate compound precipitates. The resultant amorphous precipitate product is readily spray dried to produce a dry product.

D. Process 4

As shown in FIGS. 38, 39, and 40, in certain embodiments, a multi-step, multi-reactor process is used to carry out the methods disclosed herein. In the first reactor, a magnesium ion source obtained from a Moss Landing, Calif. site (hereinafter referred to as Moss Mag), was put into solution using carbonic acid and agitation. The pH of the seawater in the first reactor was maintained a pH of 7.0 or less during Moss Mag dissolution. In certain embodiments, 1.0 gram of 50-150 μm Moss Mag was dissolved into solution per 1 L of seawater. A pH of 6.2-6.6 or a hardness reading >0.08 grams/liter indicated that the appropriate amount of Moss Mag was dissolved in solution. A source of $CO_2$, e.g. flue gas, was sparged into the water in the first reactor. About 40-50% of the total flue gas consumed during the entire reaction is dissolved into the seawater in this step. Flue gas was sparged until the pH no longer responded to flue gas dissolution, which took approximately 30-60 minutes. Agitation was stopped to allow unreacted Moss Mag, sand or other large particles to gravity settle before transferring the $CO_2$ charged acidic water from the first reactor to the second reactor.

The $CO_2$ charged acidic water was then transferred from the first reactor to the second reactor. The second reactor was used for both nucleation site generation and crystal growth. After transferring the solution from the first reactor to the second reactor, the following steps were performed:

1. 50% NaOH was added until a pH of 9.5 was reached. For example, for a 1000 gallon reaction, 20-25 kg of 50% NaOH was added using a dosing pump capable of pumping 5-25 ml/sec of 50% NaOH. After reaching a pH of 9.5, the addition of 50% NaOH was stopped.

2. A $CO_2$ source including a mixture of 20% $CO_2$/80% compressed air was sparged into the second reactor until a pH of 8.5 was reached. After reaching a pH of 8.5, the sparging of the $CO_2$ was stopped.

3. Alternating steps of adding 50% NaOH into the reactor to raise the pH and sparging $CO_2$ to lower the pH were performed. The pH was maintained between 8.5-9.8 during the alternate addition of the 50% NaOH and sparging of $CO_2$. Alternate dosing of 50% NaOH and sparging of $CO_2$ was continued until a total of 90 kg (i.e., 65-70 kg in this step +20-25 kg from the first step) of 50% NaOH was added to the reactor.

4. The final pH after the last addition of 50% NaOH was between 9.6-9.8.

5. Agitation was stopped and the precipitate was allowed to gravity settle overnight and then water/solids separation was performed. Alternatively, after agitation was stopped, the precipitate was allowed to gravity settle for 15 minutes and then accelerated water/solids separation was performed. Precipitate was maintained at a temperature below 50° C.

Resulting yields ranged from 30-50 lbs of precipitate per 1000 gallon reactor and depended on Mg ion dissolution and total hardness prior to precipitation.

Example IV $CO_2$ Absorption

A. Process 1

In this example, absorption of carbon dioxide on the laboratory-scale is described. 4.00 L of seawater was magnetically stirred while 100% $CO_2$ was heavily sparged through the solution for 19 minutes where the pH reached a minimum of 4.89. To this solution, 32.00 g of jet milled $Mg(OH)_2$ was added over a period of 2 minutes. Simultaneously, $CO_2$ was continuously added for a total of 18 minutes to maintain a pH between 7.90 and 8.00 as $Mg(OH)_2$ dissolved. Next, 100.00 mL of 2 M NaOH was added over a period of 5 minutes while the pH was maintained between 8.00 and 8.10 by addition of $CO_2$. To facilitate precipitation, 275 mL of 2 M NaOH was added over a period of 5 minutes and the resultant solution was stirred for an additional 52 minutes. The slurry was vacuum filtered and dried in an oven at 50° C. for 22 hours to recover 19.5 g of calcium and magnesium carbonates (primarily aragonite and nesquehonite, respectively) per 1 L of initial seawater solution.

B. Process 2

In this example, absorption of carbon dioxide on the laboratory-scale is described. A 100-gallon cone-bottomed plastic reaction vessel was filled with 100 gallons (380 L) of seawater, which was stirred throughout the entire process with an overhead stirrer (Portable Mixer w/Shaft, 2-4" SS Propeller Blades (1-push, 1-pull), and Mounting Frame). The first step was to sparge the solution with $CO_2$ concentrated at 20% $CO_2$ and 80% Compressed Air, with a flow rate of 25 scfh. Equilibrium was determined by the stabilization of the solution pH. The second step was to add 2.70 g/L of $Mg(OH)_2$ (1.02 kg) with heavy mixing. To further facilitate the dissolution of $Mg(OH)_2$, $CO_2$ was sparged through the solution. The third step was to add a solution of 50 wt % NaOH until a pH of 9.8 was reached, followed by additional $CO_2$ sparging to lower the pH to 8.0. These last two steps of an addition of 50 wt % NaOH to a pH of 9.8 and $CO_2$ sparging to a pH of 8.0 was repeated until a total of 16.0 kg of 50 wt % NaOH had been added to the solution, where the final addition of NaOH was used to reach a pH of 10.0. The precipitate was separated and collected from the solution in a yield of 10.24 g/L of calcium carbonate and magnesium carbonate hydrates.

C. Process 3

In this example, absorption of carbon dioxide on the laboratory-scale is described. A 100-gallon cone-bottomed plastic reaction vessel was filled with 100 gallons (380 L) of seawater, which was stirred throughout the entire process with an overhead stirrer. The first step was to sparge the solution with $CO_2$ concentrated at 20% by volume at a flow rate of 100 scfm (standard cubic feet per minute). Equilibrium was determined when the concentration of $CO_2$ in the vessel headspace approached that of the inlet gas. The calculated absorption of $CO_2$ during this step was understandably low. The second step was to slowly add 379 g of $Mg(OH)_2$ to avoid a sharp increase in pH, which would favor the undesired carbonate precipitation. To further facilitate the dissolution of $Mg(OH)_2$, $CO_2$ was sparged through the solution to an end pH of 6.3. The final step was to continuously capture $CO_2$ in the solution. Over the course of 3.5 hours, 4.9 kg of NaOH was added to balance the pH at 7.9 while $CO_2$ was sparged and reacted to form bicarbonate ions. The calculated absorption of $CO_2$ during this step was between 68% and 70%. Results are provided in FIG. 44, which shows the evolution of pH and $CO_2$ absorption (instantaneous and cumulative). Artifacts at point 1 in the pH plot were from removal of the pH probe to add $Mg(OH)_2$.

D. Process 4

In this example, absorption of carbon dioxide on the industrial-scale is described. A 1000-gallon reaction vessel was filled with 900 gallons (3400 L) of seawater, which was stirred throughout the entire process. The first step was to load the solution with 3.3 kg $Mg(OH)_2$, which increases both the pH and the magnesium content. Next, 10% by volume $CO_2$ was sparged and the pH of 7.9 was maintained by a continuous addition of NaOH up to 30 kg. The total duration of these steps was 5-6 hours. A final charge of 38 kg NaOH was added to increase the pH so that carbonates would form and precipitate. The duration of this step was 10-20 minutes. The solution was stirred for 1 hour more to allow further precipitation. The reaction was allowed to settle overnight. The solution was decanted and the solid product was recovered by either filter press or vacuum filtration. Additionally, the solution could be rinsed after the decant process; whereby water was added and the sample was filter pressed. Alternatively, water was added after initial vacuum filtration, stirred, and filtered again. Finally, the product was spray dried. The overall yield was 5-7 g/L of the original solution.

Example V

High Yield Dissolution of Mafic Mineral in HCl

In this example, the dissolution of olivine and subsequent use to precipitate $CO_2$ is described. A solution of 10% HCl (475.66 g) was used to dissolve olivine (10.01 g, particle size ~5.8 μm) at 50° C. After the solution was stirred for 10 hours and allowed to sit for 9 hours to provide a $Mg^{2+}$ (aq) concentration of 0.2491 mol/L, it was vacuum filtered hot to recover 404.52 g filtrate. Over the period of 1 hour, 15.01 g NaOH(s) and 5.23 g NaOH(aq) (in a 50 wt % solution) were used to neutralize the solution. Simultaneously, 100% $CO_2$ was heavily sparged through the mixture to provide a final pH of 8.9 where precipitate formed. The slurry was vacuum filtered and dried at 50° C. for 17 hours to yield 19.26 g which contained $MgCO_3 \cdot H_2O$, NaCl, an Fe-based compound and a Si-based compound.

Example VI

Electrochemistry

Exemplary results achieved in accordance with the present bi-electrode system are summarized in Table 8 below.

TABLE 8

Low energy electrochemical bi-electrode method and system.

| V Across Electrodes | Time (min) | Initial pH at Anode | End pH at Anode | Initial pH at Cathode | End pH at Cathode |
|---|---|---|---|---|---|
| 0.45 V 0.30 V in the 1st, and 0.15 V in the 2nd compartment | 30 | 4.994 | 5.204 | 7.801 | 7.431 |

In this example, an electrochemistry system for de-protonating seawater that has been charged with $CO_2$ is described. The cell that was used consisted of two 1-liter compartments separated by a palladium foil. The first compartment was charged with $CO_2$ until a pH of 4.994 was achieved. A sacrificial tin anode was placed into the first compartment, and the tin electrode and palladium membrane were held under galvanostatic control at 100 nA/cm$^2$, which represented a voltage of 0.30V. The second compartment consisted of a tin electrode and $SnCl_2$ dissolved in seawater. The palladium membrane and tin electrode in the second compartment where held at 0.15V. The system was run for 30 minutes and as set forth in Table 8, the system showed an increase in pH in the first electrolyte, and a decrease in pH in the second electrolyte.

Exemplary results achieved in accordance with the ionic membrane system are summarized in Table 9 below.

TABLE 9

Low energy electrochemical ion exchange system and method.

| V Across Electrodes | Time (min) | Initial pH at Anode | End pH at Anode | Initial pH at Cathode | End pH at Cathode |
|---|---|---|---|---|---|
| 0.6 | 2000 | 6.7 | 3.8 | 6.8 | 10.8 |
| 1.0 | 2000 | 6.6 | 3.5 | 6.8 | 11.1 |

In this example, an electrochemical cell for producing NaOH and HCl at a low operating voltage utilizing an ion exchange membrane positioned between an anode and a cathode is described. The cell that was used consisted of two 250 mL compartments that were separated by an anionic exchange membrane (PC-SA-250-250 (PCT GmbH of Germany)). In both compartments 0.5M NaCl in a 18MΩ aqueous solution was used. Both the anode and cathode were constructed from a 10 cm×5 cm, 45 mesh Pt gauze. The anode compartment had $H_2$ gas sparged under the Pt electrode, and the two electrodes were held at a bias of 0.6 V and 1.0 V for 2000 seconds. As set forth in Table 9, the two tests achieved a significant increase in the pH in the cathode compartment, and a decrease pH in the anode compartment.

Example VII

Liquid-Solid Separation

A. Process 1

In this prophetic example, separation of precipitation product from precipitation station effluent on the laboratory-scale is described. Precipitation product slurry is prepared as described above for Example IV.

Slurry comprising the precipitation product is produced in a reaction vessel (see Example IV), which, for the purpose of this example, is referred to as a precipitation station. Following formation of precipitation product slurry, the slurry is provided to a liquid-solid separation apparatus as precipitation station effluent. A precipitation station effluent pipe is used to provide the slurry to the liquid-solid separation apparatus and to direct slurry flow against a baffle, by which precipitation station effluent flow is deflected. Heavier precipitation product particles continue their path of motion down (i.e., in the direction of gravity) the precipitation station effluent pipe to a collector while supernatant deflects, separates from precipitation product particles, and exits through the upper portion of the liquid-solid separation apparatus. The resulting precipitation product is removed from the collector and dried to yield of calcium carbonate and magnesium carbonate hydrates.

B. Process 2

In this prophetic example, separation of precipitation product from precipitation station effluent on the laboratory-scale is described. Precipitation product slurry is prepared as described above for Example IV.

Slurry comprising the precipitation product is produced in a reaction vessel (see Example IV), which, for the purpose of this example, is referred to as a precipitation station. Following formation of precipitation product slurry, the slurry is provided as precipitation station effluent to a liquid-solid separation apparatus, wherein the slurry is made to flow in a spiral channel. At the end of the spiral channel, a parallel array of outlets collects separated particles of precipitation product. The resulting precipitation product is removed from the collector and dried to yield calcium carbonate and magnesium carbonate hydrates.

Example 1

This Example shows the use of an ultrasonic atomizer to create liquid droplets of high surface area to volume ratio in one compartment, which are then contacted with carbon dioxide in another compartment. The system of this example resembles that of FIG. 45.

This first system used a commercial ultrasonic atomizer [FIG. 45: 200], consisting of 10 transducers, which is capable of atomizing water at approximately 4 liters per hour. A 4 inch (10.16 cm.) inline fan [located at 220] was used to move the mist of liquid droplets [215] into a mixing compartment [245]. The gas was then recirculated from the mixing compartment [240] and back to the transducer compartment [220], while pure $CO_2$ flowed through the system continuously [225]. Sodium bicarbonate saturated solution that was reconstituted with 108 grams of dry NaOH pellets was used as the caustic source that was atomized. This solution was poured into the compartment housing the transducers [205]. The pH of the mist collected in the mixing chamber [245] was taken at several time intervals (5 min, 10 min, 20 min). It was found that the pH of the mist was always below 8, where the initial pH of the solution was above 13.5. After 20 minutes with the transducers, fan, and $CO_2$ gas running, a precipitate of sodium bicarbonate and sodium carbonate filled the transducer chamber.

Example 2

This Example employed one compartment for droplet generation, contacting droplets with gas, and precipitation of solid material. The apparatus of this example resembles that of FIG. 46.

This apparatus was made up of box that was 6 feet (182.88 cm.) tall, 4 (121.92 cm.) feet wide, and 6 inches (15.24 cm.) deep. There was a shelf two feet (60.96 cm.) from the top which housed a commercial 10 transducer ultrasonic unit [FIG. 46: 300] and a fan that circulated gas in a circular pattern. The bottom of the tank was conical that allowed a precipitated slurry [350] to flow to a storage tank [360]. The shelf [310] was filled with a 2.7N sodium hydroxide solution and was continuously filled by a recirculation pump from the storage tank [340]. Pure $CO_2$ [370] was pumped through the chamber and after several hours a sodium bicarbonate and carbonate precipitate formed on the walls of the chamber.

Example 3

This Example demonstrates the use of recirculation and a solution of alkaline chemistry to absorb carbon dioxide gas.

This apparatus used pure $CO_2$ as the gas and consisted of a 6 inch (15.24 cm.) diameter horizontal tube that was 1.5 (45.72 cm.) feet long. A low pressure pump recirculated solution to spray nozzles which produced liquid droplets that of a much larger droplet size when compared to the droplets produced by the ultrasonic atomizer. The tube was filled with 2.75N sodium hydroxide (NaOH), the pump was turned on atomizing the sodium hydroxide into a $CO_2$ rich compartment. After 1 hour and 40 minutes the resulting solution contained a large amount of precipitate at a pH of 8.2, indicating sodium bicarbonate and sodium carbonate had precipitated due to supersaturation of the solution with $CO_2$.

Example 4

This Example demonstrates the use of high surface area to volume ratio droplets of tap water to incorporate carbon dioxide gas into the droplets such that the droplets are nearly fully saturated with $CO_2$ within the first 5 minutes of contact with the gas.

This apparatus consisted of an eight inch (20.32 cm.) diameter tube that was forty eight inches (121.92 cm.) long with four ultrasonic transducers equally spaced across the bottom. The absorber was tested using plain tap water with a starting pH of 7.8. The mist generated by the transducers was collected after 5 minutes and tested. The pH of the bulk tap water was 6.3, and the pH of the collected mist was 5.44. The collected mist was then sparged with more $CO_2$ in a separate sparging system for 30 minutes and it was found that the minimum pH achievable was 5.39, so close to full saturation was achieved in the first 5 minutes.

Example 5

To treat the flue gas from a 200 mega-watt power plant, it takes in 100 million gallons per day (MGD) of brines, of which 75 MGD is alkaline brine with 500 mEq of alkalinity and 25 MGD is hard brine with a calcium concentration of 25,000 ppm. The power plant produces 200 tons/hour of carbon dioxide emission when using coal from the United States of America (i.e. the coal is not brown coal). The carbon dioxide capture rate is 90%, indicating that 180 tons/hr of carbon dioxide is incorporated into the absorbing solution that is comprised of the brines listed above. 408.6 tons of calcium carbonate are formed per hour, which equates to about 9800 tons of product per day, once the calcium carbonate is separated from the brine and dried, and assuming continuous operation of the treatment facility (i.e. emissions control system). This indicates that 0.196 pounds of product per gallon of brine is produced, which equates to 23.5 grams of product per liter of brine. When the capture is reduced, for example to 45% from 90%, 90 tons/hour of carbon dioxide is captured and thus 204.3 tons/hour of calcium carbonate is formed, which equates to 0.098 lb/gallon (11.75 g/l). When the size of the power plant is increased, for example from 200 mega-watts to 400 mega-watts, at 90% capture, the amount of carbon dioxide captured is 360 tons/hour, and thus 817.2 tons of calcium carbonate are formed per hour, correlating to about 19,600 tons of product per day (24 hours), assuming continuous operation at steady-state.

Example 6

As described herein technology has been developed for the capture of carbon dioxide and sulfur oxides from power plant flue gas. The technology is a two-part process that uses a source of base/high alkalinity material plus calcium and/or other divalent cations to capture and convert the carbon dioxide and sulfur oxides into solid carbonates and sulfates. These solids may then be converted into end products for sale or disposal. This approach eliminates the need to separate and compress the captured carbon dioxide for geological sequestration. A demonstration plant is being used to determine the commercial-scale processing and energy requirements to remove carbon dioxide from power plant flue gas. The demonstration plant removes carbon dioxide from a slip stream of the flue gas produced by an adjacent natural gas-fired combined-cycle power plant. The design rate of flue gas flow that can be processed in the demonstration plant, approximately 20,000 standard cubic feet per minute ("scfm"), is equivalent to that produced within the natural gas-fired combined-cycle power plant in generating approximately 4.0 megawatts ("MW") of power. This flue gas flow rate is equivalent to the flue gas flow rate from approximately 10 MW of power from a coal-fired plant. Absorption studies have also been conducted on coal flue gas at smaller scale in a pilot plant with the intention of building another demonstration facility adjacent to a coal-fired power plant to evaluate recovery and conversion of the higher concentrations of carbon dioxide and sulfur oxides present in coal-fired flue gas. Some highlights include:

In a test run lasting a typical two-hour steady state period with caustic and calcium chloride as the materials simulating brines with a flue gas flow rate of 12,000 scfm, a minimum of 80 percent carbon dioxide removal was achieved. Carbon dioxide removal was approximately 86 percent. Power consumption was 521 kilowatts ("kW"), which is equivalent to 8.6 percent of the power produced while generating the flue gas flow rate processed (based on the power generated from the equivalent coal-fired flue gas flow).

The demonstration plant instruments and controls allow for obtaining data needed to quantify the amount of carbon dioxide removal obtained and internal power consumption required for the absorber configurations and operating conditions being tested in pursuit of goals for carbon dioxide removal and power consumption.

It should be easier to remove 80 percent of the carbon dioxide from a coal-fired flue gas initially with 15 percent carbon dioxide (going down to 3 percent carbon dioxide) than it is to remove 80 percent of the carbon dioxide from the natural gas-fired combustion turbine flue gas that initially has 4 percent carbon dioxide (going down to less than one percent).

The demonstration plant and the supporting equipment has been designed with sufficient flexibility in testing equipment components and operating conditions to allow for selecting and then confirming or subsequently modifying promising internal configurations and operating conditions that ultimately lead to producing the best results.

The scale of the demonstration plant is sufficiently large that any issues specific to large scale can be observed and connected. The demonstration plant also has sufficient flexibility in the scrubber liquid preparation area to allow for testing synthetic versions of the brines and base sources intended to be used commercially.

Demonstration Plant Process Description and Design

The following is a description of the process design for the demonstration plant that is currently installed and operating. The site on which the demonstration plant is located includes facilities used in the 1940s to recover magnesium from seawater, and the demonstration site uses some of the existing large in-ground tankage on the site for the demonstration plant. A large component of the process is the absorber column ("absorber") that scrubs the flue gas to remove carbon dioxide from the flue gas by absorbing it into the scrubbing liquid slurry. The scrubbing liquid contains one or more divalent cation metals such as calcium, either dissolved or as a finely divided suspended solid. The scrubbing liquid also contains a base source of high pH such as sodium hydroxide. The flue gas leaves the natural gas-fired power plant at approximately 175 to 200 degrees Fahrenheit ("° F."). The flue gas is transported from the natural gas-fired power plant to the demonstration plant through a 36-inch, uninsulated carbon steel pipe. Two natural gas-fired power plant flue stacks are tapped such that flue gas flow can be taken from either flue stack or both simultaneously. The natural gas-fired power plant allows for the demonstration plant to take up to 24,000 scfm of flue gas with only 12 hours or less notice. This is equivalent to the flue gas produced by generating approximately 4.6 MW of power at the natural gas-fired power plant. The flue gas enters the absorber at approximately 70 to 110° F., depending on the ambient temperature, and the flow rate of flue gas through the pipe. The flue gas pipe passes underground from the natural gas-fired power plant to the demonstration plant. Provisions are made to collect any condensate from the cooling of the flue gas in the pipe on both sides (i.e., both the natural gas-fired power plant side and the demonstration plant side). Condensate collected on the natural gas-fired power plant side is sent back to the natural gas-fired power plant. Condensate collected on the demonstration plant's side is sent to freshwater storage for the demonstration plant.

The demonstration plant has been designed to achieve (as a goal for commercial operation) 80 percent removal of the carbon dioxide in the flue gas taken from the natural gas-fired power plant while limiting the required power consumption to no more than 8 percent of the power output represented by the production of the processed flue gas volume. Due to excess air requirements, natural gas-fired combustion turbines such as those used at the natural gas-fired power plant produce more flue gas per unit of power production than coal-fired steam power generation. Consequently, for flue gas carbon dioxide removal for coal-fired utility-scale power generation, the amount of flue gas that must be processed per MW of power production may typically be less than for natural gas-fired combined-cycle power generation. Because coal contains more carbon per unit weight of fuel than natural gas and less flue gas is produced per unit of power output, the flue gas concentration of carbon dioxide at the absorber inlet for coal-fired power generation would be higher than the carbon dioxide concentration for the natural gas-fired power plant flue gas. Higher absorber inlet carbon dioxide concentration will facilitate the removal of any set percentage of carbon dioxide from flue gas.

The natural gas-fired power plant flue gas typically contains 3.9 to 4.2 percent by volume carbon dioxide and essentially no sulfur oxides. A "carbon intensity" is assumed for a coal-fired power plant of 0.9 metric tons of carbon dioxide produced per megawatt hour ("MWh") of power production and a flue gas composition that has 15 percent by volume carbon dioxide (at approximately 6 percent excess air and saturated with respect to water at 90° F.). Requirements for sulfur dioxide removal are not considered in the calculation, since none is required for the natural gas-fired power plant flue gas. The total amount of flue gas produced for the theoretical coal-fired plant while generating 10 MW was calculated. This amount of flue gas was 20,000 scfm, thus, the demonstration plant was designed to process 20,000 scfm. The demonstration plant power consumption goal is then to stay below 800 kW (8 percent of 10 MW) when processing 20,000 scfm.

A forced draft centrifugal fan is used to pull flue gas from the natural gas-fired power plant and push it through the demonstration plant. The fan uses a variable frequency drive ("VFD") to control the flue gas flow rate. A vent is provided upstream of the fan to gradually provide suction on the pipe from the natural gas-fired power plant. As flow in the pipe from the natural gas-fired power plant is established, the vent is closed. The length of pipe from the natural gas-fired power plant flue stacks to the upstream vent is approximately 2,400 feet. There is approximately an additional 300 feet of pipe between the fan and the absorber for a total pipe run of 2,718 feet. Since most commercial absorbers are to be as closely coupled to the flue gas stack as possible, the fan power that is included in power consumption for the demonstration plant to move the flue gas through most of this line is not counted as part of the power consumption for other facilities. The power requirement for just the absorber can also be calculated from the pressure drop across the absorber and the flue gas flow rate. The pressure drop across the absorber is measured by a manometer on the flue gas inlet (the absorber exhausts to the atmosphere). The flue gas flows to the absorber and from the absorber are measured using hot wire anemometers inserted in the turbulent flow.

In the demonstration plant, it is intended to use chemicals representative of naturally occurring hard and alkaline brines that are to be used in commercial operations. These include, but are not limited to calcium chloride, calcium hydroxide, sodium hydroxide, sodium chloride, sodium carbonate and sodium borate. Power plant fly ash (that is both a source of cations and base) may also be used for part of the scrubbing reagent requirement. Currently, calcium hydroxide and/or calcium chloride is being used as the divalent cation source, sodium hydroxide and/or calcium hydroxide as the base source, and either freshwater or seawater to form the absorbing liquid used in the demonstration plant absorber. The calcium hydroxide is representative of hydrated calcium oxide ("CaO") in fly ash or cement kiln dust and has been used to start up and initially operate the demonstration plant. Calcium chloride is being used to model the calcium hardness in the brines expected to be used for commercial operation. It is intended to expand the chemicals used to include sodium carbonate and other compounds found in subsurface water reservoirs. These chemicals will be tested to determine their ability to promote desired properties in the dewatered solids (from the net slurry recovered from the absorber) for making byproducts.

For the start up and commissioning of the demonstration plant, calcium hydroxide was used. Solid calcium hydroxide (93.5 percent purity with the balance being mainly calcium carbonate) is delivered by truck to the demonstration plant site. The calcium hydroxide is mixed with fresh water and/or seawater in the 120,000 gallon capacity base mixing sump that is an existing outdoor open tank at the site. The capability to add supernatant (the water phase from the Epuramat solids-water separator (the "Epuramat") that is described below) is to be installed at a later date. Seawater is supplied from an existing harbor pump that feeds the seawater storage tank with a capacity of approximately 1,000,000 gallons. The stored seawater is pumped through sand filters to remove particulate and organic solids before use to reduce the risk of fouling. The liquid in the base mixing sump is circulated through a turbolizer that combines the solid calcium hydroxide with the slurry in the sump. Agitators and pumps are used to keep the slurry well mixed. The slurry is then pumped to the base mixing tank. The base mixing tank is an existing outdoor open tank at the facility with a capacity of 140,000 gallons. Agitators are used to keep the contents of the tank well mixed. In the base mixing tank, liquid (currently filtered seawater, but also eventually supernatant) can be added to maintain the weight content of the calcium hydroxide slurry at approximately 6 weight percent calcium hydroxide solids. The slurry solids content is monitored by taking grab samples from the tank and measuring for total solids. Slurry is pumped from the base mixing tank to the 10,000 gallon capacity base surge tank.

When used, liquid calcium chloride solution is received by truck. The base preparation system is also used for this cation source processing. The calcium chloride solution is stored in the base mixing sump. It is then diluted in the base mixing tank. Calcium chloride and water are simultaneously pumped into the base mixing tank. The diluted calcium chloride is then pumped to the base surge tank. The diluted calcium chloride is pumped to the slurry feed pipe headers for the appropriate/selected levels of the absorber.

Dilute sodium hydroxide is fed to the base surge tank from one of the two caustic dilution tanks to provide a source of base for the absorption of carbon dioxide. The dilute sodium hydroxide solution is made by combining 50 weight percent sodium hydroxide solution (that is stored in two 10,000 gallon capacity tanks) with fresh water in one of the caustic dilution tanks. The contents of the base surge tank are pumped through the absorber feed pump to the absorber. Dilute sodium hydroxide can also be pumped directly to any of the six pipe headers that feed slurry to the absorber.

Between operating runs the contents of the base mixing sump are sent to the base mixing tank, and the base mixing sump is flushed out with either fresh or sea water. The flushings are sent to the T1 slurry storage tank that is currently being used to store the net absorber product slurry. Because the contents of the base mixing tank can pick up carbon dioxide from spray contact with air, the contents of the base mixing tank are also emptied between runs into the T1 slurry storage tank, either directly or through the absorber.

The flue gas enters the absorber below the scrubbing stages and above the liquid collection sump. The flue gases flow upward through the absorber past six levels or stages in the absorber (numbered in ascending order from the bottom level) at which fresh and recirculated scrubbing liquid can be injected and internals can be installed (using peripheral support rings attached to the absorber internal diameter). The scrubbing liquid flows down the absorber by gravity from its injection point(s). After passing upward through the scrubbing stages, the flue gas then passes through a liquid demister (a vapor-liquid separator that removes the entrained liquid by impingement) and out of the top of the absorber to the atmosphere. No reheat of the flue gas is required. Exhaust of the flue gas to the environment is permitted after the absorber at the absorber outlet temperature. Gas sampling for the flue gas to measure carbon dioxide concentration occurs above the demister and just before the entrance to the absorber. The standard method of carbon dioxide measurement is through the continuous emission monitoring system ("CEMS") that uses two different analytic devices. The Thermo Environmental Model 60i is used as the primary measurement with the Servomex 1440D Gas Analyzer used as backup and as a crosscheck. Gas samples can also be taken manually for laboratory analysis.

Absorber internals comprise shedrows at the first level. The shedrows (inverted angle iron) extend across the diameter of the absorber, perpendicular to the flue gas flow and attach to the support rings on the absorber shell. Each absorber level has five headers that are perpendicular to the flue gas flow that can be used to attach spray nozzles. Pressure drop across the nozzles is measured. The liquid from the scrubbing accumulates in the liquid collection sump. Liquid is recirculated from the bottom of the absorber to one or more stages through three parallel recirculation pumps. To avoid build-up of liquid in the absorber, a purge stream whose flow is controlled by the liquid sump level is removed from the recirculating scrubber liquid and is sent to the absorber product surge tank. The absorber product transfer pump is to be used to move the product slurry to the Epuramat vessel where the slurry is to be dewatered from approximately 5 to 7 weight percent solids to 20 to 40 weight percent solids, forming a liquid supernatant and a thickened slurry. The Epuramat is designed to receive input flows pumped to the top of the vessel where the slurry then flows under gravity down a central feed pipe and exits into the annular region via an adjustable diffuser/separator located towards the bottom of the unit. The diffuser is designed to induce a transition from turbulent to laminar flow whereby the solid material separates under a shear gradient, resulting in the supernatant and thickened slurry streams.

The Epuramat is installed and currently being commissioned. Currently, the contents of the absorber product surge tank are sent to the outdoor T1 slurry open storage tank that has a capacity of 2,500,000 gallons and is used to separate the slurry solids from the liquid by gravity. Once the Epuramat is operating, the dewatered slurry from the Epuramat is to be sent to the T1 slurry storage tank, and the liquid supernatant is to be sent to the supernatant surge tank. The supernatant is to be pumped out of the supernatant surge tank to the 2,500,000 gallon outdoor T4 open supernatant storage tank. The supernatant is to be recycled to the base mixing sump to reduce process water consumption and to utilize unreacted base and alkali.

Currently, to control the level in the T1 slurry storage tank, the supernatant liquid in the top of the tank from the settled absorber slurry purge is checked for pH and is discharged under permit. Recirculation of the liquids in the process may reduce or possibly eliminate the need to discharge any liquid from the process. If the pH is too high and needs adjustment, carbon dioxide is added by bubbling it through the liquid to make the liquid less basic (lower pH) and suitable for discharge. Some of the solids accumulating in the T1 slurry storage tank are to be used for making and evaluating products from the dewatered solids in other equipment that is located on site. Once the Epuramat is operating, excess supernatant from the demonstration plant can be discharged from the T4 tank to the bay (with carbon dioxide addition as necessary for pH adjustment).

In addition to testing absorber slurry dewatering with the Epuramat that is designed to take the full absorber purge flow, the intent is to test four to six other slurry dewatering systems on a smaller scale with vendor supplied pilot plants. The slurry flows to these pilot plants are to be provided from the absorber product surge tank.

After dewatering, the intent is to test equipment for additional dewatering and processing of the thickened slurry to evaluate what end products can be produced from the absorber solids.

All of the major pumps in the demonstration plant use VFDs. The liquid flow rates are measured by the pump speed and by magnetic flow meters. The flows to absorber levels 4, 5, and 6 are measured with magnetic flow meters. Currently, there are no installed magnetic flow meters for levels 1, 2, and 3; other level flow meters are repositioned from other levels when measurements from levels 1, 2, or 3 are needed. Flow meters for the flow to levels 1 through 3 will be installed over the next several weeks. The measured pressure drop across the nozzles and the theoretical flow rate(s) for the nozzle design is also used to monitor for nozzle plugging, by comparing the theoretical flow with the actual flows.

To shutdown the operation of the absorber (or to flush it "clean"), the flow of flue gas from the natural gas-fired power plant is halted, fresh scrubbing solution flow is stopped, and scrubbing solution recycle is stopped. Then, fresh water from the spray water storage tank is pumped into the top of the absorber through nozzles located below the mist eliminator. The spray water can also be directed into nozzles above the mist eliminator, as required, to clean it.

Demonstration Plant Design and Operation

To evaluate and optimize carbon dioxide absorption and power consumption, the following engineering design parameters are provided:

Location and number of liquid injection points
Liquid spray patterns and droplet size range and nozzle pressure drop
Liquid spray rates relative to the gas flow rates
Internals for mixing and mass transfer
Gas residence time in the liquid spray The concentrations of the base and alkali feeds to the process may also be adjusted by adding water at the caustic dilution tanks and feed liquid storage tanks, respectively. Subject to any current design limits on pumping or flue gas fan capacity, the ability to experiment with and modify these parameters should allow for identifying the "best" equipment arrangements and operating conditions towards achieving carbon dioxide removal and power consumption goals. The size (diameter) of the absorber is sufficient to avoid wall effects and to observe (and then resolve) any issues with poor distribution of the flue gas or scrubbing liquid that might occur while testing internals. Some of the valving (mainly used as on/off valves to set up and direct different configurations of scrubber liquid flow) is manually operated as tests continue to improve operability and maintainability.

As described above, two continuous flue gas carbon dioxide and oxygen concentration monitoring devices are used in parallel to measure absorber carbon dioxide removal as a function of the operating conditions and equipment configuration. These instruments can be checked on line by switching to an ambient atmosphere feed, and are calibrated at the start of the runs for each day against a gas standard.

In addition to the CEMS data, other recorded data includes, but is not limited to pH, gas flow rates, liquid flow rates, pressures, temperatures and percent solids. For manual sampling of gases, liquids, and slurries, a methodology for chain of control and data handling is followed.

To monitor power consumption, VFD drive power inputs to all pumps and the flue gas fan are monitored. The electric meter reading that is used for the official power consumption is also monitored. The difference between the sum of the VFD power usage and the electric meter reading is attributable to lights, agitators, instrumentation, control systems, and other demonstration plant loads. The magnitude of these loads would tend to decrease in a full-scale facility, relative to the major motor loads that are listed in Table 1. Consequently, the electric meter reading is a conservative value to use. In addition, the power requirements attributable to the flue gas induce draft ("ID") fan would be expected to decrease relatively proportionately in a full-scale facility assuming the absorption unit was close coupled to the plant flue gas stack.

TABLE 1

Demonstration Plant Major Power Loads

| Item | Load(kW) |
|---|---|
| Flue gas ID fan | 25 |
| Recirc Pump A | 192 |

TABLE 1-continued

Demonstration Plant Major Power Loads

| Item | Load(kW) | |
|---|---|---|
| Recirc Pump B | 196 | |
| Recirc Pump C | 78 | (calculated) |
| All Transfer Pumps | 14 | |
| Total from VFDs | 505 | (incl Pump C) |
| Other Loads (by difference) | 16 | |
| Total from Meter | 521 | |
| Epuramat (not running) | 35 | (estimated) |
| Total | 556 | |

Note:
Loads from Feb. 23, 2010 run at 12,000 scfm and full flow on recycle pumps After establishing flue gas flow rates and liquid flow rates for a run, the demonstration plant is put into steady state operation (no fluctuation in liquid flow gallons per minute or flue gas acfm). Steady state is usually established in less than an hour. Once steady state is obtained, a run officially starts with respect to data collection. Typically, after obtaining data for an hour or two, operating conditions are changed so that a different set of run condition can be tested. Testing periods encompassing several runs have typically been in the range of 12 to 20 hours duration.

Test Data

Complete data on at least two runs has been collected. The differences between the two runs were the levels (flow rates) of fresh brine and sodium hydroxide (caustic) feed. Both runs met a minimum 80 percent carbon dioxide removal. However, the run with the higher levels of fresh brine and caustic feed was above the goal of 8 percent power consumption. The run with the lower levels of fresh brine and caustic feed approached the goal of 8 percent power consumption (521 kW at the flue gas flow rate used that is equivalent to 8.6 percent). This run used calcium chloride as the cation material, sodium hydroxide as the base material and the flue gas flow rate was 12,000 scfm. The absorber recycle pumps were operating at full capacity. Carbon dioxide removal was approximately 86 percent. Run parameters are still being evaluated.

If one theoretically increases the flue gas flow to the design flow of 20,000 scfm while retaining the other specific run conditions, the overall power usage would be expected to be slightly higher (approximately 44 kW) due to the increase in flue gas fan power required (about 175 percent more, because fan power is proportional to the square of the flue gas flow), but the power consumption value would be lower (dropping from 8.6 percent to approximately 5.6 percent) because the additional flue gas represents 67 percent more coal-fired power generation. Carbon dioxide removal is expected to decrease due to the lower available unit of scrubbing liquid per unit of gas. The actual carbon dioxide removal would need to be determined experimentally.

Observations

Foaming has been observed in the absorber. The foaming has been controlled by impingement plates installed in the liquid sump.

When calcium chloride ("$CaCl_2$") is used as the cation source to remove the carbon dioxide ("$CO_2$") and sodium hydroxide ("NaOH") is used as the high pH base source, sodium chloride (NaCl) is formed along with the water ("$H_2O$") and calcium carbonate ("$CaCO_3$") that are formed:

$CaCl_2+CO_2+2NaOH \rightarrow CaCO_3+2NaCl+H_2O$

The calcium carbonate is removed as a solid by the mechanical dewatering of the scrubber liquid (i.e., in the Epuramat or other equipment). To avoid a build-up of sodium chloride from the recycling of the supernatant, it must be purged from the system. Since sodium chloride is highly soluble, it can be removed with water during the mechanical dewatering step as residual liquid with the dewatered solids. Consideration is being given to add this process by the implementation of a rinsing step and/or by particle size separation during drying. It has been determined that the sodium chloride forms very small evaporite crystals which can be removed from larger particles in the spray dryer.

Carbon dioxide removal is being performed at temperatures that are below typical power plant stack gas temperatures. The absorption of carbon dioxide is enhanced by lower temperatures. The lower temperature also reduces the volumetric gas flow that must be processed. It is intended to operate commercial absorbers within the approximate temperature range being tested in the demonstration plant. It is intended to use the sensible heat from the cooling of the power plant stack gas to be processed in drying the dewatered solids. The processed flue gas may, in some embodiments, be reheated to provide additional buoyancy to vertically disperse the flue gas (e.g., to avoid ground level fog formation from condensation). Reheat capability may be available at existing power plants in the sulfur oxides scrubbing system.

The rate at which carbon dioxide can be absorbed into the scrubbing liquid is mass transfer limited. Based on laboratory and pilot plant data, it has been concluded that the major resistance is getting the carbon dioxide (from the flue gas) across the liquid side boundary layer of the liquid droplet. Thus, the rate and amount of carbon dioxide that can be absorbed is proportional to the surface area of the liquid (or slurry) droplets. More surface area provides more avenues for absorption, especially if the rate of absorption is constant. The amount of droplet surface area is a function of the droplet size (smaller droplets have more surface per unit volume) and the total number of droplets or liquid volume used. In practical terms, the amount of liquid used is expressed as gpm (of slurry) per 1,000 scfm of flue gas (the "L/G" ratio). A higher L/G will remove more carbon dioxide than a lower L/G, if all other operating parameters are held constant. The amount or percentage of carbon dioxide removed can also be increased by increasing the flue gas residence time (exposure time to liquid droplets) in the absorber. Each of these options has a related cost. Increasing the L/G increases the amount of power needed to pump the additional liquid slurry. Decreasing the slurry droplet size also increases the power consumption for the process because more energy is required to make smaller droplets (and to make smaller solid particles for the slurry). Increasing absorber residence time increases the size (and cost) of the absorber. Different configurations of residence time, spraying designs, liquid flow rates, and internals will be tested to establish the design parameters for the commercial scale absorber.

Mass transfer of carbon dioxide also depends on the relative concentrations of carbon dioxide in the flue gas and in the liquid. Because the absorbed carbon dioxide gas reacts within the scrubbing liquid to form calcium carbonate solid, one can assume that the carbon dioxide concentration in the liquid is always very low, approaching zero. Thus, higher concentrations of carbon dioxide in the flue gas will increase the rate of transfer of carbon dioxide into the liquid. Consequently, it is easier to remove 80 percent of the carbon dioxide from a coat-, fired flue gas initially with 15 percent carbon dioxide (going down to 3 percent carbon dioxide) than it is to remove 80 percent of the carbon dioxide from a natural gas-fired combustion turbine flue gas that initially has 4 percent carbon dioxide (going down to less than 1 percent). This phenomenon validates the assumption that it should be possible to remove 80 percent of the carbon dioxide from the natural gas-fired power plant flue gas volume equivalent to up to 10 MW of coal-fired power plant flue gas with less than the amount of power it would actually take to remove 80 percent of the carbon dioxide from the coal-fired flue gas.

Tests with the coal-fired pilot plant mentioned above have been continuously performed. Based on the multi-pollutant testing in the pilot plant absorption process on coal flue gas, the process:

Removes most trace metal emissions to non-detect levels using US EPA reference methods;

Captures mercury at greater than (">") 80 percent removal efficiency (dependent upon the coal type fired);

Captures high levels of acid gas by absorber. The observed capture rate were >99 percent SO2; >88 percent SO3, and >81 percent HCl; and All trace elements assayed in the supernatant from dewatering were below water discharge limits (US: NPDES).

These same results can be realized as the process is scaled up on coal-fired plants.

While the invention has been described in terms of various embodiments, and while these embodiments have been described in considerable detail, it is not the intention of the inventors to restrict or in any way limit the scope of the invention to such detail. It should be apparent to those of ordinary skill in the art that various adaptations and modifications of the invention may be accomplished without departing from the spirit and the scope of the invention. The foregoing are merely examples of variations that may be employed, and additional advantages and modifications will readily appear to those of ordinary skill in the art. Thus, the invention in its broader aspects is therefore not limited to the specific details, representative embodiments, and illustrative examples shown and described. Accordingly, departures may be made from such details without departing from the spirit or scope of the general inventive concept. Accordingly, it is to be understood that the detailed description and the accompanying drawings as set forth herein are not intended to limit the breadth of the invention, which should be inferred only from the following claims and their appropriately construed legal equivalents.

What is claimed is:

1. An apparatus comprising:
   an absorber comprising a sparging vessel, wherein the sparging vessel is configured to produce bubbles of an industrial gas within an absorbing solution such that at least 10% by weight of $CO_2$ in the industrial gas is transferred to the absorbing solution forming a charged solution comprising carbonates, bicarbonates, or any combination thereof;
   a first inlet for an original composition of the industrial gas, wherein the original composition comprises $CO_2$, SOx, NOx, heavy metals, non-$CO_2$ acid gases, and/or fly ash, and wherein the first inlet is operably connected to the absorber;
   a second inlet for the absorbing solution, wherein the absorbing solution comprises an alkaline solution, and wherein the second inlet is operably connected to the absorber;
   a first outlet for an effluent gas, said effluent gas characterized by being depleted in $CO_2$ and at least one of SOx, NOx, heavy metals, non-$CO_2$ acid gases, and/or fly ash relative to said original composition of said industrial gas, wherein the first outlet is operably connected to said absorber;
   a second outlet for the charged solution that has contacted the industrial gas, wherein the second outlet is operably connected to the absorber; and
   a processing station operably connected to the second outlet, wherein the processing station comprises a third inlet operably connected to a source of divalent cations and a third outlet operably connected to a separation station, configured to separate solids from liquids, and wherein the processing station is configured to contact the charged solution with the divalent cations.

2. An apparatus comprising:

an absorber comprising a spray tower wherein the spray tower is configured to produce streams, droplets, or a combination thereof of an absorbing solution in an industrial gas such that at least 10% by weight of $CO_2$ in the industrial gas is transferred to the absorbing solution forming a charged solution comprising carbonates, bicarbonates, or any combination thereof, wherein the spray tower is configured to operate at a liquid flow rate to gas flow rate ratio (L/G ratio) of between 50 and 5,000 gallons per minute/1000 actual cubic feet;

a first inlet for an original composition of the industrial gas, wherein the original composition comprises $CO_2$, SOx, NOx, heavy metals, non-$CO_2$ acid gases, and/or fly ash, and wherein the first inlet is operably connected to the absorber;

a second inlet for the absorbing solution, wherein the absorbing solution comprises an alkaline solution, and wherein the second inlet is operably connected to the absorber;

a first outlet for an effluent gas, said effluent gas characterized by being depleted in $CO_2$ and at least one of SOx, NOx, heavy metals, non-$CO_2$ acid gases, and/or fly ash relative to said original composition of said industrial gas, wherein the first outlet is operably connected to said absorber;

a second outlet for the charged solution that has contacted the industrial gas, wherein the second outlet is operably connected to the absorber; and a processing station operably connected to the second outlet, wherein the processing station comprises a third inlet operably connected to a source of divalent cations and a third operably connected to a separation station, configured to separate solids from liquids, and wherein the processing station is configured to contact the charged solution with the divalent cations.

3. An apparatus comprising:

an absorber comprising at least one of a spray tower, packing material, a packed bed, trays, shed rows, or a microporous membrane, wherein the absorber is configured to produce streams, droplets, or a combination thereof of an absorbing solution in an industrial gas such that at least 10% by weight of $CO_2$ in the industrial gas is transferred to the absorbing solution forming a charged solution that comprises carbonates, bicarbonates, or any combination thereof, and further wherein the absorber is configured to operate at a liquid flow rate to gas flow rate ratio (L/G ratio) of between 50 and 5,000 gallons per minute/1000 actual cubic feet;

a first inlet for an original composition of the industrial gas, wherein the original composition comprises $CO_2$, SOx, NOx, heavy metals, non-$CO_2$ acid gases, and/or fly ash, and wherein the first inlet is operably connected to the absorber;

a second inlet for the absorbing solution, wherein the absorbing solution comprises an alkaline solution, and wherein the second inlet is operably connected to the absorber;

a first outlet for an effluent gas, said effluent gas characterized by being depleted in $CO_2$ and at least one of SOx, NOx, heavy metals, non-$CO_2$ acid gases, and/or fly ash relative to said original composition of said industrial gas, wherein the first outlet is operably connected to said absorber;

a second outlet for the charged solution that has contacted the industrial gas, wherein the second outlet is operably connected to the absorber; and a processing station operably connected to the second outlet, wherein the processing station comprises a third inlet operably connected to a source of divalent cations and a third outlet operably connected to a separation station, configured to separate solids from liquids, and wherein the processing station is configured to contact the charged solution with the divalent cations.

4. An apparatus comprising:

an absorber comprising at least one of a spray tower, packing material, a packed bed, trays, shed rows, or a microporous membrane, wherein the absorber is configured to produce streams, droplets, or a combination thereof of an absorbing solution in an industrial gas such that at least 10% by weight of $CO_2$ in the industrial gas is transferred to the absorbing solution forming a charged solution that comprises carbonates, bicarbonates, or any combination thereof;

a first inlet for an original composition of the industrial gas, wherein the original composition comprises $CO_2$, SOx, NOx, heavy metals, non-$CO_2$ acid gases, and/or fly ash, and wherein the first inlet is operably connected to the absorber;

a second inlet for the absorbing solution, wherein the absorbing solution comprises an alkaline solution, and wherein the second inlet is operably connected to the absorber;

a first outlet for an effluent gas, said effluent gas characterized by being depleted in $CO_2$ and at least one of SOx, NOx, heavy metals, non-$CO_2$ acid gases, and/or fly ash relative to said original composition of said industrial gas, wherein the first outlet is operably connected to said absorber;

a second outlet for the charged solution that has contacted the industrial gas, wherein the second outlet is operably connected to the absorber; and a processing station operably connected to the second outlet, wherein the processing station comprises a third inlet operably connected to a source of divalent cations and a third outlet operably connected to a separation station, wherein the processing station is configured to contact the charged solution with the divalent cations.

5. An apparatus comprising:

an absorber comprising at least one of a spray tower, packing material, a packed bed, trays, shed rows, or a microporous membrane, wherein the absorber is configured to produce streams, droplets, rivulets, columns of liquid, jet sprays, liquid sheets, neutrally buoyant clouds of solution or a combination thereof of an absorbing solution in an industrial gas wherein the industrial gas comprises combustion flue gas, cement kiln flue gas, compressed carbon dioxide, or any combination thereof such that at least 10% by weight of $CO_2$ in the industrial gas is transferred to the absorbing solution forming a charged solution that comprises carbonates, bicarbonates, or any combination thereof;

a first inlet for an original composition of the industrial gas, wherein the original composition comprises $CO_2$, SOx, NOx, heavy metals, non-$CO_2$ acid gases, and/or fly ash, and wherein the first inlet is operably connected to the absorber;

a second inlet for the absorbing solution, wherein the absorbing solution comprises an alkaline solution, and wherein the second inlet is operably connected to the absorber;

a first outlet for an effluent gas, said effluent gas characterized by being depleted in $CO_2$ and at least one of SOx, NOx, heavy metals, non-$CO_2$ acid gases, and/or fly ash relative to said original composition of said industrial gas, wherein the first outlet is operably connected to said absorber;

a second outlet for the charged solution that has contacted the industrial gas, wherein the second outlet is operably connected to the absorber; and a processing station operably connected to the second output, wherein the processing station comprises a third inlet operably connected to a source of divalent cations and a third outlet operably connected to a separation station, and wherein the processing station is configured to contact the charged solution with the divalent cations.

6. The apparatus of any one of claims 2-5, further comprising atomizing components, comprising: pressure atomizers (nozzles), rotary atomizers, air-assisted atomizers, airblast atomizers, ultrasonic atomizers, ink jet atomizers, MEMS atomizers, electrostatic spray atomizers, dual fluid atomizers, eduction nozzles, or any combination thereof within the contacting chamber.

7. The apparatus of any one of claims 1-5, wherein water in the absorbing solution comprises sea water, alkaline brine, cation-rich brine, synthetic brine, industrial waste water, industrial waste brine, or any combination thereof.

8. The apparatus of any one of claims 1-5, further comprising a recirculation system.

9. The apparatus of claim 8, wherein the recirculation system comprises conduits and pumps to move the absorbing solution that has contacted the industrial gas from the third outlet of the processing station to the second inlet for absorbing solution.

10. The apparatus of claim 9, wherein the recirculation system further comprises conduits and pumps to move gas reduced in $CO_2$ from the first outlet for effluent gas to the first inlet for industrial gas.

* * * * *

UNITED STATES PATENT AND TRADEMARK OFFICE
CERTIFICATE OF CORRECTION

PATENT NO. : 8,137,444 B2
APPLICATION NO. : 12/721545
DATED : March 20, 2012
INVENTOR(S) : Kasra Farsad et al.

Page 1 of 1

It is certified that error appears in the above-identified patent and that said Letters Patent is hereby corrected as shown below:

In the Claims:

Claim 2, Column 125, Line 34, should be changed from "third operably" to --third outlet operably--

Claim 5, Column 127, Lines 4-5, should be changed from "outlet" to --output--

Claim 5, Column 127, Line 8, delete "and"

Signed and Sealed this
Eighteenth Day of August, 2015

Michelle K. Lee
*Director of the United States Patent and Trademark Office*